US012754327B2

(12) United States Patent
Dupray et al.

(10) Patent No.: US 12,754,327 B2
(45) Date of Patent: Oct. 6, 2026

(54) SERVICES AND APPLICATIONS FOR A COMMUNICATIONS NETWORK

(71) Applicant: Mobile Maven LLC, Coconut Creek, FL (US)

(72) Inventors: Dennis J. Dupray, Golden, CO (US); Sheldon F. Goldberg, Las Vegas, NV (US)

( * ) Notice: Subject to any disclaimer, the term of this patent is extended or adjusted under 35 U.S.C. 154(b) by 0 days.

(21) Appl. No.: 18/651,593

(22) Filed: Apr. 30, 2024

(65) Prior Publication Data

US 2024/0361469 A1 Oct. 31, 2024

Related U.S. Application Data

(63) Continuation of application No. 16/902,125, filed on Jun. 15, 2020, now Pat. No. 11,971,491, which is a
(Continued)

(51) Int. Cl.
*G01S 19/46* (2010.01)
*G01S 5/02* (2010.01)
(Continued)

(52) U.S. Cl.
CPC ............ *G01S 19/46* (2013.01); *G01S 5/0278* (2013.01); *H04W 4/021* (2013.01); *H04W 4/029* (2018.02);
(Continued)

(58) Field of Classification Search
CPC ...... G01S 19/46; G01S 5/0278; H04W 4/029; H04W 4/021; H04W 64/00; H04W 4/024;
(Continued)

(56) References Cited

U.S. PATENT DOCUMENTS 3,630,079 A 12/1971 Hughes et al.
3,646,580 A 2/1972 Fuller et al.
(Continued)

FOREIGN PATENT DOCUMENTS

EP 0177203 4/1986
EP 0346461 12/1989
(Continued)

OTHER PUBLICATIONS

Mateja, Jim, "Cadillac Offers A High-tech Guardian Angel," Chicago Tribune, Apr. 21, 1996, 4 pages.
(Continued)

*Primary Examiner* — Nuzhat Pervin
(74) *Attorney, Agent, or Firm* — Au Law Office, P.C.; Yiu F. Au

(57) ABSTRACT

A location system is disclosed for commercial wireless telecommunication infrastructures. The system is an end-to-end solution having one or more location centers for outputting requested locations of commercially available handsets or mobile stations (MS) based on, e.g., CDMA, AMPS, NAMPS or TDMA communication standards, for processing both local MS location requests and more global MS location requests via, e.g., Internet communication between a distributed network of location centers. The system uses a plurality of MS locating technologies including those based on: (1) two-way TOA and TDOA; (2) pattern recognition; (3) distributed antenna provisioning; (5) GPS signals, (6) angle of arrival, (7) super resolution enhancements, and (8) supplemental information from various types of very low cost non-infrastructure base stations for communicating via a typical commercial wireless base station infrastructure or a public telephone switching network. Accordingly, the traditional MS location difficulties, such as multipath, poor location accuracy and poor coverage are alleviated via such
(Continued)

technologies in combination with strategies for: (a) automatically adapting and calibrating system performance according to environmental and geographical changes; (b) automatically capturing location signal data for continual enhancement of a self-maintaining historical data base retaining predictive location signal data; (c) evaluating MS locations according to both heuristics and constraints related to, e.g., terrain, MS velocity and MS path extrapolation from tracking and (d) adjusting likely MS locations adaptively and statistically so that the system becomes progressively more comprehensive and accurate. Further, the system can be modularly configured for use in location signaling environments ranging from urban, dense urban, suburban, rural, mountain to low traffic or isolated roadways. Accordingly, the system is useful for 911 emergency calls, tracking, routing, people and animal location including applications for confinement to and exclusion from certain areas.

56 Claims, 37 Drawing Sheets

Related U.S. Application Data continuation of application No. 13/844,708, filed on Mar. 15, 2013, now Pat. No. 10,684,350, which is a continuation-in-part of application No. 13/037,337, filed on Feb. 28, 2011, now Pat. No. 10,641,861.

(51) Int. Cl.
*H04W 4/021* (2018.01)
*H04W 4/024* (2018.01)
*H04W 4/029* (2018.01)
*H04W 24/10* (2009.01)
*H04W 64/00* (2009.01)
*H04W 88/00* (2009.01)

(52) U.S. Cl.
CPC ........... *H04W 24/10* (2013.01); *H04W 64/00* (2013.01); *H04W 4/024* (2018.02); *H04W 64/006* (2013.01); *H04W 88/005* (2013.01)

(58) Field of Classification Search
CPC .. H04W 24/10; H04W 64/006; H04W 88/005
USPC ........................................................ 342/451
See application file for complete search history.

(56) References Cited

U.S. PATENT DOCUMENTS 3,845,289 A 10/1974 French
3,881,060 A 4/1975 Connell et al.
3,886,553 A 5/1975 Bates
4,023,176 A 5/1977 Currie et al.
4,052,569 A 10/1977 Pirnie, III
4,232,313 A 11/1980 Fleishman
4,310,726 A 1/1982 Asmuth
4,347,618 A 8/1982 Kavouras et al.
4,402,049 A 8/1983 Gray
4,438,439 A 3/1984 Shreve
4,445,118 A 4/1984 Taylor et al.
4,450,320 A 5/1984 Ostermann et al.
4,459,667 A 7/1984 Takeuchi
4,463,357 A 7/1984 MacDoran
4,475,010 A 10/1984 Huensch et al.
4,521,645 A 6/1985 Carroll
RE31,962 E 7/1985 Brodeur
4,542,744 A 9/1985 Barnes et al.
4,555,594 A 11/1985 Friedes et al.
4,558,300 A 12/1985 Goldman
4,630,057 A 12/1986 Martin
4,636,795 A 1/1987 Dano
4,651,156 A 3/1987 Martinez
4,651,157 A 3/1987 Gray et al.
4,660,037 A 4/1987 Nakamura
4,670,758 A 6/1987 Campbell
4,700,374 A 10/1987 Bini
4,721,958 A 1/1988 Jenkin
4,728,959 A 3/1988 Maloney et al.
4,740,792 A 4/1988 Sagey et al.
4,742,357 A 5/1988 Rackley
4,743,913 A 5/1988 Takai
4,750,197 A 6/1988 Denekamp et al.
4,760,531 A 7/1988 Yasui et al.
4,785,463 A 11/1988 Janc et al.
4,791,572 A 12/1988 Green, III et al.
4,799,062 A 1/1989 Sanderford, Jr. et al.
4,806,940 A 2/1989 Harral et al.
4,812,980 A 3/1989 Yamada et al.
4,814,711 A 3/1989 Olsen et al.
4,818,998 A 4/1989 Apsell et al.
4,857,840 A 8/1989 Lanchais
4,860,352 A 8/1989 Laurance et al.
4,864,313 A 9/1989 Konneker
4,866,450 A 9/1989 Chisholm
4,870,576 A 9/1989 Tornetta
4,876,550 A 10/1989 Kelly
4,876,738 A 10/1989 Selby
4,879,713 A 11/1989 Ichiyoshi
4,888,593 A 12/1989 Friedman et al.
4,891,650 A 1/1990 Sheffer
4,891,761 A 1/1990 Gray et al.
4,893,325 A 1/1990 Pankonen et al.
4,903,212 A 2/1990 Yokouchi et al.
4,908,629 A 3/1990 Apsell et al.
4,914,689 A 4/1990 Quade et al.
4,924,491 A 5/1990 Compton et al.
4,952,772 A 8/1990 Zana
4,990,922 A 2/1991 Young et al.
4,992,796 A 2/1991 Apostolos
4,995,071 A 2/1991 Weber et al.
5,003,317 A 3/1991 Gray et al.
5,008,679 A 4/1991 Effland et al.
5,017,926 A 5/1991 Ames et al.
5,022,067 A 6/1991 Hughes
5,022,751 A 6/1991 Howard
5,032,989 A 7/1991 Tornetta
5,034,898 A 7/1991 Lu et al.
5,043,736 A 8/1991 Darnell et al.
5,045,852 A 9/1991 Mitchell et al.
5,045,861 A 9/1991 Duffett-Smith
5,046,088 A 9/1991 Margulies
5,055,851 A 10/1991 Sheffer
5,067,153 A 11/1991 Willie et al.
5,075,694 A 12/1991 Donnangelo
5,077,788 A 12/1991 Cook et al.
5,092,343 A 3/1992 Spitzer et al.
5,099,245 A 3/1992 Sagey
5,109,399 A 4/1992 Thompson
5,111,209 A 5/1992 Toriyama
5,119,101 A 6/1992 Barnard
5,119,102 A 6/1992 Barnard
5,119,104 A 6/1992 Heller
5,136,686 A 8/1992 Koza
5,142,590 A 8/1992 Carpenter et al.
5,153,909 A 10/1992 Beckle et al.
5,155,490 A 10/1992 Spradley, Jr. et al.
5,155,688 A 10/1992 Tanaka et al.
5,155,689 A 10/1992 Wortham
5,161,180 A 11/1992 Chavous
5,163,004 A 11/1992 Rentz
5,166,694 A 11/1992 Russell et al.
5,177,489 A 1/1993 Hatch
5,184,347 A 2/1993 Farwell et al.
5,185,786 A 2/1993 Zwick
5,191,342 A 3/1993 Alsup et al.
5,193,110 A 3/1993 Jones et al.
5,202,829 A 4/1993 Geier
5,208,756 A 5/1993 Song
5,208,757 A 5/1993 Appriou et al.

(56) References Cited

U.S. PATENT DOCUMENTS 5,210,540 A 5/1993 Masumoto
5,212,765 A 5/1993 Skeirik
5,212,804 A 5/1993 Choate
5,214,789 A 5/1993 George
5,216,611 A 6/1993 McElreath
5,218,367 A 6/1993 Sheffer et al.
5,218,618 A 6/1993 Sagey
5,218,716 A 6/1993 Comroe et al.
5,220,509 A 6/1993 Takemura et al.
5,223,844 A 6/1993 Mansell et al.
5,225,842 A 7/1993 Brown et al.
5,233,541 A 8/1993 Corwin et al.
5,235,630 A 8/1993 Moody et al.
5,235,633 A 8/1993 Dennison et al.
5,239,570 A 8/1993 Koster et al.
5,243,530 A 9/1993 Stanifer et al.
5,245,651 A 9/1993 Takashima et al.
5,251,273 A 10/1993 Betts et al.
5,257,195 A 10/1993 Hirata
5,260,711 A 11/1993 Sterzer
5,268,958 A 12/1993 Nakano
5,276,451 A 1/1994 Odagawa
5,278,892 A 1/1994 Bolliger et al.
5,280,295 A 1/1994 Kelley et al.
5,280,472 A 1/1994 Gilhousen et al.
5,282,261 A 1/1994 Skeirik
5,293,318 A 3/1994 Fukushima
5,293,642 A 3/1994 Lo
5,293,645 A 3/1994 Sood
5,295,180 A 3/1994 Vendetti et al.
5,299,260 A 3/1994 Shaio
5,311,195 A 5/1994 Mathis et al.
5,311,569 A 5/1994 Brozovich et al.
5,317,323 A 5/1994 Kennedy et al.
5,319,374 A 6/1994 Desai et al.
5,323,444 A 6/1994 Ertz et al.
5,325,419 A 6/1994 Connolly et al.
5,327,144 A 7/1994 Stilp et al.
5,331,550 A 7/1994 Stafford et al.
5,334,974 A 8/1994 Simms et al.
5,334,986 A 8/1994 Fernhout
5,337,343 A 8/1994 Stickney
5,339,351 A 8/1994 Hoskinson et al.
5,343,209 A 8/1994 Sennott et al.
5,345,245 A 9/1994 Ishikawa et al.
5,347,567 A 9/1994 Moody et al.
5,347,568 A 9/1994 Moody et al.
5,349,631 A 9/1994 Lee
5,359,521 A 10/1994 Kyrtsos et al.
5,363,110 A 11/1994 Inamiya
5,365,447 A 11/1994 Dennis
5,365,450 A 11/1994 Schuchman et al.
5,365,516 A 11/1994 Jandrell
5,365,544 A 11/1994 Schilling
5,367,555 A 11/1994 Isoyama
5,373,456 A 12/1994 Ferkinhoff et al.
5,373,546 A 12/1994 Holzermer
5,374,933 A 12/1994 Kao
5,379,224 A 1/1995 Brown et al.
5,388,145 A 2/1995 Mulrow et al.
5,388,147 A 2/1995 Grimes
5,388,259 A 2/1995 Fleischman et al.
5,389,934 A 2/1995 Kass
5,390,339 A 2/1995 Bruckert et al.
5,392,052 A 2/1995 Eberwine
5,392,329 A 2/1995 Adams et al.
5,394,158 A 2/1995 Chia
5,394,333 A 2/1995 Kao
5,394,435 A 2/1995 Weerackody
5,394,445 A 2/1995 Ball et al.
5,395,366 A 3/1995 D'Andrea et al.
5,396,548 A 3/1995 Bayerl et al.
5,398,277 A 3/1995 Martin, Jr. et al.
5,398,302 A 3/1995 Thrift
5,402,520 A 3/1995 Schnitta
5,402,524 A 3/1995 Bauman et al.
5,408,586 A 4/1995 Skeirik
5,408,588 A 4/1995 Ulug
5,410,737 A 4/1995 Jones
5,412,388 A 5/1995 Attwood
5,412,708 A 5/1995 Katz
5,416,712 A 5/1995 Geier et al.
5,418,843 A 5/1995 Stjernholm
5,420,594 A 5/1995 FitzGerald et al.
5,420,914 A 5/1995 Blumhardt
5,422,813 A 6/1995 Schuchman et al.
5,423,067 A 6/1995 Manabe
5,425,136 A 6/1995 Lo et al.
5,426,745 A 6/1995 Baji et al.
5,428,546 A 6/1995 Shah et al.
5,430,654 A 7/1995 Kyrtsos et al.
5,432,841 A 7/1995 Rimer
5,434,927 A 7/1995 Brady et al.
5,434,950 A 7/1995 Kaallman
5,438,517 A 8/1995 Sennott et al.
5,438,644 A 8/1995 Fu
5,438,688 A 8/1995 Masaki
5,442,349 A 8/1995 Inoue et al.
5,444,451 A 8/1995 Johnson et al.
5,448,618 A 9/1995 Sandlerman
5,448,754 A 9/1995 Ho et al.
5,452,211 A 9/1995 Kyrtsos et al.
5,457,736 A 10/1995 Cain et al.
5,461,390 A 10/1995 Hoshen
5,465,082 A 11/1995 Chaco
5,467,282 A 11/1995 Dennis
5,473,602 A 12/1995 McKenna et al.
5,475,745 A 12/1995 Boyle
5,477,458 A 12/1995 Loomis
5,479,397 A 12/1995 Lee
5,479,482 A 12/1995 Grimes
5,485,163 A 1/1996 Singer et al.
5,488,559 A 1/1996 Seymour
5,490,073 A 2/1996 Kyrtsos
5,497,149 A 3/1996 Fast
5,502,757 A 3/1996 Bales et al.
5,506,864 A 4/1996 Schilling
5,508,707 A 4/1996 LeBlanc et al.
5,508,708 A 4/1996 Ghosh et al.
5,509,055 A 4/1996 Ehrlich et al.
5,510,798 A 4/1996 Bauer
5,510,801 A 4/1996 Engelbrecht et al.
5,511,109 A 4/1996 Hartley et al.
5,512,903 A 4/1996 Schmidtke
5,512,904 A 4/1996 Bennett
5,512,908 A 4/1996 Herrick
5,513,111 A 4/1996 Wortham
5,513,243 A 4/1996 Kage
5,513,246 A 4/1996 Jonsson et al.
5,515,285 A 5/1996 Garrett, Sr. et al.
5,515,378 A 5/1996 Roy, III et al.
5,515,419 A 5/1996 Sheffer
5,517,419 A 5/1996 Lanckton et al.
5,517,667 A 5/1996 Wang
5,519,760 A 5/1996 Borkowski et al.
5,526,001 A 6/1996 Rose et al.
5,526,357 A 6/1996 Jandrell
5,526,466 A 6/1996 Takizawa
5,532,690 A 7/1996 Hertel
5,533,100 A 7/1996 Bass et al.
5,537,460 A 7/1996 Holliday, Jr. et al.
5,539,395 A 7/1996 Buss et al.
5,541,845 A 7/1996 Klein
5,546,092 A 8/1996 Kurokawa et al.
5,546,445 A 8/1996 Dennison et al.
5,552,772 A 9/1996 Janky et al.
5,555,257 A 9/1996 Dent
5,555,286 A 9/1996 Tendler
5,555,503 A 9/1996 Kyrtsos et al.
5,559,520 A 9/1996 Barzegar et al.
5,559,878 A 9/1996 Keys et al.
5,561,704 A 10/1996 Salimando
5,561,840 A 10/1996 Alvesalo et al.
5,563,611 A 10/1996 McGann et al.

(56) References Cited

U.S. PATENT DOCUMENTS

| | | | |
|---|---|---|---|
| 5,563,931 | A | 10/1996 | Bishop et al. |
| 5,564,079 | A | 10/1996 | Olsson |
| 5,565,858 | A | 10/1996 | Guthrie |
| 5,570,412 | A | 10/1996 | LeBlanc |
| 5,572,218 | A | 11/1996 | Cohen et al. |
| 5,574,648 | A | 11/1996 | Pilley |
| 5,577,169 | A | 11/1996 | Prezioso |
| 5,579,368 | A | 11/1996 | van Berkum |
| 5,579,535 | A | 11/1996 | Orlen et al. |
| 5,581,490 | A | 12/1996 | Ferkinhoff et al. |
| 5,581,596 | A | 12/1996 | Hogan |
| 5,583,513 | A | 12/1996 | Cohen |
| 5,583,517 | A | 12/1996 | Yokev et al. |
| 5,586,178 | A | 12/1996 | Koenig et al. |
| 5,588,038 | A | 12/1996 | Snyder |
| 5,592,180 | A | 1/1997 | Yokev et al. |
| 5,594,425 | A | 1/1997 | Ladner et al. |
| 5,594,650 | A | 1/1997 | Shah et al. |
| 5,594,740 | A | 1/1997 | LaDue |
| 5,594,782 | A | 1/1997 | Zicker et al. |
| 5,596,332 | A | 1/1997 | Coles et al. |
| 5,596,625 | A | 1/1997 | LeBlanc |
| 5,598,167 | A | 1/1997 | Zijderhand |
| 5,598,460 | A | 1/1997 | Tendler |
| 5,600,705 | A | 2/1997 | Maenpaa |
| 5,600,706 | A | 2/1997 | Dunn et al. |
| 5,602,903 | A | 2/1997 | LeBlanc et al. |
| 5,604,765 | A | 2/1997 | Bruno et al. |
| 5,608,410 | A | 3/1997 | Stilp et al. |
| 5,608,854 | A | 3/1997 | Labedz et al. |
| 5,610,815 | A | 3/1997 | Gudat et al. |
| 5,610,972 | A | 3/1997 | Emery et al. |
| 5,611,704 | A | 3/1997 | Kamizono et al. |
| 5,612,703 | A | 3/1997 | Mallinckrodt |
| 5,612,864 | A | 3/1997 | Henderson |
| 5,613,041 | A | 3/1997 | Keeler et al. |
| 5,613,205 | A | 3/1997 | Dufour |
| 5,614,914 | A | 3/1997 | Bolgiano et al. |
| 5,617,565 | A | 4/1997 | Augenbraun et al. |
| 5,619,522 | A | 4/1997 | Dube |
| 5,619,552 | A | 4/1997 | Karppanen et al. |
| 5,621,848 | A | 4/1997 | Wang |
| 5,625,668 | A | 4/1997 | Loomis et al. |
| 5,625,748 | A | 4/1997 | McDonough et al. |
| 5,627,547 | A | 5/1997 | Ramaswamy et al. |
| 5,627,549 | A | 5/1997 | Park |
| 5,627,884 | A | 5/1997 | Williams et al. |
| 5,629,707 | A | 5/1997 | Heuvel et al. |
| 5,631,469 | A | 5/1997 | Carrieri et al. |
| 5,631,656 | A | 5/1997 | Hartman et al. |
| 5,634,051 | A | 5/1997 | Thomson |
| 5,635,953 | A | 6/1997 | Hayami et al. |
| 5,638,486 | A | 6/1997 | Wang et al. |
| 5,640,103 | A | 6/1997 | Petsche et al. |
| 5,642,285 | A | 6/1997 | Woo et al. |
| 5,642,303 | A | 6/1997 | Small et al. |
| 5,646,630 | A | 7/1997 | Sheynblat et al. |
| 5,646,857 | A | 7/1997 | McBurney et al. |
| 5,646,987 | A | 7/1997 | Gerber et al. |
| 5,649,065 | A | 7/1997 | Lo et al. |
| 5,652,570 | A | 7/1997 | Lepkofker |
| 5,652,788 | A | 7/1997 | Hara |
| 5,657,010 | A | 8/1997 | Jones |
| 5,657,025 | A | 8/1997 | Ebner et al. |
| 5,657,487 | A | 8/1997 | Doner |
| 5,663,734 | A | 9/1997 | Krasner |
| 5,664,948 | A | 9/1997 | Dimitriadis et al. |
| 5,669,061 | A | 9/1997 | Schipper |
| 5,673,322 | A | 9/1997 | Pepe et al. |
| 5,675,344 | A | 10/1997 | Tong et al. |
| 5,675,788 | A | 10/1997 | Husick et al. |
| 5,686,924 | A | 11/1997 | Trimble et al. |
| 5,689,270 | A | 11/1997 | Kelley et al. |
| 5,689,548 | A | 11/1997 | Maupin et al. |
| 5,697,055 | A | 12/1997 | Gilhousen et al. |
| 5,701,328 | A | 12/1997 | Schuchman et al. |
| 5,710,328 | A | 1/1998 | Spivey et al. |
| 5,710,758 | A | 1/1998 | Soliman et al. |
| 5,710,918 | A | 1/1998 | Lagarde et al. |
| 5,712,900 | A | 1/1998 | Maupin et al. |
| 5,715,306 | A | 2/1998 | Sunderman et al. |
| 5,717,406 | A | 2/1998 | Sanderford et al. |
| 5,717,737 | A | 2/1998 | Doviak et al. |
| 5,719,584 | A | 2/1998 | Otto |
| 5,724,047 | A | 3/1998 | Lioio et al. |
| 5,724,648 | A | 3/1998 | Shaughnessy et al. |
| 5,724,660 | A | 3/1998 | Kauser et al. |
| 5,727,057 | A | 3/1998 | Emery et al. |
| 5,729,549 | A | 3/1998 | Kostreski et al. |
| 5,732,074 | A | 3/1998 | Spaur et al. |
| 5,732,354 | A | 3/1998 | MacDonald |
| 5,736,964 | A | 4/1998 | Ghosh et al. |
| 5,737,431 | A | 4/1998 | Brandstein et al. |
| 5,740,048 | A | 4/1998 | Abel et al. |
| 5,740,049 | A | 4/1998 | Kaise |
| 5,742,509 | A | 4/1998 | Goldberg et al. |
| 5,742,905 | A | 4/1998 | Pepe et al. |
| 5,751,228 | A | 5/1998 | Kamiya et al. |
| 5,754,955 | A | 5/1998 | Ekbatani |
| 5,757,316 | A | 5/1998 | Buchler |
| 5,761,278 | A | 6/1998 | Pickett et al. |
| 5,764,756 | A | 6/1998 | Onweller |
| 5,768,359 | A | 6/1998 | DiPierro, Jr. et al. |
| 5,768,360 | A | 6/1998 | Reynolds et al. |
| 5,771,280 | A | 6/1998 | Johnson |
| 5,774,802 | A | 6/1998 | Tell et al. |
| 5,774,805 | A | 6/1998 | Zicker |
| 5,774,829 | A | 6/1998 | Cisneros et al. |
| 5,774,869 | A | 6/1998 | Toader |
| 5,786,773 | A | 7/1998 | Murphy |
| 5,787,235 | A | 7/1998 | Smith et al. |
| 5,787,354 | A | 7/1998 | Gray et al. |
| 5,790,953 | A | 8/1998 | Wang et al. |
| 5,790,974 | A | 8/1998 | Tognazzini |
| 5,799,016 | A | 8/1998 | Onweller |
| 5,799,061 | A | 8/1998 | Melcher et al. |
| 5,802,454 | A | 9/1998 | Goshay et al. |
| 5,802,492 | A | 9/1998 | DeLorme et al. |
| 5,802,518 | A | 9/1998 | Karaev et al. |
| 5,805,670 | A | 9/1998 | Pons et al. |
| 5,809,415 | A | 9/1998 | Rossmann |
| 5,809,437 | A | 9/1998 | Breed |
| 5,815,417 | A | 9/1998 | Orr et al. |
| 5,815,538 | A | 9/1998 | Grell et al. |
| 5,815,814 | A | 9/1998 | Dennison et al. |
| RE35,916 | E | 10/1998 | Dennison et al. |
| 5,819,273 | A | 10/1998 | Vora et al. |
| 5,819,301 | A | 10/1998 | Rowe et al. |
| 5,822,539 | A | 10/1998 | van Hoff |
| 5,825,283 | A | 10/1998 | Camhi |
| 5,831,977 | A | 11/1998 | Dent |
| 5,832,059 | A | 11/1998 | Aldred et al. |
| 5,832,367 | A | 11/1998 | Bamburak et al. |
| 5,835,568 | A | 11/1998 | Bass et al. |
| 5,835,857 | A | 11/1998 | Otten |
| 5,835,907 | A | 11/1998 | Newman |
| 5,838,562 | A | 11/1998 | Gudat et al. |
| 5,841,396 | A | 11/1998 | Krasner |
| 5,842,130 | A | 11/1998 | Oprescu-Surcobe et al. |
| 5,844,522 | A | 12/1998 | Sheffer et al. |
| 5,845,198 | A | 12/1998 | Bamburak et al. |
| 5,845,267 | A | 12/1998 | Ronen |
| 5,857,181 | A | 1/1999 | Augenbraun et al. |
| 5,864,313 | A | 1/1999 | Speck et al. |
| 5,864,755 | A | 1/1999 | King et al. |
| 5,867,495 | A | 2/1999 | Elliott et al. |
| 5,867,799 | A | 2/1999 | Lang et al. |
| 5,870,029 | A | 2/1999 | Otto et al. |
| 5,872,539 | A | 2/1999 | Mullen |
| 5,873,040 | A | 2/1999 | Dunn et al. |
| 5,873,076 | A | 2/1999 | Barr et al. |
| 5,875,394 | A | 2/1999 | Daly et al. |
| 5,875,401 | A | 2/1999 | Rochkind |
| 5,883,598 | A | 3/1999 | Parl et al. |

(56) References Cited

U.S. PATENT DOCUMENTS 5,884,216 A 3/1999 Shah et al.
5,890,068 A 3/1999 Fattouche et al.
5,892,441 A 4/1999 Woolley et al.
5,892,454 A 4/1999 Schipper et al.
5,893,091 A 4/1999 Hunt et al.
5,895,436 A 4/1999 Savoie et al.
5,898,757 A 4/1999 Buhler et al.
5,901,358 A 5/1999 Petty et al.
5,902,351 A 5/1999 Streit et al.
5,903,844 A 5/1999 Bruckert et al.
5,904,727 A 5/1999 Prabhakaran
5,905,455 A 5/1999 Heger et al.
5,906,655 A 5/1999 Fan
5,913,170 A 6/1999 Wortham
5,914,675 A 6/1999 Tognazzini
5,917,405 A 6/1999 Joao
5,917,449 A 6/1999 Sanderford et al.
5,917,866 A 6/1999 Pon
5,920,873 A 7/1999 Van Huben et al.
5,922,040 A 7/1999 Prabhakaran
5,923,286 A 7/1999 Divakaruni
5,924,090 A 7/1999 Krellenstein
5,926,133 A 7/1999 Green, Jr.
5,929,806 A 7/1999 Birchler et al.
5,930,699 A 7/1999 Bhatia
5,930,717 A 7/1999 Yost et al.
5,933,421 A 8/1999 Alamouti et al.
5,933,822 A 8/1999 Braden-Harder et al.
5,936,572 A 8/1999 Loomis et al.
5,938,721 A 8/1999 Dussell et al.
5,940,474 A 8/1999 Ruus
5,943,014 A 8/1999 Gilhousen
5,945,944 A 8/1999 Krasner
5,945,948 A 8/1999 Buford et al.
5,948,040 A 9/1999 DeLorme et al.
5,949,815 A 9/1999 Pon
5,952,969 A 9/1999 Hagerman et al.
5,959,568 A 9/1999 Woolley
5,959,580 A 9/1999 Maloney et al.
5,960,337 A 9/1999 Brewster et al.
5,963,866 A 10/1999 Palamara et al.
5,966,658 A 10/1999 Kennedy, III et al.
5,969,673 A 10/1999 Bickley
5,969,674 A 10/1999 von der Embse et al.
5,973,643 A 10/1999 Hawkes et al.
5,977,913 A 11/1999 Christ
5,978,840 A 11/1999 Nguyen et al.
5,982,324 A 11/1999 Watters et al.
5,982,891 A 11/1999 Ginter et al.
5,983,161 A 11/1999 Lemelson et al.
5,983,214 A 11/1999 Lang et al.
5,987,329 A 11/1999 Yost et al.
5,999,124 A 12/1999 Sheynblat
5,999,126 A 12/1999 Ito
6,009,334 A 12/1999 Grubeck et al.
6,011,841 A 1/2000 Isono
6,011,844 A 1/2000 Uppaluru et al.
6,012,013 A 1/2000 McBurney
6,014,102 A 1/2000 Mitzlaff et al.
6,014,555 A 1/2000 Tendler
6,021,371 A 2/2000 Fultz
6,023,241 A 2/2000 Clapper
6,026,304 A 2/2000 Hilsenrath et al.
6,026,345 A 2/2000 Shah et al.
6,028,551 A 2/2000 Schoen et al.
6,029,161 A 2/2000 Lang et al.
6,031,490 A 2/2000 Forssen et al.
6,034,635 A 3/2000 Gilhousen
6,038,668 A 3/2000 Chipman et al.
6,046,683 A 4/2000 Pidwerbetsky et al.
6,047,192 A 4/2000 Maloney et al.
6,054,928 A 4/2000 Lemelson, deceased et al.
6,061,064 A 5/2000 Reichlen
6,064,339 A 5/2000 Wax et al.
6,064,722 A 5/2000 Clise et al.
6,064,942 A 5/2000 Johnson et al.
6,073,004 A 6/2000 Balachandran
6,073,005 A 6/2000 Raith et al.
6,075,853 A 6/2000 Boeckman et al.
6,081,229 A 6/2000 Soliman et al.
6,094,573 A 7/2000 Heinonen et al.
6,097,958 A 8/2000 Bergen
6,101,178 A 8/2000 Beal
6,101,390 A 8/2000 Jayaraman et al.
6,101,391 A 8/2000 Ishizuka et al.
6,108,555 A 8/2000 Maloney et al.
6,108,557 A 8/2000 Wax et al.
6,112,095 A 8/2000 Wax et al.
6,115,611 A 9/2000 Kimoto et al.
6,122,520 A 9/2000 Want et al.
6,128,501 A 10/2000 Ffoulkes-Jones
6,131,067 A 10/2000 Girerd et al.
6,138,003 A 10/2000 Kingdon et al.
6,145,751 A 11/2000 Ahmed
6,151,355 A 11/2000 Vallee et al.
6,154,727 A 11/2000 Karp et al.
6,154,745 A 11/2000 Kari et al.
6,157,621 A 12/2000 Brown et al.
6,167,274 A 12/2000 Smith
6,169,902 B1 1/2001 Kawamoto
6,173,166 B1 1/2001 Whitecar
6,181,928 B1 1/2001 Moon
6,185,282 B1 2/2001 Boeckman et al.
6,185,427 B1 2/2001 Krasner et al.
6,202,023 B1 3/2001 Hancock et al.
6,208,290 B1 3/2001 Krasner
6,208,721 B1 3/2001 Feinberg et al.
6,236,358 B1 5/2001 Durst et al.
6,236,365 B1 * 5/2001 LeBlanc ............... G01S 5/0009
342/450
6,240,285 B1 5/2001 Blum et al.
6,243,039 B1 6/2001 Elliot
6,243,587 B1 6/2001 Dent et al.
6,249,245 B1 6/2001 Watters et al.
6,249,252 B1 6/2001 Dupray
6,259,381 B1 7/2001 Small
6,275,305 B1 8/2001 Shimada
6,275,773 B1 8/2001 Lemelson et al.
6,278,936 B1 8/2001 Jones
6,292,549 B1 9/2001 Lung et al.
6,292,799 B1 9/2001 Peek et al.
6,295,502 B1 9/2001 Hancock et al.
6,301,463 B1 10/2001 Dao et al.
6,304,833 B1 10/2001 Ferkinhoff et al.
6,308,072 B1 10/2001 Labedz et al.
6,317,060 B1 11/2001 Jones
6,317,718 B1 11/2001 Fano
6,321,092 B1 11/2001 Fitch et al.
6,323,894 B1 11/2001 Katz
6,324,276 B1 11/2001 Uppaluru et al.
6,324,404 B1 11/2001 Dennison et al.
6,327,342 B1 12/2001 Mobley et al.
6,330,452 B1 12/2001 Fattouche et al.
6,349,134 B1 2/2002 Katz
6,363,254 B1 3/2002 Jones et al.
6,370,234 B1 4/2002 Kroll
6,381,324 B1 4/2002 Shaffer et al.
6,381,329 B1 4/2002 Uppaluru et al.
6,381,464 B1 4/2002 Vannucci
6,385,302 B1 5/2002 Antonucci et al.
6,385,312 B1 5/2002 Shaffer et al.
6,385,541 B1 5/2002 Blumberg et al.
6,389,340 B1 5/2002 Rayner
6,393,346 B1 5/2002 Keith et al.
6,400,956 B1 6/2002 Richton
6,401,078 B1 6/2002 Roberts et al.
6,408,307 B1 6/2002 Semple et al.
6,415,018 B1 7/2002 Antonucci et al.
6,415,291 B2 7/2002 Bouve et al.
6,418,208 B1 7/2002 Gundlach et al.
6,430,411 B1 8/2002 Lempio et al.
6,434,223 B2 8/2002 Katz
6,438,380 B1 8/2002 Bi et al.
6,442,485 B2 8/2002 Evans

(56) References Cited

U.S. PATENT DOCUMENTS 6,445,784 B2 9/2002 Uppaluru et al.
6,459,782 B1 10/2002 Bedrosian et al.
6,477,362 B1 11/2002 Raith et al.
6,486,801 B1 11/2002 Jones
6,487,500 B2 11/2002 Lemelson et al.
6,490,450 B1 12/2002 Batni et al.
6,492,912 B1 12/2002 Jones
6,493,439 B2 12/2002 Lung et al.
6,496,776 B1 12/2002 Blumberg et al.
6,510,383 B1 1/2003 Jones
6,512,415 B1 1/2003 Katz
6,519,232 B1 2/2003 Becher
6,519,463 B2 2/2003 Tendler
6,522,875 B1 2/2003 Dowling et al.
6,529,143 B2 3/2003 Mikkola et al.
6,529,722 B1 3/2003 Heinrich et al.
6,539,077 B1 3/2003 Ranalli et al.
6,549,130 B1 4/2003 Joao
6,549,768 B1 4/2003 Fraccaroli
6,563,921 B1 5/2003 Williams et al.
6,570,967 B2 5/2003 Katz
6,570,975 B2 5/2003 Shaffer et al.
6,571,279 B1 5/2003 Herz et al.
6,574,318 B1 6/2003 Cannon et al.
6,577,714 B1 6/2003 Darcie et al.
6,584,307 B1 6/2003 Antonucci et al.
6,587,546 B2 7/2003 Stumer et al.
6,591,112 B1 7/2003 Siccardo et al.
6,594,483 B2 7/2003 Nykanen et al.
6,597,983 B2 7/2003 Hancock
6,608,892 B2 8/2003 Shaffer et al.
6,618,668 B1 9/2003 Laird
6,622,020 B1 9/2003 Seki
6,625,437 B1 9/2003 Jampolsky et al.
6,628,755 B2 9/2003 Shimada et al.
6,633,900 B1 10/2003 Khalessi et al.
6,650,619 B1 11/2003 Schuster et al.
6,650,902 B1 11/2003 Richton
6,650,998 B1 11/2003 Rutledge et al.
6,661,884 B2 12/2003 Shaffer et al.
6,677,894 B2 1/2004 Sheynblat et al.
6,678,356 B2 1/2004 Stumer et al.
6,678,357 B2 1/2004 Stumer et al.
6,678,360 B1 1/2004 Katz
6,683,538 B1 1/2004 Wilkes, Jr.
6,700,507 B2 3/2004 Jones
6,707,421 B1 3/2004 Drury et al.
6,714,859 B2 3/2004 Jones
6,721,399 B2 4/2004 Beyda
6,724,860 B2 4/2004 Stumer et al.
6,731,940 B1 5/2004 Nagendran
6,741,927 B2 5/2004 Jones
6,744,857 B2 6/2004 Stumer
6,744,858 B1 6/2004 Ryan et al.
6,748,057 B2 6/2004 Ranalli et al.
6,748,226 B1 6/2004 Wortham
6,748,318 B1 6/2004 Jones
6,748,320 B2 6/2004 Jones
6,751,626 B2 6/2004 Brown et al.
6,754,334 B2 6/2004 Williams et al.
6,754,482 B1 6/2004 Torabi
6,757,359 B2 6/2004 Stumer et al.
6,760,601 B1 7/2004 Suoknuuti et al.
6,782,264 B2 * 8/2004 Anderson ................. G01S 5/06 455/560
6,804,606 B2 10/2004 Jones
6,813,501 B2 11/2004 Kinnunen et al.
6,819,929 B2 11/2004 Antonucci et al.
6,826,405 B2 11/2004 Doviak et al.
6,826,481 B2 11/2004 Root et al.
6,834,195 B2 12/2004 Brandenberg et al.
6,839,628 B1 1/2005 Tu
6,845,400 B2 1/2005 Macpherson et al.
6,847,825 B1 1/2005 Duvall et al.
6,850,600 B1 2/2005 Boeckman et al.
6,850,839 B1 2/2005 McGibney
6,868,139 B2 3/2005 Stumer et al.
6,871,140 B1 3/2005 Florance et al.
6,873,850 B2 3/2005 Dowling et al.
6,888,936 B1 5/2005 Groen et al.
6,889,139 B2 5/2005 Prabhakaran
6,904,359 B2 6/2005 Jones
6,912,545 B1 6/2005 Lundy et al.
6,950,876 B2 9/2005 Bright et al.
6,952,101 B2 10/2005 Gupta
6,952,181 B2 10/2005 Karr et al.
6,952,645 B1 10/2005 Jones
6,980,631 B1 12/2005 Danzl et al.
6,980,636 B2 12/2005 Fleischer, III et al.
6,985,742 B1 1/2006 Giniger et al.
6,993,118 B2 1/2006 Antonucci et al.
6,996,219 B2 2/2006 Rodriguez et al.
6,999,779 B1 2/2006 Hashimoto
7,003,081 B2 2/2006 Stumer et al.
7,010,536 B1 3/2006 De Angelo
7,019,770 B1 3/2006 Katz
7,030,781 B2 4/2006 Jones
7,031,724 B2 4/2006 Ross et al.
7,047,019 B1 5/2006 Cox et al.
7,050,818 B2 5/2006 Tendler
7,051,018 B2 5/2006 Reed et al.
7,054,432 B2 5/2006 Sabinson et al.
7,065,192 B2 6/2006 Danzl et al.
7,103,153 B2 9/2006 Stumer et al.
7,107,256 B2 9/2006 Nakajima et al.
7,114,651 B2 10/2006 Hjelmvik
7,136,473 B2 11/2006 Gruchala et al.
7,136,474 B2 11/2006 Shaffer et al.
7,167,553 B2 1/2007 Shaffer et al.
7,171,189 B2 1/2007 Bianconi et al.
7,177,397 B2 2/2007 McCalmont et al.
7,177,400 B2 2/2007 Eisner et al.
7,190,774 B2 3/2007 McFarland
7,191,058 B2 3/2007 Laird et al.
7,228,140 B2 6/2007 Anctil et al.
7,231,220 B2 * 6/2007 Reddy ................... H04W 4/029 455/457
7,245,910 B2 7/2007 Osmo
7,254,559 B2 8/2007 Florance et al.
7,274,332 B1 9/2007 Dupray
7,284,033 B2 10/2007 Jhanji
7,298,327 B2 * 11/2007 Dupray ................. G01S 5/0278 342/451
7,400,970 B2 7/2008 Jones
7,440,762 B2 * 10/2008 Maloney ................. G01S 19/09 455/457
7,525,484 B2 4/2009 Dupray et al.
7,660,437 B2 2/2010 Breed
7,702,682 B2 4/2010 De Angelo
7,714,778 B2 * 5/2010 Dupray ................. G01S 5/0252 342/357.31
7,764,231 B1 7/2010 Dupray
7,812,766 B2 10/2010 LeBlanc et al.
7,903,029 B2 3/2011 Dupray
7,925,274 B2 * 4/2011 Anderson ............... G01S 19/09 455/433
8,032,153 B2 10/2011 Karr et al.
8,082,096 B2 * 12/2011 Dupray ................. G01S 13/878 701/465
8,090,598 B2 1/2012 Bauer et al.
8,135,413 B2 3/2012 Dupray
8,571,580 B2 * 10/2013 Altman .............. G06Q 30/0207 455/457
8,611,923 B2 * 12/2013 Burke ................... H04W 64/00 455/456.2
8,838,139 B2 * 9/2014 Anderson ............. H04W 4/025 455/560
8,994,591 B2 * 3/2015 Dupray ................. H04W 64/00 342/465
9,412,367 B2 8/2016 Gazdzinski
9,621,661 B2 4/2017 Diem
9,996,315 B2 * 6/2018 Barnes, Jr. ......... G06Q 30/0259
10,083,608 B2 9/2018 O'Sullivan

(56) References Cited

U.S. PATENT DOCUMENTS

| | | | | |
|---|---|---|---|---|
| 2001/0039504 | A1 | 11/2001 | Linberg et al. | |
| 2002/0035605 | A1 | 3/2002 | McDowell et al. | |
| 2002/0087389 | A1 | 7/2002 | Sklarz et al. | |
| 2002/0111154 | A1 | 8/2002 | Eldering et al. | |
| 2003/0032409 | A1 | 2/2003 | Hutcheson et al. | |
| 2003/0040324 | A1 | 2/2003 | Eldering et al. | |
| 2003/0064705 | A1 | 4/2003 | Desiderio | |
| 2003/0146871 | A1* | 8/2003 | Karr | G01S 5/0009 342/465 |
| 2003/0148774 | A1 | 8/2003 | Naghian et al. | |
| 2003/0222820 | A1* | 12/2003 | Karr | G01S 5/0009 342/457 |
| 2004/0022258 | A1 | 2/2004 | Tsukada et al. | |
| 2004/0030631 | A1 | 2/2004 | Brown et al. | |
| 2004/0132464 | A1* | 7/2004 | Poykko | G01S 5/021 455/456.1 |
| 2004/0147254 | A1* | 7/2004 | Reddy | H04W 4/02 455/403 |
| 2004/0198386 | A1* | 10/2004 | Dupray | G01S 5/02 455/456.1 |
| 2004/0266457 | A1* | 12/2004 | Dupray | H04W 64/00 455/456.1 |
| 2005/0003831 | A1* | 1/2005 | Anderson | G01S 5/01 455/456.1 |
| 2005/0136945 | A1* | 6/2005 | Kennedy | H04W 64/00 455/456.1 |
| 2005/0288958 | A1 | 12/2005 | Eraker | |
| 2006/0106625 | A1 | 5/2006 | Brown | |
| 2006/0262011 | A1* | 11/2006 | Bull | G01S 5/0226 342/357.29 |
| 2006/0294147 | A1 | 12/2006 | Root et al. | |
| 2007/0043770 | A1 | 2/2007 | Goodrich et al. | |
| 2007/0150387 | A1 | 6/2007 | Sinsheim et al. | |
| 2008/0167049 | A1 | 7/2008 | Karr et al. | |
| 2009/0030707 | A1 | 1/2009 | Green | |
| 2009/0048938 | A1 | 2/2009 | Dupray | |
| 2009/0313089 | A1 | 12/2009 | Bonner et al. | |
| 2010/0063829 | A1 | 3/2010 | Dupray | |
| 2010/0234045 | A1 | 9/2010 | Karr et al. | |
| 2011/0244887 | A1 | 10/2011 | Dupray | |
| 2012/0058775 | A1 | 3/2012 | Dupray et al. | |
| 2012/0190380 | A1 | 7/2012 | Dupray et al. | |
| 2013/0150085 | A1* | 6/2013 | Jin | H04W 4/20 455/456.2 |
| 2013/0288692 | A1* | 10/2013 | Dupray | H04W 76/50 455/450 |
| 2016/0139242 | A1* | 5/2016 | Dupray | G01S 1/026 455/456.1 |
| 2016/0309298 | A1 | 10/2016 | Dupray et al. | |
| 2020/0333426 | A1* | 10/2020 | Dupray | G01S 5/0258 |
| 2020/0379079 | A1* | 12/2020 | Dupray | H04W 64/00 |
| 2024/0361469 | A1* | 10/2024 | Dupray | H04W 4/021 |
| 2026/0036666 | A1* | 2/2026 | Müller | G01R 31/36 |

FOREIGN PATENT DOCUMENTS

| | | | | |
|---|---|---|---|---|
| EP | 0546758 | | 6/1993 | |
| EP | 0592560 | | 4/1994 | |
| EP | 0672890 | | 9/1995 | |
| EP | 0689369 | | 12/1995 | |
| EP | 0748727 | | 12/1996 | |
| EP | 0762363 | | 3/1997 | |
| EP | 0781067 | | 6/1997 | |
| EP | 0810449 | | 12/1997 | |
| EP | 0811296 | | 12/1997 | |
| EP | 0860710 | | 8/1998 | |
| EP | 0870203 | | 10/1998 | |
| EP | 0923817 | | 6/1999 | |
| EP | 1045604 | | 10/2000 | |
| EP | 2541203 | | 1/2013 | |
| GB | 1605207 | | 10/1983 | |
| GB | 2155720 | | 9/1985 | |
| GB | 2180425 | | 3/1987 | |
| GB | 2286369 | | 8/1995 | |
| GB | 2291300 | | 1/1996 | |
| GB | 2405292 | A * | 2/2005 | H04W 4/02 |
| JP | 272258 | | 6/1983 | |
| JP | 62-284277 | | 12/1987 | |
| JP | 05-300081 | | 11/1993 | |
| JP | 06-003431 | | 1/1994 | |
| JP | 06-003433 | | 1/1994 | |
| JP | 06-066919 | | 3/1994 | |
| JP | 06-066920 | | 3/1994 | |
| JP | 06-148308 | | 5/1994 | |
| JP | 07-055912 | | 3/1995 | |
| JP | 08-184451 | | 7/1996 | |
| JP | 10-013961 | | 1/1998 | |
| JP | 10-221106 | | 8/1998 | |
| JP | 11-064482 | | 3/1999 | |
| JP | 11-258325 | | 9/1999 | |
| JP | 11-289574 | | 10/1999 | |
| JP | 11-306491 | | 11/1999 | |
| WO | WO 92/02105 | | 2/1992 | |
| WO | WO 93/04453 | | 3/1993 | |
| WO | WO 94/01978 | | 1/1994 | |
| WO | WO 94/06221 | | 3/1994 | |
| WO | WO 94/11853 | | 5/1994 | |
| WO | WO 94/15412 | | 7/1994 | |
| WO | WO 94/27161 | | 11/1994 | |
| WO | WO 95/03598 | | 2/1995 | |
| WO | WO 95/14335 | | 5/1995 | |
| WO | WO 95/18354 | | 7/1995 | |
| WO | WO 95/23981 | | 9/1995 | |
| WO | WO 95/34177 | | 12/1995 | |
| WO | WO 96/14588 | | 5/1996 | |
| WO | WO 96/20842 | | 7/1996 | |
| WO | WO 97/01228 | | 1/1997 | |
| WO | WO 97/14054 | | 4/1997 | |
| WO | WO 97/22888 | | 6/1997 | |
| WO | WO 97/23785 | | 7/1997 | |
| WO | WO 97/24010 | | 7/1997 | |
| WO | WO 97/26750 | | 7/1997 | |
| WO | WO 97/28455 | | 8/1997 | |
| WO | WO 97/38326 | | 10/1997 | |
| WO | WO 97/38540 | | 10/1997 | |
| WO | WO 97/41654 | | 11/1997 | |
| WO | WO 97/50002 | | 12/1997 | |
| WO | WO 98/00982 | | 1/1998 | |
| WO | WO 98/02824 | | 1/1998 | |
| WO | WO 98/08314 | | 2/1998 | |
| WO | WO 98/10307 | | 3/1998 | |
| WO | WO 98/14018 | | 4/1998 | |
| WO | WO 98/25157 | | 6/1998 | |
| WO | WO 98/40837 | | 9/1998 | |
| WO | WO 98/59506 | | 12/1998 | |
| WO | WO 99/33293 | | 7/1999 | |
| WO | WO 99/45732 | | 9/1999 | |
| WO | WO 00/04730 | | 1/2000 | |
| WO | WO 00/29979 | | 5/2000 | |
| WO | WO 00/41090 | | 7/2000 | |
| WO | WO 00/41412 | | 7/2000 | |
| WO | WO 00/50844 | | 8/2000 | |
| WO | WO 01/44998 | | 6/2001 | |
| WO | WO 01/60086 | | 8/2001 | |
| WO | WO 01/95642 | | 12/2001 | |
| WO | WO 02/065250 | | 8/2002 | |
| WO | WO-2009070464 | A1 * | 6/2009 | G01S 5/02213 |
| WO | WO-2012074791 | A2 * | 6/2012 | H04W 72/02 |

OTHER PUBLICATIONS

Official Action for U.S. Appl. No. 13/037,337, mailed May 22, 2015.

U.S. Appl. No. 08/191,984, filed Feb. 4, 1994.

U.S. Appl. No. 08/246,149, filed May 19, 1994.

U.S. Appl. No. 08/355,901, filed Dec. 13, 1994.

U.S. Appl. No. 60/017,269, filed May 13, 1996.

U.S. Appl. No. 60/017,899, filed May 17, 1996, Maloney.

U.S. Appl. No. 60/025,855, filed Sep. 9, 1996, LeBlanc.

U.S. Appl. No. 60/035,691, filed Jan. 16, 1997, Maloney.

U.S. Appl. No. 60/038,037, filed Feb. 7, 1997, Christ.

(56) References Cited

OTHER PUBLICATIONS

U.S. Appl. No. 11/746,753, filed May 10, 2007, Dupray (.
U.S. Appl. No. 13/831,674, filed Mar. 15, 2013, Dupray et al.
U.S. Appl. No. 13/843,204, filed Mar. 15, 2013, LeBlanc et al.
U.S. Appl. No. 13/844,500, filed Mar. 15, 2013, Dupray et al.
"A Unique Solution—Highway Master: Becoming the Mobile Communications System of Choice by Owner-Operators," Landline Magazine, Nov./Dec. 1994, pp. 30-32.
"A310/A300 Flight Management System Pilot's Guide," Honeywell, Inc., Dec. 1993, 441 pages.
"ARGOS: Basic Description of the Argos System," ARGOS, 7 pages, 1999.
"AVL FSD," OCS Technologies—DCP, Tampa Division, Jun. 10, 1993, 11 pages.
"AVL Markets: More Than Position Reporting," Phillips Business Information, Inc. Global Positioning & Navigation News, LexisNexis, Aug. 8, 1996, 3 pages.
"Finally, There is a Mobile Communication System for The Transportation Industry with a Real Ring to it," Highway Master Mobile Communication & Information Systems, 1993, 7 pages.
"GM Safety Technology," General Motors Corporation, 2000, 2 pages.
"Integrated software solutions for the criminal justice system," OCS Technologies Corporation, 1993, 4 pages.
"Location Systems and Technologies," 1994, Wireless Emergency Services JEM Report, Annex A pp. 42-46 and Appendix A pp. 1-2.
"Mid-Am installs voice communications," Milk & Liquid Food Transporter, May 1994, vol. 34(5), 1 page.
"Mid-America Dairymen Picks Highway Master," Refrigerated Transport, Mar. 1994, 1 page.
"Presenting the most advanced AVLS available," Magnavox Advanced Products and Systems Company, 1988, 6 pages.
"Services Beyond Airtime," Release concerning RadioCamera™, available at http:/www.uswcorp.com/laby.htm, printed Sep. 14, 1998, 10 pages.
"Successful test of satellite-based landing system may open new era in aircraft navigation," Business Editors/Aviation Writers, Oct. 19, 1994, 4 pages.
"The Measearch Engine Years: Fit the First," 1992, http://www.conman.org/people/spc/refs/search.hpl.html, pp. 1-3.
"TravTek Evaluation Plan," prepared by Farradyne Systems, Inc. for the Federal Highway Administration, Apr. 1991, 62 pages.
1990-91 Aviation System Capacity Plan, U.S. DOT and FAA, Dec. 1990, 323 pages.
Abowd et al., "A Mobile context-Aware Tour Guide," Sep. 23, 1996, Baltzer Journals.
Abowd et al., "A Mobile context-Aware Tour Guide," Wireless Networks, vol. 3, 1997, pp. 421-433.
AIM/FAR 1994: Airman's Information Manual / Federal Aviation Regulations, TAB AERO, Division of McGraw-Hill, 1994, pp. 89-91.
AJ Systems, "Final Report and GPS System Specification for Shipboard TACAN Replacement," submitted to Naval Air Development Center, Nov. 1991, 195 pages.
Antonio et al., "OmniTRACS: A Commercial Ku-Band Mobile Satellite Terminal and its Applicability to Military Mobile Terminals," IEEE Military Communications Conference, Oct. 1988, pp. 43.1.1-43.1.4.
Baldazo, "Navigating with a Web Compass: Quarterdeck Harnessess Leading-edge "Metasearch" Technology to Create a Smart Agent that Searches the Web and organizes the Results," BYTE, Mar. 1996, pp. 97-98.
Bass, Tim, "Intrusion Detection Systems and Multisensor Data Fusion: Creating Cyberspace Situational Awareness," Communications of the ACM, Apr. 2000, vol. 43, No. 4, pp. 100-105.
Beck et al., "Simulation Results on the Downlink of a Qualcomm-like DS-CDMA-System Over Multipath fading channels," Sep. 1994, pp. 1-7.
Beser, J. and B.W. Parkinson, "The Application of NAVSTAR Differential GPS in the Civilian Community," Navigation: Journal of the Institute of Navigation, Summer 1982, vol. 29(2), pp. 107-136.
Birkland, "Management Techniques: Track, Talk, Tell," Fleet Equipment, Jun. 1994, pp. 20-25.
Botafogo, "Cluster Analysis for Hypertext Systems," ACM-SIRIG, Jun. 1993, pp. 116-124.
Bowditch, N., The American Practical Navigator, Pub No. 9, 1995, pp. 174-175 and 187-88.
Bronson et al., "Il-Morrow's Loran-C Based Vehicle Tracking System," Presented at NAV 85, Land Navigation and Location for Mobile Applications, Sep. 1985, 13 pages.
Brown, Henry E., "Navigation, Surveillance, and Communications Services within the Province of Ontario," Journal of The Institute of Navigation, vol. 35(4), Winter 1988-89, pp. 407-413.
Brumitt et al., "EasyLiving: Technologies for Intelligent Environments," 2000, pp. 1-12.
C.J. Driscoll & Associates, "Survey of Location Technologies to Support Mobile 9-1-1," Jul. 1994, 59 pages.
Caffery et al., "Overview of Radiolocation in CDMA Cellular Systems," IEEE Communications Magazine, Apr. 1998, pp. 38-45.
Caffery et al., "Radio Location in Urban CDMA Microcells," International Symposium on Personal, Indoor, and Mobil Radio Communications, Sep. 1995, 5 pages.
Caffery, J. et al., "Vehicle Location and Tracking for IVHS in CDMA Microcells," International Symposium on Personal, Indoor, and Mobile Radio Communications, Sep. 1994, pp. 1227-1231.
Callan, James P. et al., "Searching Distributed Collections With Inference Networks," 18th Annual International ACM SIGIR Conference on Research and Development in Information Retrieval, 1995.
Campadello et al., "Using Mobile and Intelligent Agents to Support Nomadic Users," 6th International Conference of Intelligence in Networks (ICIN2000), Jan. 17-20, 2000, Bordeaux, France.
Candler, "Tracking All Trucks: Many Companies are outfitting their fleets with advanced mobile communication technology," Nations Business, Dec. 1994, pp. 60-62.
Carroll, James V., "Availability Performance Comparisons of Combined Loran-C/GPS and Standalone GPS Approach Navigation Systems," IEEE Position Location and Navigation Symposium, Apr. 1994, pp. 77-83.
Carter et al., "Using Cellular Telephones for Automatic Vehicle Tracking," presented at NAV85, Land Navigation and Location for Mobile Applications, Sep. 1985, 10 pages.
Carter, David A., "Using Loran-C for Automatic Vehicle Monitoring," Journal of The Institute of Navigation, vol. 29(1), Spring 1982, pp. 80-88.
Cassidy, "Highway Master Goes Flat-Out in Communications Race," Transport Topics, Aug. 8, 1994, 2 pages.
CC Docket No. 94-102, Before the Federal Communications Commission, in the Matter of Revision of the Commission's Rules to Ensure Compatibility with Enhanced 911 Emergency Calling Systems; "Comments of Harris Government Communication Systems Division A Division of Harris Corporation," filed Sep. 25, 1996.
CC Docket No. 94-102, Before the Federal Communications Commission, in the Matter of Revision of the Commission's Rules to Ensure Compatibility with Enhanced 911 Emergency Calling Systems; "Reply Comments of KSI Inc. and MULIC Inc." filed Oct. 25, 1996.
CC Docket No. 94-102, Before the Federal Communications Commission, in the Matter of Revision of the Commission's Rules to Ensure Compatibility with Enhanced 911 Emergency Calling Systems; "US West Comments," filed Jan. 9, 1995, 81 pages.
CC Docket No. 94-102, Before the Federal Communications Commission, in the Matter of Revision of the Commission's Rules to Ensure Compatibility with Enhanced 911 Emergency Calling Systems; ex parte communication from Cambridge Positioning Systems Ltd. received Apr. 14, 1997 by the Commission.
CC Docket No. 94-102, Before the Federal Communications Commission, in the Matter of Revision of the Commission's Rules to Ensure Compatibility with Enhanced 911 Emergency Calling Sys-

(56) References Cited

OTHER PUBLICATIONS tems; ex parte communication from GeoTek Communications, Inc. received Apr. 14, 1997 by the Commission.
CC Docket No. 94-102, Before the Federal Communications Commission, in the Matter of Revision of the Commission's Rules to Ensure Compatibility with Enhanced 911 Emergency Calling Systems; ex parte communication from National Strategies, Inc., regarding enhanced 911 system trial by TruePosition, Inc. and New Jersey Office of Emergency Telecommunications Services, received Aug. 8, 1997 by the Commission.
CC Docket No. 94-102, Before the Federal Communications Commission, in the Matter of Revision of the Commission's Rules to Ensure Compatibility with Enhanced 911 Emergency Calling Systems; ex parte communication from SnapTrack, Inc., received Jun. 27, 1997 by the Commission.
CC Docket No. 94-102, Before the Federal Communications Commission, in the Matter of Revision of the Commission's Rules to Ensure Compatibility with Enhanced 911 Emergency Calling Systems; ex parte communication from XYPOINT Corporation, Inc. received Jul. 28, 1997 by the Commission.
Cellular Community Bulletin: A report on wireless activities benefitting your constituents, "Cellular Technology used to Improve Truck Fleet Efficiency," Highway Master, Jan. 13, 1995, 1 page.
Chadwick, D. Jim, "Projected Navigation System Requirements for Intelligent Vehicle Highway Systems (IVHS)," The Institute of Navigation, Proceedings of ION GPS-94, Sep. 20-23, 1994, pp. 485-490.
Chambers et al., "A Comparison of Automatic Vehicle Tracking Systems," Journal of The Institute of Navigation, vol. 21(3), Fall 1974, pp. 208-222.
Chan et al., "Multipath Propagation Effects on a CDMA Cellular System," IEEE, 1994, pp. 848-855.
Cheverst et al., "Experiences of Developing and Deploying a Context-Aware Tourist Guide: The GUIDE Project; "Mobile Computing Networking 2000, pp. 20-31 (url = "citeseer.ist.psu.edu/cheverst00experiences.html").
Cheverst, et al. "Using context as a Crystal Ball: Rewards and Pitfalls," Distributed Multimedia Research Group, Pub. Yr. 2000, Dept. of Computing, Lancaster University, Lancaster, LA14YR, U.K., 5 pages.
Cobb et al., "Precision Landing Tests with Improved Integrity Beacon Pseudolites," presented at ION GPS-95, Sep. 1995, 7 pages.
Comments of AT&T Corp., In the Matter of Revision of the Commission's Rules to Ensure Compatibility with Enhanced 911 Emergency Calling Systems, CC Docket No. 94-102, Jan. 9, 1995, 25 pages.
Comments of the Cellular Telecommunications Industry Association, In the Matter of Revision of the Commission's Rules to Ensure Compatibility with Enhanced 911 Emergency Calling Systems, CC Docket No. 94-102, Jan. 9, 1995, 26 pages.
Cortland, Laurence J., "Loran-C Vehicle Tracking in Detroit's Public Safety Dispatch System," Journal of The Institute of Navigation, vol. 36(3), Fall 1989, pp. 223-233.
Dailey, D.J., "Demonstration of an Advanced Public Transportation System in the Context of an IVHS Regional Architecture," paper presented at the First World Congress on Applications of Transport Telematics and Intelligent Vehicle-Highway Systems, Nov. 30-Dec. 3, 1994.
Dailey, D.J., et al., "ITS Data Fusion," Final Research Report, Research Project T9903, Task 9, ATIS/ATMS Regional IVHS Demonstration, University of Washington, Apr. 1996.
Dartmouth College, "Soldiers, Agents and Wireless Networks: A Report on a Military Application," PAAM 2000.
Dey, "Understanding and Using Context," Personal and Ubiquitous Computing Journal, vol. 5(1), 2001., pp. 4-7.
Diesposti et al., "Benefits and Issues on the Integration of GPS with a Wireless Communications Link," 29th Annual Precise Time and Time Interval (PTTI) Meeting, Dec. 1997, pp. 391-398.
Douglas Vatier facsimile to Adam Hough re NC-25 GPS-Dead Reckoning Navigation System, Jan. 12, 1995, 7 pages.
Driscoll, "Wireless Caller Location Systems," GSP World Advanstar Communications, Inc., 1998, www.gpsworld.com/1198/1198driscol.html, pp. 1-8.
Dutta et al., "Modified Adaptive Multiuser Detector for DS-CDMA in Multipath Fading," Prior to Dec. 22, 1997, pp. 1-7.
E.J. Krakiwsky Telefax to Karl Poley at II Morrow, Inc. re Building a database of all existing Intelligent Vehicle Highway Systems (IVHS) navigation systems, Nov. 10, 1993, 3 pages.
E.J. Krakiwsky, "IVHS Navigation Systems DatabseTM," The University of Calgary, 1994, 6 pages.
E.O Frye, "GPS Signal Availability in Land Mobile Applications," Journal of The Institute of Navigation, vol. 36(3), Fall 1989, pp. 287-301.
Enge et al., "Combining Pseudoranges from GPS and Loran-C for Air Navigation," IEEE Position Location and Navigation Symposium, Mar. 1990, pp. 36-43.
Ergon Proprietary, "Performance Analyses Brief: Microminiature Emergency Locator Systems (MELS)," May 1996.
Evans, "New Satellites for Personal Communications," Scientific American, 1998, vol. 278(4), pp. 70-77.
FAA Advisory Circular 20-101C, "Airworthiness Approval of Omega/VLF Navigation Systems For Use in the U.S. National Airspace System (NAS) and Alaska," Sep. 12, 1988, 31 pages.
FAA Advisory Circular 20-121A, "Airworthiness Approval of Loran-C Navigation Systems for use in the U.S. National Airspace Systems (NAS) and Alaska," Aug. 24, 1988, 21 pages.
FAA Advisory Circular 20-130A, "Airworthiness Approval of Navigation or Flight Management Systems Integrating Multiple Navigation Sensors," Jun. 14, 1995, 50 pages.
FAA Advisory Circular 20-138, "Airworthiness Approval of Global Positioning System (GPS) Navigation Equipment For Use as a VFR and IFR Supplemental Navigation System," May 25, 1994, 33 pages.
FAA Advisory Circular 25-11, "Transport Category Airplane Electronic Display Systems," Jul. 17, 1987, 34 pages.
FAA Advisory Circular 25-15, "Approval of Flight Management Systems in Transport Category Airplanes," Nov. 20, 1989, 30 pages.
FAA Historical Chronology, 1926-1996, publication date unknown, 303 pages.
FAA, "ASR-9 System Field Maintenance," Operation Support, FAA, Nov. 2001, 410 pages.
Fechner et al., "A Hybrid Neural Network Architecture for Automatic Object Recognition," IEEE, 1994, pp. 187-194.
Federal Communications Commission, "Notice of Proposed Rule Making," In the Matter of Revision of the Commission's Rules to Ensure Compatibility with Enhanced 911 Emergency Calling Systems, CC Docket No. 94-102, released Oct. 19, 1994, 53 pages.
Federal Communications Commission, "Report and Order and Further Notice of Proposed Rulemaking," In the Matter of Revision of the Commission's Rules to Ensure Compatibility with Enhanced 911 Emergency Calling Systems, CC Docket No. 94-102, released Jul. 26, 1996, 98 pages.
Fels et al., "Progress of C-Map: A Context-Aware Mobile Assistant," ATR Media Integration & Communication Research Laboratories, Seida-cho, Soraku-gun, Kyoto, 619-02, Japan, Publication year 1998.
Fernandez et al., "GPS Navigation Subsystem for Automatic Vehicle Location Systems," NAV 90, Land Navigation and Information Systems Conference, Sep. 18-20, 1990, 12 pages.
FleetVision Integrated Fleet Management System, Trimble Navigation, date unknown, 9 pages.
Frank, R.L., "Current Developments in Loran-C," Proceedings of the IEEE, Oct. 1983, vol. 71(10), pp. 1127-1142.
Freedman, A., The Computer Glossary: The Complete Illustrated Dictionary, 8th Edition, 1998, p. 177.
French et al., "A Comparison of IVHS Progress in the United States, Europe, and Japan," prepared by R.L. French & Associates, Dec. 31, 1998, 216 pages.
French, "The Evolving Roles of Vehicular Navigation," Journal of the Insitute of Navigation, Fall 1987, vol. 34(3), pp. 212-228.
French, R.L., "Map Matching Origins Approaches and Applications," Proceedings of the Second International Symposium on Land Vehicle Navigation, Jul. 4-7, 1989, pp. 91-116.

(56) References Cited

OTHER PUBLICATIONS

Galijan et al., "Results of a Study Into the Utility of Carrier Phase GPS for Automated Highway Systems," The Institute of Navigation, Proceedings of ION GPS-94, Sep. 20-23, 1994, pp. 533-541.
Gallant, "Neural Network Learning and Expert Systems," The MIT Press, 1994, pp. 132-137.
Gaspard et al., "Position Assignment in Digital Cellular Mobile Radio Networks (e.g. GSM) derived from Measurements at the Protocol Interface," Prior to Dec. 22, 1997, pp. 1-5.
Giordano et al., "A Novel Location Based Service and Architecture," IEEE PIMRC '95, Sep. 1995, vol. 2, pp. 853-857.
Giordano et al., "Location Enhanced Cellular Information Services," 5th IEEE International Symposium on Personal, Indoor and Mobile Radio Communications, Sep. 18-23, 1994, pp. 1143-1145.
Gojanovich and Depaola, "The New Jersey Bell Network Proposal for Statewide Enhanced 9-1-1 Service," submitted on Nov. 20, 1989 to the Network Subcommittee of State of New Jersey 9-1-1 Commission, 34 pages.
Goldsmith et al., "A Measurement-Based Model for Predicting Coverage Areas of Urban Microcells," IEEE, 1993, pp. 1013-1023.
Goodman, "The Wireless Internet: Promises and Challenges," IEEE, 2000, pp. 1-6.
GPS World Newsletter, Apr. 11, 1994, pp. 1, 4.
GPS World Newsletter, Sep. 9, 1993, pp. 1, 4.
GPS World: News and Applications of the Global Positioning System, Intelligent Vehicles & Highways Special Supplement, Apr. 1994, 2 pages.
GPS World: News and Applications of the Global Positioning System, Jul. 1994, p. 57.
Harper, "Trucks Become 'Warehouses' for Inventory," The Wall Street Journal, Feb. 7, 1994, 1 page.
Highway Master Features & Benefits, Highway Master Mobile Communication & Information Systems, 1993, 2 pages.
Highway Master Features & Benefits, Highway Master Mobile Communication & Information Systems, 1995, 2 pages.
Highway Master Mobile Communication & Information Systems Fact Sheet, HighwayMaster Corp., Jan. 13, 1995, 2 pages.
Hills, "Terrestrial Wireless Networks," Scientific American, 1998, vol. 278(4), pp. 86-91.
Hojo et al., "Land-Mobile GPS Receiver," Proceedings of the 3rd International Technical Meeting of the Satellite Division of ION, Sep. 19-21, 1990, pp. 183-190.
Howe, D.A., "The Feasibility of Applying the Active TvTime System to Automatic Vehicle Location," Journal of the Institute of Navigation, vol. 21(1), Spring 1974, pp. 9-15.
Hunter et al., "Land Navigation and Fleet Management with GPS, Loran, and Dead Reckoning Sensors," IEEE Position Location and Navigation Symposium, Nov./Dec. 1988, pp. 54-60.
ICAO Circular, "Secondary Surveillance Radar Mode S Advisory Circular," Intl. Civil Aviation Org., Circular 174-AN/110, 1983, 44 pages.
Ichitsubo et al., "A Statistical Model for Microcellular Multipath Propagation Environment," Prior to Dec. 22, 1997, Wireless Systems Laboratories, pp. 1-6.
II Morrow, Inc. Press Release, "II Morrow's VTS finds new application," II Morrow, Inc., Oct. 13, 1986, 2 pages.
II Morrow, Inc. Press Release, "Kern County Adds Eyes," II Morrow, Inc., Mar. 10, 1986, 8 pages.
II Morrow, Inc. Press Release, "Los Alamos selects II Morrow's VTS," II Morrow, Inc., Sep. 9, 1986, 1 page.
II Morrow, Inc. Press Release, "Pinellas County Florida Chooses II Morrow," II Morrow, Inc., Sep. 4, 1986, 2 pages.
II Morrow, Inc. Press Release, "Punta Gorda Florida Adds Police Car Tracking System," II Morrow, Inc., Aug. 28, 1986, 2 pages.
II Morrow, Inc., "Fleet Management Solutions with GPS Technology," 1995, 2 pages.
II Morrow, Inc., "II Morrow's Fleet Management Systems Putting Time on Your Side," date unknown, 2 pages.
II Morrow, Inc., "Maps are custom built using accurate government data!" 1985, 7 pages.
II Morrow, Inc., "The vision to take fleet management one step further," 1992, 8 pages.
II Morrow, Inc., "Vehicle Tracking System References," 1986, 6 pages.
II Morrow, Inc., "Vehicle Tracking System Specifications Sheets: Economical Reliable Accurate Secure," date unknown, 10 pages.
Iida et al. "Multi-Agent Architecture for Seamless Personal Communications," NetMedia Research Center, Fujitsu Laboratories Ltd., 1999, pp. 1-7.
Inman et al., "TravTek Evaluation Rental and Local User Study," U.S. Dept. of Transportation and Federal Highway Administration, Mar. 1996, 105 pages.
Inman et al., "TravTek Evaluation Yoked Driver Study," U.S. Dept. of Transportation and Federal Highway Administration, Oct. 1995, 101 pages.
Inman et al., "Trav-Tek System Architecture Evaluation," U.S. Dept. of Transportation and Federal Highway Administration, Jul. 1995, 156 pages.
Ishikawa et al., "Proposal of High Accuracy Positioning Service for Terrestrial Mobile Communication Systems by Using GPS Satellites," 1993, pp. 363-372.
Iwayama et al., "Cluster-Based Text Catagorization: A Comparison of Category Search Strategies," ACM-SIGIR, 1995, pp. 273-279.
James Hume Facsimile to Jim McClellan re Sale of Magnavox Electronic Systems Co., Jul. 27, 1993, 2 pages.
Johnson, "Smart Technology Busting Out All Over Web," Electronic Engineering Times, Jun. 15, 1998, vol. 1012, pp. 1-6.
Juneja et al., "Location Services Using Cellular Digital Packet Data," 1996 IEEE Intl. Conference on Personal Wireless Communications, Feb. 1996, pp. 222-226.
Junius et al., "New Methods for Processing GSM Radio Measurement Data: Applications for Locating, Handover, and Network Management," Communication Network, 1994, Aachen University of Technology, pp. 338-342.
Junius et al., "New Methods for Processing GSM Radio Measurement Data: Applications for Locating, Handover, and Network Management," IEEE Vehicular Technology Conference, Jun. 1994, pp. 338-342.
Kaplan, E., "Understanding GPS: Principles and Applications," Artech House, 1996, 288 pages.
Karanta, Ilkka, "Intelligent Agents In Mobile Services," VTT Information Technolgy, Oct. 2, 1997.
Kennedy et al., "Direction Finding and 'Smart Antennas' Using Software Radio Architectures," IEEE Communications Magazine, May 1995, pp. 62-68.
Kennemann, Olrik, "Continuous Location of Moving GSM Mobile Stations by Pattern Recognition Techniques," Fifth IEEE International Symposium on Personal, Indoor and Mobile Radio Communications (PIMRC '94), pp. 630-634, IEEE, Sep. 1994.
Kerr, T., "Decentralized Filtering and Redundancy Management for Multisensor Navigation," IEEE Transactions on Aerospace and Electronic Systems, Jan. 1987, vol. AES-23(1), pp. 83-119.
Klass, Philip, "Industry Devisin GPS Receiver with Hyrid Navigation Adis," Avionics, Dec. 14, 1987, p. 121.
Koshima et al., "Personal locator services emerge," IEEE Spectrum, Feb. 2000, pp. 41-48.
Kosko, "Fuzzy Systems as Universal Approximators," IEEE, 1994, pp. 1329-1333.
Kugler et al., "Combined Use of GPS and Loran-C in Integrated Navigation Systems," IEEE, Satellite Systems for Mobile Communications and Navigation, May 13-15, 1996, pp. 7-11.
Kugler et al., "Combined Use of GPS and Loran-C in Integrated Navigation Systems," IEEE, Satellite Systems for Mobile Communications and Navigation, May 1996, pp. 161-168.
Lachapelle et al., "Analysis of GPS and Loran-C Performance for Land Vehicle Navigation in the Canadian Rockies," IEEE Aerospace and Electronic Systems Magazine, vol. 7(5), May 1992, pp. 504-508.
Lachapelle et al., "Analysis of Loran-C Performance in the Pemberton Area, B.C.," Canadian Aeronautics and Space Journal, vol. 28(2), Jun. 1992, pp. 52-61.

(56) References Cited

OTHER PUBLICATIONS

Lachapelle et al., "GPS/Loran-C: An Effective System Mix for Vehicular Navigation in Mountainous Areas," Navigation: Journal of the Institute of Navigation, vol. 40(1), Spring 1993, pp. 19-34.
Lappin, "Truckin," Wired, Jan. 1995, 6 pages.
Lawrence et al., "Northern Light Search Engine Leads the Pack—Others Fall Behind," Online Newsletter, May 1, 1998, vol. 19(5), pp. 1-2.
Lee et al., "Minimizing Position Error in a Car Navigation System by Using GPS and Dead-Reckoning," Journal of the Korean Society for Geospatial Information System, 1994, pp. 81-88.
Lee, "Trucking Takes the High Tech Road," Radio Resource Magazine, Jan./Feb. 1994, 9 pages.
Lee, W. C. Y., Mobile Cellular Communications, 2nd Ed., McGraw-Hill, 1995, 673 pages.
Long et al., "Rapid Prototyping of Mobile Context-Aware Applications: The Cyberguide Case Study," 2nd ACM International Conference on Mobile Computing and Networking, 1996 (MobiCom '96).
Loran, "Users Handbook 1992 Edition," U.S. Coast Guard, Radionavigation Division, 1992, 28 pages.
Low, "Comparison of Urban Propagation Models with CW-Measurements," IEEE Deutsche Bundespost Telekom, 1992, pp. 936-942.
Lt. Gene Norden, Irvine Police Department, Vehicle Tracking System, 1986, 3 pages.
Machalaba, "Long Haul: Trucking Firms Face Driver Shortage, Idling Some Rigs and Causing Delays for Shippers," The Wall Street Journal, Dec. 28, 1993, 2 pages.
Mammano et al., "PATHFINDER System Design," First Vehicle Navigation & Information Systems Conference, Sep. 1989, pp. 484-488.
Marcelo, "Vehicle location system serves public safety agencies," Mobile Radio Technology, vol. 4(12), Dec. 1986, 5 pages.
Mardiraju et al., "Neural Networks for Robust Image Feature Classification: A Comparative Study," IEEE, 1994, pp. 423-430.
Marmasse et al., "Location-aware Information Delivery with com-Motion," Mit Media Laboratory, 20 Ames Street, Combridge, MA 02139, USA, Publication: HUC 2000 Proceeding, pp. 157-171, publication year 2000.
Maturino-Lozoya et al., "Pattern Recognition Techniques in Hand-off and Service Area Determination," IEEE Vehicular Technology Conference, Jun. 1994, pp. 96-100.
Meadow, "Text Information Retrieval Systems," Academic Press, 1992, pp. 204-209.
Mele, "Mid-America Dairymen: Proves That it Pays—Committee approach finds cost justification for cellular system," Fleet Owner, 1994, 1 page.
Merriam Webster's Desk Dictionary, 3rd Edition, Merriam-Webster, Inc., 1995, p. 274.
Miller, RT, et al., "Protein fold recognition by sequence threading: tools and assessment techniques," Journal Announcement, Department of Biochemistry and Molecular Biology, University College, London, United Kingdom, Jan. 1996, 1 page.
Morris et al., "Omega Navigation System Course Book," National Technical Information Service of Springfield, Virginia, Jul. 1994, 60 pages.
Mynatt et al., "Designing Audio Aura," published in CHI '98 Conference Proceedings, 1998.
National Training Center Rotation—In the Field, The National Training Center Matures 1985-1995, pp. 181-225.
Ndili, Awele, "GPS Pseudolite Signal Design," The Institute of Navigation, Presented at ION-GPS-94, Sep. 1994, 8 pages.
Newton, "The Near-Term Potential of Doppler Location," John Hopkins APL Technical Digest, 1981, pp. 16-31.
Newton, H., Newton's Telecom Dictionary, 12th Edition, Feb. 1997, pp. 80, 154-155, 294-295, 381-383, 417, 612-613, 651, 655-657, 727-728.
Nicholas Flaskay OCS Technologies letter to Edward J. Krakiwsky re Automatic Vehicle Location product, Aug. 11, 1993, 2 pages.
Noh, Jac-Scon, "Position Location by Integration of GPS Receiver and Dead Reckoning Sensors," International Journal of Precision Engineering Korea, 1996, pp. 443-447.
Notess, "Internet Search Engine Update," Online, Jul. 1, 1998, vol. v22:nr, pp. 1-3.
Okawa et al., "PLRS Development Testing," IEEE AES Magazine, 1988, vol. 3(8), pp. 10-15.
Orphanoudakis, C.E. et al., "12 Cnet: Content-Based Similarity Search in Geographically Distributed Repositories of Medical Images," Computerized Medical Imaging and Graphics, 1996, vol. 20(4), pp. 193-207.
Parish, "Case Studies of market Research for Three Transportation Communication Products," U.S. Department of Transportation Research and Special Programs Administration, Mar. 1994, 70 pages.
Parviainen et al., "Mobile Information Systems Impact Study," Ontario Ministry of Transportation, Aug. 1988, 236 pages.
Pascoe et al., "Human-Computer-Giraffe Interaction: HCl in the Field," Workshop on Human Computer Interaction with Mobile Devices, Glasgow, Scotland, 1998.
Pelton, "Telecommunications for the 21st Century," Scientific American, 1998, vol. 278(4), pp. 80-85.
Perlstein et al., "Designing and implementing automatic vehicle location," Mobile Radio Technology, Jan. 1989, 6 pages.
Perlstein, "Automatic Vehicle Location Systems: A Tool for Computer Aided Despatch Systems of the Future," IEEE, 1989, pp. 186-193.
Perry, Tekla S., "In Search of the Future of Air Traffic Control," IEEE Spectrum, Aug. 1997, pp. 18-35.
Peterson et al., "Evaluation of Radionavigation Systems in an Urban Environment," Proceedings of The Institute of Navigation 1995 National Technical Meeting, Jan. 18-20, 1995, pp. 293-302.
Pilley et al., "Airport Navigation and Surveillance Using GPS and ADS," Institute of Navigation, ION GPS-91, Sep. 12, 1991, pp. 363-371.
Pitoura et al., "Locating Objects in Mobile Computing," IEEE, 2001, pp. 1-43.
Pop et al., "Site Engineering for Indoor Wireless Spread Spectrum Communications," Jun. 2001, 3 pages.
Post, Kendall E., "Real-Time Linear Ensemble Averaging LORAN Receiver Architecture," The Institute of Navigation, Proceedings of the 45th Annual Meeting, Jun. 1989, pp. 67-75.
Powell, C., "The Decca Navigator system for ship and aircraft use," Proceedings of the IEEE, Part B: Radio and Electronic Engineering, Mar. 1958, vol. 105(9), pp. 225-234.
Press Release re Benefits of the HighwayMaster Mobile Communication and Information System, Highway Master Mobile Communication & Information Systems, Dec. 16, 1994, 2 pages.
Press Release re Bill Saunders named HighwayMaster Corp. Chief Executive Officer, Highway Master Mobile Communication & Information Systems, Jan. 13, 1995, 2 pages.
Press Release re Bill Saunders to speak at the Celluar Telecommunications Industry Conference regarding the New Frontier: Wireless Data Applications, Highway Master Mobile Communication & Information Systems, Jan. 11, 1995, 2 pages.
Press Release re Global Positioning System (Satellite) vehicle location tracking is now available with the HighwayMaster Mobile Communication and Information System, Highway Master Mobile Communication & Information Systems, Jan. 6, 1995, 4 pages.
Press Release re Gordon Quick named HighwayMaster Corp., Chief Operating Officer, Highway Master Mobile Communication & Information Systems, Jan. 12, 1995, 2 pages.
Press Release, "Lafayette Parish adds Vehicle Tracking," II Morrow, Inc., Sep. 8, 1986, 2 pages.
Private Pilot Manual, Jeppesen Sanderson, 1988, pp. 2-32, 2-52.
Ramanathan et al., "A Survey of Routing Techniques for Mobile Communications Networks," Mobile Networks and Applications, Oct. 1996, vol. 1(2), pp. 1-31.
Randell et al., "The Shopping Jacket: Wearable Computing for the Consumer," Personal Technologies, 4, 2000, pp. 241-244.
Rappaport et al., "Position Location Using Wireless Communications on Highways of the Future," IEEE Communications Magazine, Oct. 1996, pp. 33-41.

(56) References Cited

OTHER PUBLICATIONS

Riley et al., "Vehicle Tracking System for Salem, Oregon Police Department," The Institute of Navigation Proceedings of the National Technical Meeting, Jan. 21-23, 1986, pp. 89-94.
Rizzo et al., "Integration of Location Services in the Open Distributed Office," Technical Report 14-94, Computing Laboratory, University of Kent, Cantebury, United Kingdom, Aug. 1994, pp. 1-14.
Romano, "Traffic Fatalities Show Drop," The New York Times, Feb. 3, 1991, 2 pages.
Rothblatt, Martin, "The First GPS Satellite Radio Optimized for Automatic Vehicle Location," Proceedings of the 47th Annual Meeting of The Institute of Navigation, Jun. 1991, pp. 261-263.
Salcic, "AGPCS—An Automatic GSM-based Positioning and Communication System," Proceedings of GeoComputation 1997 & SIRC 1997, Aug. 1997, pp. 15-22.
Saldin et al., "Magnavox Automatic Vehicle Location Pilot System for the Toronto Department of Ambulance Services," IEE Vehicle Navigation & Information Systems Conference, Sep. 11-13, 1989, pp. 194-201.
Santo, Brian, "Enables Reliable Autopilot Aircraft Touchdowns—Landing system based on GPS," Electronic Engineering Times, Nov. 14, 1994, 3 pages.
Schlachta et al., "Interoperability versus Integration of Omega and GPS," The Journal of Navigation, vol. 43(2), May 1990, pp. 229-237.
Schopp, Michael, "User Modelling and Performance Evaluation of Distributed Location Management for Personal Communications Services," Proceedings of the 15th International Teletraffic Congress (ITC) 15, Washington, D.C., 1997, S. 23-34.
Sena, "Computer-aided dispatching: digital maps aid emergency response and fleet management," Computer Graphics World, May 1990, vol. 13(5), pp. 34-42.
Skoblicki, "Automatic Vehicle Location (AVL) Using GPS Enhance Dead Reckoning," International Conference on Vehicle Navigation & Information Systems, Oct. 22, 1991, 9 pages.
Smith, Jr., "Passive Location of Mobile Cellular Telephone Terminals," IEEE, CH3031-2/91/0000-0221, 1991, pp. 221-225.
Sousa et al., "Delay Spread Measurements for the Digital Cellular Channel in Toronto," IEEE, 1994, pp. 837-847.
Spiteri et al., "An Architecture to Support Storage and Retrieval of Events," Proceedings of Middleware 1998, IFIP International Conference on Distributed Systems Platfors and Open Distributed Processing, Lancaster, UK, Sep. 1998.
Stansell, T.A., "Civil GPS from a Future Perspective," Proceedings of the IEEE, Oct. 1983, vol. 71(10), pp. 1187-1192.
Stein et al., "Pseudolite-Aided GPS: a Comparison," IEEE Position, Location, and Navigation Symposium, 1988, pp. 329-333.
Stewart, John M., "Vehicle Location and Position Monitoring System Using Satellite Navigation and Cellular Telephone," Jun. 1993, 15 pages.
Striglis et al., "A Multistage RAKE Receiver for Improved Capacity of CDMA Systems," IEEE Vehicular Technology Conference, 1994, pp. 1-5.
Stutzmann et al., "Moving Beyond Wireless Voice Systems," Scientific American, 1998, vol. 278(4), pp. 92-93.
Swanson et al., "The Omega Navigation System," Navigation, Spring 1965, vol. 12(1), pp. 24-35.
Tanabe et al., "Experimental Validation of GPS-INS-STAR Hybrid Navigation System for Space Autonomy," Acta Astronautica, vol. 21(5), 1990, pp. 295-308.
Taylor, "TravTek—Information and Services Center," Vehicle Navigation & Information Systems Conference Proceedings, Oct. 1991, 12 pages.
The American Heritage College Dictionary, 3rd Edition, Houghton Mifflin Co., 1993, p. 485.
The Intelligent Highway, European Transport Telematics Update, vol. 4(18), Mar. 18, 1994, 3 pages.
The New Shorter Oxford English Dictionary, 4th Edition, Oxford University Press, 1993, p. 894.
Thrall, "Advantages of Interoperability to the Prudent Navigator," Proceedings of the 48th Annual Meeting of The Institute of Navigation, Dayton, OH, Jun. 1992, pp. 47-50.
TR45 Emergency Services Joints Experts Meeting Report, Telecommunications Industry Association, Aug. 28, 1994, 25 pages.
Trimble FleetVision, Land Navigation and Information Systems, Presented at 1990 Conference of the Royal Institute of Naviation, Warwick 1990, 8 pages.
Van Aerde et al., "TravTek Evaluation Modeling Study," U.S. Dept. of Transportation and Federal Highway Administration, Mar. 1996, 134 pages.
Van Graas et al., "Multisensor Signal Processing Techniques (Hybrid GPS/LORAN-C with RAIM)," U.S. Dept. of Transportation and Federal Aviation Administration, Sep. 1991, 95 pages.
Van Graas, "Hybrid GPS/Loran-C: A Next-Generation of Sole Means Air Navigation," Dissertation presented to the faculty of the College of Engineering and Technology of Ohio University, Ohio University Library, Nov. 1988, 185 pages.
Van Willigen et al., "Eurofix: GNSS Augmented Loran-C & Loran-C Augmented GNSS," Proceedings of the 1995 National Technical Meeting of The Institute of Navigation, Jan. 18-20, 1995, pp. 337-344.
Waid et al., "Relative GPS Using DME/TACAN Data Link," The Institute of Navigation, Proceedings of Ion GPS-94, Sep. 20-23, 1994, pp. 851-861.
Wang Baldonado et al., "SenseMaker: An Information-Exploration Interface Supporting the Contextual Evolution of a User's Interests," ACM-CHI, 1997, pp. 11-18.
Weiss et al., "HyPursuit: A Hierarcical Network Search Engine that Exploits Content-Link Hypertext Clustering," Hypertext, 1996, pp. 180-193.
Weseman, John F., "Loran-C: Present and Future," Journal of The Institute of Navigation, vol. 29(1), Spring 1982, pp. 7-21.
Whitcomb, "Using Low Cost Magnetic Sensors on Magnetically Hostile Land Vehicles," IEEE Plans, Nov. 29-Dec. 2, 1988, pp. 34-35.
Widnall, W.S., "JTIDS Relative Navigation With Measurement Sharing: Design and Performance," IEEE Transactions On Aerospace And Electronic Systems, Mar. 1986, vol. AES-22(2), pp. 146-154.
Wilson, Jr., et al., "A Lagrangian Drifter with Inexpensive Wide Area Differential GPS Positioning," Oceans 96 MTS/IEEE Conference Proceedings, Sep. 1996, pp. 851-856.
Winick, A.B. and D.M. Brandewie, "VOR/DME System Improvements," Proceedings of the IEEE, Mar. 1970, vol. 58(3), pp. 430-437.
Wittenben et al., "A Low Cost Noncoherent Receiver with Adaptive Antenna Combining for High Speed Wireless Lans," Prior to Dec. 22, 1997, ASCOM Systec AG, pp. 1-4.
Wolfle et al., "Field Strength Prediction in Indoor Environments with Neural Networks," Prior to Dec. 22, 1997, pp. 1-5.
Wylie et al., "The Non-Line of Sight Problem in Mobile Location Estimation," Proc. IEEE ICUPC, Cambridge, Mass, USA, Sep.-Oct. 1996, vol. 2, pp. 827-831.
Complaint for Declaratory Judgment and Jury Demand filed Sep. 27, 2011, in the United States District Court for the District of Colorado at Case No. 11-cv-02519-WYD-MJW, 9 pages.
Defendant TracBeam, L.L.C.'s Motion to Dismiss Under Fed. R. Civ. P. 12(b)(1) filed Oct. 24, 2011, in the United States District Court for the District of Colorado at Case No. 11-cv-02519-WYD-MJW, including exhibits, 87 pages.
Plaintiff Telecommunication Systems, Inc.'s Opposition to Defendant TracBeam, L.L.C.'s Motion to Dismiss under Fed. R. Civ. P. 12(b)(1) filed Nov. 15, 2011, in the United States District Court for the District of Colorado at Case No. 11-cv-02519-WYD-MJW, 14 pages.
Declaration of SID V. Pandit In Support Of Plaintiff Telecommunication Systems, Inc.'s Opposition To Defendant TracBeam, L.L.C.'s Motion To Dismiss Under Fed. R. Civ. P. 12(b)(I) filed Nov. 15, 2011, in the United States District Court for the District of Colorado at Case No. 11-cv-02519-WYD-MJW, 60 pages.

(56) References Cited

OTHER PUBLICATIONS

Defendants' First Set of Common Interrogatories to Plaintiff, filed in Case No. 6:11-cv-00096-LED, U.S. District Court for the Eastern District of Texas, Tyler Division, on Nov. 2, 2011, 20 pages.
Plaintiff TracBeam, L.L.C.'s Disclosure of Asserted Claims and Infringement Contentions under Patent Rule 3-1 filed in Case No. 6:11-cv-00096-LED, U.S. District Court for the Eastern District of Texas, Tyler Division, Sep. 16, 2011, 8 pages.
Plaintiff's Responses to Defendants' First Set of Common Interrogatories filed in Case No. 6:11-CV-00096-LED, U.S. District Court for the Eastern District of Texas, Marshall Division, on Dec. 5, 2011, 21 pages.
Appendices A and B to TracBeam's Objections and Responses to Defendants' First Set of Common Interrogatories, filed in Case No. 6:11-cv-00096-LED, U.S. District Court for the Eastern District of Texas, Marshall Division, Dec. 5, 2011, 118.
Defendants' Invalidity Contentions, filed in the United States District Court for the Eastern District of Texas, Tyler Division, at Case No. 6:11-cv-00096-LED, on Dec. 16, 2011, including Appendices A-Q and Exhibits 1-18.
Plaintiff TracBeam, L.L.C.'s Disclosure of Asserted Claims and Infringement Contentions under Patent Rule 3-1 to Location Labs filed Case No. 6:11-cv-00096-LED, U.S. District Court for the Eastern District of Texas, Tyler Division, on Mar. 16, 2012, 8 pages.
Order Denying Motion to Dismiss issued by the United States District Court for the Eastern District of Texas, Tyler Division at Case No. 6:11-cv-96, on Mar. 27, 2012, 6 pages.
Plaintiff TracBeam, L.L.C.'s Motion To Strike Portions Of Defendants' Invalidity Contentions, filed in the United States District Court for the Eastern District of Texas, Tyler Division, at Case No. 6:11-cv-00096-LED, on Apr. 6, 2012, 17 pages.
Intervenor Location Labs' Motion To Dismiss TracBeam's Allegations For Failure To State A Claim For Willful Infringement, filed in the United States District Court for the Eastern District of Texas, Tyler Division, at Case No. 6:11-cv-00096-LED, on Apr. 9, 2012, 18 pages.
Defendant AT&T Inc.'s Answer To Plaintiff's First Amended Complaint For Patent Infringement, filed in the United States District Court for the Eastern District of Texas, Tyler Division, at Case No. 6:11-cv-00096-LED, on Apr. 10, 2012, 15 pages.
Defendant AT&T Mobility LLC's Answer And Counterclaims To Plaintiff's First Amended Complaint For Patent Infringement, filed in the United States District Court for the Eastern District of Texas, Tyler Division, at Case No. 6:11-cv-00096-LED, on Apr. 10, 2012, 19 pages.
Defendants' Supplemental Invalidity Contentions, filed in the United States District Court for the Eastern District of Texas, Tyler Division, at Case No. 6:11-cv-00096-LED, on Apr. 17, 2012, with Exhibits 19-23, 837 pages.
Defendant Cellco Partnership's Answer To First Amended Complaint And Demand For Jury Trial, filed in the United States District Court for the Eastern District of Texas, Tyler Division, at Case No. 6:11-cv-00096-LED, on Apr. 10, 2012, 19 pages.
Defendant Cellco Partnership's Motion to Strike Plaintiff's Infringement Contentions, filed in the United States District Court for the Eastern District of Texas, Tyler Division, at Case No. 6:11-cv-00096-LED, on Apr. 19, 2012, 23 pages.
Declaration of Martin M. Noonen in Support of Defendant Cellco Partnership's Motion to Strike Plaintiff's Infringement Contentions filed in the United States District Court for the Eastern District of Texas, Tyler Division, at Case No. 6:11-cv-00096-LED, on Apr. 19, 2012, with Exhibits 1-13, 268 pages.
Defendant Google's Motion to Sever, filed in the United States District Court for the Eastern District of Texas, Tyler Division, at Case No. 6:11-cv-00096-LED, on Apr. 17, 2012, 21 pages.
Declaration of Christopher Schenck in Support of Defendant Google, Inc.'s Motion to Sever, filed in the United States District Court for the Eastern District of Texas, Tyler Division, at Case No. 6:11-cv-00096-LED, on Apr. 17, 2012, with Exhibits A-M, 137 pages.
Defendants' Opposition to Plaintiff's Motion to Strike Portions of Defendants' Invalidity Contentions, filed in the United States District Court for the Eastern District of Texas, Tyler Division, at Case No. 6:11-cv-00096-LED, on Apr. 23, 2012, with Exhibits A-E, 844 pages.
Consolidated Defendant's Invalidity Contentions, filed in the United States District Court for the Eastern District of Texas, Tyler Division, at Case No. 6:11-cv-00096-LED, on May 1, 2012, with Appendices A-Q and Exhibits 1-23, 3988 pages.
Location Labs' Patent Local Rule 3-3 Invalidity Contentions, filed in the United States District Court for the Eastern District of Texas, Tyler Division, at Case No. 6:11-cv-00096-LED, on Apr. 30, 2012, with Appendices A-Q and Exhibits 1-23, 4067 pages.
Location Labs' Preliminary Proposed Claim Constructions [Pursuant to Ed. Tex. Patent Rule 4.2], filed in the United States District Court for the Eastern District of Texas, Tyler Division, at Case No. 6:11-cv-00096-LED, on Jun. 18, 2012, with Exhibits A, 14 pages.
The Carrier Defendants' Preliminary Proposed Constructions and Identification of Extrinsic Evidence [Patent Rule 4-2], filed in the United States District Court for the Eastern District of Texas, Tyler Division, at Case No. 6:11-cv-00096-LED, on Jun. 18, 2012, 29 pages.
Defendant Google, Inc.'s Preliminary Proposed Constructions and Identification of Extrinsic Evidence [Patent Rule 4-2], filed in the United States District Court for the Eastern District of Texas, Tyler Division, at Case No. 6:11-cv-00096-LED, on Jun. 18, 2012, with Exhibits A-B, 24 pages.
Defendants' Motion for Partial Summary Judgment of Invalidity Based on Indefiniteness filed in the United States District Court for the Eastern District of Texas, Tyler Division, at Case No. 6:11-cv-00096-LED, on Sep. 25, 2012, 22 pages.
Declaration of Jon V. Swenson in Support of Defendants' Motion for Partial Summary Judgment of Invalidity Based on Indefiniteness filed in the United States District Court for the Eastern District of Texas, Tyler Division, at Case No. 6:11-cv-00096-LED, on Sep. 25, 2012, 22 pages.
Defendants' Responsive Claim Construction Brief filed in the United States District Court for the Eastern District of Texas, Tyler Division, at Case Nos. 6:11-cv-00096-LED and 6:12-cv-00058-LED, on Oct. 4, 2012, 58 pages.
Declaration of Jon V. Swenson in Support of Defendants' Responsive Claim Construction Brief filed in the United States District Court for the Eastern District of Texas, Tyler Division, at Case Nos. 6:11-cv-00096-LED and 6:12-cv-00058-LED, on Oct. 4, 2012, 202 pages.
Declaration of Vijay K. Madisetti, Ph.D. in Support of Defendants' Responsive Claim Construction Brief filed in the United States District Court for the Eastern District of Texas, Tyler Division, at Case Nos. 6:11-cv-00096-LED and 6:12-cv-00058-LED, on Oct. 4, 2012, 192 pages.
Defendants' Supplemental Invalidity Contentions with Exhibits A-Q filed in Case Nos. 6:11-cv-00096-LED, U.S. District Court for the Eastern District of Texas, Tyler Division, on Nov. 1, 2012, 535 pages.
Memorandum Opinion and Order ("Markman Order") issued in Case No. 6:11-cv-00096-LED by the United States District Court for the Eastern District of Texas, Tyler Division, on Jan. 23, 2013, 39 pages.
Plaintiff TracBeam's Second Supplemental Response to Defendants' Common Interrogatory Nos. 2 filed in Case Nos. 6:11-cv-00096-LED and 6:13-cv-00093-LED, U.S. District Court for the Eastern District of Texas, Tyler Division, May 21, 2013, 25 pages.
Report of William Michalson, Ph.D., Concerning Validity of Claims 1, 7, 25, 106, and 215 of U.S. Pat. No. 7,764,231 and Claims 51, 56, and 67 of U.S. Pat. No. 7,525,484 dated May 24, 2013, 379 pages.
Expert Report of The Honorable Gerald J. Mossinghoff dated May 24, 2013, 32 pages.
Supplemental Report of William Michalson, Ph.D., Concerning the Invalidity of U.S. Pat. No. 7,764,231 and U.S. Pat. No. 7,525,484 for Improper Inventorship dated Jun. 7, 2013, 13 pages.

(56) References Cited

OTHER PUBLICATIONS

Supplemental Expert Report of Michael S. Braasch Regarding Invalidity of Asserted Claims of U.S. Pat. No. 7,764,231 and U.S. Pat. No. 7,525,484 for Improper Inventorship dated Jun. 7, 2013, 31 pages.
Deposition of Dennis Dupray held in Case Nos. 6:11-cv-00096-LED and 6:13-cv-00093-LED, U.S. District Court for the Eastern District of Texas, Tyler Division, Feb. 20, 2013, 225 pages.
Deposition of Charles Karr held in Case No. 6:11-cv-00096-LED, U.S. District Court for the Eastern District of Texas, Marshall Division, Mar. 12, 2013, 243 pages.
Communication from U.S. Patent and Trademark Office, Re: U.S. Appl. No. 08/355,901, Advisory Action, Dated: Aug. 11, 1998.
Communication from U.S. Patent and Trademark Office, Re: U.S. Appl. No. 08/355,901, Advisory Action, Dated: Nov. 4, 1998.
Communication from U.S. Patent and Trademark Office, Re: U.S. Appl. No. 08/355,901, Advisory Action, Dated: Oct. 9, 1998.
Communication from U.S. Patent and Trademark Office, Re: U.S. Appl. No. 08/355,901, Advisory Action, Dated: Sep. 9, 1998.
Communication from U.S. Patent and Trademark Office, Re: U.S. Appl. No. 08/355,901, Examiner Interview Summary Record, Dated: Aug. 13, 1996.
Communication from U.S. Patent and Trademark Office, Re: U.S. Appl. No. 08/355,901, Office Action Summary, Dated: Jun. 24, 1998.
Communication from U.S. Patent and Trademark Office, Re: U.S. Appl. No. 08/355,901, Office Action Summary, Dated: Mar. 14, 1997.
Communication from U.S. Patent and Trademark Office, Re: U.S. Appl. No. 08/355,901, Office Action Summary, Dated: Mar. 17, 1998.
Communication from U.S. Patent and Trademark Office, Re: U.S. Appl. No. 08/355,901, Paper from Examiner M. Blum of Group Art Unit 2202, 1996.
Communication from U.S. Patent and Trademark Office, Re: U.S. Appl. No. 08/355,901, Response from Examiner regarding communication filed on Dec. 26, 1995, Dated Jul. 23, 1996.
Official Action for U.S. Appl. No. 10/297,449, mailed Jul. 27, 2005.
Official Action for U.S. Appl. No. 10/297,449, mailed Feb. 23, 2006.
Notice of Allowance for U.S. Appl. No. 10/297,449, mailed Oct. 4, 2006.
Notice of Allowance for U.S. Appl. No. 10/297,449, mailed Aug. 10, 2007.
Notice of Allowance for U.S. Appl. No. 10/297,449, mailed Nov. 14, 2007.
Notice of Allowance for U.S. Appl. No. 10/297,449, mailed Mar. 31, 2008.
Notice of Allowance for U.S. Appl. No. 10/297,449, mailed Sep. 9, 2008.
Notice of Allowance for U.S. Appl. No. 10/297,449, mailed Jan. 8, 2009.
Notice of Allowance for U.S. Appl. No. 10/297,449, mailed May 29, 2009.
Official Action for U.S. Appl. No. 11/464,880, mailed Jul. 22, 2008.
Official Action for U.S. Appl. No. 11/464,880, mailed Feb. 23, 2010.
Notice of Allowance for U.S. Appl. No. 11/464,880, mailed Aug. 9, 2010.
Official Action for U.S. Appl. No. 12/021,222, mailed Dec. 17, 2010.
Official Action for U.S. Appl. No. 10/337,807, mailed Mar. 25, 2005.
Official Action for U.S. Appl. No. 10/337,807, mailed Feb. 13, 2007.
Notice of Allowance for U.S. Appl. No. 11/838,213, mailed Jun. 24, 2010.
Notice of Allowance for U.S. Appl. No. 11/838,213, mailed Oct. 14, 2010.
Notice of Allowance for U.S. Appl. No. 11/838,213, mailed Nov. 22, 2011.
Restriction Requirement for U.S. Appl. No. 13/037,337, mailed Dec. 4, 2012.
Official Action for U.S. Appl. No. 13/037,337, mailed Sep. 11, 2013.
"GPS Interface Control Document ICD-GPS-200," IRN-200B-PR001, Jul. 1, 1992 revision, reprinted Feb. 1995, 109 pages.
Boucher, Neil J., "Cellular Radio Handbook," Quantum Publishing, 1990, 91 pages.
Marshall, Catherin R., "The U S West Intelligent Services Research Laboratory," CHI '90 Proceedings, Apr. 1990, pp. 383-384.
Parkinson, B.W. and P. Axelrad, eds., "Global Positioning System: Theory and Applications," vol. 163 Progress in Astronautics and Aeronautics, AIAA, 1996, 236 pages.
Parkinson, Bradford W. and James Spilker, Jr., eds., "Global Positioning System: Theory and Applications," vol. 164 Progress in Astronautics and Aeronautics, AIAA, 1996, 221 pages.
U.S. Appl. No. 60/044,821, filed Apr. 25, 1997, LeBlanc et al.
U.S. Appl. No. 60/056,590, filed Aug. 20, 1997, Dupray et al.
U.S. Appl. No. 60/062,931, filed Oct. 21, 1997, Dupray.
U.S. Appl. No. 15/396,778, filed Jan. 2, 2017, Dupray et al.
"How to Exploit Wal-Mart's Weaknesses," Zenith Management Consulting, 2005, pp. 1-11.
Definition of "determine," American Heritage Dictionary, 3rd Ed., 1994, p. 235.
Definition of "locus," American Heritage Dictionary, 4th Ed., 2000, p. 1027.
Definition of "obtain," American Heritage Dictionary, 3rd Ed., 1994, p. 575.
Definition of "obtain," Webster's New World College Dictionary, 4th Ed., 2010, p. 996.
Definition of "source," Random House Webster's Dictionary, 4th Ed., 2001, p. 688.
Federal Communications Commission, "Memorandum Opinion and Order," In the Matter of Revision of the Commission's Rules to Ensure Compatibility with Enhanced 911 Emergency Calling Systems, CC Docket No. 94-102, vol. 12(36) Supplement, released Dec. 23, 1997, pp. 22497-23188.
Federal Communications Commission, "Third Report and Order," In the Matter of Revision of the Commission's Rules to Ensure Compatibility with Enhanced 911 Emergency Calling Systems, CC Docket No. 94-102, vol. 14(31) Supplement, released Oct. 6, 1999, pp. 17012-17627.
Goldstein et al., "A New Way to Measure Consumer Risk Preferences," (revise and resubmit), Marketing Science, 2006, 38 pages.
Krizman et al., "Wireless Position Location: Fundamentals, Implementation Strategies, and Sources of Error," IEEE Vehicular Technology Conf., Phoenix, AZ, May 5-7, 1997, 5 pages.
Zagami et al., "Providing Universal Location Services Using a Wireless E911 Location Network," IEEE Communications Magazine, Apr. 1998, pp. 66-71.
Complaint for Declaratory Judgment and Jury Demand filed in Case No. 6:12-cv-00058-LED, United States District Court for the District of Colorado, on Sep. 27, 2011, 9 pages.
Complaint for Patent Infringement filed in Case No. 6:11-cv-96-LED, U.S. District Court for the Eastern District of Texas, Tyler Division, on Feb. 25, 2011, 15 pages.
Plaintiff's Markman Tutorial submitted in Case Nos. 6:11-cv-96-LED, U.S. District Court for the Eastern District of Texas, Tyler Division, on Nov. 2, 2012, 37 pages.
Expert Report of Dr. Michael S. Braasch Regarding Invalidity of Asserted Claims U.S. Pat. No. 7,764,231 and U.S. Pat. No. 7,525,484, dated May 24, 2013, 127 pages.
Expert Report of Robert Stoll Regarding Prosecution Laches, dated May 24, 2013, 52 pages.
Defendants MetroPCS Communications, Inc.'s and MetroPCS Wireless, Inc.'s Amended Rule 7.1 Disclosure Statement filed in Case No. 6:11-cv-96-LED, U.S. District Court for the Eastern District of Texas, Tyler Division, May 30, 2013, 3 pages.
Joint Motion to Dismiss Without Prejudice Claims and Counterclaims Between TracBeam, MetroPCS, and TCS filed in Case Nos. 6:11-cv-96-LED and 6:12-cv-58-LED, United States District Court for the Eastern District of Texas, Tyler Division, on Jun. 13, 2013, 3 pages.

(56) References Cited

OTHER PUBLICATIONS

Order of Dismissal Without Prejudice as to MetroPCS and TCS issued in Case Nos. 6:11-cv-96-LED and 6:12-cv-58-LED, United States District Court for the Eastern District of Texas, Tyler Division, on Jun. 17, 2013, 2 pages.
Order Resolving Parties Claim Construction Dispute Regarding Claim 25 issued in Case No. 6:11-cv-96-LED, United States District Court for the Eastern District of Texas, Tyler Division, on Oct. 25, 2013, 3 pages.
Memorandum Opinion and Order issued in Case No. 6:11-cv-96-LED, United States District Court for the Eastern District of Texas, Tyler Division, on Oct. 25, 2013, 18 pages.
Complaint for Patent Infringement filed in Case No. 6:14-cv-678, U.S. District Court for the Eastern District of Texas, Tyler Division, on Aug. 8, 2014, 9 pages.
Summons to T-Mobile, US, Inc., issued in Case No. 6:14-cv-678, U.S. District Court for the Eastern District of Texas, Tyler Division, on Aug. 18, 2014, 2 pages.
Summons to T-Mobile, USA, Inc., issued in Case No. 6:14-cv-678, U.S. District Court for the Eastern District of Texas, Tyler Division, on Aug. 18, 2014, 2 pages.
Joint Motion to Resolve Disputes and Enter Docket Control Order filed in Case Nos. 6:14-cv-678-RWS and 6:14-cv-680-RWS, U.S. District Court for the Eastern District of Texas, Tyler Division, on Apr. 9, 2015, 16 pages.
Order Denying Joint Motion to Resolve Disputes and Enter Docket Control Order issued in Case Nos. 6:14-cv-678-RWS and 6:14-cv-680-RWS, U.S. District Court for the Eastern District of Texas, Tyler Division, on Jun. 2, 2015, 2 pages.
Notice of Compliance Regarding Reasonable Number of Asserted Claims filed in Case Nos. 6:14-cv-678-RWS and 6:14-cv-680-RWS, U.S. District Court for the Eastern District of Texas, Tyler Division, on Jun. 24, 2015, 3 pages.
Deposition of Dennis Dupray (vol. II) held in Case Nos. 6:14-cv-678-RWS and 6:14-cv-680-RWS, U.S. District Court for the Eastern District of Texas, Tyler Division, Feb. 16, 2016, pp. 332-335.
TracBeam's Motion to Compel T-Mobile's Compliance with Discovery Requests (filed under seal) in Case Nos. 6:14-cv-678 and 6:14-cv-680-RWS, United States District Court for the Eastern District of Texas, Tyler Division, on Mar. 14, 2016, 16 pages.
Memorandum Opinion and Order ("Markman Order") issued in Case No. 6:14-cv-678, United States District Court for the Eastern District of Texas, Tyler Division, on Jul. 14, 2016, 29 pages.
Expert Report of Dr. William R. Michalson Regarding Invalidity of Asserted Claims of U.S. Pat. No. 7,764,231 and U.S. Pat. No. 7,298,327, dated Jul. 27, 2016, 310 pages.
Expert Report of Robert Stoll Regarding Prosecution Laches, dated Jul. 27, 2016, 61 pages.
Official Action for U.S. Appl. No. 13/037,337, mailed Jan. 13, 2016.
Official Action for U.S. Appl. No. 13/037,337, mailed Nov. 16, 2016.
Official Action for U.S. Appl. No. 13/037,337, mailed Aug. 10, 2017.
Deposition of Frederick Warren LeBlanc (Redacted) held in Case No. 6:11-cv-00096-LED, U.S. District Court for the Eastern District of Texas, Marshall Division, Mar. 13, 2013, 125 pages.
Deposition of Dennis Dupray (Redacted vol. I) held in Case Nos. 6:11-cv-00096-LED and 6:13-cv-00093-LED, U.S. District Court for the Eastern District of Texas, Tyler Division, Feb. 20, 2013, 225 pages.
Deposition of Dennis Dupray (Redacted vol. II) held in Case Nos. 6:11-cv-00096-LED and 6:13-cv-00093-LED, U.S. District Court for the Eastern District of Texas, Tyler Division, Feb. 21, 2013, 100 pages.
Deposition of Dennis Dupray (Redacted vol. III) held in Case Nos. 6:11-cv-00096-LED and 6:13-cv-00093-LED, U.S. District Court for the Eastern District of Texas, Tyler Division, Feb. 22, 2013, 43 pages.
Deposition of Dennis Dupray (Redacted vol. IV) held in Case Nos. 6:11-cv-00096-LED and 6:13-cv-00093-LED, U.S. District Court for the Eastern District of Texas, Tyler Division, May 29, 2013, 50 pages.
Deposition of Dennis Dupray (Redacted vol. V) held in Case Nos. 6:11-cv-00096-LED and 6:13-cv-00093-LED, U.S. District Court for the Eastern District of Texas, Tyler Division, Aug. 19, 2013, 66 pages.
Deposition of Corey K. Ford held in Case No. 6:13-CV-93-LED, U.S. District Court for the Eastern District of Texas, Marshall Division, Apr. 16, 2013, 68 pages.

* cited by examiner

*FOM_ID*: First Order Model ID (providing this Location Hypothesis); note, since it is possible for location hypotheses to be generated by other than the FOM's, in general this field identifies the module that generated this location hypothesis.

*MS_ID*: The identification of the target MS to which this location hypothesis applies.

*pt_est*: The most likely location point estimate of the target MS

*valid_pt*: Boolean indicating the validity of "pt_est"

*area_est*: Location Area Estimate of the target MS provided by the FOM. This area estimate will be used whenever "image_area" below is NULL.

*valid_area*: Boolean indicating the validity of "area_est" (one of "pt_est" and "area_est" must be valid).

*adjust*: Boolean (true iff adjustments to the fields of this location hypothesis are to be performed in the Context Adjuster Module).

*pt_covering*: reference to a substantially minimal area (e.g., mesh cell) covering of "pt_est". Note, since this MS may be substantially on a cell boundary, this covering may in some cases include more than one cell.

*image_area*: reference to an area (e.g., mesh cell) covering of the image cluster set area for "pt_covering" (see detailed description of the function, "confidence_adjuster"). Note that if this field is not NULL, then this is the target MS location estimate used by the Location Center instead of "area_est".

FIG. 9A

*extrapolation_area*: reference to (if non-NULL) an extrapolated MS target estimate area provided by the Location Extrapolator submodule of the Hypothesis Analyzer. That is, this field, if non_NULL, is an extrapolation of the "image_area" field if it exists, otherwise this field is an extrapolation of the "area_est" field. Note other extrapolation fields may also be provided depending on the embodiment of the present invention, such as an extrapolation of the "pt_covering".

*confidence*: A real value in the range [0, +1.0] indicating a likelihood (e.g., probability) that the target MS is in (or out) of a particular area. If positive: if "image_area" exists, then this is a measure of the likelihood that the target MS is within the area represented by "image_area," else if "image_area" has not been computed (e.g., "adjust" is FALSE), then "area_est" must be valid and this is a measure of the likelihood that the target MS is within the area represented by "area_est." If negative, then "area_est" must be valid and this is a measure of the likelihood that the target MS is NOT in the area represented by "area_est". If it is zero (near zero), then the likelihood is unknown.

*Original_Timestamp*: Date and time that the location signature cluster for this location hypothesis was received by the CDMA Filter Subsystem.

*Active_Timestamp*: Run-time field providing the time to which this location hypothesis has had its MS location estimate(s) extrapolated (in the Location Extrapolator of the Hypothesis Analyzer). Note that this field is initialized with the value from the "Original_Timestamp" field.

*Processing Tags and environmental categorizations*: For indicating particular types of environmental classifications not readily determined by the Original_Timestamp field (e.g., weather, traffic), and restrictions on location hypothesis processing.

*loc_sig_cluster*: Access to location signature signal characteristics provided to the First Order Models by the CDMA Filter Subsystem; i.e., access to the "loc sigs" (received at "timestamp" regarding the location of the target MS)

*descriptor*: Optional descriptor (from the First Order Model indicating why/how the Location Area Estimate and Confidence Value were determined).

FIG. 9B

FIG. 15: LOCATION PROVISIONING VIA MULTIPLE CMRS

Fig. 25A

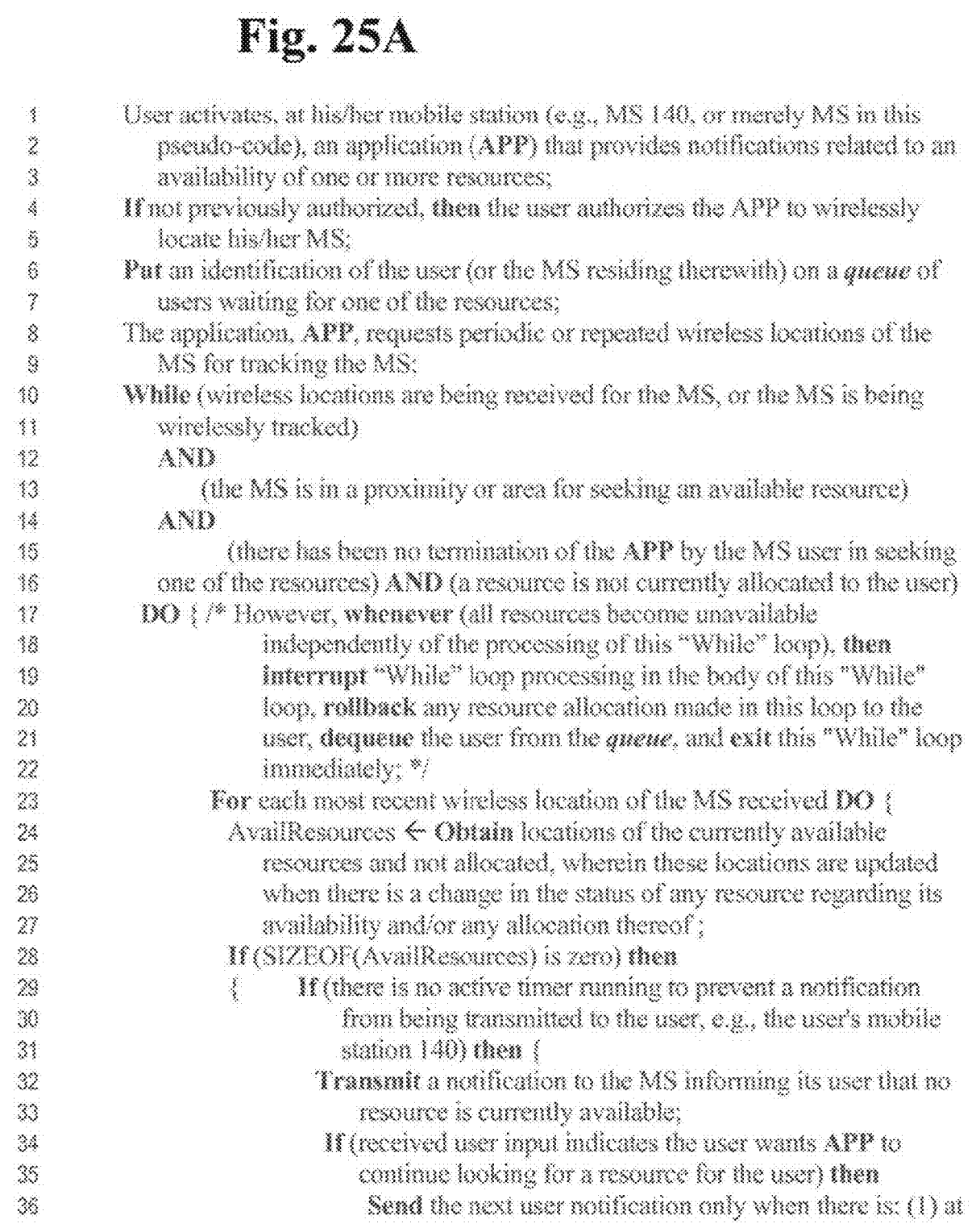

User activates, at his/her mobile station (e.g., MS 140, or merely MS in this
    pseudo-code), an application (APP) that provides notifications related to an
    availability of one or more resources;
If not previously authorized, then the user authorizes the APP to wirelessly
    locate his/her MS;
Put an identification of the user (or the MS residing therewith) on a *queue* of
    users waiting for one of the resources;
The application, APP, requests periodic or repeated wireless locations of the
    MS for tracking the MS;
While (wireless locations are being received for the MS, or the MS is being
    wirelessly tracked)
    AND
        (the MS is in a proximity or area for seeking an available resource)
    AND
          (there has been no termination of the APP by the MS user in seeking
    one of the resources) AND (a resource is not currently allocated to the user)
  DO { /* However, whenever (all resources become unavailable
            independently of the processing of this "While" loop), then
            interrupt "While" loop processing in the body of this "While"
            loop, rollback any resource allocation made in this loop to the
            user, dequeue the user from the *queue*, and exit this "While" loop
            immediately; */
        For each most recent wireless location of the MS received DO {
          AvailResources ← Obtain locations of the currently available
            resources and not allocated, wherein these locations are updated
            when there is a change in the status of any resource regarding its
            availability and/or any allocation thereof ;
          If (SIZEOF(AvailResources) is zero) then
          {     If (there is no active timer running to prevent a notification
                    from being transmitted to the user, e.g., the user's mobile
                    station 140) then {
                Transmit a notification to the MS informing its user that no
                    resource is currently available;
                If (received user input indicates the user wants APP to
                    continue looking for a resource for the user) then
                      Send the next user notification only when there is: (1) at

Fig. 25B

```
                        least one available and unallocated resource, OR, (2)
                        a predetermined elapsed time of a timer
                        (activated/initialized in this "Send" command or the
                        "Send" command below) has expired, e.g., a 3
                        minute timer; for providing the user with status(es)
                        regarding resource (un)availability;
            }
            Else Exit While loop;
    } ElseIf (all resources are allocated, but at least one is available) then
            /* i.e., all resources have had a notification sent to some MS
            user, but at least such resource is still available */
    {           If (there is no active timer running to prevent the user from
                    receiving a notification when unallocated and
                    available resource is identified) then {
                Transmit a notification to the MS informing its user
                        that a resource may be available, but all have
                        been allocated;
                If (a received user input indicates the user wants APP to
                    continue looking for a resource for the user) then
                    Send a next user notification when there is (1) an
                        available and unallocated resource, OR, (2) a
                        predetermined elapsed time of a timer
                        (activated/initialized in this "Send" command or
                        the "Send" command above) has expired, e.g., a 3
                        minute timer for continuing to provide the user
                        with notifications of resource availability
                        status(es);
                }
                Else Exit While loop;
    } /* There is an available resource, and, this resource is not allocated
            to any MS user */
    ElseIf (the location of the user's MS is near an available and
            unallocated resource) AND (no other user, that has a "seek
            time" for seeking a resource longer, is at least as near the
            available and unallocated resource) then {
                Allocate the resource to the user;
```

Fig. 25C

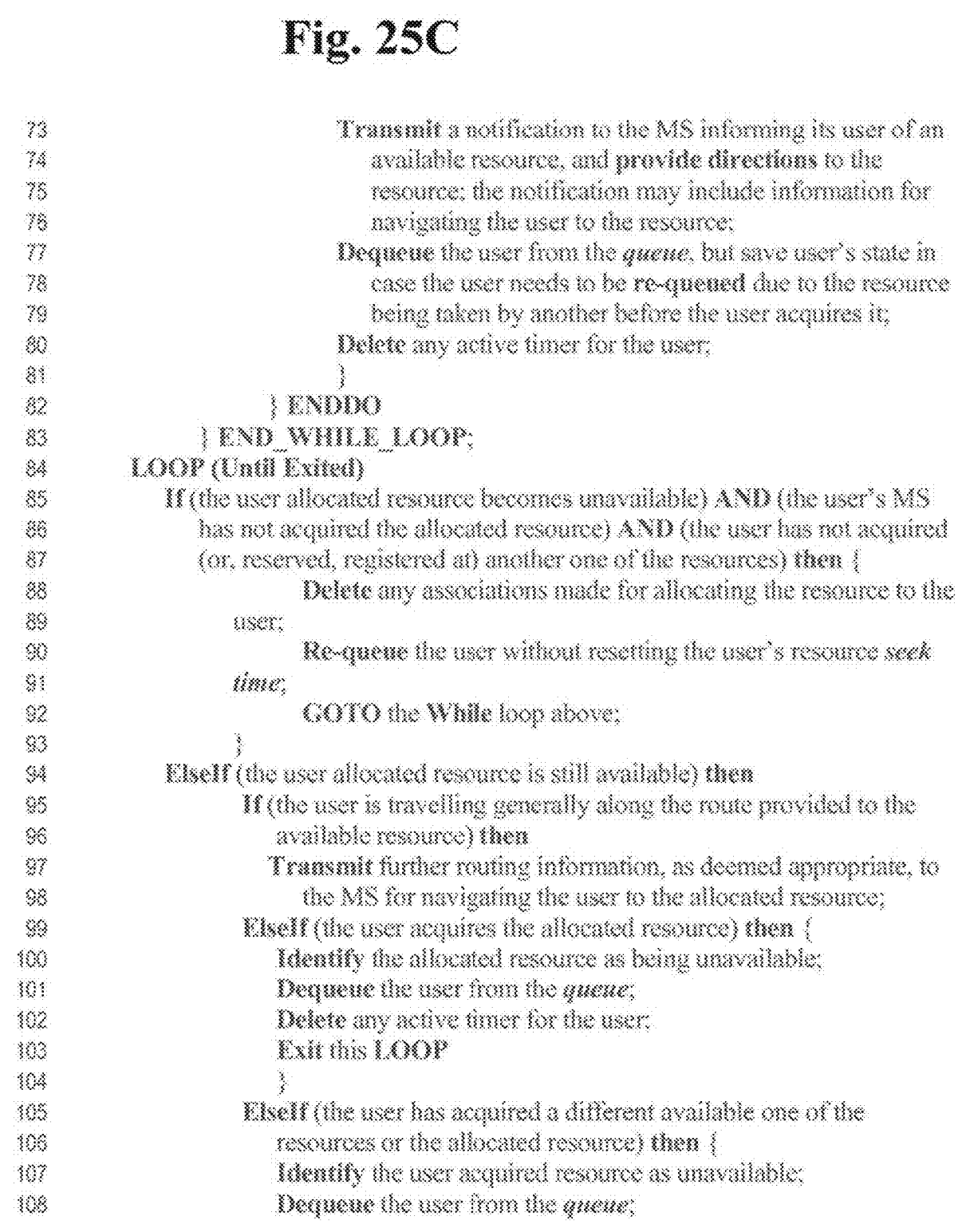

```
                    Transmit a notification to the MS informing its user of an
                        available resource, and provide directions to the
                        resource; the notification may include information for
                        navigating the user to the resource;
                    Dequeue the user from the queue, but save user's state in
                        case the user needs to be re-queued due to the resource
                        being taken by another before the user acquires it;
                    Delete any active timer for the user;
                    }
               } ENDDO
          } END_WHILE_LOOP;
     LOOP (Until Exited)
       If (the user allocated resource becomes unavailable) AND (the user's MS
          has not acquired the allocated resource) AND (the user has not acquired
          (or, reserved, registered at) another one of the resources) then {
                  Delete any associations made for allocating the resource to the
            user;
                  Re-queue the user without resetting the user's resource seek
            time;
                  GOTO the While loop above;
            }
       ElseIf (the user allocated resource is still available) then
            If (the user is travelling generally along the route provided to the
               available resource) then
              Transmit further routing information, as deemed appropriate, to
                 the MS for navigating the user to the allocated resource;
            ElseIf (the user acquires the allocated resource) then {
               Identify the allocated resource as being unavailable;
               Dequeue the user from the queue;
               Delete any active timer for the user;
               Exit this LOOP
               }
            ElseIf (the user has acquired a different available one of the
               resources or the allocated resource) then {
               Identify the user acquired resource as unavailable;
               Dequeue the user from the queue;
```

Fig. 25D

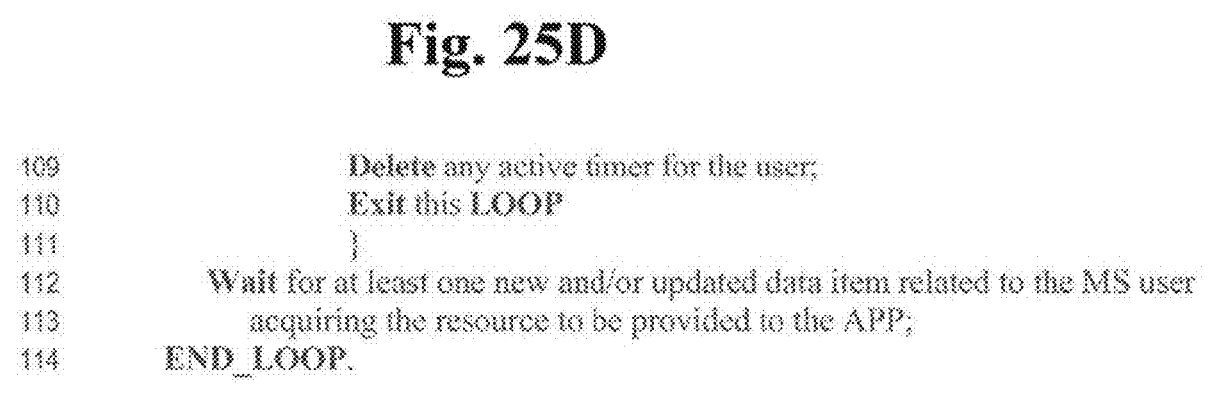

```
                Delete any active timer for the user;
                Exit this LOOP
                }
        Wait for at least one new and/or updated data item related to the MS user
            acquiring the resource to be provided to the APP;
    END_LOOP.
```

SERVICES AND APPLICATIONS FOR A COMMUNICATIONS NETWORK

RELATED APPLICATIONS

The present application is a continuation of U.S. patent application Ser. No. 16/902,125 filed Jun. 15, 2020, which is a continuation of U.S. patent application Ser. No. 13/844,708 filed Mar. 15, 2013 (now U.S. Pat. No. 10,684,350), which is a continuation-in-part of Ser. No. 13/037,337 filed Feb. 28, 2011 (now U.S. Pat. No. 10,641,861). Each of the above-identified references is fully incorporated herein by reference

FIELD OF THE INVENTION

The present invention is directed generally to a system and method for providing complex network services requiring interactions between various network accessible applications and/or services, and in particular where such complex services utilize or require the location of a wireless mobile station, and more particularly, to the utilization of a plurality wireless location service providers via, e.g., a wireless location gateway. Additionally, the present invention is directed to a platform for enabling such complex services, and to identifying such novel services that may be provided by such a platform. Thus, the present invention is directed to complex network services such as location based services for locating people or objects, and in particular, to a system and method for locating a wireless mobile stations.

BACKGROUND

There is great interest in providing existing infrastructures for wireless communication systems with the capability for locating people and/or objects in a cost effective manner. Such a capability would be invaluable in a variety of situations, especially in emergency, crime situations and mobile commerce. There are numerous competing wireless location technologies that purport to effectively locate wireless mobile stations (as used herein this term includes, e.g., mobile phones, short message devices (SMS), electronic container tracking tags, micro-transceivers for personal location and/or emergency, and mobile transmitters such as can be used on battlefield or military reconnaissance, surveillance or tracking; additionally, in a more general context, this term includes vehicles, and other mobile units such as railroad cars, watercraft, and aircraft containing a device that can be located wirelessly).). These technologies can be generally classified as:

(a) handset centric wherein a portion of the location processing is performed at the mobile stations, and in particular, each such mobile station (MS) includes specialized electronics specifically for performing location. In most cases, such specialized electronics are for detecting and receiving satellite (or more generally, non-terrestrial) signals that can then be used in determining a location of the MS.

(b) network centric wherein the wireless communication network(s) with which the MS is in contact handle substantially all location specific processing. As one skilled in the art will understand, there are various wireless location technologies that are available such as time difference of arrival (TDOA), time of arrival (TOA), timing advance (TA) techniques, angle of arrival (AOA), multipath pattern matching techniques; and (c) hybrid systems wherein there are specialized location electronics at the handset, but a substantial amount of the location processing is performed at a network site rather at the MS. An example of such a hybrid system is what is known as network assisted GPS systems, wherein GPS signals are obtained at the MS (with the assistance network received information) and GPS timing information is transmitted from the MS to the network for performing MS location computations.

The wide variety of wireless location techniques can provide, under appropriate circumstances, the following advantages:

(a) if the techniques are used in combination, a more reliable and accurate wireless location capability can be provided. In particular, when an embodiment of one wireless location technique is known to be less than satisfactory in a particular geographic area, an alternative embodiment (or alternative technique) can be used to obtain an MS's location(s). Additionally, two different embodiments and/or techniques can be applied substantially simultaneously for locating an MS. In this latter case, a location resolver is likely needed to determine a "most likely" resulting MS location estimate. Note, that wireless location systems for combining wireless location techniques is described in the following international and U.S. patent applications which are each incorporated fully by reference herein:
   i. U.S. Provisional Patent Application No. 60/025,855 filed Sep. 9, 1996
   ii. U.S. Provisional Patent Application No. 60/044,821, filed Apr. 25, 1997;
   iii. U.S. Provisional Application No. 60/056,590, filed Aug. 20, 1997;
   iv. International Patent Application No. PCT/US97/15933 filed Sep. 8, 1997 entitled "LOCATION OF A MOBILE STATION USING A PLURALITY OF COMMERCIAL WIRELESS INFRASTRUCTURES"
   v. International Application No. PCT/US97/15892 filed Sep. 8, 1997; entitled "LOCATION OF A MOBILE STATION";
   vi. U.S. patent application Ser. No. 09/194,367 filed Nov. 24, 1999 entitled "Location Of A Mobile Station";
   vii. U.S. application Ser. No. 09/176,587 filed Oct. 21, 1998 entitled "Wireless Location System For Calibrating Multiple Location Estimators";
   viii. U.S. Pat. No. 6,236,365 filed Jan. 22, 1999 entitled "Location of a Mobile Station Using A Plurality Of Commercial Infrastructures";
   ix. U.S. patent application Ser. No. 09/299,115 filed: Apr. 23, 1999 entitled "WIRELESS LOCATION USING MULTIPLE SIMULTANEOUS LOCATION ESTIMATORS" by Dupray; and
   x. International Patent Application No. PCT/US01/17957 filed Jun. 4, 2001 entitled "A Wireless Location Gateway And Applications Therefor" by Dupray;"; and (b) if a primary wireless location technique fails (e.g., due to an electronics malfunction), then assuming an alternative technique is available that does not use, e.g., the malfunctioning electronics of the primary technique, then the alternative technique can be used for MS location.

However, the variety of wireless location techniques available is also problematic for at least the following reasons:

(a) a request for an MS location can require either the requester to know the wireless location service provider of the geographical area where the MS is likely to be, or to contact a location broker that is able to, e.g., determine a communication network covering the geographical area within which the MS is currently residing and activate (directly or through the MS's wireless service provider) an appropriate wireless location service. In the art, the technology enabling such a location broker capability has been referred to as a "wireless location gateway". An embodiment of such a gateway is described in the PCT/US97/15892 reference identified above;

(b) for communication networks relying on handset centric and/or hybrid systems for MS location, MSs roaming from networks using only network centric location capabilities will likely not have the specialized electronics needed for being located and accordingly many location related network services will not be available such as emergency services (e.g., E911 in the U.S.).

(c) different location techniques have different reliability and accuracy characteristics. Thus, the wireless location technology may need to be selected according to the requirements of the location requesting application. For example, location requesting applications that require relatively precise location information are emergency rescue, and certain military related applications (e.g., battlefield data fusion, battlefield maneuvers and/or military command, control and communication (C3)).

Accordingly, it would be desirable to integrate into a single wireless location broker or wireless location gateway as many location techniques as possible so that location requests can be fulfilled without the requester needing to know what location technique is used. It would be further desirable for roaming MSs to be able to be located in coverage areas where a wireless location technique is different from the one (or more) techniques supported in the primary subscription area for the MS. Additionally, it would be desirable to provide new applications for which MS location information can be applied via, e.g., a wireless location gateway.

Description of Terms

The following definitions are provided for convenience. In general, the descriptions here are also defined elsewhere herein as well.

(1.1) The term "wireless" herein refers to digital signaling using wireless protocols such as Advanced Mobile Phone Service (AMPS), Narrowband Advanced Mobile Phone Service (NAMPS), code division multiple access (CDMA) and Time Division Multiple Access (TDMA), Global Systems Mobile (GSM), General Packet Radio Service (GPRS), time division multiple access (TDMA), WIFI protocols, wireless signal protocols for indoor or underground wireless communication systems, as well as any other wireless communication protocol such as Bluetooth as applicable herein.

(1.2) As used herein, the term "mobile station" (equivalently, MS) refers to a wireless mobile device that is at least a transmitting device, and in most cases is also a wireless receiving device, such as a portable radio telephony handset (e.g., a "smart phone" or Iphone®), or a radio tag (such as may be attached to items whose location may be desired or for identifying a locating a person, an item, or an animal associated with the tag). Note that in some contexts herein instead or in addition to the term "mobile station" or "MS", the following terms may also be used: "personal station" (PS), "location unit" (LU), and mobile communications device (MCD) as being substantially synonymous with the term "mobile station". Examples of various MSs are identified in the Background section above.

(1.3) The term, "wireless infrastructure" (or simply "infrastructure"), denotes one or more of: (a) a network for one or more of telephony communication services, (b) a collection of commonly controlled transceivers for providing wireless communication with a plurality of MSs, (c) the Internet, (d) that portion of a communications network that receives and processes wireless communications with wireless mobile stations. In some embodiments, a wireless infrastructure may include telephony wireless base stations or access points (collectively, referred to herein as "base stations" or "BS"s) such as those for radio mobile communication systems based on CDMA, AMPS, NAMPS, TDMA, GPRS, GSM, WIFI systems, indoor access point systems, Bluetooth, and/or hybrid indoor/outdoor wireless systems. The base stations provide a network of cooperative communication channels with an air interface to the MS, Thus, an MS user within an area serviced by the base stations may be provided with wireless communication substantially throughout the area by user transparent communication transfers (i.e., "handoffs") between the user's MS and these base stations in order to maintain effective telephony service.

(1.4) The phrase, "composite wireless signal characteristic values" denotes the result of aggregating and filtering a collection of measurements of wireless signal samples, wherein these samples are obtained from the wireless communication between an MS to be located and the base station infrastructure (e.g., a plurality of networked base stations). However, other phrases are also used herein to denote this collection of derived characteristic values depending on the context and the likely orientation of the reader. For example, when viewing these values from a wireless signal processing perspective of radio engineering, as in the descriptions of the subsequent Detailed Description sections concerned with the aspects of the present disclosure for receiving MS signal measurements from a base station infrastructure, the phrase typically used is: "RF signal measurements". Alternatively, from a data processing perspective, the phrases: "location signature cluster" and "location signal data" are used to describe signal characteristic values between the MS and the plurality of infrastructure base stations substantially simultaneously detecting MS transmissions. Moreover, since the location communications between an MS and the base station infrastructure typically include simultaneous communications with more than one base station, a related useful notion is that of a "location signature" (also denoted "loc sig" herein) which is the composite wireless signal characteristic values for signal samples between an MS to be located and a single base station. Also, in some contexts, the phrases: "signal characteristic values" or "signal characteristic data" are used when either or both a location signature(s) and/or a location signature cluster(s) are intended.

(1.5) A wireless location computational estimator may be referred to by the term "position determining entity" (PDE) or "position determining technique" or a variation of these terms. Such wireless location computational estimator may also be denoted herein as a "MS location hypothesizing computational model", a "first order model", a "FOM", and/or a "location estimating model" as well as other terms as may be appropriate. Such an position determining entity or technique is used to determine/compute a geographical estimate of a location of at least one mobile station using wireless signals communicated between the mobile station and, e.g., one or more base stations (and/or variations thereof, e.g., indoor access points).

SUMMARY

The present disclosure relates to a method(s) and system(s) for performing and utilizing wireless mobile station location. In particular, various communications network utilities, services or applications are disclosed herein for assisting, e.g., mobile station users, wherein such assistance may include: (i) assistance in purchasing items; (ii) receiving incentives/advertising for purchasing various items, e.g. of interest to the user (or of interest to a social network contact of the user); (iii) receiving routing or navigation information for appropriately or "intelligently" navigating the user between, e.g., a plurality of points of interest, while attempting to satisfy one or more user constraints related to the route or the points of interest (changes thereto); and (iv) electronic (Internet accessible) yellow page services for providing custom advertising to users.

Note that for convenience, communications network utilities, services or applications as disclosed herein will be also referred to as "applications" or "apps". Accordingly, an application for routing or navigating a user may be referred to as a "routing application", an application for providing incentives may be referred to as an "incentive providing application", etc.

In one noteworthy routing application, hotels and other personal service providers, such as auto rental agencies, hotels, resorts and cruise ships may provide an inexpensive mobile station (MS) that can be used substantially only for contacting: (i) the personal service, (ii) emergency services, and/or (iii) receiving directions to return to the personal service. Accordingly, the MS may be wirelessly located during operations (ii) and (iii) via wireless communications between the MS and a local wireless service provider wherein a request to locate the MS is provided to appropriate network equipment, and the resulting MS location estimate is: provided to a public safety emergency center (e.g., E911) for dispatching emergency services, or provided to a mapping and routing system such as provided by Google Maps, and/or by MapInfo as disclosed in the LeBlanc et. al. patent application filed Jan. 22, 1999 and having U.S. Pat. No. 6,236,365 (which is fully incorporated herein by reference) so that the MS user may be routed safely and expeditiously to a predetermined location of the personal service. Note that data representing the location of the personal service can be associated with an identification of the MS so that MS activation for (iii) above results in one or more audio and/or visual presentations of directions for directing the user to return to the personal service.

An MS together with the wireless network with which the MS is communicating may also provide the MS user with the ability to explicitly request to be substantially continuously tracked, wherein the MS tracked locations are stored for access by those having permission (e.g., the user, parents and/or associates of the user, e.g., friends, employers, etc.). Additionally, the velocity and/or expected time of arrival at a predetermined destination may be derived from such tracking and may be provided to the user or his/her associates (e.g., employer, friends, and/or family). Further, note that this tracking and notification of information obtained therefrom may be provided via a telephony or Internet enabled mobile station, or a mobile station in operable communication with a short messaging service. For example, the MS registered owner may provide permissions for those able to access such MS tracking information so that such information can be automatically provided to certain associates and/or provided on request to certain associates. Additionally, note that the MS and the MS location providing wireless network may also allow the MS user to deactivate such MS tracking functionality. In one embodiment, an MS user may activate such tracking for his/her MS during working hours and deactivate such tracking during non-working hours. Accordingly, an employer can then track employee's whereabouts during work hours, while the employee is able to retain his/her location privacy when not working although the employer may be still able to contact the employee in case of an emergency during the employee's non-working time. Note, that this location capability and method of obtaining location information about an MS user while assuring privacy at other times may be useful for appropriately monitoring personnel in the military, hospitals, transportation services (e.g., for couriers, bus and taxis drivers), telecommunications personnel, emergency rescue and correctional institution personnel.

In another routing related application, an MS and the MS location providing wireless network may provide the MS user with functionality to register certain locations so that data representing such locations can be easily accessed for use at a later time. For example, the MS user may be staying at a hotel in an unfamiliar area. Accordingly, the user can request, via his/her MS, that his/her location at the hotel be determined and registered so that it is available at a later time for routing the user back to the hotel. In fact, the user may have personal location registrations of a plurality of locations in various cities and countries so that when traveling the user has wireless access to directions to preferred locations such as his/her hotel, preferred restaurants, shopping areas, scenic areas, rendezvous points, theatres, athletic events, churches, entertainment establishments, locations of acquaintances, etc. Note, that such personal location registration information may reside primarily on the user's subscriber network, but upon the MS user's request, his/her personal location registrations may be transmitted to another network from which the user is receiving wireless services as a roamer. Moreover, any new location registrations (or deletions) may be duplicated in the user's personal registration of the user's subscriber network. However, in some instances an MS user may wish to retain such registered locations only temporarily while the user is in a particular area; e.g., a predetermined network coverage area. Accordingly, the MS user may indicate (or such may be the default) that a new personal location registration be retained for a particular length of time, and/or until a location of the user is outside the area to which such new location registrations appear to be applicable. However, prior to deleting any such registrations, the MS user may be queried to confirm such deletions. For example, if the MS user has new location registrations for the Dallas, Texas area, and the MS user subsequently travels to London, then upon the first wireless location performed by the MS user for location registration services, the MS user may be queried as whether to save the new Dallas, Texas location registrations permanently, for an particular length of time (e.g. 30 days), or delete all or selected portions thereof.

Advertising may be directed to an MS according to its location. In at least some studies Advertising may be directed to an MS according to its location. MS users do not respond well to unsolicited wireless advertisement whether location based or otherwise. However, in response to certain user queries for locally available merchandise, certain advertisements may be viewed as more friendly. Thus, by allowing an MS user to contact, e.g., a wireless advertising portal by voice or via wireless Internet, and describe certain products or services desired (e.g., via interacting with an automated speech interaction unit, an information search engine, etc.), the user may be able to describe and receive (at his/her MS) audio and/or visual presentations of such products or services that may satisfy such a user's request and that are near or within a predetermined travel distance, travel time, etc. from the MS user's location as, e.g., determined by a wireless location capability.

Note that the advertising may be utilized by an intelligent electronic yellow pages which can utilize the MS user's location (and/or anticipated locations; e.g., due to roadways being traversed) together with user preferences and needs (as well as other constraints) to both intelligently respond to user requests as well as intelligently anticipate user preferences and needs. A block diagram showing the high level components of an embodiment of an electronic yellow pages capability is disclosed herein. Such an electronic yellow pages capability may provide advertising that is user driven in that, e.g., an MS user may be able to select advertising based on attributes such as: merchant proximity, traffic/parking conditions, the product/service desired, quality ratings, price, user merchant preferences, product/service availability, coupons and/or discounts. Further, the MS user may be able to determine an ordering of advertisements presented based on, e.g., his/her selection inputs for categorizing such attributes. For example, the MS user may request advertisements of athletic shoes be ordered according to the following values: (a) within 20 minutes travel time of the MS user's current location, (b) midrange in price, (c) currently in stock, and (d) no preferred merchants. Note that in providing advertisements according to the MS user's criteria, the electronic yellow pages may have to make certain assumptions such as: if the MS user does not specify a time for being at the merchant (and instead, provides information about when he/she will travel to the merchant from his/her current location), the electronic yellow pages may default the time to a range of times somewhat longer than the travel time to the merchant. Additionally, the electronic yellow pages may also check stored data on the merchant to assure that the MS user can access the merchant once the MS user arrives at the merchant's location (e.g., that the merchant is open for business). Further, the MS user may dynamically, and in real time, vary such advertising selection parameters for thereby substantially immediately changing the advertising being provided to the user's MS. For example, the MS display may provide an area for entering an identification of a product/service name wherein the network determines a list of related or complementary products/services. Accordingly, if an MS user desires to purchase a wedding gift, and knows that the couple to be wed are planning a trip to Australia, then upon the MS user providing input in response to activating a "related products/services" feature, and then inputting, e.g., "trip to Australia" (as well as any other voluntary information indicating that the purchase is for: a gift, for a wedding, and/or a price of less than $100.00), then the intelligent yellow pages may be able to respond with advertisements for related products/services such as portable electric power converter for personal appliances that is available from a merchant local (and/or non-local) to the MS user. Moreover, such related products/services (and/or "suggestion") functionality may be interactive with the MS user. For example, there may be a network response to the MS user's above gift inquiry such as "type of gift: conventional or unconventional?". Moreover, the network may inquire as to the maximum travel time (or distance) the MS user is willing to devote to finding a desired product/service, and/or the maximum travel time (or distance) the MS user is willing to devote to visiting any one merchant. Note that in one embodiment of the electronic yellow pages, priorities may be provided by the MS user as to a presentation ordering of advertisements, wherein such ordering may be by: price, quality, convenience to purchase, language spoken at the merchant, user safety concerns in traveling to or being at the merchant's location, etc.

When an MS appears to be traveling an extended distance through a plurality of areas (as determined, e.g., by recent MS locations along an interstate that traverse the plurality of areas), an application may be accessed by the MS user such that upon entering each new area having a new collection of location related products, services, persons of interest, or points of interest may become available to a user of the MS. Moreover, if the MS user has a personal profile that also is accessible by the MS and/or the network, then advertising for local businesses and services that are expected to meet the MS user's tastes and needs may be made available to the user. Thus, if the MS user prefers fine Italian food but does not want to travel more than 20 minutes by auto from his/her current location to reach such a restaurant, then advertisements for restaurants satisfying such criteria may be made available to the user.

Sightseeing or touring applications may be provided for MS users, wherein repeated locations of the user's MS is determined for assisting in routing the user to desired, e.g., points of interest. In particular, self guided tours may be provided by such applications, wherein the application is interactive with the user depending on user feedback, e.g., as to one or more points of interest the user desires to see or access, the time the user has available to access the points of interest, the estimated time needed to access the points of interest, the cost of certain points of interest.

A communications network application may provided for MSs that have photo/video capabilities integrated therein, wherein location information indicative of where a picture/video is taken using the MS (optionally also with a time/date of obtaining the picture/video data) is associated with the picture/video. Note that such location information may be determined from a wireless location of a user's MS. In particular, MS latitude-longitude coordinates may be transformed into a city address (or city area) together with a direction(s) from the location(s) where the picture/video was taken.

An application of a wireless location system may enable geographic visualization applications, wherein one or more geographic areas of interest are presented as visual geographic images or maps with annotations thereon indicative of, e.g., a relative interest a mobile station user may have in such geographic areas. In particular, such geographic areas may be color coded on a map according to an expected interest the user may have in different ones of the areas. For example, a mobile station user may be desirous of finding a parking space in a large parking facility such as at an airport parking facility, municipal parking (on, e.g., downtown streets or parking garages), or a shopping mall. If the parking facility has electronic monitoring for monitoring parking spaces therein, then parking spaces (e.g., for automobiles or other modes of transportation) can be readily identified as being occupied or available via such electronic monitoring so that a mobile station user can view on his/her mobile station a map of the parking facility with a designated color (e.g., bright green) identifying one or more nearby available parking spaces, and optionally providing a route to one of the parking spaces. Of course, there may be no guarantee that the user will arrive at one of the parking spaces prior to it being taken by someone else. However, if another takes the parking space, then the user can be notified of the parking space's unavailability potentially substantially before travelling to the un available parking space. Of course, in providing parking space information to the user, both the location of an empty parking space and the user's location preferably should be known or determined so that the user may be navigated to an empty parking space. In addition to a service for locating such empty parking spaces for users in, e.g., parking garages, shopping malls, street parking in downtown areas, etc., other services may also be provided which rely on wirelessly locating mobile station users and/or the resources for such users. In particular, such users may request notifications for assisting in locating other resources such as a nearby restaurant having a reduced (or no) wait time for service, a hotel or motel having a vacancy, a campsite at a campground, a theme park (or other) attraction having a reduced (or no) wait time.

A further communications network application for utilization by a mobile communications device is disclosed herein, wherein electronic coupons, discounts, promotions, etc. (collectively, referred to as "incentives" herein) may be provided to the user of the mobile communications device, e.g. at the request of the user, and generally, for a particular product or product type. Moreover, such an application may provide these incentives according to, the user's location and time sensitive information in that the incentives may be dependent upon the user's geographic location, and may also have built-in time constraints (e.g., an expiration time/date) which may, e.g., vary with a context indicative of such criteria as: the user's location, previous locations of the user, user purchasing behavior, and one or more (social) networks of contacts/friends of the user. In particular, the present application is directed to providing, e.g., targeted advertising to users (e.g., also referred to as "consumers" in the present context) by combining various technologies to provide a system and service that:

(a) allows the consumer to become aware of a product/service in terms of both time and location, in which the consumer shows an interest;
(b) allows the system to know the at least information about the consumer that provides some measure of predictability in terms of what the consumer will purchase and/or has an interest therein. Note that anonymity of the consumer may still be maintained.
(c) activates techniques for obtaining information from/about the consumer for benefiting the consumer, wherein such information is obtained by both explicit consumer input as well as analysis of the consumer's behavior related to contacts with others (e.g., dissemination of incentives, as well as locations visited by the consumer);
(d) provides and transmits to a consumer (e.g., via an MS therefor) various alternatives prior to, or within a reasonable time, of the consumer making a selection of an item to purchase so that the consumer may benefit from such alternatives to which the consumer is provided within a relatively short time span.

In particular, the present advertising application benefits users/consumers by providing incentives that are more "intelligent" or "smart" than heretofore has been provided to users, wherein such incentives can function to both assist the consumer in buying, as well as assisting an advertiser in selling products in a timely and cost effective manner.

Note that for a wireless location application, a primary criteria (in one embodiment) is whether a location hypothesis represents the actual location where the MS was when the corresponding input data set (wireless signal measurements) were communicated between this MS and the wireless network.

Disclosed are one or more FOMs that may be generally denoted as classification models wherein such FOMs are trained or calibrated to associate particular composite wireless signal characteristic values with a geographical location where a target MS could likely generate the wireless signal samples from which the composite wireless signal characteristic values are derived. Further, such classification FOMs have the capability for training and retraining to automatically maintain the accuracy of these models even though substantial changes to the radio coverage area may occur, such as the construction of a new high rise building or seasonal variations (due to, for example, foliage variations). As used herein, "training" refers to iteratively presenting "training data" to a computational module for changing the behavior of the module so that the module may perform progressively better as it learns appropriate behavioral responses to the training data. Accordingly, training may include, for example, the repeated input of training data to an artificial neural network, or repeated statistical regression analyses on different and/or enhanced training data (e.g., statistical sample data sets). Note that other embodiments of a trained pattern matching FOMs for wireless location are disclosed in U.S. Pat. No. 6,026,304, titled "Radio Transmitter Location Finding for Wireless Communication Network Services and Management," filed Jan. 8, 1997 and issued Feb. 15, 2000, having Hilsenrath and Wax as inventors, this patent being incorporated herein fully by reference.

It is known in the wireless telephony art that the phenomenon of signal multipath and shadow fading renders most analytical location computational techniques such as time-of-arrival (TOA) or time-difference-of-arrival (TDOA) substantially error prone in urban areas and particularly in dense urban areas without further statistical correlation processing such as such super resolution as disclosed in U.S. Pat. No. 5,890,068 by Fattouche et. al. issued on Mar. 30, 1999 and incorporated fully herein by reference. Moreover, it may be the case that even though such additional processing is performed, the multipath phenomenon may still be problematic. However, this same multipath phenomenon also may produce substantially distinct or peculiar signal measurement patterns, wherein such a pattern coincides with a relatively small geographical area. Thus, a FOM(s) may utilize multipath as an advantage for increasing accuracy. Moreover, it is worthwhile to note that the utilization of classification FOMs in high multipath environments is especially advantageous in that high multipath environments are typically densely populated. Thus, since such environments are also capable of yielding a greater density of MS location signal data from MSs whose actual locations can be obtained, there can be a substantial amount of training or calibration data captured for training or calibrating such classification FOMs and for progressively improving the MS location accuracy of such models.

Classification FOMs may be utilized that determine target MS locations by correlating and/or associating network anomalous behavior with geographic locations where such behavior occurs. That is, network behaviors that are problematic for voice and/or data communication may be used advantageously for locating a target MS. For example, it is well known that wireless networks typically have within their coverage areas persistent subareas where voice quality is problematic due to, e.g., measurements related to high total errors, a high error rate, or change in error rate. In particular, such measurements may be related to frame error rates, redundancy errors, co-channel interference, excessive handoffs between base stations, and/or other call quality measurements. Additionally, measurements may be used that are related to subareas where wireless communication between the network and a target MS is not sufficient to maintain a call (i.e., "deadzones"). Thus, information about such so called problematic behaviors may used by, e.g., a location estimator (FOM) to generate a more accurate estimate of a target MS. For example, such network behavioral measurements may be provided for training an artificial neural network and/or for providing to a statistical regression analysis technique and/or statistical prediction models (e.g., using principle decomposition, partial least squares, or other regression techniques) for associating or correlating such measurements with the geographic area for which they likely derive. Moreover, note that such network behavioral measurements can also be used to reduce the likelihood of a target MS being in an area if such measurements are not what would be expected for the area.

Such a PDE or FOM may be hybrid combination of MS location techniques (e.g., other PDEs or FOMs). For example, an embodiment may include a FOM that uses a combination of Time Difference of Arrival (TDOA) and Timing Advance (TA) location measurement techniques for locating the target MS, wherein such a technique may require only minor modifications to the wireless infrastructure. Such a hybrid FOM may be a combination of one or more location techniques based on at least two of: GPS signals, base station communication measurements (e.g., signal strength, TDOA, timing advance, angle of arrival, etc.), WIFI signal measurements, and in some circumstances more local signaling protocols such as Bluetooth. In particular, such a FOM may provide reduced MS location errors and reduced resolution of ambiguities than are present when these techniques are used separately. One embodiment of such a FOM (also denoted the Yost Model or FOM herein) is disclosed in U.S. Pat. No. 5,987,329 filed Jul. 30, 1997 and issued Nov. 16, 1999 having Yost and Panchapakesan as inventors, this patent being fully incorporated herein by reference.

Additionally, note that FOMs related to the Yost Model may also be used with an elliptical search restriction location technique may also be utilized. In particular, such a technique is disclosed in U.S. patent application, having U.S. Ser. No. 08/903,551, and entitled "System and Method Using Elliptical Search Area Coverage in Determining the Location of a Mobile Terminal", filed Jul. 30, 1997, which is also incorporated by reference herein.

A plurality of stationary, low cost, low power "location detection base stations" (LBS also referred to herein as a femtocell) may be used in locating a MS, each such LBS having both restricted range MS detection capabilities, and a built-in MS. Accordingly, a grid of such LBSs can be utilized for providing wireless signaling characteristic data (from their built-in MSs) for: (a) (re)training such classification FOMs, and (b) calibrating the FOMs so that each generated location hypothesis has a reliable confidence value (probability) indicative of the likeliness of the target MS being in an area represented by the location hypothesis.

Personal communication systems (PCS) offer an appropriate localized base upon which to build various personal location systems (PLS) for utilizing the wireless location techniques and applications disclosed herein, in particular, for locating people and/or objects as well as providing location based services.

Techniques and applications disclosed herein may include components (e.g., FOMs or PDEs) that can substantially automatically retrain themselves to compensate for variations in wireless signal characteristics (e.g., multipath) due to environmental and/or topographic changes to a geographic service area. For example, there may be low cost, low power base stations, each referred to as a location base station (LBS or femtocell) above, providing, for example, CDMA pilot channels to a very limited area about each such LBS. The location base stations may provide limited voice traffic capabilities, but each is capable of gathering sufficient wireless signal characteristics from an MS within the location base station's range to facilitate locating the MS. Thus, by positioning the location base stations at known locations in a geographic region such as, for instance, on street lamp poles and road signs, additional MS location accuracy can be obtained. That is, due to the low power signal output by such location base stations, for there to be signaling control communication (e.g., pilot signaling and other control signals) between a location base station and a target MS, the MS must be relatively near the location base station. Additionally, for each location base station not in communication with the target MS, it is likely that the MS is not near to this location base station. Thus, by utilizing information received from both location base stations in communication with the target MS and those that are not in communication with the target MS, the possible geographic areas within which the target MS is likely to be may be substantially narrowed. Further, by providing each location base station (LBS) with a co-located stationary wireless transceiver (denoted a built-in MS above) having similar functionality to an MS, the following advantages are provided:

(2.1) Assuming that the co-located base station capabilities and the stationary transceiver of an LBS are such that the base station capabilities and the stationary transceiver communicate with one another, the stationary transceiver can be signaled by another component (s) to activate or deactivate its associated base station capability, thereby conserving power for the LBS that operate on a restricted power such as solar electrical power;

(2.2) The stationary transceiver of an LBS can be used for transferring target MS location information obtained by the LBS to a conventional telephony base station;

(2.3) Since the location of each LBS is known and can be used in location processing, signals therefrom may be used to (re)train wireless location capabilities disclosed herein. That is, by activating each LBS stationary transceiver so that there is signal communication between the stationary transceiver and surrounding base stations within range, wireless signal characteristic values for the location of the stationary transceiver are obtained for each such base station. Accordingly, such characteristic values can then be associated with the known location of the stationary transceiver for training various of the location processing modules disclosed herein such as the classification FOMs discussed above. In particular, such training and/or calibrating may include:

(i) (re)training FOMs;

(ii) adjusting the confidence value initially assigned to a location hypothesis according to how accurate the generating FOM is in estimating the location of the stationary transceiver using data obtained from wireless signal characteristics of signals between the stationary transceiver and base stations with which the stationary transceiver is capable of communicating;

(iii) automatically updating the previously mentioned historical data base (i.e., the location signature data base), wherein the stored signal characteristic data for each stationary transceiver can be used for detecting environmental and/or topographical changes (e.g., a newly built high rise or other structures capable of altering the multipath characteristics of a given geographical area); and (iv) tuning of the location system parameters, wherein the steps of: (a) modifying various system parameters and (b) testing the performance of the modified location system on verified mobile station location data (including the stationary transceiver signal characteristic data), these steps being interleaved and repeatedly performed for obtaining better system location accuracy within useful time constraints.

Also disclosed herein is a mobile (location) base station (MBS) that can be, for example, incorporated into a vehicle, such as an ambulance, police car, or taxi. Such a vehicle can travel to sites having a transmitting target MS, wherein such sites may be randomly located and the signal characteristic data from the transmitting target MS at such a location can consequently be archived with a verified location measurement performed at the site by the mobile location base station. Moreover, it is important to note that such a mobile location base station as its name implies also includes base station electronics for communicating with mobile stations, though not necessarily in the manner of a conventional infrastructure base station. In particular, a mobile location base station may (in one embodiment) only monitor signal characteristics, such as MS signal strength, from a target MS without transmitting signals to the target MS. Alternatively, a mobile location base station can periodically be in bi-directional communication with a target MS for determining a signal time-of-arrival (or time-difference-of-arrival) measurement between the mobile location base station and the target MS. Additionally, each such mobile location base station includes components for estimating the location of the mobile location base station, such mobile location base station location estimates being important when the mobile location base station is used for locating a target MS via, for example, time-of-arrival or time-difference-of-arrival measurements as one skilled in the art will appreciate. In particular, a mobile location base station can include:

(3.1) a mobile station (MS) for both communicating with other components of the wireless location capabilities disclosed herein (such as a location processing center);

(3.2) a GPS receiver for determining a location of the mobile location base station;

(3.3) a gyroscope and other dead reckoning devices; and (3.4) devices for operator manual entry of a mobile location base station location.

Furthermore, a mobile location base station includes modules for integrating or reconciling distinct mobile location base station location estimates that, for example, can be obtained using the components and devices of (3.1) through (3.4) above. That is, location estimates for the mobile location base station may be obtained from: GPS satellite data, mobile location base station data provided by the location processing center, dead reckoning data obtained from the mobile location base station vehicle dead reckoning devices, and location data manually input by an operator of the mobile location base station.

Location estimating system embodiments disclosed herein offer many advantages over existing location systems. Such embodiments may employ a number of distinctly different location estimators which provide a greater degree of accuracy and/or reliability than is possible with existing wireless location systems. For instance, the location models provided may include not only the radius-radius/TOA and TDOA techniques but also adaptive techniques such as artificial neural net techniques and the techniques disclosed in the U.S. Pat. No. 6,026,304 by Hilsenrath et. al. incorporated by reference herein, and angle or direction of arrival techniques as well as substantially any other wireless location technique wherein appropriate input data can be obtained. Note that hybrid location estimators based on combinations of such techniques (such as the location technique of U.S. Pat. No. 5,987,329 by Yost et. al). may also be provided.

Various location estimating system embodiments disclosed herein may provide various strategies for activating, within a single MS location instance, one or more location estimators (FOMs), wherein each such activated location estimator is provided with sufficient wireless signal data input for the activation. In one embodiment, one such strategy may be called "greedy" in that substantially as many location estimators may be activated as there is sufficient input (additionally, time and resources as well) for activation. Note that some wireless location techniques are dependent on specialized location related devices being operational such as fixed or network based receivers, antennas, transceivers, and/or signal processing equipment. Additionally note that some location techniques also require particular functionality to be operable in the MS; e.g., functionality for detecting one or more location related signals from satellites (more generally non-terrestrial transmitting stations). For example, the signals may be GPS signals. Accordingly, certain wireless location techniques may have their activations dependent upon whether such location related devices and/or MS functionality are available and operable for each instance of determining an MS location. Thus, for each MS wireless location instance, location estimators may be activated according to the operable features present during an MS location instance for providing input activation data.

Various location estimating system embodiments disclosed herein may be able to adapt to environmental changes substantially as frequently as desired. Thus, such embodiments may be able to take into account changes in the location topography over time without extensive manual data manipulation. Moreover, the wireless location capabilities disclosed herein can be utilized with varying amounts of signal measurement inputs. Thus, if a location estimate is desired in a very short time interval (e.g., less than approximately one to two seconds), then the wireless location capabilities disclosed herein can be used with only as much signal measurement data as is possible to acquire during an initial portion of this time interval. Subsequently, after a greater amount of signal measurement data has been acquired, additional more accurate location estimates may be obtained. Note that this capability can be useful in the context of 911 emergency response in that a first quick coarse wireless mobile station location estimate can be used to route a 911 call from the mobile station to a 911 emergency response center that has responsibility for the area containing the mobile station and the 911 caller. Subsequently, once the 911 call has been routed according to this first quick location estimate, by continuing to receive additional wireless signal measurements, more reliable and accurate location estimates of the mobile station can be obtained.

Various location estimating system embodiments disclosed herein demonstrate the utilization of various novel computational paradigms such as:

- (4.1) providing a multiple FOM computational architecture (as illustrated in FIG. 8) wherein:
  - (4.1.1) the hypotheses may be generated by modular independent hypothesizing computational models (FOMs), wherein the FOMs have been calibrated to thereby output confidence values (probabilities) related to the likelihood of correspondingly generated hypotheses being correct;
  - (4.1.2) the location hypotheses from the FOMs may be further processed using additional amounts of application specific processing common or generic to a plurality of the FOMs;
  - (4.1.3) the computational architecture may enhance the hypotheses generated by the FOMs both according to past performance of the models and according to application specific constraints and heuristics without requiring complex feedback loops for recalibrating one or more of the FOMs;
  - (4.1.4) the FOMs are relatively easily integrated into, modified and extracted from the computational architecture;
- (4.2) providing a computational paradigm for enhancing an initial estimated solution to a problem by using this initial estimated solution as, effectively, a query or index into an historical data base of previous solution estimates and corresponding actual solutions for deriving an enhanced solution estimate based on past performance of the module that generated the initial estimated solution.

Additionally, the wireless location systems and applications therefor disclosed herein need not have their computational modules co-located. In particular, various modules can be remotely located from one another and communicate with one another via telecommunication transmissions such as telephony technologies and/or the Internet. For example, some number of the position determining entities or techniques may reside in remote locations and communicate their generated hypotheses via the Internet.

The processing following the generation of location hypotheses (each having an initial location estimate) by the position determining entities or techniques may be such that this processing can be provided on Internet user nodes and the position determining entities or techniques may reside at Internet server sites. In this configuration, an Internet user may request hypotheses from such remote position determining entities or techniques and perform the remaining processing at his/her node.

Additionally, there may be one or more central location development sites that may be networked to, for example, geographically dispersed location centers providing location services, wherein the FOMs or PDEs may be accessed, substituted, enhanced or removed dynamically via network connections (via, e.g., the Internet) with a central location development site. Thus, a small but rapidly growing municipality in substantially flat low density area might initially be provided with access to, for example, two or three FOMs for generating location hypotheses in the municipality's relatively uncluttered radio signaling environment. However, as the population density increases and the radio signaling environment becomes cluttered by, for example, thermal noise and multipath, additional or alternative FOMs may be transferred via the network to the location center for the municipality.

Note that there may be (but not necessarily) a lack of sequencing between the FOMs and subsequent processing of hypotheses (e.g., location hypotheses, or other application specific hypotheses), the FOMs can be incorporated into an expert system, if desired. For example, each FOM may be activated from an antecedent of an expert system rule. Thus, the antecedent for such a rule can evaluate to TRUE if the FOM outputs a location hypothesis, and the consequent portion of such a rule may put the output location hypothesis on a list of location hypotheses occurring in a particular time window for subsequent processing by the location center. Alternatively, activation of the FOMs may be in the consequents of such expert system rules. That is, the antecedent of such an expert system rule may determine if the conditions are appropriate for invoking the FOM(s) in the rule's consequent.

A blackboard system with intelligent agents (FOMs) may be used to determine a MS geographical location. In such an embodiment, each of the intelligent agents may be calibrated using archived data so that for each of the input data sets provided either directly to the intelligent agents or to the blackboard, each hypothesis generated and placed on the blackboard by the intelligent agents has a corresponding confidence value indicative of an expected validity of the hypothesis.

Of course, other software architectures may also to used in implementing the processing of the location center without departing from scope of the present disclosure. In particular, object-oriented architectures are also within the scope of the present disclosure. For example, the FOMs may be object methods on an MS location estimator object, wherein the estimator object receives substantially all target MS location signal data output by the signal filtering subsystem. Alternatively, software bus architectures are contemplated by the present disclosure, as one skilled in the art will understand, wherein the software architecture may be modular and facilitate parallel processing.

Wireless Application Platform Services and Architecture

It is yet another aspect of the present disclosure to provide a platform or architecture for providing wireless application services to wireless subscribers. In particular, the present disclosure includes a service providing platform that is substantially uniform over a plurality of different wireless application services, and in particular wireless location based services, and/or, short and/or instant messaging services, and in particularly in combination with Internet access for such services as mobile commerce (also known as "mcommerce"), personal communications with friends and family, wireless games, wireless assessment of an emergency situation (e.g., where voice data, picture data. e.g., from camera phones, is obtained, as well as data transmissions from on-site emergency assessment and/or analysis equipment such as chemical analyzers, radiation analyzers, biochemical hazard analyzers, etc.). Accordingly, this platform may be considered as a wireless location application hub, wherein a single instance (or substantially duplicate copies) of the platform can provide a plurality of different wireless services to wireless subscribers. In particular, such a platform can provide robust generic wireless data communication capabilities that are required or desirable by a wide variety of wireless application services, and particularly services using wireless location capabilities. For example, such data communication capabilities provided by such a platform can include:

(a) user profile processing: E.g., (i) using user profile information for identifying and/or predicting information that is likely to be of interest to the user; (ii) gathering user profile information from not only receiving such profile information from the user, but also performing data mining operations on various public data sources for obtaining further user profile information about specific users as well as more general demographic profile information, and (iii) maintaining limitations or constraints on the content and/or types of information that can be stored in the user's profile.

(b) data encryption processing: E.g., encryption/decryption of a user's personal profile, encryption/decryption of a user's location (e.g., such user location encryption may be particularly advantageous in a user witness protection program).

(c) data privacy processing: E.g., there may be only certain individuals or designated agents that can view and/or modify a user's profile; additionally, there may be certain portions of a user's profile that can not be accessed without appropriate permissions (e.g., financial information, home address, social security number, etc.). Thus, various profile data items can be grouped together, wherein each such group may be provided with corresponding access permissions and/or restrictions. For example, there may be a first group of data items that can be accessed with substantially all access privileges of the user. Individuals and/or designated agents having this access may include: parents (e.g., where the user is under the age of say, 15), children of elderly parents. Optionally, a second smaller group of profile data items may include, e.g., some financial information, social security number, and other user identifications, wherein individuals and/or designated agents having access to this second group may include a spouse and/or close family members. Optionally, a third group of profile data items may include: professional and/or some personal information that would be useful for a designated corporate agent that is, e.g., subsidizing the use of the mobile station. Such a corporate agent may be, e.g., the user's employer. Accordingly, the user's employer may be allowed to view mobile station use records, as well as modify restrictions on the services that can be accessed via the mobile station (e.g., Internet transmission of full length movies or other pay per view services). Other groupings of profile data items are, of course, possible such as a fourth grouping of user profile information related to personal or professional commercial transactions that the user may desire to perform, e.g., buy/sell a car, bicycle, or pair of shoes, buy/sell tickets to a particular event (sports event or other entertainment), buy/sell travel accommodations. Note that the fourth group may be only viewed by pre-authorized or pre-qualified agents, such as those identified individually and/or aggregately by the user or a user designated agent (such as an agent for an electronic yellow pages enterprise, an Internet search service, and/or an Internet product discounter). Optionally, another grouping of profile data items may be for an organization to which the user is affiliated such as a professional organization (e.g., American Medical Association, American Bar Association, or other professional organization). There may be other profile data groups for religious, personal, and/or political organization user affiliations with correspond access privileges and restrictions.

(d) data exposure processing: E.g., for various inquiries for information about a user, the user may provide criteria about what information may be exposed. Thus, for an anonymous inquiry received due to, e.g., the location of the user, the user may provide criteria for exposing certain interests such as interests in cars, types of music, etc. Note the processing here may be similar to that of the data privacy above, and in some embodiments may be substantial identical therewith. However, if sophisticated profile capabilities are accessible to mobile station users, inconsistencies can occur within such a profile wherein the user wishes to leave his/her profile groups unaltered, but still exercise additional control such as exclude all accesses from a particular person, and/or exclude all accesses for a particular period of time, and/or provide access to particular profile data items for a particular time period or when the user is in a particular geographical location and/or when the accessing agent is in a particular geographical location or relationship to the user's geographical location. Thus, in one embodiment, the data exposure processing contemplated here may be a more dynamic version of the data privacy processing above, wherein, e.g., user location, time periods, and/or accessing agent location may be taken into account. Additionally and/or alternatively, the data exposure processing contemplated here may function as a profile access supervisor or controller that can override (temporarily or until countermanding input is provided) more stable long term profile access criteria such as the profile data groups and their corresponding access privileges and/or restrictions described above.

Note that in one embodiment of the present disclosure, a network service provider or other authorized agent may provide predetermined groups of profile data together with corresponding access permissions/restrictions that allow the user to easily construct profile data groups (with their corresponding access permissions/restrictions) and assign individuals and/or categories of entities to such groups. Thus, the user may provide network input to create the first, second and fourth data profile groups described above. Subsequently, the user may be able to exclude all profile access by a particular organization, individual or business without the user modifying the profile groupings.

It is important to note here that in the term "access" as used regarding profile data not only encompasses the discovery of such information by network agents that may actively search user profiles for particular types of information, but also encompasses the active exposure of such profile data to selected enterprises, organizations, and/or individuals. In particular, a network service provider or other authorized agent may be granted permission to distribute portions of the user's profile to certain entities. For example, a user may request that his/her profile include information that he/she wishes to purchase various brand names of expensive clothing, but only when these brands are on sale. Thus, such profile information may be actively distributed to selected businesses.

(e) constraint checking and rule activation processing: E.g., evaluating application specific conditions in a substantially uniform manner across a plurality of different applications according to, e.g., data stored in a constraint database(s), a rule base(s), and/or a user profile database(s)), (f) transaction processing: for certain wireless applications transaction based user interactions are most appropriate wherein there is the ability to initiate, commit, and roll back or undo a series of data communications as one skilled in the art will understand. Moreover, it is desirable that such a transaction processing capability provide for multilevel transactions wherein one instance of a transaction can be within another, (g) data synchronization: e.g., providing a duplicate copy of a collection of data from one point on a communications network to another point on the network, (h) event or transaction logging: e.g., for some wireless applications the interactions with users are sufficiently important to warrant storing a trace of such interactions, (i) common interfaces: e.g., substantially uniform interfaces between an embodiment of the wireless application platform of the present disclosure and both a plurality of wireless applications as well as users of such applications, (j) wireless location request triggering mechanisms: e.g., (i) for requesting the information related to users of nearby wireless mobiles when the requesting user is at a particular location or area (e.g., at a ski resort, walking through a downtown area), or at a particular time of day; or (ii) for requesting periodic locations of persons (e.g., employees, salespersons, friends, relatives, etc) or assets (e.g., a furniture shipment), or sensitive materials (e.g., toxic wastes being transported across country), or (iii) providing wireless advertising or purchasing incentives.

Moreover, an application platform according to the present disclosure may support such service functions as (a)-(j) immediately above via standard telephony and/or network functionality including WAP, BlueTooth, WIFI, and other wireless (and wired) application protocols. It is important to note that the term WAP is being used generically to refer to any wireless Internet protocol, including HDML and any future wireless Internet protocols that may be developed. The following examples are provided of some competing technologies that for the purposes of the present description will be referred to generically as WAP. For instance, Web content may be delivered as existing HTML. However, Internet content may be provided wirelessly as proposed by Spyglass' Prism technology or i-mode which is popular in Japan. As a further example, Internet content can be processed through a template model that reads existing HTML content and fits the data to a template optimized for various types of wireless mobile stations such as the system proposed by Everypath.com. As another example, the data content can be delivered to a Palm Pilot or other PDA or handheld device that uses a proprietary protocol. Thus it is an aspect of the present disclosure to provide an inventive wireless application platform wherein applications can be substantially implemented by providing application specific data which can be used to drive the application processing performed by, e.g., the above listed functions.

It is important to note that the platform of the present disclosure is particularly useful for cost effectively and quickly making "complex" network services available to subscribers; e.g., network services that require far more additional network coordination and communication between various network components (of one or more different networks) than services such as voice and data communication, and various enhancements to these basic services. For example, for wireless location based services, at least the following network services and components must communicate appropriately for performing at least some of the following functions: (i) wireless signal measurements related to the location of a target MS must be captured and routed to a wireless location entity for determining a location estimate of the target mobile station; (ii) a component such as a wireless location gateway, must determine what wireless location technology to activate to determine the target mobile station's location; moreover, such a determination is likely dependent upon the capabilities of the target mobile station, capabilities of wireless network (e.g., the wireless carrier with which the target mobile station is currently communicating) to support particular wireless location technologies, and/or the ability of the wireless carrier to communicate with particular wireless location service provider; (iii) billing for determining the location estimate must be determined; (iv) a location request may be received from various sources; (v) privacy and/or security issues must be resolved; (vi) location data representations may need to be resolved between a wireless location providing service and a location based application; (vii) a capability for iteratively frequently performing such a wireless location may be required, and appropriate network provisioning allocated thereto such as in tracking a mobile station; (viii) wireless locations may require a verification capability such as a callback mechanism as described in International Patent Application PCT/US00/40989 titled "Geographically Constrained Network Services", filed Sep. 25, 2000 by Goldberg and Dupray and having International Publication No. WO 02/00316, this reference being fully incorporated herein by reference; (ix) the location based application's output be may media rich in the sense that graphical and/or image representations may need to communicated to the user and/or to another network destination; thus, network congestion may occur due to increased network bandwidth required; (x) a wireless location based application may be only an intermediate step in enabling another application; e.g., in the International Patent Application by Goldberg and Dupray cited above, a wireless location verification application may be performed prior to a wireless network financial transaction such as a wireless gaming wager to assure that the subscriber is in a location that allows such, or a download of a geographically restricted software product (e.g., a software product that can only be downloaded and/or utilized in a particular geographical region or country such as the U.S. or Canada due to, for instance, national security concerns and/or patent violation, or other legal violations on the use of the software outside of the particular area); (xi) location based games are popular in some areas, and such games may also utilize short messaging services (SMS); thus, coordination and communication between the game application, a wireless location service provider, and the SMS provider must be performed; (xii) it is generally perceived that location based advertising is viewed with distain by subscribers since such advertising has been not much more than a location based broadcast vehicle for advertising; accordingly, what is believed desired is an "intelligent" location based advertising capability such as is disclosed herein and in International Patent Application No. PCT/US01/17957 filed Jun. 4, 2001 entitled "A Wireless Location Gateway And Applications Therefor" by Dupray incorporated herein fully by reference; however, such intelligence may likely require additional complexity such as accessing subscriber profiles, activating network triggering mechanisms or network daemons or intelligent subscriber network software agents to determine when and/or where a subscriber request is satisfied such as a request for obtaining tickets to a local sporting event that is sold out.

It has been suggested that the most commercially viable location based services have yet to be determined, and that in order to determine such services, numerous location based applications will have to be developed and marketed to gain experience in what services subscribers will pay for and to provide subscribers with experience in using such services. However, due to the complexity of developing applications for such services, if a generic or uniform platform such as is provided by the present disclosure is not utilized, the overhead and financial risk in developing such services may be beyond the financial risk tolerance as well as the technical expertise of wireless carriers and/or third party network service developers to surmount. Various examples of complex network services have been developed and/or described in the relevant art. For example, U.S. Pat. No. 5,742,905 by Peppe et. al. filed Sep. 19, 1994, titled "Personal Communications Internet working" fully incorporated herein by reference discloses:

> "a personal communications internetwork providing a network subscriber with the ability to remotely control the receipt and delivery of wireless and wireline voice and text messages. The network operates as an interface between various wireless and wireline networks, and also performs media translation, where necessary. The subscriber's message receipt and delivery options are maintained in a database which the subscriber may access by wireless or wireline communications to update the options programmed in the database. The subscriber may be provided with CallCommand service which provides real-time control of voice calls while using a wireless data terminal or PDA."

As a further example, International Patent Application PCT/IB00/01995 Jhanji having International Publication No. WO 144998 and titled "IMPROVED SYSTEMS FOR COMMUNICATING CURRENT AND FUTURE ACTIVITY INFORMATION AMONG MOBILE INTERNET USERS AND METHODS THEREFOR" is fully incorporated herein by reference, wherein this application discloses:

> "there is provided a search facility wherein a user may search among all users and/or posted information (or at least users and/or information to which the searcher has access privilege) for postings or users based on some search criteria. Since substantially all user profiles and posted information are kept in the database subsystem, such data is available to those, having the proper access privilege. By way of example, a certain user may perform a search among selected ones of her friends for those currently engaged in shopping activities or planning to go shopping. As another example, a certain user may perform a search to check on the status, location, or activity pertaining to a specific other user. As another example, a given user may wish to search for anyone in the public who is interested in a particular activity, who may be in a particular location, or who may have a certain profile characteristic of interest. Since many of the items of information pertaining to user activities are time-sensitive, searches preferably take into account the time component whenever appropriate (e.g., for activity currently taking place or proposed in the future). Along with user profile and activity, the invention permits users to find one another based on location and time, as well as having a degree of control over the privacy of their user profile and posted information."

However, it is believed that most commercially viable complex network services have yet to be developed, and the present disclosure is directed to both such novel new network services, and a method and system for rapidly providing such services to subscribers, wherein the applications providing such services use various combinations of, e.g., SMS, MS location services/applications, email services/applications, voice and data transmission services/applications, Internet access, Internet accessible applications, and/or voice over IP services/applications.

Moreover, note that the network services platform of the present disclosure may also be utilized to expedite providing other subscriber services, complex or otherwise. For example, "intelligent" electronic yellow page capabilities may require capabilities such as (xii) above regardless of whether such capabilities include a location based component.

It is believed that there are two general types of wireless services that can be easily supported by the present disclosure: (i) services (denoted "called services" herein) where the wireless subscriber initiates an activation substantially by placing a telephony call for service activation (e.g., services similar to E911), and (ii) services (denoted "connection services" herein) that are activated by a subscriber navigating a previously established network (e.g., Internet) connection where the establishment of the network connection provides virtually no information about what subsequent network services that may be activated by the subscriber. Such called services may interface directly with an embodiment of the platform of the present disclosure, wherein the embodiment may be for a single wireless carrier or may provide such services for multiple carriers. Moreover, for connection services, such services may be of two types:

(1) connection services that make use of the capabilities of an embodiment of the platform of the present disclosure; e.g., a "platform aware" application for providing such a connection service might inspect a network (e.g., Internet) path by which an activation was received by a subscriber, wherein the inspection would determine whether there is a platform embodiment by which the platform aware application can communicate for receiving appropriate additional information such as subscriber location, type of mobile device, subscriber profile attributes (e.g., authorizations for billing a profile designated entity), and/or for transmitting information to the platform for billing for and/or logging the activated connection service (e.g., an electronic yellow pages subsidiary of a wireless carrier may be activated, via the Internet, by a merchant for advertising an eminent sale and the expense incurred is automatically incorporated into the merchant's bill with the carrier, or, e.g., providing a corporation with an integrated billing, auditing and employee wireless profile management system for telecommunications and Internet services wherein a platform embodiment of the present disclosure acts as a common interface for both managing employee profiles for access to network services, and billing the corporation for employee network accesses to billable network services whose enabling applications are "platform aware"; and (2) connection services that do not make use of the capabilities of the platform of the present disclosure. However, even for these services the platform of the present disclosure may provide substantial benefits. It is believed that in many (if not most cases) wherein connection services are accessed via a platform of the present disclosure, that the entity providing the connection to the network (e.g., an Internet service provider) for such connection services will be "platform aware". Accordingly, information from a subscriber's profile can be requested and/or "pushed" to the network connection providing entity so that, e.g., this entity can prohibit access to certain network information, or can push corporate specific information to an employee for incorporation in to the employee's network connection device (e.g., MS) such as: (i) an updated preferred vendor list, (ii) a download of a new customer record management system, and/or (iii) periodically automatically update a corporate employee address book.

Note, that the functionality of (2) immediately above may be, of course, available to the "platform aware" applications as well.

Thus, it is an aspect of the platform of the present disclosure to provide for the distribution and use of subscriber or user profile information over a plurality of different types of communication networks (e.g., networks having different transmission characteristics such as: network bandwidth, the data types that can be effectively presented to users, the reliability or quality of service of network transmissions, and/or the transmission protocols and/or services provided). For example, networks that can classified as different are: different wireless telephony networks (CDMA, TDMA, GSM), wireline telephony networks (PSTNs), the Internet or other packet switched networks (e.g., networks using WAP). Thus, where there is profile information provided for the communication capabilities of individual ones of the communication networks and/or the services offered on individual ones of the communication networks, the platform coordinates fulfillment of complex service requests that may require the fulfillment of a plurality of subordinate service requests on potentially different ones of these communication networks according to, e.g., information in a user profile that is accessed by the platform for controlling at least portions of the fulfillment of the complex service request.

Furthermore, it is a particular aspect of the platform of the present disclosure to enable easy implementation of wireless location related applications. For example, embodiments of the platform disclosed herein have "plug and play" interfaces so that applications for fulfilling service requests need only identify to the platform their requirements and the platform coordinates the activation and routing of results from other applications operatively attached to the platform.

Examples of wireless location applications enabled by embodiments of the present disclosure follow. Wireless applications related to intelligent advertising (e.g., personalized advertising driven by information disclosed by a subscriber or user) may be provided by an embodiment of the disclosure, wherein the user's location is used in determining the advertising provided. Alternatively, wireless applications for providing games and gaming may also be provided by an embodiment of the platform disclosed herein. Moreover, for gaming, the platform may support wireless Internet gaming wherein the geographic location of a wireless player is taken into account for determining any legal restrictions that must be obeyed in order to conform with gaming laws where the user is located. Additional wireless services or applications expeditiously enabled by the disclosure include: introductions of wireless users with likely or stated shared interests (possibly based on location proximity), labor management and tracking, asset management and tracking, and sightseeing. Other applications are provided in the Detailed Description hereinbelow.

It is an aspect of the present disclosure that for at least some wireless applications, a geographical proximity subsystem or engine is accessed for determining when the application invoking (or location monitored) user or a tracked asset is in proximity to a particular entity (e.g., a location, person, or moving object) that the proximity engine outputs a message to the corresponding invoked application. Conversely, the proximity engine may be used for determining when two or more entities become further apart than some predetermined distance (e.g., hikers, or children from their home).

It is a further aspect of the present disclosure that a wireless services platform as described herein provide such wireless applications to wireless users in an "always on" or "always accessible" capability much like broadcast television wherein the user has access to a predetermined number of wireless services/applications, and the user can selectively activate/deactivate such services/applications depending upon the user's input. However, it is also an aspect of the present disclosure to go beyond the broadcast television paradigm in that: (i) a plurality of such applications can be concurrently active, and (ii) such applications can be activated/deactivated according to various criteria such as user location, time of day, proximity to/from a particular location or entity. Moreover, this "always accessible" capability may be presented at the user's wireless mobile station via a graphical user interface such that a proactive intelligent collection of applications is available, wherein such applications may function as, e.g., electronic agents or extensions of a user so that such an agent can, e.g., (i) alert the user of location based circumstances to which the user would not otherwise be aware, (ii) arrange or facilitate communications between users that are in proximity to one another when it is determined that such communication is likely desired by both parties wherein these users may have no a priori knowledge of one another and/or their common interests. Moreover, embodiments of the present disclosure are intended to support "intelligent" wireless communication between a user and a plurality of different wireless applications via (at least in one embodiment) substantially the same wireless services platform wherein such applications may be, e.g., considered as intelligent agents of the user for providing the user with information about products, services, people, objects, and/or locations about which the user may have an interest but which the user has both insufficient knowledge, and an insufficient knowledge to prearrange the obtaining of such information. For example, a user may input user profile information to the wireless services platform indicating that the user should be alerted when any other user that is presumed to be walking (or stationary), and is nearby (e.g., within 200 feet), and has a profile indicating that he/she is receptive to contact, and is interested in purchasing early Asian art. In particular, such alerts may be very useful if, e.g., a user is a seller of such art and is attending a well attended art auction or museum displaying Asian art. As another example, if a user is on an airplane, the user may be alerted to other users on the airplane wherein it may likely that communication between the two users would be a mutually beneficial based on the (personal or professional) profiles of the users.

Moreover, the present disclosure is novel in that it provides a user with a mobile station interface that allows the user to have a plurality of such intelligent location sensitive agents/applications active simultaneously wherein the user is wirelessly notified when any one or more of these agents/ applications detect a condition or circumstance that may be of interest to the user. Thus, the user may have one or more business related agents/applications active (e.g., for contacting potential nearby buyers or sellers of products or services), in combination with one or more personal needs related agents/applications (e.g., for meeting a possible nearby compatible mate, or someone interested in East European folk dancing, or for purchasing a nearby bicycle below a particular price), in combination with one or more agents/applications related to nearby entertainment. Moreover such agents/applications may be explicitly turned on or off by the user at any time (e.g., the user may manually request an immediate one time query of other users within a specified proximity), as well as the user may provide criteria for activating and deactivating such agents/applications according to time schedules, and/or the user's location. Thus, the user may request automatic deactivation of personal agents while at work, and activation of such agents when the user is detected as being away from work. Moreover, the present disclosure may offer a plurality generic agents/applications which the user can then customize. For example, a first sales representative for a particular company may request wireless downloads of current prices for a first collection of products or services while a second sales representative may request wireless downloads of current prices for a second different collection of products or services. More generally, the present disclosure supports wireless synchronization between a corporate enterprise wide data repository and various corporate subentities such as subsidiaries, salespersons or other employees, wherein access to the data repository and wireless data synchronization with a particular view or subset of the data repository is dependent upon the subentity's access permissions as provided by the corporation.

Additionally, the wireless platform disclosed herein may provide services so that applications/agents can perform data mining of various network accessible databases to provide verification of data of interest to a user. For example, a user that travels frequently may request that a wireless application perform data mining via, e.g., Internet search engines for currently available nearby movies, concerts, lecturers, and special events whenever the user activates the application. As other examples, a user may request data mining be performed to determine information such as: the legal description or owner of a particular property given the property's address, or the average income of households within one mile of the user's location. As other examples, a user may request data mining to be performed for automatically entering information into the user's profile and/or validating information in his/her profile and/or another user's profile.

Additionally, it is an aspect of the present disclosure that requests for location information by a user and/or applications activated by the user are coordinated so that there is efficient use of wireless location network capabilities. For example, a first wireless application may be activated by a user for requesting information related to nearby users that have an interest in health products (e.g., the user may be an owner of a health food store). Additionally, the user may have another wireless agent/application active for requesting information about nearby individuals that appear to be compatible with the user. Accordingly, the frequency of receiving information on nearby users, and the sharing of results between the two active agents/applications can provide better utilization of network resources.

It is another aspect of the present disclosure that when a request for user information is received such as due to a location based proximity query, there is a sequence of steps and interactions between the requesting user and the queried user which can lead from substantial anonymity to (if desired by both parties) personal contact in a non-threatening and comfortable manner. In particular, as an intermediate step from substantial anonymity to possibly meeting face-to-face, it is an aspect of the present disclosure to provide an instant messaging type service between the requesting user and a queried user wherein the two users can converse without the identity of the other user being automatically provided by the network.

Further features and advantages of the present disclosure are provided by the figures and detailed description accompanying this summary.

BRIEF DESCRIPTION OF THE DRAWINGS

FIGS. 9A and 9B are a high level data structure diagram describing the fields of a location hypothesis object generated by the position determining entities or techniques (each such entity or technique being also referred to as a "PDE", a "first order model" or "FOM" herein) 1224 of the location center.

FIGS. 25A-25D show illustrative psuedo-code for the performance of the visualization applications.

DETAILED DESCRIPTION

In order to simplify the description herein the following U.S. patents and U.S. patent applications (a) through (1) are fully incorporated by reference:

(a) U.S. patent application Ser. No. 12/861,817 filed Aug. 23, 2010.

(b) U.S. patent application Ser. No. 12/021,222 filed Jan. 28, 2008 and having U.S. Patent Application Publication No. US 2008-0133126 A1

(c) U.S. patent application Ser. No. 11/838,213 filed Aug. 13, 2007 having U.S. Patent Application Publication No. US 2007-0287473 A1.

(d) U.S. patent application Ser. No. 11/739,097 filed Apr. 24, 2007 having U.S. Patent Application Publication No. US 2008-0167049 A1.

(e) U.S. patent application Ser. No. 11/464,880 filed Aug. 16, 2006 having U.S. Patent Application Publication No. US 2006-0276201 A1.

(f) U.S. patent application Ser. No. 10/297,449 filed Dec. 6, 2002 (now U.S. Pat. No. 7,714,778).

(g) U.S. patent application Ser. No. 10/262,413 filed Sep. 30, 2002 (now U.S. Pat. No. 7,298,327).

(h) U.S. patent application Ser. No. 09/820,584 filed Mar. 28, 2001 (now U.S. Pat. No. 6,952,181).

(i) U.S. patent application Ser. No. 09/770,838 filed Jan. 26, 2001 (now U.S. Pat. No. 7,525,484).

(j) U.S. patent application Ser. No. 09/299,115 filed Apr. 23, 1999 (now U.S. Pat. No. 6,249,252).

(k) U.S. patent application Ser. No. 09/230,109 filed Jul. 8, 1999 (now U.S. Pat. No. 6,236,365).

(l) U.S. patent application Ser. No. 09/176,587 filed Oct. 21, 1998 (now U.S. Pat. No. 7,274,332).

Figure 4:
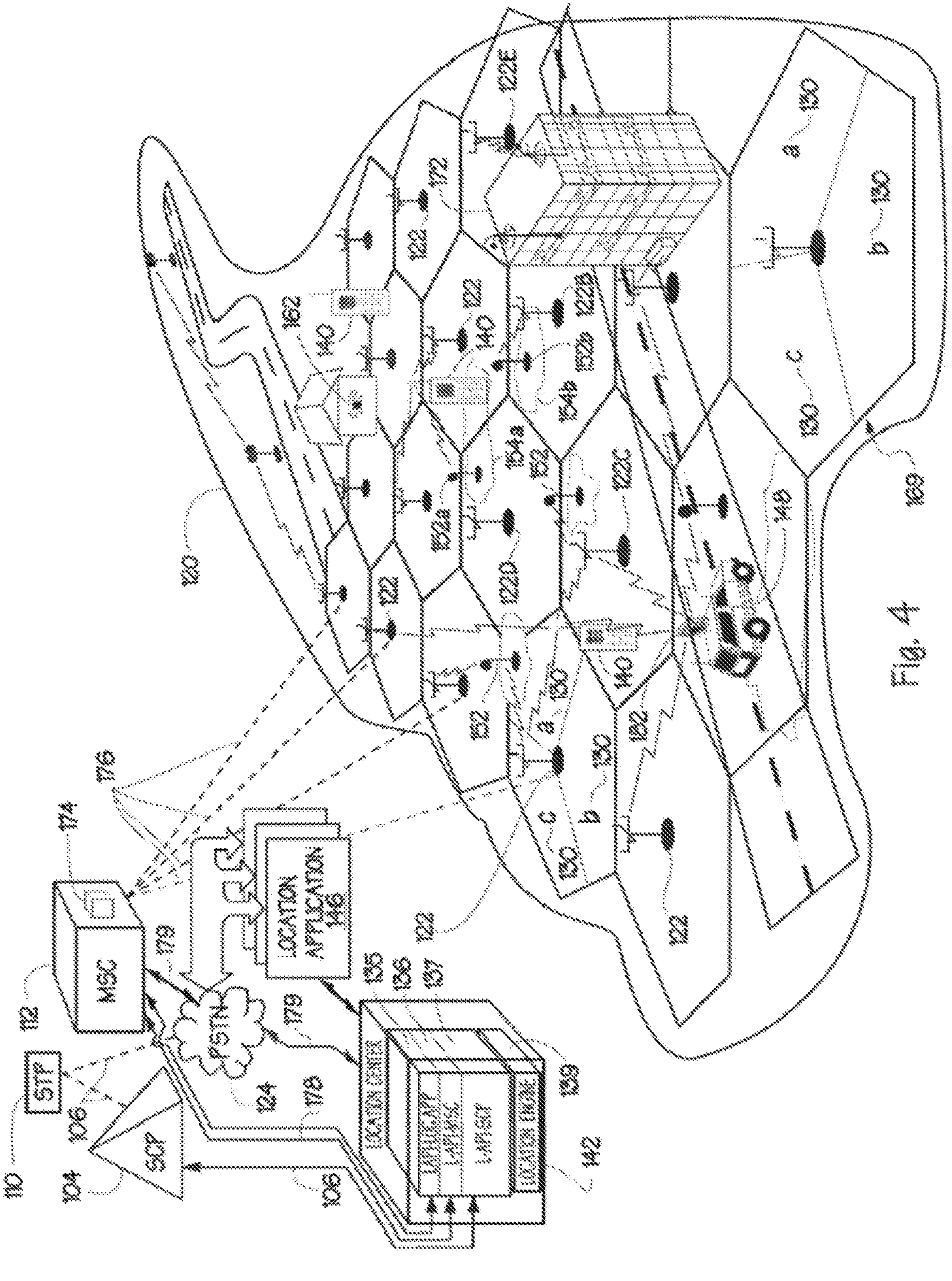
FIG. 4 illustrates an overall view of a wireless radio location network architecture, based on advanced intelligent network (AIN) principles.

FIG. 4 is a high level diagram of one embodiment of a wireless location architecture for the wireless location capabilities disclosed herein. Accordingly, this figure illustrates the interconnections between the components of a wireless cellular communication network, such as, a typical PCS network configuration and various components. In particular, as one skilled in the art will understand, a typical wireless (PCS) network includes:

(a) a (large) plurality of wireless mobile stations (MSs) 140 for at least one of voice related communication, visual (e.g., text such as is provided by a short message service) related communication, and location related communication. Note that some of the MSs 140 may include the electronics and corresponding software to detect and process signals from non-terrestrial transmission stations such as GPS and/or GLONASS satellites. Moreover, note that such non-terrestrial transmission stations can also be high attitude aircraft which, e.g., can hover over a metropolitan area thereby facilitating wireless communications;

(b) a mobile switching center (MSC) 112;

(c) a plurality of wireless cell sites in a radio coverage area 120, wherein each cell site includes an infrastructure base station such as those labeled 122 (or variations thereof such as 122A-122D). In particular, the base stations 122 denote the standard high traffic, fixed location base stations used for voice and data communication with a plurality of MSs 140, and, also used for communication of information related to locating such MSs 140. Additionally, note that the base stations labeled 152 are more directly related to wireless location enablement. For example, as described in greater detail hereinbelow, the base stations 152 may be low cost, low functionality transponders that are used primarily in communicating MS location related information to the location center 142 (via base stations 122 and the MSC 112). Note that unless stated otherwise, the base stations 152 will be referred to hereinafter as location base station(s) 152 or simply LBS(s) 152;

(d) a public switched telephone network (PSTN) 124 (which may include signaling system links 106 having network control components such as: a service control point (SCP) 104, one or more signaling transfer points (STPs) 110.

In addition, the wireless location capabilities disclosed herein provides one or more location centers/gateways 142. Such gateways may be described at a high level as follows.

Location Center/Gateway 142 Description

A location center/gateway 142, (also be referred to as a location center/gateway, or simply gateway), in response to a location request received at the location center, can request activation of one or more of a plurality of wireless location techniques in order to locate an MS 140.

Figure 18:
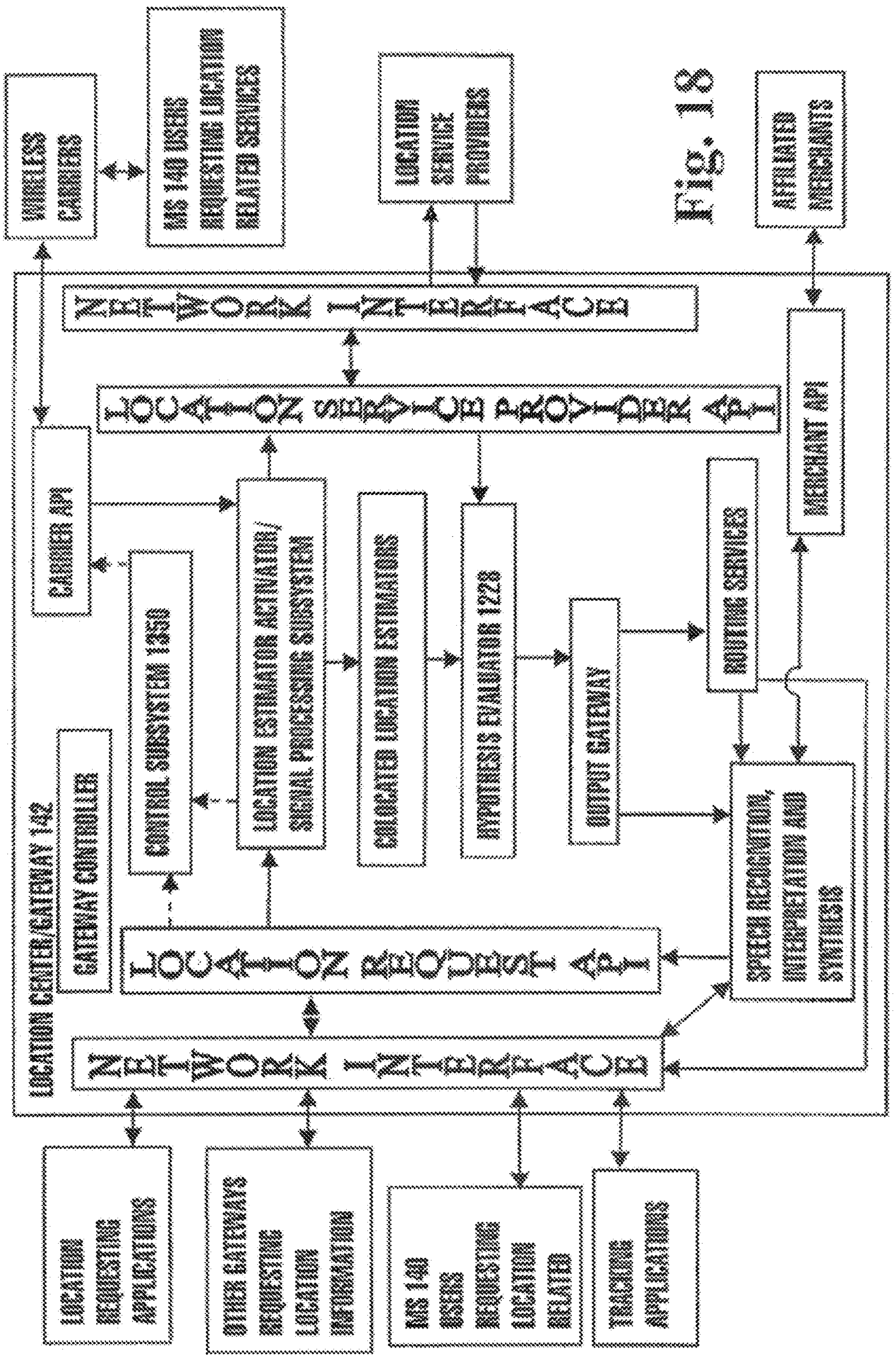
FIG. 18 is a block diagram further illustrating a wireless location gateway.

Various embodiments are provided herein of the location center/gateway 142. In particular, FIG. 18 is block diagram illustrating another embodiment of the location center/gateway 142. Note that the wireless location gateway activation requests may be dependent upon, e.g., (a) a wireless network with which the MS 140 may be in contact, such a network may be:

(i) a commercial mobile radio network supporting telephony functionality, (ii) a short messaging service or paging network;

(iii) a wireless network of beacons for providing location related information such as GPS and LORAN C, (iv) wireless carrier independent networks for performing wireless location such as the wireless location network provided by Times Three, Suite #220, Franklin Atrium, 3015 5th Avenue N.E., Calgary, AB T2A 6 TB, (v) a wireless broadcasting network for use in activating an MS 140 of, e.g., a stolen vehicle such as is provided by LoJack Corporation, 333 Elm Street, Dedham, MA 02026, and/or (vi) a hybrid network including portions of wireless networks each network providing different types of signal measurements for performing wireless location);

(b) the location signal measurement obtaining capabilities of the wireless network with which the MS may be in contact. For example, such a network may only support a network centric location technique;

(c) the functionality of the MS 140 such as: the type(s) of wireless signals which can be detected and processed by the MS such as:

(i) non-terrestrial signals such as GPS signals, (ii) signals from wireless beaconing/broadcasting systems such as for LORAN C signals or stolen vehicle broadcast networks for activating an MS 140 attached to the stolen vehicle, or (iii) wireless telephony protocols like CDMA, TDMA, and/or GSM, (d) a likely location of the target MS 140. For example, if the target MS 140 is likely to be in Japan rather than the United States, then the location service provider contacted by the gateway 142 may be different from the location service provider if the MS is likely to be in the U.S.

Moreover, regarding the plurality of wireless location techniques (embodiments thereof also denoted herein as "location estimators") for which activation may be requested by the gateway, these techniques may be co-located with the gateway, accessible via a network including: (i) local area networks, and (ii) wide area networks such as a telephony (wired or wireless) network, the Internet or a cable network. The gateway 142 may supply to one or more of the location estimators, measurements of communications between the MS 140 and one or more networks for determining a location of the MS 140. Alternatively, instead of supplying such measurements (locally or remotely, and, via a network or otherwise), the gateway 142 may provide, with the location activation request, an identification of where the measurements may be obtained (e.g., one or more network addresses). In yet another alternative, such a gateway 142 may also send request(s) to the network(s) having such MS communication measurements to forward them to particular location estimators. Note, that in performing these tasks, the gateway 142 may receive with a location request (or may retrieve in response thereto) information regarding the functionality of the target MS 140, e.g., as discussed above. Accordingly, such information may be used in selecting the location estimator to which an activation request is provided. Thus, the gateway 142 may be the intermediary between location requesting applications and the location estimators, thereby providing a simple, uniform application programming interface (API) for such applications substantially independently of the location estimators that are activated to fulfill such location requests. Moreover, the gateway 142 (or embodiments thereof) can substantially ease the burden on geolocation service providers by providing a substantially uniform method for obtaining target MS/network signal data for use in locating the target MS. Thus, by interfacing to the gateway 142, a location service provider may substantially reduce the number and complexity of its data exchange interfaces with the wireless networks for obtaining target MS/network signal data. Similarly, the networks capturing such signal data may also reduce the complexity and number of their interfaces for providing such signal data to location service providers. Additionally, note that the gateway may also fulfill location requests wherein the location is for a stationary and/or wireline handset instead of a mobile station 140. Accordingly, the gateway 142 may request access to, e.g., phone location information stored in a carrier's database of premise provisioning equipment as one skilled in the art will understand.

In some embodiments of the gateway 142, it may also facilitate in the providing of certain location related services in addition to providing, e.g., MS 140 locations. In particular, one or more of the following location related services may be facilitated by the gateway 142 or may be made operative via the wireless location capabilities of the gateway 142. However, note that the following location related services can, in general, be provided without use of a gateway 142, albeit, e.g., in a likely more restricted context wherein not all available wireless location estimating techniques are utilized, and/or by multiplying the number of interfaces to geolocation service providers (e.g., distinct wireless location interfaces provided directly to each wireless location service provider utilized). Further note that at some of these applications are described in greater detail in later sections herein:

(10.1) Routing instructions for directing a vehicle or person to get to a desired destination. Note, that there are various forms of utilizing MS location capabilities to determine an appropriate route, and related teachings are provided in copending U.S. patent application titled, "Wireless Location Using A Plurality of Commercial Network Infrastructures," by F. W. LeBlanc, Dupray and Karr filed Jan. 22, 1999 and having U.S. Pat. No. 6,236,365 issued May 22, 2001 which is fully incorporated herein by reference, and by the following two copending U.S. patent applications which are also incorporated herein by reference: (i) "Location Of A Mobile Station" filed Nov. 24, 1999 having application Ser. No. 09/194,367 whose inventors are Dupray and Karr, and (ii) "A Wireless Location System For Calibrating Multiple Location Estimators" filed Oct. 21, 1998 having application Ser. No. 09/176,587 whose inventor is Dupray. Additionally, other routing services may also be provided by the gateway 142 (or by service providers in cooperation with the gateway). For example, the gateway 142 may cooperate with an automated speech recognition interpretation and synthesis unit for providing substantially automated interactive communication with an MS 140 for providing spoken directions. Note that such directions may be provided in terms of street names and/or descriptions of the terrain (e.g., "the glass high rise on the left having pink tinted glass").

(10.2) Advertising may be directed to an MS 140 according to its location. In at least some studies it appears that MS 140 users do not respond well to unsolicited wireless advertisement whether location based or otherwise. However, in response to certain user queries for locally available merchandise, certain advertisements may be viewed in a more friendly light. Thus, by allowing an MS user to contact, e.g., a wireless advertising portal by voice or via wireless Internet, and describe certain merchandise desired (e.g., via interacting with an automated speech interaction unit) the user may be able to describe and receive (at his/her MS 140) visual displays of merchandise that may satisfy such a user's request. For example, an MS user may provide a spoken request such as: "I need a shirt, who has specials near here?".

(10.3) Applications that combine routing with safety for assisting MS users with requests such as "How do I get back to the hotel safely?";

(10.4) Applications that combine routing with sightseeing and/or guided tour capabilities where routing is interactive and dependent on feedback from users regarding, e.g., user interests;

(10.5) Applications using Internet picture capture with real time voice capture and MS location (e.g., sightseeing, security, and law enforcement), (10.6) Intelligent transportation (e.g., voice commanded vehicles);

(10.7) Applications that monitor whether or not a person or object (e.g., a vehicle) is within a predetermined boundary. Note, that such an application may automatically provide speech output to the MS user (or other authorized user) when the person or object is beyond the predetermined boundary;

(10.8) Applications that route to an event and automatically determine parking availability and where to park; and (10.9) Traffic/weather condition routing.

Further note that various architectures for the location center/location gateway are within the scope of the wireless location capabilities disclosed herein including a distributed architecture wherein in addition to the FOMs being possibly remotely accessed (e.g., via a communications network such as the Internet), the gateway itself may be distributed throughout one or more communication networks. Thus, a location request received at a first location gateway portion may be routed to a second location gateway portion (e.g., via the Internet). Such a distributed gateway may be considered a "meta-gateway" and in fact such gateway portions may be fully functioning gateways in their own right. Thus, such routing therebetween may be due to contractual arrangements between the two gateways (each fulfilling location requests for a different network, wireless carrier, and/or geographical region). For example, for locating a stolen vehicle, it is not uncommon for the stolen vehicle to be transported rapidly beyond the coverage area of a local or regional wireless vehicle locating service. Moreover, a given location gateway may provide location information for only certain areas corresponding, e.g., to contractual arrangements with the wireless carriers with which the location gateway is affiliated. Thus, a first location gateway may provide vehicle locations for a first collection of one or more wireless networks, and a second location gateway may provide vehicle locations for a second collection of one or more wireless networks. Accordingly, for an MS 140 built into a vehicle which can be detected by one or more wireless networks (or portions thereof) in each of the first and second collections, then if the vehicle is stolen, the first gateway may be initially contacted for determining whether the vehicle can be located via communications with the first collection of one or more wireless networks, and if the vehicle can not be located, the first gateway may provide a location request to the second gateway for thereby locating the stolen vehicle via wireless communications with one or more wireless networks of the second collection. Furthermore, the first gateway may provide location requests for the stolen vehicle to other location gateways.

The wireless location capabilities disclosed herein provides the following additional components:

(11.1) one or more mobile base stations 148 (MBS) which are optional, for physically traveling toward the target MS 140 or tracking the target MS;

(11.2) a plurality of location base stations 152 (LBS) which are optional, distributed within the radio coverage areas 120, each LBS 152 having a relatively small MS 140 detection area 154. Note that such LBSs 152 may also support Internet and/or TCP/IP transmissions for transmitting visual location related information (e.g., graphical, or pictorial) related to an MS location request.

Since location base stations 152 can be located on, e.g., each floor of a multi-story building, the wireless location technology described herein can be used to perform location in terms of height as well as by latitude and longitude.

In operation, an MS 140 may utilize one or more of the wireless technologies, CDMA, TDMA, AMPS, NAMPS or GSM for wireless communication with: (a) one or more infrastructure base stations 122, (b) mobile base station(s) 148, or (c) an LBS 152. Additionally, note that in some embodiments of the wireless location capabilities disclosed herein, there may be MS to MS communication.

Referring to FIG. 4 again, additional detail is provided of typical base station coverage areas, sectorization, and high level components within a radio coverage area 120, including the MSC 112. Three exemplary base stations (BSs) are 122A, 122B and 122C, each of which radiate referencing signals within their area of coverage 169 to facilitate mobile station (MS) 140 radio frequency connectivity, and various timing and synchronization functions. Note that some base stations may contain no sectors 130 (e.g. 122E), thus radiating and receiving signals in a 360 degree omnidirectional coverage area pattern, or the base station may contain "smart antennas" which have specialized coverage area patterns. However, the generally most frequent base stations 122 have three sector 130 coverage area patterns. For example, base station 122A includes sectors 130, additionally labeled a, b and c. Accordingly, each of the sectors 130 radiate and receive signals in an approximate 120 degree arc, from an overhead view. As one skilled in the art will understand, actual base station coverage areas 169 (stylistically represented by hexagons about the base stations 122) generally are designed to overlap to some extent, thus ensuring seamless coverage in a geographical area. Control electronics within each base station 122 are used to communicate with a mobile stations 140. Information regarding the coverage area for each sector 130, such as its range, area, and "holes" or areas of no coverage (within the radio coverage area 120), may be known and used by the location center 142 to facilitate location determination. Further, during communication with a mobile station 140, the identification of each base station 122 communicating with the MS 140 as well, as any sector identification information, may be known and provided to the location center 142.

In the case of the base station types 122, 148, and 152 communicating location information, a base station or mobility controller 174 (BSC) controls, processes and provides an interface between originating and terminating telephone calls from/to mobile station (MS) 140, and the mobile switch center (MSC) 112. The MSC 122, on-the-other-hand, performs various administration functions such as mobile station 140 registration, authentication and the relaying of various system parameters, as one skilled in the art will understand.

The base stations 122 may be coupled by various transport facilities 176 such as leased lines, frame relay, T-Carrier links, optical fiber links or by microwave communication links.

When an MS 140 is powered on and in the idle state, it constantly monitors the pilot signal transmissions from each of the base stations 122 located at nearby cell sites. Since base station/sector coverage areas may often overlap, such overlapping enables an MS 140 to detect, and, in the case of certain wireless technologies, communicate simultaneously along both the forward and reverse paths, with multiple base stations 122 and/or sectors 130. In FIG. 4, the constantly radiating pilot signals from base station sectors 130, such as sectors a, b and c of BS 122A, are detectable by MSs 140 within the coverage area 169 for BS 122A. That is, the mobile stations 140 scan for pilot channels, corresponding to a given base station/sector identifiers (IDs), for determining in which coverage area 169 (i.e., cell) it is contained. This is performed by comparing signal strengths of pilot signals transmitted from these particular cell-sites.

The mobile station 140 then initiates a registration request with the MSC 112, via the base station controller 174. The MSC 112 determines whether or not the mobile station 140 is allowed to proceed with the registration process (except, e.g., in the case of a 911 call, wherein no registration process is required). Once any required registration is complete, calls may be originated from the mobile station 140 or calls or short message service messages can be received from the network. Note that the MSC 112 communicates as appropriate, with a class 4/5 wireline telephony circuit switch or other central offices, connected to the PSTN 124 network. Such central offices connect to wireline terminals, such as telephones, or any communication device compatible with a wireline. The PSTN 124 may also provide connections to long distance networks and other networks.

The MSC 112 may also utilize IS/41 data circuits or trunks connecting to signal transfer point 110, which in turn connects to a service control point 104, via Signaling System #7 (SS7) signaling links (e.g., trunks) for intelligent call processing, as one skilled in the art will understand. In the case of wireless AIN services such links are used for call routing instructions of calls interacting with the MSC 112 or any switch capable of providing service switching point functions, and the public switched telephone network (PSTN) 124, with possible termination back to the wireless network.

Referring still to FIG. 4, the location center/gateway (LC) 142 interfaces with the MSC 112 either via dedicated transport facilities 178, using, e.g., any number of LAN/WAN technologies, such as Ethernet, fast Ethernet, frame relay, virtual private networks, etc., or via the PSTN 124. The gateway 142 may receive autonomous (e.g., unsolicited) command/response messages regarding, for example: (a) the state of the wireless network of each commercial radio service provider utilizing the LC 142 for wireless location services, (b) MS 140 and BS 122 radio frequency (RF) measurements, (c) communications with any MBSs 148, and (d) location applications requesting MS locations using the location center/gateway 142. Conversely, the LC 142 may provide data and control information to each of the above components in (a)-(d). Additionally, the LC 142 may provide location information to an MS 140, via a BS 122. Moreover, in the case of the use of a mobile base station (MBS) 148, several communications paths may exist with the LC 142.

The MBS 148 may act as a low cost, partially-functional, moving base station, and is, in one embodiment, situated in a vehicle (e.g., land, water or aircraft) where an operator may engage in MS 140 searching and tracking activities. In providing these activities using CDMA, the MBS 148 provides a forward link pilot channel for a target MS 140, and subsequently receives unique BS pilot strength measurements from the MS 140. The MBS 148 also includes a mobile station 140 for data communication with the gateway 142, via a BS 122. In particular, such data communication includes telemetering at least the geographic position (or estimates thereof) of the MBS 148, various RF measurements related to signals received from the target MS 140, and in some embodiments, MBS 148 estimates of the location of the target MS 140. In some embodiments, the MBS 148 may utilize multiple-beam fixed antenna array elements and/or a moveable narrow beam antenna, such as a microwave dish 182. The antennas for such embodiments may have a known orientation in order to further deduce a radio location of the target MS 140 with respect to an estimated current location of the MBS 148. As will be described in more detail herein below, the MBS 148 may further contain a satellite (e.g., global positioning system (GPS)) receiver (or other receiver for non-terrestrial wireless signals) for determining the location of the MBS 148 and/or providing wireless location assistance a target MS 140, e.g., providing GPS information to the MS to assist the MS in determining its location. Additionally, the MBS 148 may include distance sensors, dead-reckoning electronics, as well as an on-board computing system and display devices for locating both the MBS 148 itself as well as tracking and locating the target MS 140. The computing and display provides a means for communicating the position of the target MS 140 on a map display to an operator of the MBS 148. It is important to note that in one embodiment, an MBS 148 may determine its location substantially independent of the communications network(s) with which the MBS communicates.

Each location base station (LBS) 152 is a low cost location device. In some embodiments, to provide such LBS's cost effectively, each LBS 152 only partially or minimally supports the air-interface standards of the one or more wireless technologies used in communicating with both the BSs 122 and the MSs 140. Each LBS 152, when put in service, is placed at a fixed location, such as at a traffic signal, lamp post, etc., wherein the location of the LBS may be determined as accurately as, for example, the accuracy of the locations of the infrastructure BSs 122. Assuming the wireless technology, CDMA, is used, each BS 122 uses a time offset of the pilot PN sequence to identify a forward CDMA pilot channel. In one embodiment, each LBS 152 emits a unique, time-offset pilot PN sequence channel in accordance with the CDMA standard in the RF spectrum designated for BSs 122, such that the channel does not interfere with neighboring BSs 122 cell site channels, and does not interfere with neighboring LBSs 152. Each LBS 152 may also contain multiple wireless receivers in order to monitor transmissions from a target MS 140. Additionally, each LBS 152 contains mobile station 140 electronics, thereby allowing the LBS to both be controlled by, e.g., the gateway 142 or the wireless carrier(s) for the LBS, and to transmit information to, e.g., the gateway 142 (via, e.g., at least one neighboring BS 122), or to another wireless location service provider such as one providing one or more FOMs.

As mentioned above, when the location of a particular target MS 140 is desired, the gateway 142 may request location information about the target MS 140 from, for instance, one or more activated LBSs 152 in a geographical area of interest. Accordingly, whenever the target MS 140 is in an LBS coverage area, or is suspected of being in the coverage area, either upon command from the gateway 142 (or other location service provider), or in a substantially continuous (or periodic) fashion, the LBS's pilot channel appears to the target MS 140 as a potential neighboring base station channel, and consequently, is placed, for example, in the CDMA neighboring set, or the CDMA remaining set of the target MS 140 (as one familiar with the CDMA standards will understand).

During the normal CDMA pilot search sequence of the mobile station initialization state (in the target MS), the target MS 140 will, if within range of such an activated LBS 152, detect the LBS pilot presence during the CDMA pilot channel acquisition substate. Consequently, the target MS 140 performs RF measurements on the signal from each detected LBS 152. Similarly, an activated LBS 152 can perform RF measurements on the wireless signals from the target MS 140. Accordingly, each LBS 152 detecting the target MS 140 may subsequently telemeter back to the LC 142 measurement results related to signals from/to the target MS 140. Moreover, upon command, the target MS 140 may telemeter back to the gateway 142 its own measurements of the detected LBSs 152, and consequently, this new location information, in conjunction with location related information received from the BSs 122, can be used to locate the target MS 140.

It should be noted that an LBS 152 will normally deny hand-off requests, since typically the LBS does not require the added complexity of handling voice or traffic bearer channels, although economics and peak traffic load conditions may dictate preference here. Note that GPS timing information, needed by any CDMA base station, is either achieved via a the inclusion of a local GPS receiver or via a telemetry process from a neighboring conventional BS 122, which contains a GPS receiver and timing information. Since energy requirements are minimal in such an LBS 152, (rechargeable) batteries or solar cells may be used to power the LBSs. Further, no expensive terrestrial transport link is typically required since two-way communication is provided by an included MS 140 (or an electronic variation thereof) within each LBS. Thus, LBSs 152 may be placed in numerous locations, such as:

(a) in dense urban canyon areas (e.g., where signal reception may be poor and/or very noisy);
(b) in remote areas (e.g., hiking, camping and skiing areas);
(c) along highways (e.g., for emergency as well as monitoring traffic flow), and their rest stations; or
(d) in general, wherever more location precision is required than is obtainable using other wireless infrastructure network components.

Location Center—Network Elements API Description

A location application programming interface 136 (FIG. 4), denoted L-API, is may be provided between the location center/gateway 142 (LC) and the mobile switch center (MSC) network element type, in order to send and receive various control, signals and data messages. The L-API may be implemented using a preferably high-capacity physical layer communications interface, such as IEEE standard 802.3 (10 baseT Ethernet), although other physical layer interfaces could be used, such as fiber optic ATM, frame relay, etc. At least two forms of L-API implementation are possible. In a first case, the signal control and data messages are provided using the MSC 112 vendor's native operations messages inherent in the product offering, without any special modifications. In a second case, the L-API includes a full suite of commands and messaging content specifically optimized for wireless location purposes, which may require some, although minor development on the part of an MSC vendor.

Signal Processor Description

Figure 17:
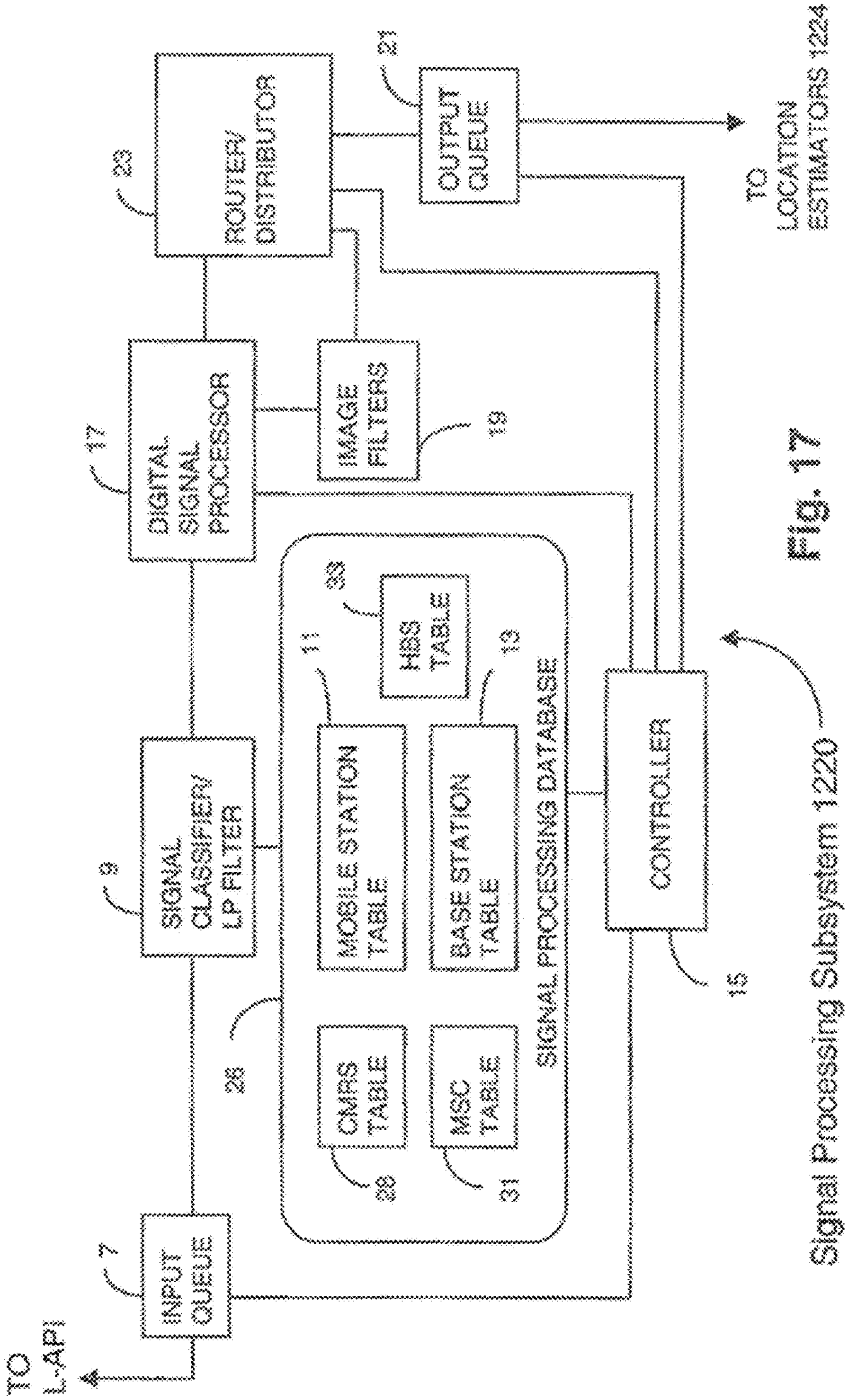
FIG. 17 illustrates the primary components of the signal processing subsystem.

Referring to FIG. 17, a signal processing subsystem (labeled 1220 in other figures) may be provided (or accessed) by the gateway 142. Such a signal processing subsystem may: (a) receive control messages and signal measurements from one or more wireless service provider networks, and (b) transmit appropriate control messages to such wireless networks via the location applications programming interface 136 referenced earlier, for wireless location purposes. The signal processing subsystem 1220 additionally provides various signal identification, conditioning and pre-processing functions, including buffering, signal type classification, signal filtering, message control and routing functions to the location estimating modules or FOMs.

Figure 1:
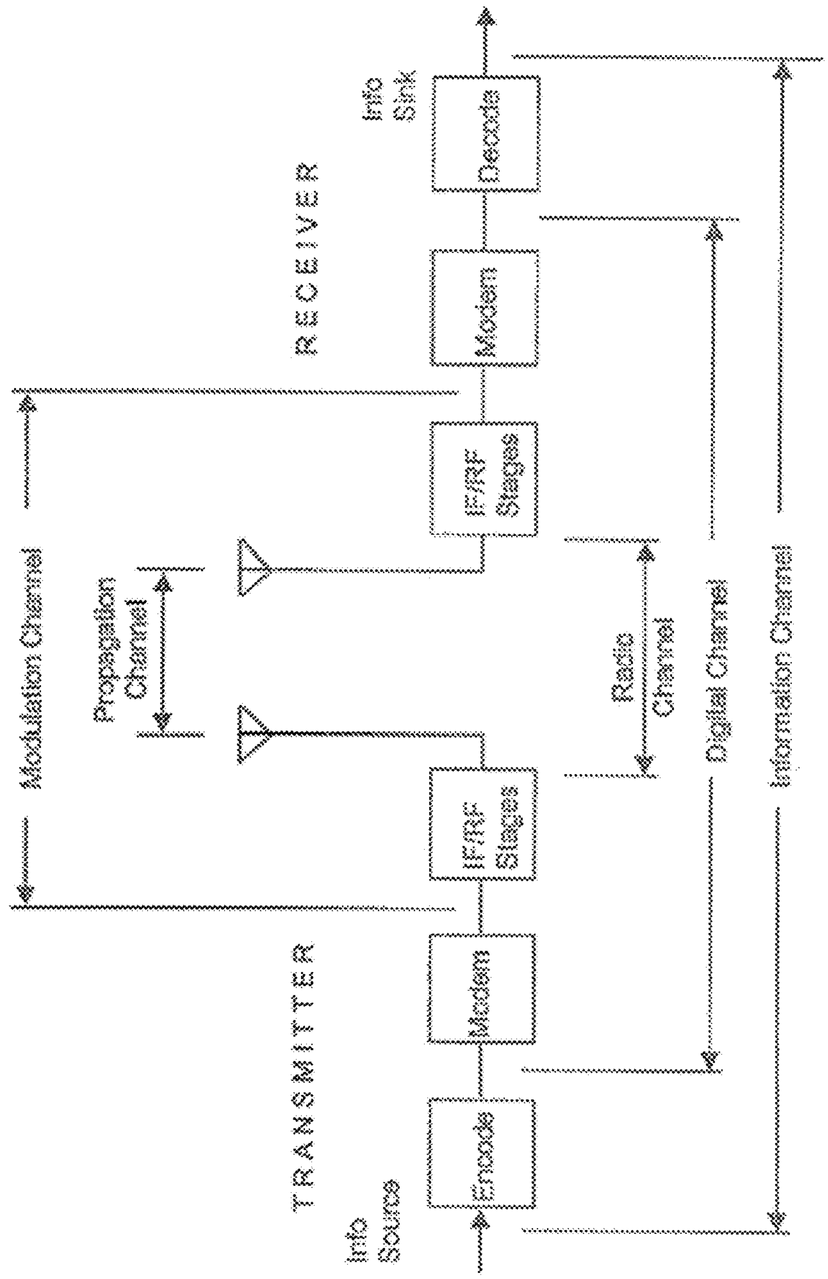
FIG. 1 illustrates various perspectives of radio propagation opportunities which may be considered in addressing correlation with mobile to base station ranging.

There can be several combinations of Delay Spread/Signal Strength sets of measurements made available to the signal processing subsystem 1220. In some cases a mobile station 140 (FIG. 1) may be able to detect up to three or four pilot channels representing three to four base stations, or as few as one pilot channel, depending upon the environment and wireless network configuration. Similarly, possibly more than one BS 122 can detect a mobile station 140 transmitter signal, and the fact that multiple CMRS' base station equipment commonly will overlap coverage areas.

For each mobile station 140 or BS 122 transmitted signal that is detected by a receiver group at a base or mobile station, respectively, multiple delayed signals, or "fingers" may be detected (e.g., in CDMA) and tracked resulting from multipath radio propagation conditions from a given transmitter. In typical spread spectrum diversity CDMA receiver design, the "first" finger represents the most direct, or least delayed multipath signal. Second or possibly third or fourth fingers may also be detected and tracked, assuming the detecting base station and/or mobile station 140 contains a sufficient number of data receivers for doing so. The signal processing subsystem may utilize various wireless signal measurements of transmissions between a target mobile station 140 and a network of base stations 122, 152 and/or 148. Such measurements can be important in effectively estimating the location of mobile stations 140 in that it is well known that measurements of wireless signal propagation characteristics, such as signal strength (e.g., RSSI), time delay, angle of arrival, and any number other measurements, can individually lead to gross errors in MS 140 location estimates.

Accordingly, one aspect of the wireless location capabilities disclosed herein is directed to utilizing a larger number of wireless signal measurements, and utilizing a plurality of MS 140 estimation techniques to compensate for location estimation errors generated by some such techniques. For example, due to the large capital outlay costs associated with providing three or more overlapping base station coverage signals in every possible location, most practical digital PCS deployments result in fewer than three base station pilot channels being reportable in the majority of location areas, thus resulting in a larger, more amorphous location estimates by terrestrial triangulation systems. Thus, by utilizing wireless signal measurements from a variety of sources substantially simultaneously and/or "greedily" (i.e., use whatever signal measurements can be obtained from any of the signal sources as they are obtained), additional location enhancements can be obtained. For example, by enhancing a mobile station 140 with electronics for detecting satellite transmissions (as done with mobile base stations 148 and which also can be viewed as such an enhanced mobile station 140) additional location related signals may be obtained from:

(a) the GPS satellite system, (b) the Global Navigation Satellite System (GLONASS) satellite system, a Russian counterpart to the U.S. GPS system, and/or (c) the numerous low earth orbit satellite systems (LEOs) and medium earth orbit satellite systems (MEOs) such as the IRIDIUM system being developed by Motorola Corp., the GLOBALSTAR system by Loral and Qualcomm, and the ICO satellite system by ICO Global Communications.

Thus, by combining even insufficient wireless location measurements from different wireless communication systems, accurate location of an MS 140 is possible. For example, by if only two GPS satellites are detectable, but there is an additional reliable wireless signal measurement from, e.g., a terrestrial base station 122, then by triangulating using wireless signal measurements derived from transmissions from each of these three sources, a potentially reliable and accurate MS location can be obtained.

Moreover, the transmissions from the MS 140 used for determining the MS's location need not be transmitted to terrestrial base stations (e.g., 122). It is within the scope of the wireless location capabilities disclosed herein that a target MS 140 may transmit location related information to satellites as well. For example, if a target MS 140 detects two GPS satellite transmissions and is able to subsequently transmit the GPS signal measurements (e.g., timing measurements) to an additional satellite capable of determining additional MS location measurements according to the signals received, then by performing a triangulation process at the location center/gateway 142 (which may be co-located with the additional satellite, or at a remote terrestrial site), a potentially reliable and accurate MS location can be obtained. Accordingly, the wireless location capabilities disclosed herein is capable of resolving wireless location ambiguities due to a lack of location related information of one type by utilizing supplemental location related information of a different type. Note that by "type" as used here it is intended to be interpreted broadly as, e.g., (a) a data type of location information, and/or (b) communications from a particular commercial wireless system as opposed to an alternative system, each such system having distinct groups of known or registered MS users.

Moreover, it can be that different FOMs are provided for at least some wireless location computational models utilizing different types of location related information. For example, in certain contexts wireless networks based on different wireless signaling technologies may be used to locate an MS 140 during the time period of a single emergency call such as E911. Moreover, in other contexts it may be possible for the target MS 140 to use one or more of a plurality of wireless communication networks, possibly based on different wireless communication technologies, depending on availability the of technology in the coverage area. In particular, since so called "dual mode" or "tri-mode" mobile stations 140 are available, wherein such mobile stations are capable of wireless communication in a plurality of wireless communication technologies, such as digital (e.g., CDMA, and/or TDMA) as well as analog or AMP/NAMPS, such mobile stations may utilize a first (likely a default) wireless communication technology whenever possible, but switch to another wireless communication technology when, e.g., coverage of the first wireless technology becomes poor. Moreover, such different technologies are typically provided by different wireless networks (wherein the term "network" is understood to include a network of communication supporting nodes geographically spaced apart that provide a communications infrastructure having access to information regarding subscribers to the network prior to a request to access the network by the subscribers). Accordingly, the wireless location capabilities disclosed herein may include (or access) FOMs for providing mobile station location estimates wherein the target MS 140 communicates with various networks using different wireless communication technologies. Moreover, such FOMs may be activated according to the wireless signal measurements received from various wireless networks and/or wireless technologies supported by a target MS 140 and to which there is a capability of communicating measurements of such varied wireless signals to the FOM(s). Thus, in one embodiment of the wireless location capabilities disclosed herein, there may be a triangulation (or trilateration) based FOM for each of CDMA, TDMA and AMP/NAMPS which may be singly, serially, or concurrently used for obtaining a particular location of an MS 140 at a particular time (e.g., for an E911 call). Thus, when locating a target MS 140, the MS may, if there is overlapping coverage of two wireless communication technologies and the MS supports communications with both, repeatedly switch back and forth between the two thereby providing additional wireless signal measurements for use in locating the target MS 140.

In one embodiment of the wireless location capabilities disclosed herein, wherein multiple FOMs may be activated substantially simultaneously (or alternatively, wherever appropriate input is received that allow particular FOMs to be activated). Note that at least some of the FOMs may provide "inverse" estimates of where a target MS 140 is not instead of where it is. Such inverse analysis can be very useful in combination with location estimates indicating where the target MS is in that the accuracy of a resulting MS location estimate may be substantially decreased in size when such inverse estimates are utilized to rule out areas that otherwise appear to be likely possibilities for containing the target MS 140. Note that one embodiment of a FOM that can provide such reverse analysis is a location computational model that generates target MS location estimates based on archived knowledge of base station coverage areas (such an archive being the result of, e.g., the compilation a RF coverage database—either via RF coverage area simulations or field tests). In particular, such a model may provide target MS location inverse estimates having a high confidence or likelihood that that the target MS 140 is not in an area since either a base station 122 (or 152) cannot detect the target MS 140, or the target MS cannot detect a particular base station. Accordingly, the confidences or likelihoods on such estimates may be used by diminishing a likelihood that the target MS is in an area for the estimate, or alternatively the confidence or likelihood of all areas of interest outside of the estimate can increased.

Note that in some embodiments of the wireless location capabilities disclosed herein, both measurements of forward wireless signals to a target MS 140, and measurements of reverse wireless signals transmitted from the target MS to a base station can be utilized by various FOMs. In some embodiments, the received relative signal strength ($RRSS_{BS}$) of detected nearby base station transmitter signals along the forward link to the target mobile station can be more readily used by the location estimate modules (FOMs) since the transmission power of the base stations 122 typically changes little during a communication with a mobile station. However, the relative signal strength ($RRSS_{MS}$) of target mobile station transmissions received by the base stations on the reverse link may require more adjustment prior to location estimate model use, since the mobile station transmitter power level changes nearly continuously.

Location Center High Level Functionality

At a very high level the location center/gateway 142 computes (or requests computation of) location estimates for a wireless mobile station 140 by performing at least some of the following steps:

(23.0) receiving an MS location request;

(23.1) receiving measurements of signal transmission characteristics of communications communicated between the target MS 140 and one or more wireless infrastructure base stations 122. Note, this step may only be performed if the gateway provides such measurements to a FOM (e.g., a FOM co-located therewith);

(23.2) filtering the received signal transmission characteristics (by a signal processing subsystem 1220 illustrated in, e.g., FIGS. 5 and 30) as needed so that target MS location data can be generated that is uniform and consistent with location data generated from other target MSs 140. In particular, such uniformity and consistency is both in terms of data structures and interpretation of signal characteristic values provided by the MS location data, as will be described hereinbelow. Note, this step may also only be performed if the gateway provides such measurements to a FOM. Otherwise, such FOM is likely to perform such filtering;

(23.3) inputting the generated target MS location data to one or more MS location estimating models (FOMs, labeled collectively as 1224 in FIG. 5), so that each such FOM may use the input target MS location data for generating a "location hypothesis" providing an estimate of the location of the target MS 140. Note, this step may also only be performed if the gateway provides such measurements to a FOM;

(23.4) receiving the resulting location hypotheses from the activated FOMs, and providing the generated location hypotheses to an hypothesis evaluation module (denoted the hypothesis evaluator 1228 in FIG. 5) for:

(a) (optionally) adjusting the target MS location estimates of the generated location hypotheses and/or adjusting confidence values of the location hypotheses, wherein for each location hypothesis, its confidence value indicates the confidence or likelihood that the target MS is located in the location estimate of the location hypothesis. Moreover, note that such adjusting uses archival information related to the accuracy and/or reliability of previously generated location hypotheses;

(b) (optionally) evaluating the location hypotheses according to various heuristics related to, for example, the radio coverage area 120 terrain, the laws of physics, characteristics of likely movement of the target MS 140; and (c) (necessarily) determining a most likely location area for the target MS 140, wherein the measurement of confidence associated with each input MS location area estimate may be used for determining a "most likely location area"; and (23.5) outputting a most likely target MS location estimate to one or more applications 146 (FIG. 5) requesting an estimate of the location of the target MS 140.

Location Hypothesis Data Representation

In order to describe how the steps (23.1) through (23.5) are performed in the sections below, some introductory remarks related to the data denoted above as location hypotheses will be helpful. Additionally, it will also be helpful to provide introductory remarks related to historical location data and the data base management programs associated therewith.

For each target MS location estimate generated and utilized by the wireless location capabilities disclosed herein, the location estimate may be provided in a data structure (or object class) denoted as a "location hypothesis" (illustrated in Table LH-1). Brief descriptions of the data fields for a location hypothesis is provided in the Table LH-1.

TABLE LH-1

| | |
|---|---|
| FOM_ID | First order model ID (providing this Location Hypothesis); note, since it is possible for location hypotheses to be generated by other than the FOMs 1224, in general, this field identifies the module that generated this location hypothesis. |
| MS_ID | The identification of the target MS 140 to this location hypothesis applies. |
| pt_est | The most likely location point estimate of the target MS 140. |
| valid_pt | Boolean indicating the validity of "pt_est". |
| area_est | Location Area Estimate of the target MS 140 provided by the FOM. This area estimate will be used whenever "image_area" below is NULL. |
| valid_area | Boolean indicating the validity of "area_est" (one of "pt_est" and "area_est" must be valid). |
| adjust | Boolean (true if adjustments to the fields of this location hypothesis are to be performed in the Context adjuster Module). |
| pt_covering | Reference to a substantially minimal area (e.g., mesh cell) covering of "pt_est". Note, since this MS 140 may be substantially on a cell boundary, this covering may, in some cases, include more than one cell. |
| image_area | Reference to a substantially minimal area (e.g., mesh cell) covering of "pt_covering" (see detailed description of the function, "confidence_adjuster"). Note that if this field is not NULL, then this is the target MS location estimate used by the location center 142 instead of "area_est". |
| extrapolation_area | Reference to (if non-NULL) an extrapolated MS target estimate area provided by the location extrapolator submodule 1432 of the hypothesis analyzer 1332. That is, this field, if non-NULL, is an extrapolation of the "image_area" field if it exists, otherwise this field is an extrapolation of the "area_est" field. Note other extrapolation fields may also be provided depending on the embodiment of the wireless location capabilities disclosed herein, such as an extrapolation of the "pt_covering". |
| confidence | In one embodiment, this is a probability indicating a likelihood that the target MS 140 is in (or out) of a particular area. If "image_area" exists, then this is a measure of the likelihood that the target MS 140 is within the area represented by "image_area", or if "image_area" has not been computed (e.g., "adjust" is FALSE), then "area_est" must be valid and this is a measure of the likelihood that the target MS 140 is within the area represented by "area_est". Other embodiments, are also within the scope of the wireless location capabilities disclosed herein that are not probabilities; e.g., translations and/or expansions of the [0, 1] probability range as one skilled in the art will understand. |
| Original_Timestamp | Date and time that the location signature cluster (defined hereinbelow) for this location hypothesis was received by the signal processing subsystem 1220. |
| Active_Timestamp | Run-time field providing the time to which this |

TABLE LH-1-continued

| | |
|---|---|
| | location hypothesis has had its MS location estimate(s) extrapolated (in the location extrapolator 1432 of the hypothesis analyzer 1332). Note that this field is initialized with the value from the "Original_Timestamp" field. |
| Processing Tags and environmental categorizations | For indicating particular types of environmental classifications not readily determined by the "Original_Timestamp" field (e.g., weather, traffic), and restrictions on location hypothesis processing. |
| loc_sig_cluster | Provides access to the collection of location signature signal characteristics derived from communications between the target MS 140 and the base station(s) detected by this MS (discussed in detail hereinbelow); in particular, the location data accessed here is provided to the position determining entities or techniques (each such entity or technique being also referred to as a "PDE", a "first order model" or "FOM" herein) by the signal processing subsystem 1220; i.e., access to the "loc sigs" (received at "timestamp" regarding the location of the target MS) |
| descriptor | Original descriptor (from the First order model indicating why/how the Location Area Estimate and Confidence Value were determined). |

As can be seen in the Table LH-1, each location hypothesis data structure includes at least one measurement, denoted hereinafter as a confidence value (or simply confidence), that is a measurement of the perceived likelihood that an MS location estimate in the location hypothesis is an accurate location estimate of the target MS 140. Since, in some embodiments of the wireless location capabilities disclosed herein, such confidence values are an important aspect, much of the description and use of such confidence values are described below; however, a brief description is provided here.

In one embodiment, each confidence value is a probability indicative of a likeliness that the target MS 140 resides within an geographic area represented by the hypothesis to which the confidence value applies. Accordingly, each such confidence value is in the range [0, 1]. Moreover, for clarity of discussion, it is assumed that unless stated otherwise that the probabilistic definition provided here is to be used when confidence values are discussed.

Note, however, other definitions of confidence values are within the scope of the wireless location capabilities disclosed herein that may be more general than probabilities, and/or that have different ranges other than [0, 1]. For example, one such alternative is that each such confidence value is in the range −1.0 to 1.0, wherein the larger the value, the greater the perceived likelihood that the target MS 140 is in (or at) a corresponding MS location estimate of the location hypothesis to which the confidence value applies. As an aside, note that a location hypothesis may have more than one MS location estimate (as will be discussed in detail below) and the confidence value will typically only correspond or apply to one of the MS location estimates in the location hypothesis. Further, values for the confidence value field may be interpreted as: (a) −1.0 means that the target MS 140 is NOT in such a corresponding MS area estimate of the location hypothesis area, (b) 0 means that it is unknown as to the likelihood of whether the MS 140 in the corresponding MS area estimate, and (c)+1.0 means that the MS 140 is perceived to positively be in the corresponding MS area estimate.

Additionally, in utilizing location hypotheses in, for example, the location evaluator 1228 as in (23.4) above, it is important to keep in mind that for confidences, $cf_1$ and $cf_2$, if $cf_1 <= cf_2$, then for a location hypotheses $H_1$ and $H_2$ having $cf_1$ and $cf_2$, respectively, the target MS 140 is expected to more likely reside in a target MS estimate of $H_2$ than a target MS estimate of $H_1$. Moreover, if an area, A, is such that it is included in a plurality of location hypothesis target MS estimates, then a confidence score, CSA, can be assigned to A, wherein the confidence score for such an area is a function of the confidences for all the location hypotheses whose (most pertinent) target MS location estimates contain A. That is, in order to determine a most likely target MS location area estimate for outputting from the location center/gateway 142, a confidence score is determined for areas within the location center/gateway service area.

Coverage Area: Area Types And Their Determination

The notion of "area type" as related to wireless signal transmission characteristics has been used in many investigations of radio signal transmission characteristics. Some investigators, when investigating such signal characteristics of areas have used somewhat naive area classifications such as urban, suburban, rural, etc. However, it is desirable for the purposes of the wireless location capabilities disclosed herein to have a more operational definition of area types that is more closely associated with wireless signal transmission behaviors.

To describe embodiments of the an area type scheme that may be used in the wireless location capabilities disclosed herein, some introductory remarks are first provided. Note that the wireless signal transmission behavior for an area depends on at least the following criteria:

(23.8.1) substantially invariant terrain characteristics (both natural and man-made) of the area; e.g., mountains, buildings, lakes, highways, bridges, building density;

(23.8.2) time varying environmental characteristics (both natural and man-made) of the area; e.g., foliage, traffic, weather, special events such as baseball games;

(23.8.3) wireless communication components or infrastructure in the area; e.g., the arrangement and signal communication characteristics of the base stations 122 in the area (e.g., base station antenna downtilt). Further, the antenna characteristics at the base stations 122 may be important criteria.

Accordingly, a description of wireless signal characteristics for determining area types could potentially include a characterization of wireless signaling attributes as they relate to each of the above criteria. Thus, an area type might be: hilly, treed, suburban, having no buildings above 50 feet, with base stations spaced apart by two miles. However, a categorization of area types is desired that is both more closely tied to the wireless signaling characteristics of the area, and is capable of being computed substantially automatically and repeatedly over time. Moreover, for a wireless location system, the primary wireless signaling characteristics for categorizing areas into at least minimally similar area types are: thermal noise and, more importantly, multipath characteristics (e.g., multipath fade and time delay).

Focusing for the moment on the multipath characteristics, it is believed that (23.8.1) and (23.8.3) immediately above are, in general, more important criteria for accurately locating an MS 140 than (23.8.2). That is, regarding (23.8.1), multipath tends to increase as the density of nearby vertical area changes increases. For example, multipath is particularly problematic where there is a high density of high rise buildings and/or where there are closely spaced geographic undulations. In both cases, the amount of change in vertical area per unit of area in a horizontal plane (for some horizontal reference plane) may be high. Regarding (23.8.3), the greater the density of base stations 122, the less problematic multipath may become in locating an MS 140. Moreover, the arrangement of the base stations 122 in the radio coverage area 120 in FIG. 4 may affect the amount and severity of multipath.

Accordingly, it would be desirable to have a method and system for straightforwardly determining area type classifications related to multipath, and in particular, multipath due to (23.8.1) and (23.8.3). The wireless location capabilities disclosed herein provides such a determination by utilizing a novel notion of area type, hereinafter denoted "transmission area type" (or, "area type" when both a generic area type classification scheme and the transmission area type discussed hereinafter are intended) for classifying "similar" areas, wherein each transmission area type class or category is intended to describe an area having at least minimally similar wireless signal transmission characteristics. That is, the novel transmission area type scheme of the wireless location capabilities disclosed herein is based on: (a) the terrain area classifications; e.g., the terrain of an area surrounding a target MS 140, (b) the configuration of base stations 122 in the radio coverage area 120, and (c) characterizations of the wireless signal transmission paths between a target MS 140 location and the base stations 122.

In one embodiment of a method and system for determining such (transmission) area type approximations, a partition (denoted hereinafter as $P_0$) is imposed upon the radio coverage area 120 for partitioning for radio coverage area into subareas, wherein each subarea is an estimate of an area having included MS 140 locations that are likely to have is at least a minimal amount of similarity in their wireless signaling characteristics. To obtain the partition $P_0$ of the radio coverage area 120, the following steps are performed:

(23.8.4.1) Partition the radio coverage area 120 into subareas, wherein in each subarea is: (a) connected, (b) the subarea is not too oblong, e.g., the variations in the lengths of chords sectioning the subarea through the centroid of the subarea are below a predetermined threshold, (c) the size of the subarea is below a predetermined value, and (d) for most locations (e.g., within a first or second deviation) within the subarea whose wireless signaling characteristics have been verified, it is likely (e.g., within a first or second deviation) that an MS 140 at one of these locations will detect (forward transmission path) and/or will be detected (reverse transmission path) by a same collection of base stations 122. For example, in a CDMA context, a first such collection may be (for the forward transmission path) the active set of base stations 122, or, the union of the active and candidate sets, or, the union of the active, candidate and/or remaining sets of base stations 122 detected by "most" MSs 140 in. Additionally (or alternatively), a second such collection may be the base stations 122 that are expected to detect MSs 140 at locations within the subarea. Of course, the union or intersection of the first and second collections is also within the scope of the wireless location capabilities disclosed herein for partitioning the radio coverage area 120 according to (d) above. It is worth noting that it is believed that base station 122 power levels will be substantially constant. However, even if this is not the case, one or more collections for (d) above may be determined empirically and/or by computationally simulating the power output of each base station 122 at a predetermined level. Moreover, it is also worth mentioning that this step is relatively straightforward to implement using the data stored in the location signature data base 1320 (i.e., the verified location signature clusters discussed in detail hereinbelow). Denote the resulting partition here as $P_1$.

(23.8.4.2) Partition the radio coverage area 120 into subareas, wherein each subarea appears to have substantially homogeneous terrain characteristics. Note, this may be performed periodically substantially automatically by scanning radio coverage area images obtained from aerial or satellite imaging. For example, EarthWatch Inc. of Longmont, CO can provide geographic with 3 meter resolution from satellite imaging data. Denote the resulting partition here as $P_2$.

(23.8.4.3) Overlay both of the above partitions, $P_1$ and $P_2$ of the radio coverage area 120 to obtain new subareas that are intersections of the subareas from each of the above partitions. This new partition is $P_0$ (i.e., $P_0=P_1$ intersect $P_2$), and the subareas of it are denoted as "$P_0$ subareas".

Now assuming $P_0$ has been obtained, the subareas of $P_0$ are provided with a first classification or categorization as follows:

(23.8.4.4) Determine an area type categorization scheme for the subareas of $P_1$. For example, a subarea, A, of $P_1$, may be categorized or labeled according to the number of base stations 122 in each of the collections used in (23.8.4.1)(*d*) above for determining subareas of $P_1$. Thus, in one such categorization scheme, each category may correspond to a single number x (such as 3), wherein for a subarea, A, of this category, there is a group of x (e.g., three) base stations 122 that are expected to be detected by a most target MSs 140 in the area A. Other embodiments are also possible, such as a categorization scheme wherein each category may correspond to a triple: of numbers such as (5, 2, 1), wherein for a subarea A of this category, there is a common group of 5 base stations 122 with two-way signal detection expected with most locations (e.g., within a first or second deviation) within A, there are 2 base stations that are expected to be detected by a target MS 140 in A but these base stations cannot detect the target MS, and there is one base station 122 that is expected to be able to detect a target MS in A but not be detected.

(23.8.4.5) Determine an area type categorization scheme for the subareas of $P_2$. Note that the subareas of $P_2$ may be categorized according to their similarities. In one embodiment, such categories may be somewhat similar to the naive area types mentioned above (e.g., dense urban, urban, suburban, rural, mountain, etc.). However, it is also an aspect of the wireless location capabilities disclosed herein that more precise categorizations may be used, such as a category for all areas having between 20,000 and 30,000 square feet of vertical area change per 11,000 square feet of horizontal area and also having a high traffic volume (such a category likely corresponding to a "moderately dense urban" area type).

(23.8.4.6) Categorize subareas of $P_0$ with a categorization scheme denoted the "$P_0$ categorization," wherein for each $P_0$ subarea, A, a "$P_0$ area type" is determined for A according to the following substep(s):

(a) Categorize A by the two categories from (23.8.4.4) and (23.8.5) with which it is identified. Thus, A is categorized (in a corresponding $P_0$ area type) both according to its terrain and the base station infrastructure configuration in the radio coverage area 120.

(23.8.4.7) For each $P_0$ subarea, A, of $P_0$ perform the following step(s):

(a) Determine a centroid, C(A), for A;

(b) Determine an approximation to a wireless transmission path between C(A) and each base station 122 of a predetermined group of base stations expected to be in (one and/or two-way) signal communication with most target MS 140 locations in A. For example, one such approximation is a straight line between C(A) and each of the base stations 122 in the group. However, other such approximations are within the scope of the wireless location capabilities disclosed herein, such as, a generally triangular shaped area as the transmission path, wherein a first vertex of this area is at the corresponding base station for the transmission path, and the sides of the generally triangular shaped defining the first vertex have a smallest angle between them that allows A to be completely between these sides.

(c) For each base station 122, $BS_i$, in the group mentioned in (b) above, create an empty list, $BS_i$-list, and put on this list at least the $P_0$ area types for the "significant" $P_0$ subareas crossed by the transmission path between C(A) and $BS_i$. Note that "significant" $P_0$ subareas may be defined as, for example, the $P_0$ subareas through which at least a minimal length of the transmission path traverses. Alternatively, such "significant" $P_0$ subareas may be defined as those $P_0$ subareas that additionally are know or expected to generate substantial multipath.

(d) Assign as the transmission area type for A as the collection of $BS_i$-lists. Thus, any other $P_0$ subarea having the same (or substantially similar) collection of lists of $P_0$ area types will be viewed as having approximately the same radio transmission characteristics.

Note that other transmission signal characteristics may be incorporated into the transmission area types. For example, thermal noise characteristics may be included by providing a third radio coverage area 120 partition, $P_3$, in addition to the partitions of $P_1$ and $P_2$ generated in (23.8.4.1) and (23.8.4.2) respectively. Moreover, the time varying characteristics of (23.8.2) may be incorporated in the transmission area type frame work by generating multiple versions of the transmission area types such that the transmission area type for a given subarea of $P_0$ may change depending on the combination of time varying environmental characteristics to be considered in the transmission area types. For instance, to account for seasonality, four versions of the partitions $P_1$ and $P_2$ may be generated, one for each of the seasons, and subsequently generate a (potentially) different partition $P_0$ for each season. Further, the type and/or characteristics of base station 122 antennas may also be included in an embodiment of the transmission area type.

Other embodiments of area types are also within the scope of the wireless location capabilities disclosed herein. As mentioned above, each of the position determining entities or techniques 1224 have default confidence values associated therewith, and these confidence values may be probabilities. More precisely, such probability confidence values can be determined as follows. Assume there is a partition of the coverage area into subareas, each subarea being denoted a "partition area." For each partition area, activate each first order model 1224 with historical location data in the Location Signature Data Base 1320 (FIG. 6), wherein the historical location data has been obtained from corresponding known mobile station locations in the partition area. For each first order model, determine a probability of the first order model generating a location hypothesis whose location estimate contains the corresponding known mobile station location. To accomplish this, assume the coverage area is partitioned into partition areas A, wherein each partition area A is specified as the collection of coverage area locations such that for each location, the detected wireless transmissions between the network base stations and a target mobile station at the location can be straightforwardly equated with other locations of area A. For example, one such partition, $P_0$, can be defined wherein each partition area A is specified in terms of three sets of base station identifiers, namely, (a) the base station identifiers of the base stations that can be both detected at each location of A and can detect a target mobile station at each location, (b) the identifiers for base stations that can detect a target mobile station at each location of A, but cannot be detected by the target mobile station, and (c) the identifiers for base stations that can be detected by a target mobile station at each location of A, but these base stations cannot detect the target mobile station. That is, two locations, $I_1$ and $I_2$. are identified as being in A if and only if the three sets of (a), (b), and (c) for $I_1$ are, respectively, identical to the three sets of (a), (b), and (c) for $I_2$.

Accordingly, assuming the partition $P_0$ is used, a description can be given as to how probabilities may be assigned as the confidence values of location hypotheses generated by the position determining entities or techniques 1224. For each partition area A, a first order model 1224 is supplied with wireless measurements of archived location data in the Location Signature Data Base associated with corresponding verified mobile station locations. Thus, a probability can be determined as to how likely the first order model is to generate a location hypothesis having a location estimate containing the corresponding verified mobile station location. Accordingly, a table of partition area probabilities can be determined for each first order model 1224. Thus, when a location hypothesis is generated and identified as belonging to one of the partition areas, the corresponding probability for that partition area may be assigned as the confidence value for the location hypothesis. The advantages to using actual probabilities here is that, as will be discussed below, the most likelihood estimator 1344 can compute a straightforward probability for each distinct intersection of the multiple location hypotheses generated by the multiple position determining entities or techniques, such that each such probability indicates a likelihood that the target mobile station is in the corresponding intersection.

Location Information Data Bases And Data

Location Data Bases Introduction

It is an aspect of the wireless location capabilities disclosed herein that MS location processing performed by the location center/gateway 142 should become increasingly better at locating a target MS 140 both by (a) building an increasingly more detailed model of the signal characteristics of locations in the service area for the wireless location capabilities disclosed herein, and also (b) by providing capabilities for the location center processing to adapt to environmental changes.

One way these aspects of the wireless location capabilities disclosed herein are realized is by providing one or more data base management systems and data bases for:

(a) storing and associating wireless MS signal characteristics with known locations of MSs 140 used in providing the signal characteristics. Such stored associations may not only provide an increasingly better model of the signal characteristics of the geography of the service area, but also provide an increasingly better model of more changeable signal characteristic affecting environmental factors such as weather, seasons, and/or traffic patterns;

(b) adaptively updating the signal characteristic data stored so that it reflects changes in the environment of the service area such as, for example, a new high rise building or a new highway.

Referring again to FIG. 5 of the collective representation of these data bases is the location information data bases 1232. Included among these data bases is a data base for providing training and/or calibration data to one or more trainable/calibratable FOMs 1224, as well as an archival data base for archiving historical MS location information related to the performance of the FOMs. These data bases will be discussed as necessary hereinbelow. However, a further brief introduction to the archival data base is provided here. Accordingly, the term, "location signature data base" is used hereinafter to denote the archival data base and/or data base management system depending on the context of the discussion. The location signature data base (shown in, for example, FIG. 6 and labeled 1320) is a repository for wireless signal characteristic data derived from wireless signal communications between an MS 140 and one or more base stations 122, wherein the corresponding location of the MS 140 is known and also stored in the location signature data base 1320. More particularly, the location signature data base 1320 associates each such known MS location with the wireless signal characteristic data derived from wireless signal communications between the MS 140 and one or more base stations 122 at this MS location. Accordingly, it is an aspect of the wireless location capabilities disclosed herein to utilize such historical MS signal location data for enhancing the correctness and/or confidence of certain location hypotheses as will be described in detail in other sections below.

Data Representations for the Location Signature Data Base

In one embodiment, there are four fundamental entity types (or object classes in an object oriented programming paradigm) utilized in the location signature data base 1320. Briefly, these data entities are described in the items (24.1) through (24.4) that follow:

(24.1) (verified) location signatures: Each such (verified) location signature describes the wireless signal characteristic measurements between a given base station (e.g., BS 122 or LBS 152) and an MS 140 at a (verified or known) location associated with the (verified) location signature. That is, a verified location signature corresponds to a location whose coordinates such as latitude-longitude coordinates are known, while simply a location signature may have a known or unknown location corresponding with it. Note that the term (verified) location signature is also denoted by the abbreviation, "(verified) loc sig" hereinbelow;

(24.2) (verified) location signature clusters: Each such (verified) location signature cluster includes a collection of (verified) location signatures corresponding to all the location signatures between a target MS 140 at a (possibly verified) presumed substantially stationary location and each BS (e.g., 122 or 152) from which the target MS 140 can detect the BS's pilot channel regardless of the classification of the BS in the target MS (i.e., for CDMA, regardless of whether a BS is in the MS's active, candidate or remaining base station sets, as one skilled in the art will understand). Note that for simplicity here, it is presumed that each location signature cluster has a single fixed primary base station to which the target MS 140 synchronizes or obtains its timing;

(24.3) "composite location objects (or entities)": Each such entity is a more general entity than the verified location signature cluster. An object of this type is a collection of (verified) location signatures that are associated with the same MS 140 at substantially the same location at the same time and each such loc sig is associated with a different base station. However, there is no requirement that a loc sig from each BS 122 for which the MS 140 can detect the BS's pilot channel is included in the "composite location object (or entity)"; and (24.4) MS location estimation data that includes MS location estimates output by one or more MS location estimating position determining entities or techniques 1224, such MS location estimate data is described in detail hereinbelow.

It is important to note that a loc sig is, in one embodiment, an instance of the data structure containing the signal characteristic measurements output by the signal filtering and normalizing subsystem also denoted as the signal processing subsystem 1220 describing the signals between: (i) a specific base station 122 (BS) and (ii) a mobile station 140 (MS), wherein the BS's location is known and the MS's location is assumed to be substantially constant (during a 2-5 second interval in one embodiment of the wireless location capabilities disclosed herein), during communication with the MS 140 for obtaining a single instance of loc sig data, although the MS location may or may not be known. Further, for notational purposes, the BS 122 and the MS 140 for a loc sig hereinafter will be denoted the "BS associated with the loc sig", and the "MS associated with the loc sig" respectively. Moreover, the location of the MS 140 at the time the loc sig data is obtained will be denoted the "location associated with the loc sig" (this location possibly being unknown).

Note that additional description of this aspect of the wireless location capabilities disclosed herein can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the location signature data base 1320.

Location Center Architecture

Overview of Location Center/Gateway Functional Components

Figure 5:
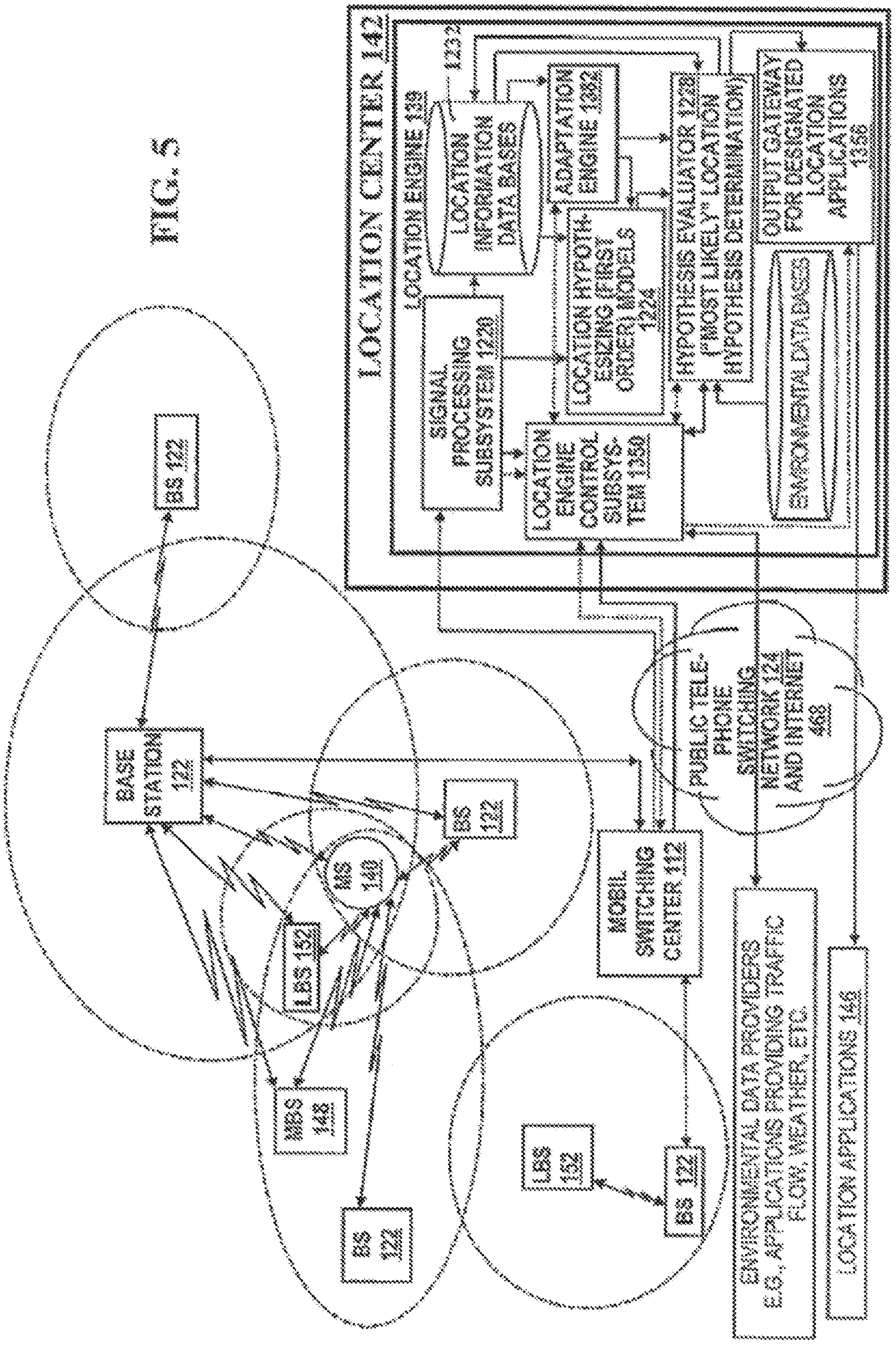
FIG. 5 is a high level block diagram of an embodiment of the wireless location capabilities disclosed herein for locating a mobile station (MS) within a radio coverage area.

FIG. 5 presents a high level diagram of an embodiment of the location center/gateway 142 and the location engine 139 in the context of the infrastructure for the entire location system of the wireless location capabilities disclosed herein.

It is important to note that the architecture for the location center/gateway 142 and the location engine 139 provided by the wireless location capabilities disclosed herein is designed for extensibility and flexibility so that MS 140 location accuracy and reliability may be enhanced as further location data become available and as enhanced MS location techniques become available. In addressing the design goals of extensibility and flexibility, the high level architecture for generating and processing MS location estimates may be considered as divided into the following high level functional groups described hereinbelow.

Low Level Wireless Signal Processing Subsystem for Receiving and Conditioning Wireless Signal Measurements A first functional group of location engine 139 modules is for performing signal processing and filtering of MS location signal data received from a conventional wireless (e.g., CDMA) infrastructure, as discussed in the steps (23.1) and (23.2) above. This group is denoted the signal processing subsystem 1220 herein. One embodiment of such a subsystem is described in the U.S. copending patent application titled, "Wireless Location Using A Plurality of Commercial Network Infrastructures," by F. W. LeBlanc, Dupray and Karr filed Jan. 22, 1999 and having U.S. Pat. No. 6,236,365. Note that this patent application is incorporated herein entirely by reference.

Initial Location Estimators: Position Determining Entities or Techniques

A second functional group of modules at least accessible by the location engine 139 are the FOM 1224 for generating various target MS 140 location initial estimates, as described in step (23.3). A brief description of some types of position determining entities or techniques (first order models) is provided immediately below. Note that FIG. 8 illustrates another, more detail view of an embodiment of the location center/gateway 142 for the wireless location capabilities disclosed herein. In particular, this figure illustrates some of the FOMs 1224 at least accessible (but not necessarily co-located with the other location center/gateway modules shown in this figure), and additionally illustrates the primary communications with other modules of the gateway. However, it is important to note that the wireless location capabilities disclosed herein is not limited to the FOMs 1224 shown and discussed herein. That is, it is a primary aspect of the wireless location capabilities disclosed herein to easily incorporate FOMs using other signal processing and/or computational location estimating techniques than those presented herein. Further, note that each FOM type may have a plurality of its MS location estimating models (at least) accessible by the gateway 142.

For example, (as will be described in further detail below), one such type of model or FOM 1224 (hereinafter models of this type are referred to as "terrestrial communication station offset (TCSO) models" or "terrestrial communication station offset (TCSO) first order models", or "terrestrial communication station offset (TCSO) FOMs") may be based on a range, offset, and/or distance computation such as on a base station signal reception angle determination between the target MS 140 from each of one or more base stations. Basically, such TCSO models 1224 determine a location estimate of the target MS 140 by determining an offset from each of one or more base stations 122, possibly in a particular direction from each (some of) the base stations, so that, e.g., an intersection of each area locus defined by the base station offsets may provide an estimate of the location of the target MS. TCSO FOMs 1224 may compute such offsets based on, e.g.:

(a) signal timing measurements between the target mobile station 140 and one or more base stations 122; e.g., timing measurements such as time difference of arrival (TDOA), or time of arrival (TOA). Note that both forward and reverse signal path timing measurements may be utilized;

(b) signal strength measurements (e.g., relative to power control settings of the MS 140 and/or one or more BS 122); and/or (c) signal angle of arrival measurements, or ranges thereof, at one or more base stations 122 (such angles and/or angular ranges provided by, e.g., base station antenna sectors having angular ranges of 120° or 60°, or, so called "SMART antennas" with variable angular transmission ranges of 2° to 120°).

Accordingly, a terrestrial communication station offset (TCSO) model may utilize, e.g., triangulation or trilateration to compute a location hypothesis having either an area location or a point location for an estimate of the target MS 140. Additionally, in some embodiments location hypothesis may include an estimated error.

Another type of FOM 1224 is a statistically based first order model 1224, wherein a statistical technique, such as regression techniques (e.g., least squares, partial least squares, principle decomposition), or e.g., Bollenger Bands (e.g., for computing minimum and maximum base station offsets). In general, models of this type output location hypotheses determined by performing one or more statistical techniques or comparisons between the verified location signatures in location signature data base 1320, and the wireless signal measurements from a target MS. Models of this type are also referred to hereinafter as a "stochastic signal (first order) model" or a "stochastic FOM" or a "statistical model." Of course, statistically based FOMs may be a hybrid combination with another type of FOM such as a TCSO FOM.

Still another type of FOM 1224 is an adaptive learning model, such as an artificial neural net or a genetic algorithm, wherein the FOM may be trained to recognize or associate each of a plurality of locations with a corresponding set of signal characteristics for communications between the target MS 140 (at the location) and the base stations 122. Moreover, typically such a FOM is expected to accurately interpolate/extrapolate target MS 140 location estimates from a set of signal characteristics from an unknown target MS 140 location. Models of this type are also referred to hereinafter variously as "artificial neural net models" or "neural net models" or "trainable models" or "learning models." Note that a related type of FOM 1224 is based on pattern recognition. These FOMs can recognize patterns in the signal characteristics of communications between the target MS 140 (at the location) and the base stations 122 and thereby estimate a location area of the target MS. However, such FOMs may not be trainable.

Yet another type of FOM 1224 can be based on a collection of dispersed low power, low cost fixed location wireless transceivers (also denoted "location base stations 152" hereinabove) that are provided for detecting a target MS 140 in areas where, e.g., there is insufficient base station 122 infrastructure coverage for providing a desired level of MS 140 location accuracy. For example, it may uneconomical to provide high traffic wireless voice coverage of a typical wireless base station 122 in a nature preserve or at a fair ground that is only populated a few days out of the year. However, if such low cost location base stations 152 can be directed to activate and deactivate via the direction of a FOM 1224 of the present type, then these location base stations can be used to both location a target MS 140 and also provide indications of where the target MS is not. For example, if there are location base stations 152 populating an area where the target MS 140 is presumed to be, then by activating these location base stations 152, evidence may be obtained as to whether or not the target MS is actually in the area; e.g., if the target MS 140 is detected by a location base station 152, then a corresponding location hypothesis having a location estimate corresponding to the coverage area of the location base station may have a very high confidence value. Alternatively, if the target MS 140 is not detected by a location base station 152, then a corresponding location hypothesis having a location estimate corresponding to the coverage area of the location base station may have a very low confidence value. Models of this type are referred to hereinafter as "location base station models."

Yet another type of FOM 1224 can be based on input from a mobile base station 148, wherein location hypotheses may be generated from target MS 140 location data received from the mobile base station 148.

Still other types of FOM 1224 can be based on various techniques for recognizing wireless signal measurement patterns and associating particular patterns with locations in the coverage area 120. For example, artificial neural networks or other learning models can used as the basis for various FOMs.

Note that the FOM types mentioned here as well as other FOM types are discussed in detail hereinbelow. Moreover, it is important to keep in mind that in one embodiment of the wireless location capabilities disclosed herein, the substantially simultaneous use or activation of a potentially large number of such first order models 1224, may be able to enhance both the reliability of location estimates and the accuracy of such estimates. Additionally, note that in some embodiments of the wireless location capabilities disclosed herein, the first order models 1224 can be activated when appropriate signal measurements are obtained. For example, a TDOA FOM may be activated when only a single signal time delay measurement is obtained from some plurality of base station 122. However, if, for instance, additional time delay values are obtained (and assuming such additional values are necessary), then one or more wireless signal pattern matching FOM may also be activated in conjunction with the TDOA FOM. Additionally, a FOM using satellite signals (e.g., GPS) to perform a triangulation may be activated whenever appropriate measurements are received regardless of whether additional FOMs are capable of being substantially simultaneously activated or not. Accordingly, since such satellite signal FOMs are generally more accurate, output from such a FOM may dominate any other previous or simultaneous estimates unless there is evidence to the contrary.

Moreover, the wireless location capabilities disclosed herein provides a framework for incorporating MS location estimators to be subsequently provided as new FOMs in a straightforward manner. For example, a FOM 1224 based on wireless signal time delay measurements from a distributed antenna system for wireless communication may be incorporated into the wireless location capabilities disclosed herein for thereby locating a target MS 140 in an enclosed area serviced by the distributed antenna system. Accordingly, by using such a distributed antenna FOM, the wireless location capabilities disclosed herein may determine the floor of a multi-story building from which a target MS is transmitting. Thus, MSs 140 can be located in three dimensions using such a distributed antenna FOM. Additionally, FOMs for detecting certain registration changes within, for example, a public switched telephone network can also be used for locating a target MS 140. For example, for some MSs 140 there may be an associated or dedicated device for each such MS that allows the MS to function as a cordless phone to a line based telephone network when the device detects that the MS is within signaling range. In one use of such a device (also denoted herein as a "home base station"), the device registers with a home location register of the public switched telephone network when there is a status change such as from not detecting the corresponding MS to detecting the MS, or visa versa, as one skilled in the art will understand. Accordingly, by providing a FOM that accesses the MS status in the home location register, the location engine 139 can determine whether the MS is within signaling range of the home base station or not, and generate location hypotheses accordingly. Moreover, other FOMs based on, for example, chaos theory and/or fractal theory are also within the scope of the wireless location capabilities disclosed herein.

It is important to note the following aspects of the wireless location capabilities disclosed herein relating to FOMs 1224:

(28.1) Each such first order model 1224 may be relatively easily incorporated into and/or removed from the wireless location capabilities disclosed herein. For example, assuming that the signal processing subsystem 1220 provides uniform input to the FOMs, and there is a uniform FOM output interface (e.g., API), it is believed that a large majority (if not substantially all) viable MS location estimation strategies may be accommodated. Thus, it is straightforward to add or delete such FOMs 1224.

(28.2) First order models 1224 may be relatively simple and still provide significant MS 140 locating functionality and predictability. For example, much of what is believed to be common or generic MS location processing has been coalesced into, for example: a location hypothesis evaluation subsystem, denoted the hypotheses evaluator 1228 and described immediately below. Thus, the wireless location capabilities disclosed herein is modular and extensible such that, for example, (and importantly) different first order models 1224 may be utilized depending on the signal transmission characteristics of the geographic region serviced by an embodiment of the wireless location capabilities disclosed herein. Thus, a simple configuration of the wireless location capabilities disclosed herein may have (or access) a small number of FOMs 1224 for a simple wireless signal environment (e.g., flat terrain, no urban canyons and low population density). Alternatively, for complex wireless signal environments such as in cities like San Francisco, Tokyo or New York, a large number of FOMs 1224 may be simultaneously utilized for generating MS location hypotheses.

An Introduction to an Evaluator for Location Hypotheses: Hypothesis Evaluator

A third functional group of location engine 139 modules evaluates location hypotheses output by the first order models 1224 and thereby provides a "most likely" target MS location estimate. The modules for this functional group are collectively denoted the hypothesis evaluator 1228.

Hypothesis Evaluator

A primary purpose of the hypothesis evaluator 1228 is to mitigate conflicts and ambiguities related to location hypotheses output by the first order models 1224 and thereby output a "most likely" estimate of an MS for which there is a request for it to be located. In providing this capability, there are various related embodiments of the hypothesis evaluator that are within the scope of the wireless location capabilities disclosed herein. Since each location hypothesis includes both an MS location area estimate and a corresponding confidence value indicating a perceived confidence or likelihood of the target MS being within the corresponding location area estimate, there is a monotonic relationship between MS location area estimates and confidence values. That is, by increasing an MS location area estimate, the corresponding confidence value may also be increased (in an extreme case, the location area estimate could be the entire coverage area 120 and thus the confidence value may likely correspond to the highest level of certainty; i.e., +1.0). Accordingly, given a target MS location area estimate (of a location hypothesis), an adjustment to its accuracy may be performed by adjusting the MS location area estimate and/or the corresponding confidence value. Thus, if the confidence value is, for example, excessively low then the area estimate may be increased as a technique for increasing the confidence value. Alternatively, if the estimated area is excessively large, and there is flexibility in the corresponding confidence value, then the estimated area may be decreased and the confidence value also decreased. Thus, if at some point in the processing of a location hypothesis, if the location hypothesis is judged to be more (less) accurate than initially determined, then (i) the confidence value of the location hypothesis may be increased (decreased), and/or (ii) the MS location area estimate can be decreased (increased). Moreover, note that when the confidence values are probabilities, such adjustments are may require the reactivation of one or more FOMs 1224 with requests to generate location hypotheses having location estimates of different sizes. Alternatively, adjuster modules 1436 and/or 1440 (FIG. 16 discussed hereinbelow) may be invoked for generating location hypotheses having area estimates of different sizes. Moreover, the confidence value on such an adjusted location hypothesis (actually a new location hypothesis corresponding to the originally generated hypothesis) may also be a probability in that combinations of FOMs 1224 and adjuster modules 1436 and 1440 can also be calibrated for thereby yielding probabilities as confidence values to the resulting location hypotheses.

In a first class of embodiments (typically wherein the confidence values are not maintained as probabilities), the hypothesis evaluator 1228 evaluates location hypotheses and adjusts or modifies only their confidence values for MS location area estimates and subsequently uses these MS location estimates with the adjusted confidence values for determining a "most likely" MS location estimate for outputting. Alternatively, in a second class of embodiments for the hypothesis evaluator 1228 (also typically wherein the confidence values are not maintained as probabilities), MS location area estimates can be adjusted while confidence values remain substantially fixed. However, in one preferred embodiment of the present embodiment, both location hypothesis area estimates and confidence values are modified.

The hypothesis evaluator 1228 may perform any or most of the following tasks depending on the embodiment of the hypothesis evaluator. That is, (30.1) it may enhance the accuracy of an initial location hypothesis generated by an FOM by using the initial location hypothesis as, essentially, a query or index into the location signature data base 1320 for obtaining one or more corresponding enhanced location hypotheses, wherein the enhanced location hypotheses have both an adjusted target MS location area estimates and an adjusted confidences based on past performance of the FOM in the location service surrounding the target MS location estimate of the initial location hypothesis;

Additionally, for embodiments of the hypothesis evaluator 1228 wherein the confidence values for location hypotheses are not maintained as probabilities, the following additional tasks (30.2) through (30.7) may be performed:

(30.2) the hypothesis evaluator 1228 may utilize environmental information to improve and reconcile location hypotheses supplied by the first order models 1224. A basic premise in this context is that the accuracy of the individual first order models may be affected by various environmental factors such as, for example, the season of the year, the time of day, the weather conditions, the presence of buildings, base station failures, etc.;

(30.3) the hypothesis evaluator 1228 may determine how well the associated signal characteristics used for locating a target MS compare with particular verified loc sigs stored in the location signature data base 1320 (see the location signature data base section for further discussion regarding this aspect of the wireless location capabilities disclosed herein). That is, for a given location hypothesis, verified loc sigs (which were previously obtained from one or more verified locations of one or more MS's) are retrieved for an area corresponding to the location area estimate of the location hypothesis, and the signal characteristics of these verified loc sigs are compared with the signal characteristics used to generate the location hypothesis for determining their similarities and subsequently an adjustment to the confidence of the location hypothesis (and/or the size of the location area estimate);

(30.4) the hypothesis evaluator 1228 may determine if (or how well) such location hypotheses are consistent with well known physical constraints such as the laws of physics. For example, if the difference between a previous (most likely) location estimate of a target MS and a location estimate by a current location hypothesis requires the MS to:

(a1) move at an unreasonably high rate of speed (e.g., 200 mph), or (b1) move at an unreasonably high rate of speed for an area (e.g., 80 mph in a corn patch), or (c1) make unreasonably sharp velocity changes (e.g., from 60 mph in one direction to 60 mph in the opposite direction in 4 sec), then the confidence in the current Location Hypothesis is likely to be reduced.

Alternatively, if for example, the difference between a previous location estimate of a target MS and a current location hypothesis indicates that the MS is:

(a2) moving at an appropriate velocity for the area being traversed, or (b2) moving along an established path (e.g., a freeway), then the confidence in the current location hypothesis may be increased.

(30.5) the hypothesis evaluator 1228 may determine consistencies and inconsistencies between location hypotheses obtained from different first order models. For example, if two such location hypotheses, for substantially the same timestamp, have estimated location areas where the target MS is likely to be and these areas substantially overlap, then the confidence in both such location hypotheses may be increased. Additionally, note that a velocity of an MS may be determined (via deltas of successive location hypotheses from one or more first order models) even when there is low confidence in the location estimates for the MS, since such deltas may, in some cases, be more reliable than the actual target MS location estimates;

(30.6) the hypothesis evaluator 1228 determines new (more accurate) location hypotheses from other location hypotheses. For example, this module may generate new hypotheses from currently active ones by decomposing a location hypothesis having a target MS location estimate intersecting two radically different wireless signaling area types. Additionally, this module may generate location hypotheses indicating areas of poor reception; and (30.7) the hypothesis evaluator 1228 determines and outputs a most likely location hypothesis for a target MS.

Note that additional description of the hypothesis evaluator 1228 can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to their descriptions of the hypothesis evaluator.

Context Adjuster Introduction.

The context adjuster (alternatively denoted "location adjuster modules) 1326 module enhances both the comparability and predictability of the location hypotheses output by the first order models 1224. In one embodiment (typically where confidence values of location hypotheses are not maintained as probabilities), this module modifies location hypotheses received from the FOMs 1224 so that the resulting location hypotheses output by the context adjuster 1326 may be further processed uniformly and substantially without concern as to differences in accuracy between the first order models from which location hypotheses originate. Further, embodiments of the context adjuster may determine those factors that are perceived to impact the perceived accuracy (e.g., confidence) of the location hypotheses. For instance, environmental characteristics may be taken into account here, such as time of day, season, month, weather, geographical area categorizations (e.g., dense urban, urban, suburban, rural, mountain, etc.), area subcategorizations (e.g., heavily treed, hilly, high traffic area, etc.).

Figure 16:
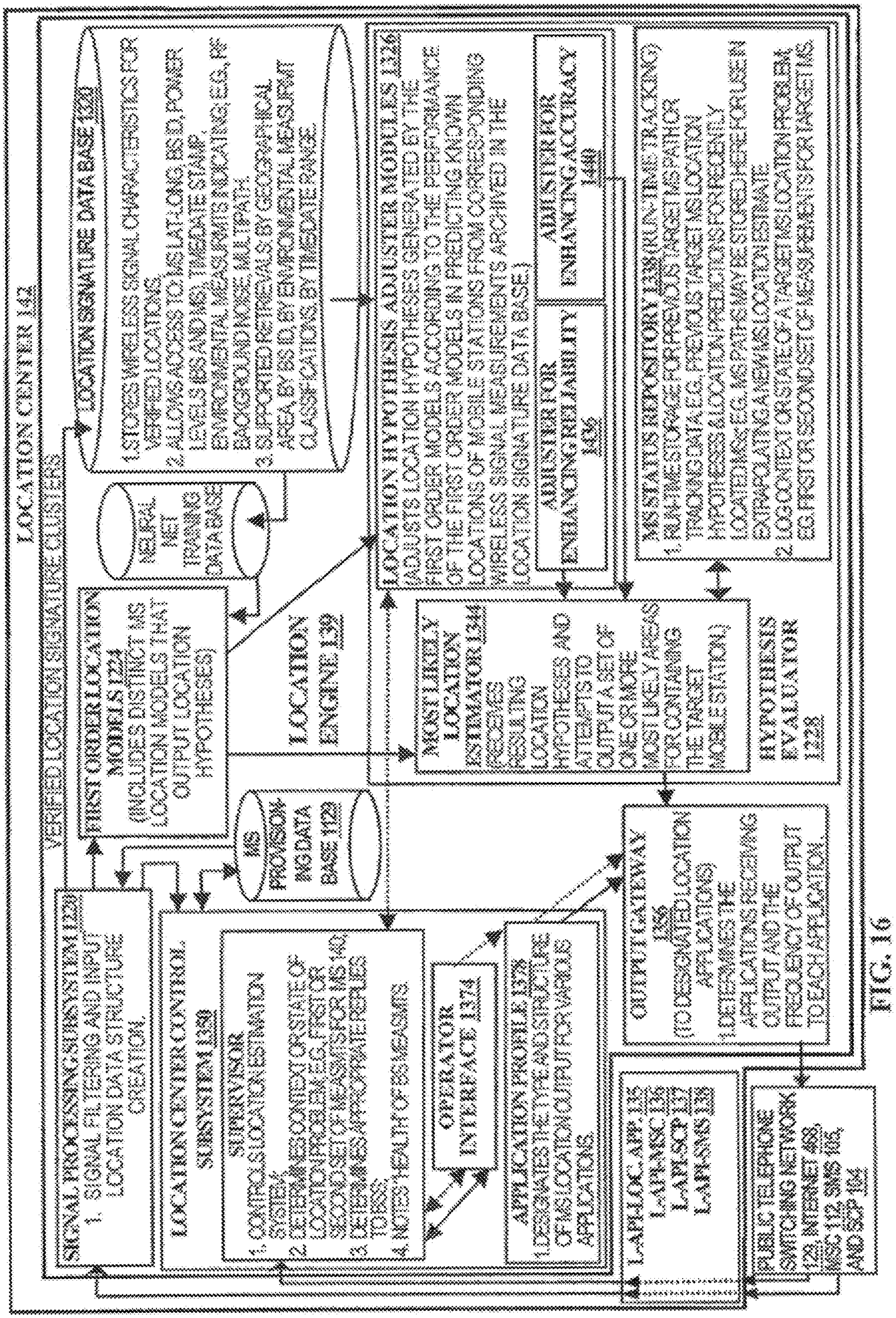
FIG. 16 illustrates another embodiment of the location engine 139, wherein the context adjuster 1326 (denoted in this figure as "location hypothesis adjuster modules") includes a module (1436) that is capable of adjusting location hypotheses for reliability, and another module (1440) that is capable of adjusting location hypotheses for accuracy.

In FIG. 16, two such adjuster modules are shown, namely, an adjuster for enhancing reliability 1436 and an adjuster for enhancing accuracy 1440. Both of these adjusters perform their location hypothesis adjustments in the manner described above. The difference between these two adjuster modules 1436 and 1440 is primarily the size of the localized area "nearby" the newly generated location estimate. In particular, since it is believed that the larger (smaller) the localized nearby area is, the more likely (less likely) the corresponding adjusted image is to contain the target mobile station location, the adjuster for enhancing reliability 1436 may determine its localized areas "nearby" a newly generated location estimate as, for example, having a 40% larger diameter (alternatively, area) than the location area estimate generated by a first order model 1224. Alternatively, the adjuster for enhancing accuracy 1444 may determine its localized areas "nearby" a newly generated location estimate as, for example, having a 30% smaller diameter (alternatively, area) than the location area estimate generated by a first order model 1224. Thus, each newly generated location hypothesis can potentially be used to derive at least two additional adjusted location hypotheses with some of these adjusted location hypotheses being more reliable and some being more accurate than the location hypotheses generated directly from the first order models 1224.

Note that additional description of context adjuster aspects of the wireless location capabilities disclosed herein can be found in the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the context adjuster 1326.

MS Status Repository Introduction

The MS status repository 1338 is a run-time storage manager for storing location hypotheses from previous activations of the location engine 139 (as well as for storing the output "most likely" target MS location estimate(s)) so that a target MS 140 may be tracked using target MS location hypotheses from previous location engine 139 activations to determine, for example, a movement of the target MS 140 between evaluations of the target MS location.

Location Hypothesis Analyzer Introduction.

The location hypothesis analyzer 1332, may adjust confidence values of the location hypotheses, according to:

(a) heuristics and/or statistical methods related to how well the signal characteristics for the generated target MS location hypothesis matches with previously obtained signal characteristics for verified MS locations.

(b) heuristics related to how consistent the location hypothesis is with physical laws, and/or highly probable reasonableness conditions relating to the location of the target MS and its movement characteristics. For example, such heuristics may utilize knowledge of the geographical terrain in which the MS is estimated to be, and/or, for instance, the MS velocity, acceleration or extrapolation of an MS position, velocity, or acceleration.

(c) generation of additional location hypotheses whose MS locations are consistent with, for example, previous estimated locations for the target MS.

Note that additional description of this aspect of the wireless location capabilities disclosed herein can be found in one of the following copending U.S. patent application which is incorporated herein by reference: "Location Of A Mobile Station" filed Nov. 24, 1999 having application Ser. No. 09/194,367 whose inventors are D. J. Dupray and C. L. Karr.

Most Likelihood Estimator

The most likelihood estimator 1344 is a module for determining a "most likely" location estimate for a target MS being located by the location engine 139. The most likelihood estimator 1344 receives a collection of active or relevant location hypotheses from the hypothesis analyzer 1332 and uses these location hypotheses to determine one or more most likely estimates for the target MS 140.

There are various embodiments of the most likelihood estimator 1344 that may be utilized with the wireless location capabilities disclosed herein. One such embodiment will now be described. At a high level, an area of interest is first determined which contains the target MS 140 whose location is desired. This can be straightforwardly determined by identifying the base stations 122 that can be detected by the target MS 140 and/or the base stations 140 that can detect the target MS. Subsequently, assuming that this area of interest has been previously partitioned into "cells" (e.g., small rectangular areas of, for example, 50 to 200 feet per side) and that the resulting location hypotheses for estimating the location of the target MS 140 each have a likelihood probability associated therewith, then for each such location hypothesis, a probability (more generally confidence value) is capable of being assigned to each cell intersecting and/or included in the associated target MS location estimate. In particular, for each location hypothesis, a portion of the probability value, P, for the associated location estimate, A, can be assigned to each cell, C, intersecting the estimate. One simple way to perform this is to divide P by the number of cells C, and increment, for each cell C, a corresponding probability indicative of the target MS 140 being in C with the result from the division. One skilled in the art will readily recognize numerous other ways of incrementing such cell probabilities, including: providing a Gaussian or other probabilistic distribution of probability values according to, e.g., the distance of the cell from the centroid of the location estimate. Accordingly, assuming all such probability increments have been assigned to all such cells C from all location hypotheses generated for locating the target MS 140, then the following is one embodiment of a program for determining one or more most likely locations of the target MS.

most likely area containing the target MS 140 having at least a particular desired confidence. However, a similar program may be readily provided where a most likely area having less than a desired extent or dimension is output; e.g., such a program would could be used to provide an answer to the question: "What city block is the target MS most likely in?"

Additionally, note that a center of gravity type of computation for obtaining the most likely location estimate of the target MS 140 may be used as described in U.S. Pat. No. 5,293,642 ('642 patent) filed Dec. 19, 1990 having an issue data of Mar. 8, 1994 with inventor Lo which is incorporated by reference herein and may contain essential material for the wireless location capabilities disclosed herein.

Still referring to the hypothesis evaluator 1228, it is important to note that not all the above mentioned modules are required in all embodiments of the wireless location capabilities disclosed herein. In particular, the hypothesis analyzer 1332 may be unnecessary. Accordingly, in such an embodiment, the enhanced location hypotheses output by the context adjuster 1326 are provided directly to the most likelihood estimator 1344.

Control and Output Gating Modules

A fourth functional group of location engine 139 modules is the control and output gating modules which includes the location center control subsystem 1350, and the output gateway 1356. The location control subsystem 1350 provides the highest level of control and monitoring of the data processing performed by the location center 142. In particular, this subsystem performs the following functions:

```
Desired_rel ← get the desired reliability for the resulting location estimate;
Max_size ← get the desired maximum extent for the resulting location estimate;
Binned_cells ← sort the cells of the area of interest by their probabilities into bins where each
               successive bin includes those cells whose confidence values are within a smaller
               (non-overlapping) range from that of any preceding bin . Further, assume there
               are, e.g., 100 bins B_I wherein B_1 has cells with confidences within the range [0,
               0.1], and B_I has cells with confidences within the range [ (i - 1) * 0.01, i * 0.01].
Result ← nil;
Curr_rel ← 0; /* current likelihood of target MS 140 being in the area represented by "Result" */
Done ← FALSE;
Repeat
        Cell_bin ← get first (next) bin of cells from Binned_cells;
        While (there are cells in Cell_bin) do
            Curr_cell ← get a next cell from Cell_bin that is closest to the centroid of
                        "Result";
            Result ← Result + Curr_cell;
            /* now determine a new reliability value corresponding to adding "Curr_cell" to
                the most likely location estimate being built in "Result" */
            Curr_rel ← Curr_rel + confidence_of_MS_in(Curr_cell);
            If (Curr_rel > Desired_rel) then
                    Done ← TRUE;
Until Done;
/* reliability that the target MS is in "Result" is sufficient */
Curr_size ← current maximum geographic extent (i.e., dimension) of the area represented by
                    "Result";
If (Curr_size <= Max_size) then output(Result);
Else Determine whether "Result" has one or more outlying cells that can be replaced by other
    cells closer to the centroid of "Result" and still have a reliability >= "Desired_rel";
    If (there are replaceable outlier cells) then
        replace them in Result and output(Result);
    Else output(Result);
```

Note that numerous similar embodiments of the above program maybe used, as one skilled in the art will understand. For instance, instead of "building" Result as provided in the above program, Result can be "whittled" from the area of interest. Accordingly, Result would be initialized to the entire area of interest, and cells would be selected for removal from Result. Additionally, note that the above program determines a fast approximation to the optimal (a) controls and monitors location estimating processing for each target MS 140. Note that this includes high level exception or error handling functions;

(b) receives and routes external information as necessary. For instance, this subsystem may receive (via, e.g., the public telephone switching network and Internet 468) such environmental information as increased signal noise in a particular service area due to increase traffic, a change in weather conditions, a base station 122 (or other infrastructure provisioning), change in operation status (e.g., operational to inactive);

(c) receives and directs location processing requests from other location centers 142 (via, e.g., the Internet);

(d) performs accounting and billing procedures such as billing according to MS location accuracy and the frequency with which an MS is located;

(e) interacts with location center operators by, for example, receiving operator commands and providing output indicative of processing resources being utilized and malfunctions;

(f) provides access to output requirements for various applications requesting location estimates. For example, an Internet location request from a trucking company in Los Angeles to a location center 142 in Denver may only want to know if a particular truck or driver is within the Denver area. Alternatively, a local medical rescue unit is likely to request a precise a location estimate as possible.

Figure 6A:
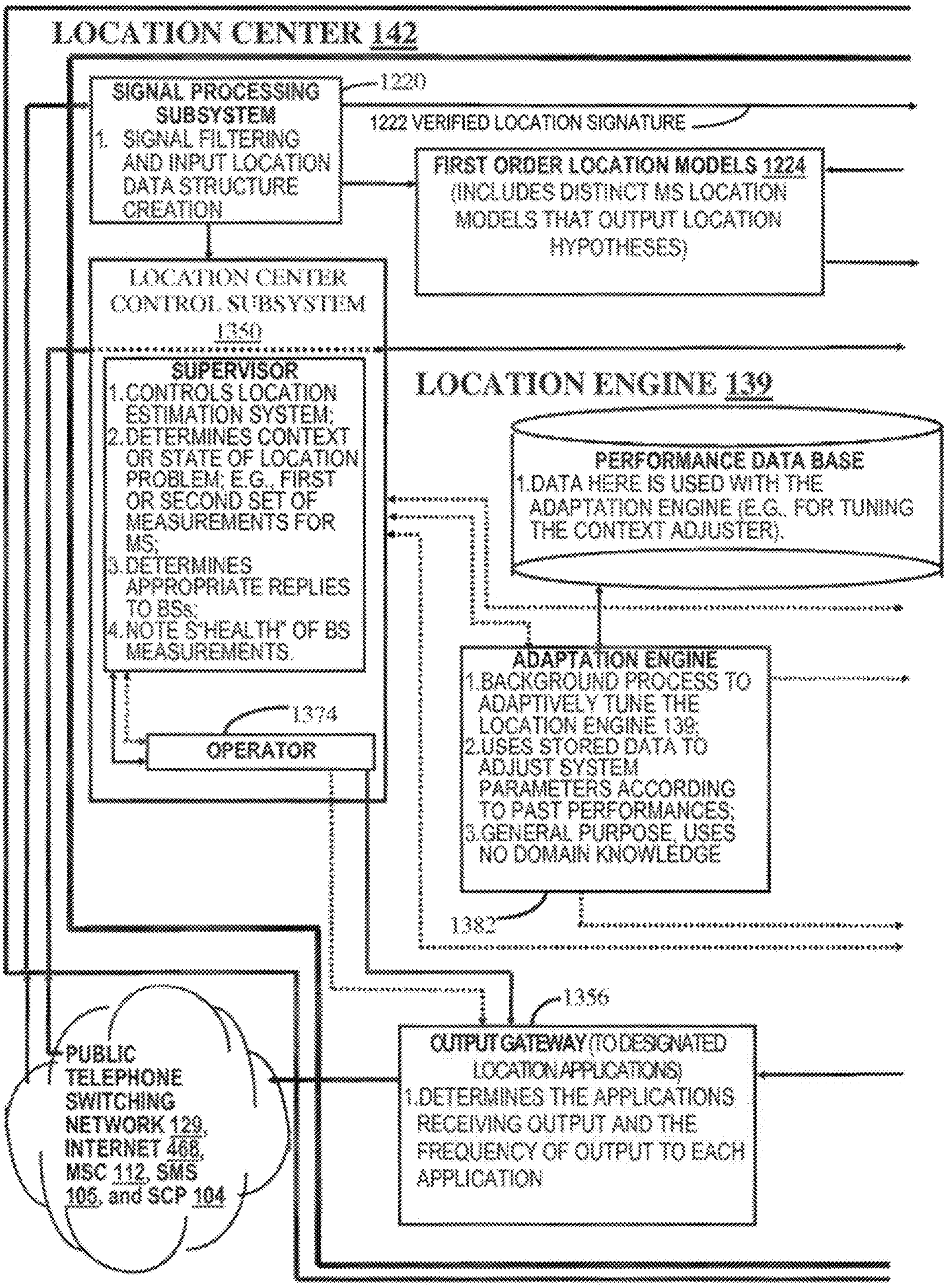
FIGS. 6A-6C is a high level block diagram of the location center 142.
Figure 6B:
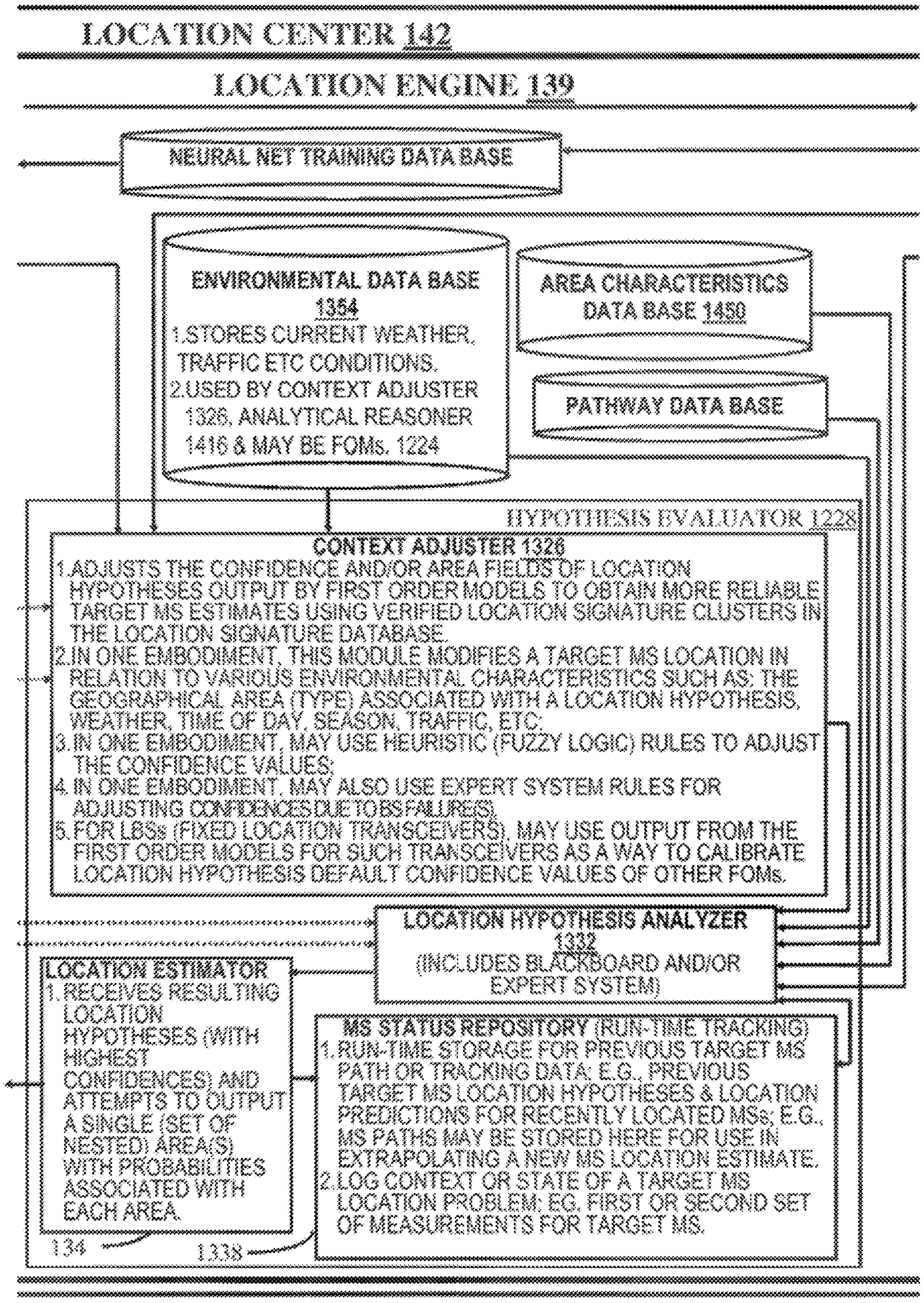
Figure 6C:
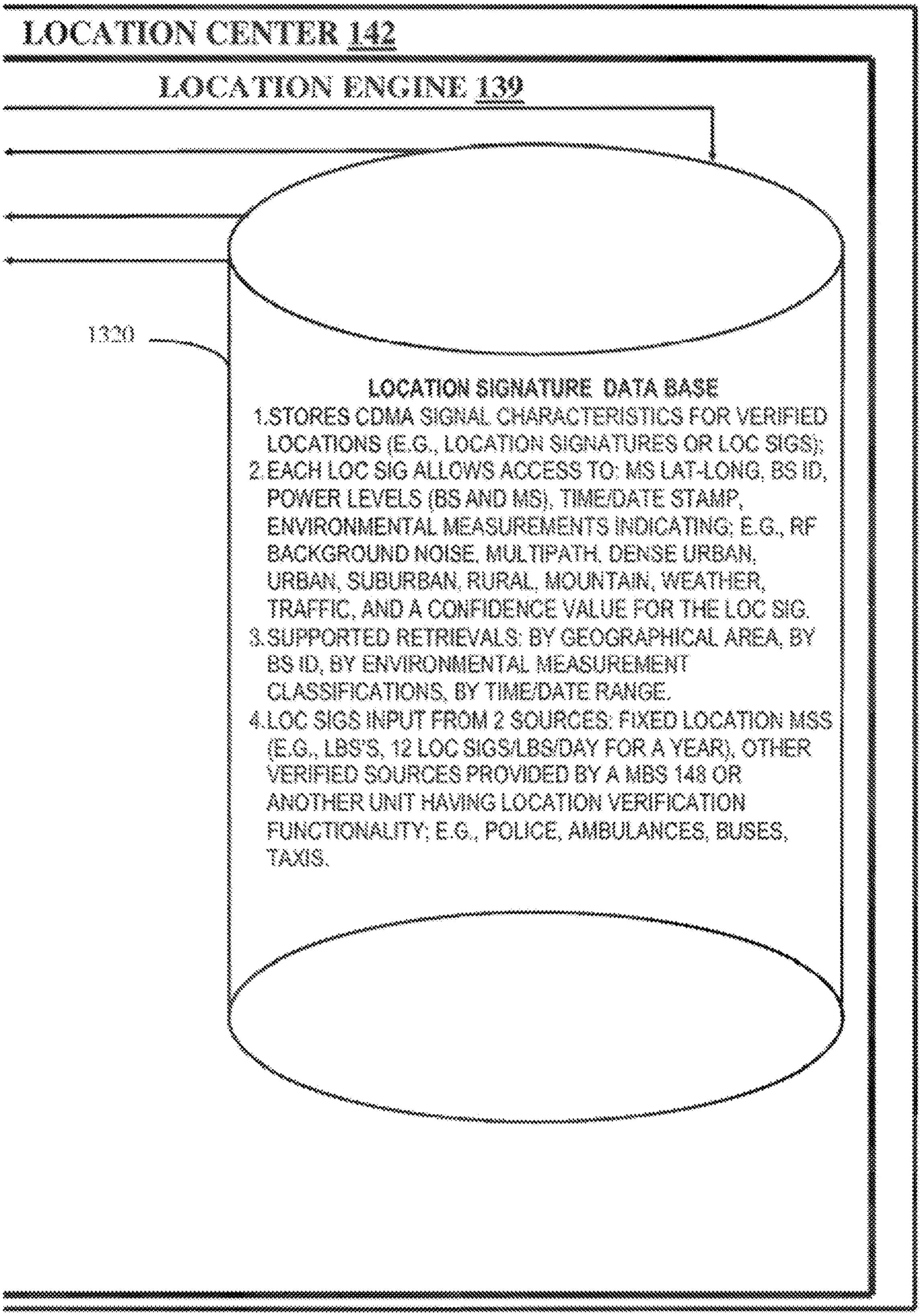
Figure 7:
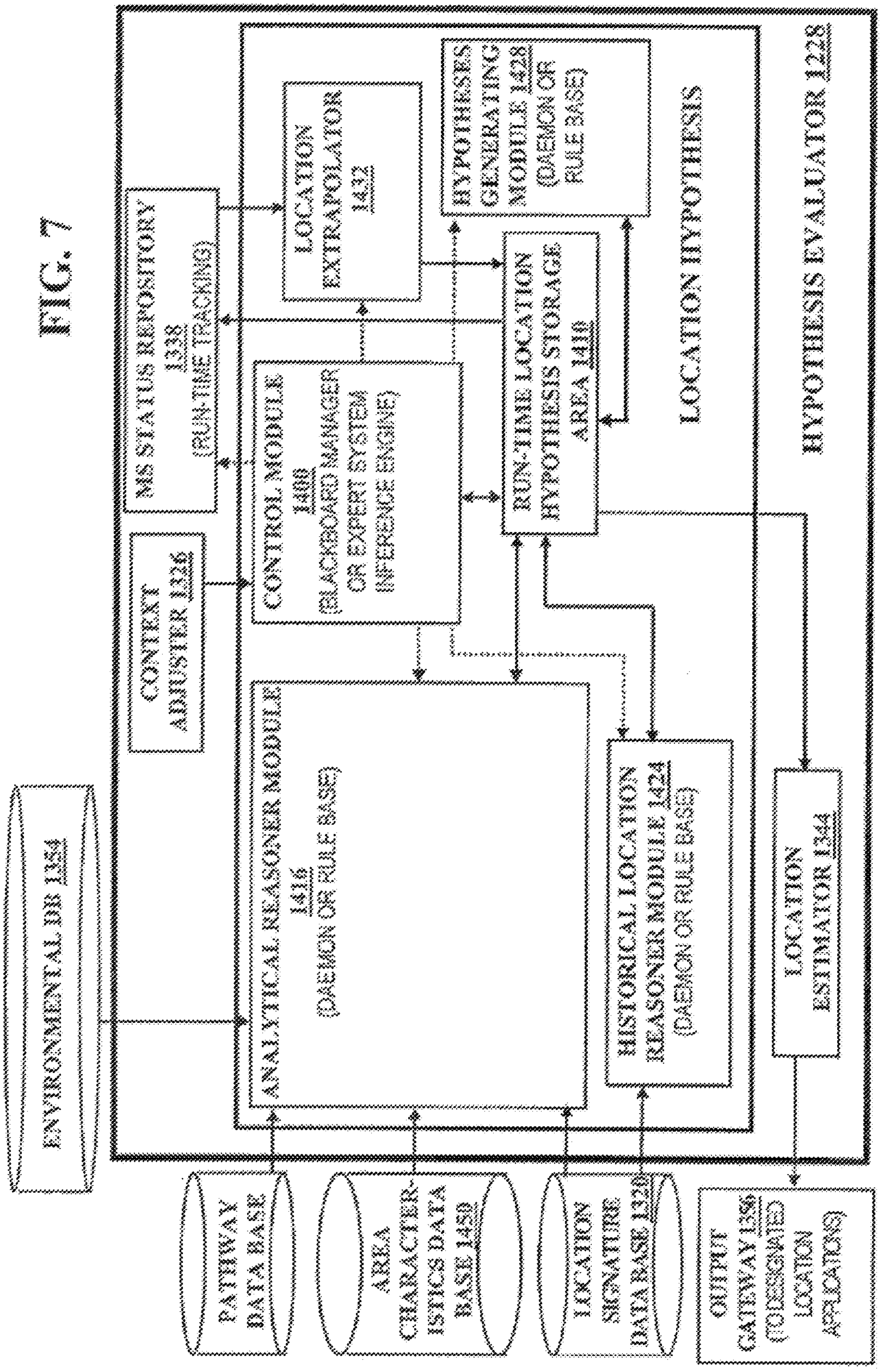
FIG. 7 is a high level block diagram of the hypothesis evaluator for the location center.
Figure 8A:
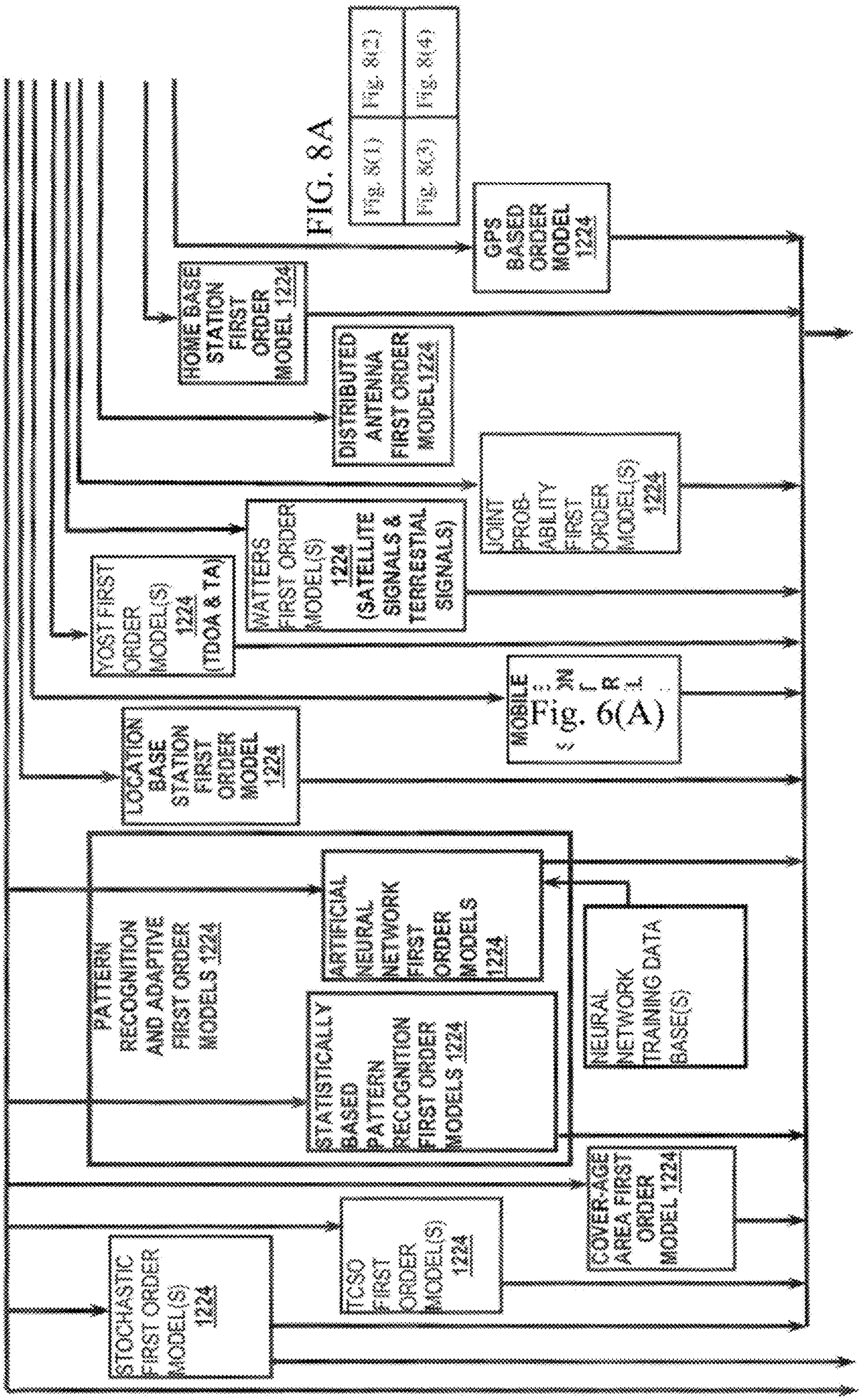
FIGS. 8A-8D is a substantially comprehensive high level block diagram illustrating data and control flows between the components of (and/or accessed by) the location center/gateway 142, as well the functionality of these components.
Figure 8B:
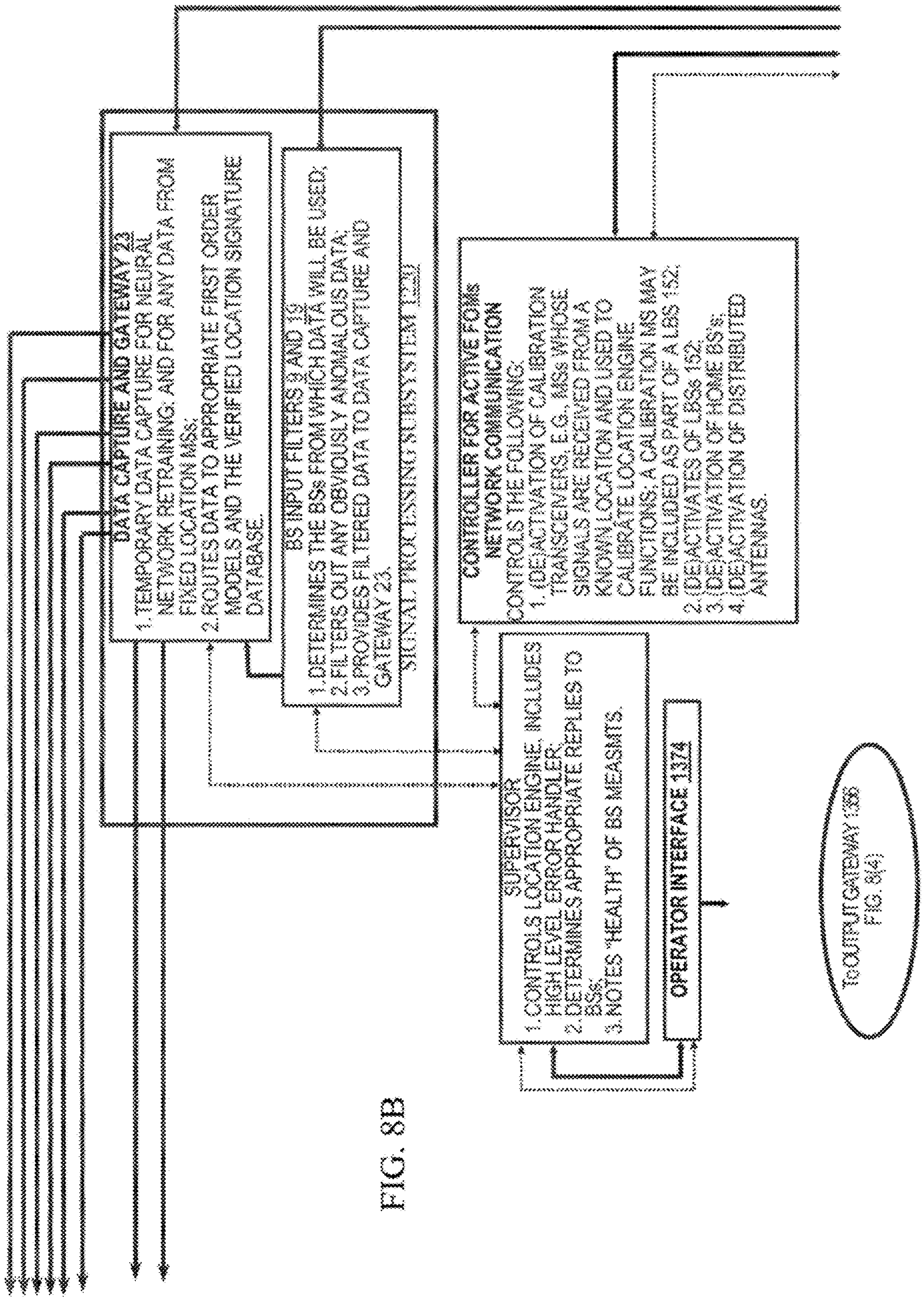
Figure 8C:
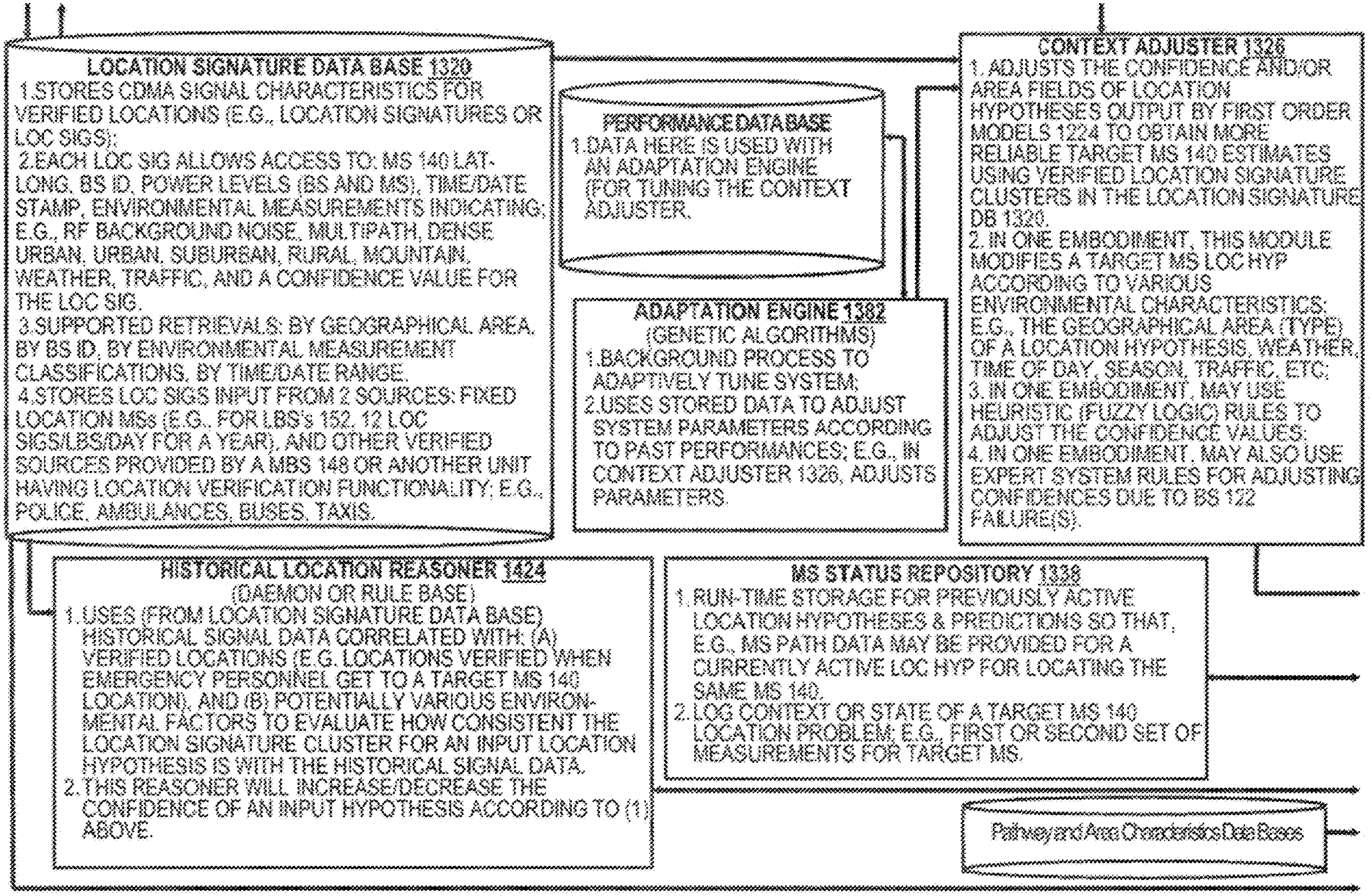
Figure 8D:
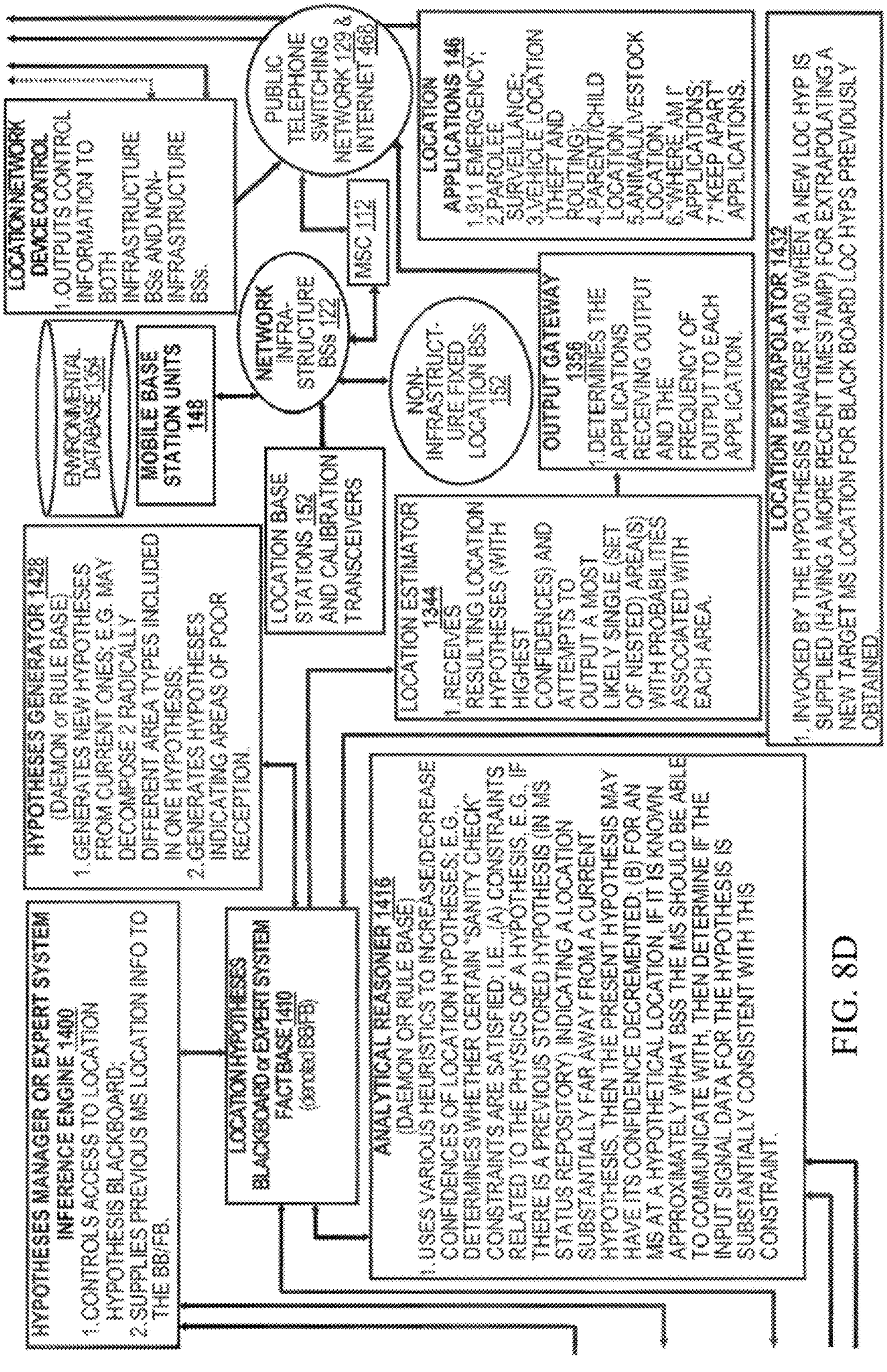
Figure 10:
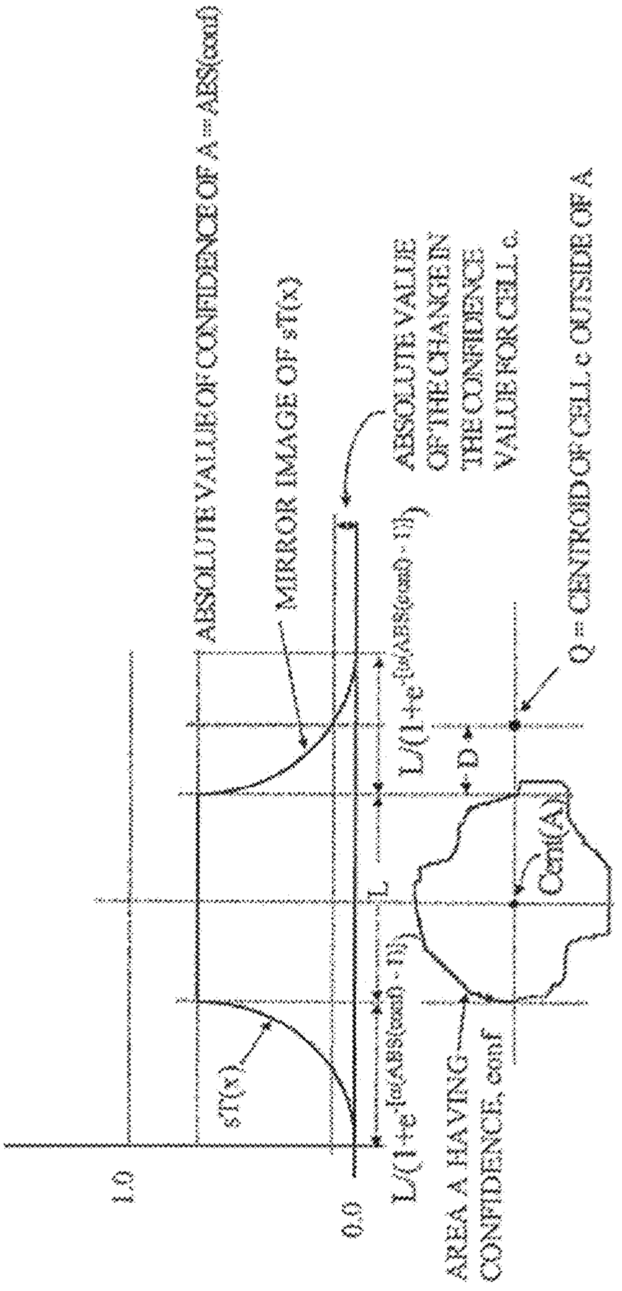
FIG. 10 is a graphical illustration of the computation performed by the most likelihood estimator 1344 of the hypothesis evaluator.

Note that in FIG. 6, (a)-(d) above are, at least at a high level, performed by utilizing the operator interface 1374.

Referring now to the output gateway 1356, this module routes target MS 140 location estimates to the appropriate location application(s). For instance, upon receiving a location estimate from the most likelihood estimator 1344, the output gateway 1356 may determine that the location estimate is for an automobile being tracked by the police and therefore must be provided must be provided according to the particular protocol.

System Tuning and Adaptation: The Adaptation Engine

A fifth functional group of location engine 139 modules provides the ability to enhance the MS locating reliability and/or accuracy of the wireless location capabilities disclosed herein by providing it with the capability to adapt to particular operating configurations, operating conditions and wireless signaling environments without performing intensive manual analysis of the performance of various embodiments of the location engine 139. That is, this functional group automatically enhances the performance of the location engine for locating MSs 140 within a particular coverage area 120 using at least one wireless network infrastructure therein. More precisely, this functional group allows the wireless location capabilities disclosed herein to adapt by tuning or optimizing certain system parameters according to location engine 139 location estimate accuracy and reliability.

There are a number location engine 139 system parameters whose values affect location estimation, and it is an aspect of the wireless location capabilities disclosed herein that the MS location processing performed should become increasingly better at locating a target MS 140 not only through building an increasingly more detailed model of the signal characteristics of location in the coverage area 120 such as discussed above regarding the location signature data base 1320, but also by providing automated capabilities for the location center processing to adapt by adjusting or "tuning" the values of such location center system parameters.

Accordingly, the wireless location capabilities disclosed herein may include a module, denoted herein as an "adaptation engine" 1382, that performs an optimization procedure on the location center 142 system parameters either periodically or concurrently with the operation of the location center in estimating MS locations. That is, the adaptation engine 1382 directs the modifications of the system parameters so that the location engine 139 increases in overall accuracy in locating target MSs 140. In one embodiment, the adaptation engine 1382 includes an embodiment of a genetic algorithm as the mechanism for modifying the system parameters. Genetic algorithms are basically search algorithms based on the mechanics of natural genetics.

Note that additional description of this aspect of the wireless location capabilities disclosed herein can be found in one of the following two copending U.S. patent applications which are incorporated herein by reference: (a) U.S. Pat. No. 7,764,231 filed Nov. 24, 1999, and (b) U.S. Pat. No. 7,274,332 filed Oct. 21, 1998.

Implementations of First Order Models

Further descriptions of various first order models 1224 are provided in this section. However, it is important to note that these are merely representative embodiments of location estimators that are within the scope of the wireless location capabilities disclosed herein. In particular, two or more of the wireless location technologies described hereinbelow may be combined to create additional First Order Models. For example, various triangulation techniques between a target MS 140 and the base station infrastructure (e.g., time difference of arrival (TDOA) or time of arrival (TOA)), may be combined with an angle of arrival (AOA) technique. For instance, if a single direct line of sight angle measurement and a single direct line of sight distance measurement determined by, e.g., TDOA or TOA can effectively location the target MS 140. In such cases, the resulting First Order Models may be more complex. However, location hypotheses may generated from such models where individually the triangulation techniques and the AOA techniques would be unable to generate effective location estimates.

Terrestrial Communication Station Offset (TCSO) First Order Models (e.g., TOA/TDOA/AOA)

As discussed in the Location Center Architecture Overview section herein above, TCSO models determine a presumed direction and/or distance (more generally, an offset) that a target MS 140 is from one or more base stations 122. In some embodiments of TCSO models, the target MS location estimate(s) generated are obtained using radio signal analysis techniques that are quite general and therefore are not capable of taking into account the peculiarities of the topography of a particular radio coverage area. For example, substantially all radio signal analysis techniques using conventional procedures (or formulas) are based on "signal characteristic measurements" such as:

(a) signal timing measurements (e.g., TOA and TDOA), and/or (b) signal strength measurements.

Furthermore, such signal analysis techniques are likely predicated on certain very general assumptions that can not fully account for signal attenuation and multipath due to a particular radio coverage area topography.

Taking CDMA or TDMA base station network as an example, each base station (BS) 122 is required to emit a constant signal-strength pilot channel pseudo-noise (PN) sequence on the forward link channel identified uniquely in the network by a pilot sequence offset and frequency assignment. It is possible to use the pilot channels of the active, candidate, neighboring and remaining sets, maintained in the target MS, for obtaining signal characteristic measurements (e.g., TOA and/or TDOA measurements) between the target MS 140 and the base stations in one or more of these sets.

Based on such signal characteristic measurements and the speed of signal propagation, signal characteristic ranges or range differences related to the location of the target MS 140 can be calculated. Using TOA and/or TDOA ranges as exemplary, these ranges can then be input to either the radius-radius multilateration or the time difference multilateration algorithms along with the known positions of the corresponding base stations 122 to thereby obtain one or more location estimates of the target MS 140. For example, if there are, four base stations 122 in the active set, the target MS 140 may cooperate with each of the base stations in this set to provide signal arrival time measurements. Accordingly, each of the resulting four sets of three of these base stations 122 may be used to provide an estimate of the target MS 140 as one skilled in the art will understand. Thus, potentially (assuming the measurements for each set of three base stations yields a feasible location solution) there are four estimates for the location of the target MS 140. Further, since such measurements and BS 122 positions can be sent either to the network or the target MS 140, location can be determined in either entity.

Since many of the signal measurements utilized by embodiments of TCSO models are subject to signal attenuation and multipath due to a particular area topography. Many of the sets of base stations from which target MS location estimates are desired may result in either no location estimate, or an inaccurate location estimate.

Accordingly, some embodiments of TCSO FOMs may attempt to mitigate such ambiguity or inaccuracies by, e.g., identifying discrepancies (or consistencies) between arrival time measurements and other measurements (e.g., signal strength), these discrepancies (or consistencies) may be used to filter out at least those signal measurements and/or generated location estimates that appear less accurate. In particular, such identifying and filtering may be performed by, for example, an expert system residing in the TCSO FOM.

Another approach for enhancing certain location techniques such as TDOA or angle or arrival (AOA) is that of super resolution as disclosed in U.S. Pat. No. 5,890,068 (also referred to as the '068 patent herein) filed on Oct. 3, 1996 having an issue date of Mar. 30, 1999 with inventors Fattouche et. al. which is incorporated by reference herein. Note that such super resolution determines, for at least one of the base stations 122 (more generally, as disclosed in the '068 patent, a wireless "monitoring site"), one of: a distance, and a time difference of arrival between the target mobile station and the base station, wherein said first technique estimates a time of arrival (TOA) of a received signal relative to a time reference at each one of a plurality of wireless signal monitoring stations using an inverse transform whose resolution is greater than Rayleigh resolution. In particular, the following portions of the '068 patent are particularly important: the Summary section, the Detailed Description portion regarding FIGS. 12-17, and the section titled "Description Of The Preferred Embodiments Of The Invention."

Another approach, regardless of the FOM utilized, for mitigating such ambiguity or conflicting MS location estimates is particularly novel in that each of the target MS location estimates is used to generate a location hypothesis regardless of its apparent accuracy. Accordingly, these location hypotheses are input to an embodiment of the context adjuster 1326. In particular, in one context adjuster 1326 embodiment each location hypothesis is adjusted according to past performance of its generating FOM 1224 in an area of the initial location estimate of the location hypothesis (the area, e.g., determined as a function of distance from this initial location estimate), this alternative embodiment adjusts each of the location hypotheses generated by a first order model according to a past performance of the model as applied to signal characteristic measurements from the same set of base stations 122 as were used in generating the location hypothesis. That is, instead of only using only an identification of the first order model (i.e., it's FOM_ID) to, for example, retrieve archived location estimates generated by the model in an area of the location hypothesis' estimate (when determining the model's past performance), the retrieval retrieves the archived location estimates that are, in addition, derived from the signal characteristics measurement obtained from the same collection of base stations 122 as was used in generating the location hypothesis. Thus, the adjustment performed by this embodiment of the context adjuster 1326 adjusts according to the past performance of the distance model and the collection of base stations 122 used.

Note in one embodiment, such adjustments can also be implemented using a pre-computed vector location error gradient field. Thus, each of the location error vectors (as determined by past performance for the FOM) of the gradient field has its starting location at a location previously generated by the FOM, and its vector head at a corresponding verified location where the target MS 140 actually was. Accordingly, for a location hypothesis of an unknown location, this embodiment determines or selects the location error vectors having starting locations within a small area (e.g., possibly of a predetermined size, but alternatively, dependent on the density of the location error vector starting locations nearby to the location hypothesis) of the location hypothesis. Additionally, the determination or selection may also be based upon a similarity of signal characteristics also obtained from the target MS 140 being located with signal characteristics corresponding to the starting locations of location error vectors of the gradient field. For example, such sign characteristics may be, e.g., time delay/signal strength multipath characteristics.

Angle of Arrival First Order Model

Various mobile station location estimating models can be based on the angle of arrival (AOA) of wireless signals transmitted from a target MS 140 to the base station infrastructure as one skilled in the art will understand. Such AOA models (sometimes also referred to as direction of arrival or DOA models) typically require precise angular measurements of the wireless signals, and accordingly utilize specialized antennas at the base stations 122. The determined signal transmission angles are subject to multipath aberrations. Therefore, AOA is most effective when there is an unimpeded line-of-sight simultaneous transmission between the target MS 140 and at least two base stations 122.

TCSO (Grubeck) FOM with Increased Accuracy Via Multiple MS Transmissions

Another TCSO first order model 1224, denoted the Grubeck model (FOM) herein, is disclosed in U.S. Pat. No. 6,009,334 filed Nov. 26, 1997 and issued Dec. 28, 1999 having Grubeck, Fischer, and Lundqvist as inventors, this patent being fully incorporated herein by reference. The Grubeck model includes a location estimator for determining more accurately the distance between a wireless receiver at (RX), e.g., a CMRS fixed location communication station (such as a BS 122) and a target MS 140, wherein wireless signals are repeatedly transmitted from the target MS 140 and may be subject to multipath. An embodiment of the Grubeck model may be applied to TOA, TDOA, and/or AOA wireless measurements. For the TOA case, the following steps are performed:

(a) transmitting "M" samples $s_i$ 1<=I<=M of the same wireless signal from, e.g., the target MS 140 to the RX. Preferably M is on the order of 50 to 100 (e.g., 70) wireless signal bursts, wherein each such burst contains a portion having an identical known contents of bits (denoted a training sequence). However, note that a different embodiment can use (e.g., 70) received bursts containing different (non-identical) information, but information still known to the RX.;

(b) receiving the "M" signal samples $s_i$ along with multipath components and noise at, e.g., RX;

(c) for each of the received "M" samples $s_i$, determining at the RX an estimated channel power profile (CPPi). Each CPPi is determined by first determining, via a processor at the RX, a combined correlation response ("Channel Impulse Response" or CIRi) of a small number of the bursts (e.g., 5) by correlating each burst with its known contents.

Accordingly; the squared absolute value of the CIRi is the "estimated channel power profile" or CPPi;

(d) (randomly) selecting "N" (e.g., 10) out of the "M" received samples;

(e) performing incoherent integration of the CPPi for the "N" samples selected, which results in an integrated signal, i.e., one integrated channel power profile_ICPP (Ni);

(f) determining if the signal-to-noise quality of the ICPP (Ni) is greater than or equal to a predetermined threshold value, and if not, improving the signal-to-noise quality of ICPP(Ni) as required, by redoing the incoherent integration with successively one additional received sample CPPi until the signal-to-noise quality of the ICPP(Ni) is greater than or equal to the predetermined threshold value;

(g) determining the TOA(i), including the case of determining TOA(i) from the maximum signal amplitude;

(h) entering the determined TOA(i) value into a diagram that shows a frequency of occurrence as a function of TOA(i);

(i) repeating the whole procedure "X" times by selecting a new combination of "N" out of "M" samples, which results in "X" additional points in the frequency of occurrence diagram;

(j) reading the minimum value TOA(min) as the time value having "z" of all occurrences with higher TOA(i) values and "1-z" of all occurrences with lower TOA(i) values, where $z>0.7$.

As mentioned above, an embodiment of the Grubeck FOM may also be provides for TDOA and/or AOA wireless location techniques, wherein a similar incoherent integration may be performed.

Note that a Grubeck FOM may be particularly useful for locating a target MS 140 in a GSM wireless network.

TCSO (Parl) FOM Using Different Tones and Multiple Antennas at BSs 122

A first order model 1224, denoted the Parl model herein, is substantially disclosed in U.S. Pat. No. 5,883,598 (denoted the '598 Patent herein) filed Dec. 15, 1995 and issued Mar. 16, 1999 having Parl, Bussgang, Weitzen and Zagami as inventors, this patent being fully incorporated herein by reference. The Parl FOM includes a system for receiving representative signals (denoted also "locating signal(s)") from the target MS 140 via, e.g., base stations 122 and subsequently combining information regarding the amplitude and phase of the MS transmitted signals received at the base stations to determine the position of the target MS 140. In one embodiment, the Parl model uses input from a locating signal having two or more single-frequency tones, as one skilled in the art will understand. Moreover, at least some of the base stations 122 preferably include at least two antennas spaced from each other by a distance between a quarter wavelength and several wavelengths of the wireless locating signals received from the target MS 140. Optionally, another antenna vertically above or below the two or more antennas also spaced by a distance of between a quarter wavelength and several wavelengths can be used where elevation is also being estimated. The base stations 122 sample locating signals from the target MS 140. The locating signals include tones that can be at different frequencies. The tones can also be transmitted at different times, or, in an alternative embodiment, they can be transmitted simultaneously. Because, in one embodiment, only single-frequency tones are used as the locating signal instead of modulated signals, substantial transmission circuitry may be eliminated. The Parl FOM extracts information from each representative signal received from a target MS 144, wherein at least some of the extracted information is related to the amplitude and phase of the received signal.

In one embodiment of a Parl FOM, related to the disclosure in the '598 Patent, when the locations of the BSs 122 are known, and the direction from any two of the BSs 122 to the target MS 140, the MS's location can be initially (roughly) determined by signal direction finding techniques. For example, an estimate of the phase difference between the signals at a pair of antennas at any BS 122 (having two such antennas) can lead to the determination of the angle from the base station to the target MS 140, and thus, the determination of the target MS direction. Subsequently, an enhanced location of the target MS 140 is computed directly from received target MS signal data using an ambiguity function A(x,y) described in the '598 Patent, wherein for each point at x,y, the ambiguity function A(x,y) depends upon the probability that the MS is located at the geolocation represented by (x,y). Essentially the Parl FOM combines angle of arrival related data and TDOA related data for obtaining an optimized estimate of the target MS 140. However, it appears that independent AOA and TDOA MS locations are not used in determining a resulting target MS location (e.g., without the need for projecting lines at angles of arrival or computing the intersection of hyperbolas defined by pairs of base stations). Instead, the Parl FOM estimates the target MS's location by minimizing a joint probability of location related errors. In particular, such minimization may use the mean square error, and the location (x, y) at which minimization occurs is taken as the estimate of the target MS 140. In particular, the ambiguity function A(x,y) defines the error involved in a position determination for each point in a geolocation Cartesian coordinate system. The Parl model optimizes the ambiguity function to select a point x,y at which the associated error is minimized. The resulting location for (x, y) is taken as the estimate of the location of the target MS 140. Any of several different optimization procedures can be used to optimize the ambiguity function A(x,y). E.g., a first rough estimate of the target MS's location may be obtained by direction finding (as discussed above). Next, six points x,y may be selected that are in close proximity to the estimated point. The ambiguity function A(x,y) is solved for each of the x,y points to obtain six values. The six computed values are then used to define a parabolic surface. The point x,y at which the maximum value of the parabolic surface occurs is then taken as the estimate of the target MS 140. However, other optimization techniques may also be used. For example, a standard technique such as an iterative progression through trial and error to converge to the maximum can be used. Also, gradient search can be used to optimize the ambiguity function. In the case of three-dimensional location, the two-dimensional ambiguity function A(x,y) is extended to a three-dimensional function A(x,y,z). As in the two-dimensional case, the ambiguity function may be optimized to select a point x,y,z as the best estimate of the target MS's location in three dimensions. Again, any of several known optimization procedures, such as iterative progression through trial and error, gradient search, etc., can be used to optimize the ambiguity function.

TCSO FOM Using TDOA/AOA Measurements from an MBS 148 and/or an LBS 152

It is believed that from the location center/gateway 142 architecture and from the architecture of the mobile station location subsystem (described in a separate section hereinbelow) that target MS 140 location related information can be obtained from an MBS 148 and/or one or more LBSs 152. Moreover, such location related information can be supplied to any FOM 1224 that is able to accept such information as input. Thus, pattern recognition and adaptive FOMs may accept such information. However, to provide an alternative description of how MS location related information from an MBS and/or LBS may be used, reference is made to U.S. Pat. No. 6,031,490 (denoted the '490 Patent herein) filed Dec. 23, 1997 and issued Feb. 29, 2000 having Forssen, Berg and Ghisler as inventors, this patent being fully incorporated herein by reference. A TCSO FOM (denoted the FORSSEN FOM herein) using TDOA/AOA is disclosed in the '490 Patent.

The FORSSEN FOM includes a location estimator for determining the Time Difference of Arrival (TDOA) of the position of a target MS 140, which is based on Time of Arrival (TOA) and/or AOA measurements. This FOM uses data received from "measuring devices" provided within a wireless telecommunications network. The measuring devices measure TOA on demand and (optionally) Direction of Arrival (DOA), on a digital uplink time slot or on digital information on an analog uplink traffic channel in one or more radio base stations. The TOA and DOA information and the traffic channel number are reported to a Mobile Services Switching Center (MSC), which obtains the identity of the target MS 140 from the traffic channel number and sends the target MS 140 identity and TOA and DOA measurement information to a Service Node (e.g., location center 142) of the network. The Service Node calculates the position of the target MS 140 using the TOA information (supplemented by the DOA information when available). Note, that the FORSSEN model may utilize data from a second mobile radio terminal that is colocated on a mobile platform (auto, emergency vehicle, etc.) with one of the radio base stations (e.g., MBS 148), which can be moved into relatively close proximity with the target MS 140. Consequently, by moving one of the radio base stations (MBSs) close to the region of interest (near the target MS 140), the position determination accuracy is significantly improved.

Note that the '490 Patent also discloses techniques for rising the target MS's transmission power for thereby allowing wireless signals from the target MS to be better detected by distant BSs 122.

Coverage Area First Order Model

Radio coverage area of individual base stations 122 may be used to generate location estimates of the target MS 140. Although a first order model 1224 based on this notion may be less accurate than other techniques, if a reasonably accurate RF coverage area is known for each (or most) of the base stations 122, then such a FOM (denoted hereinafter as a "coverage area first order model" or simply "coverage area model") may be very reliable. To determine approximate maximum radio frequency (RF) location coverage areas, with respect to BSs 122, antennas and/or sector coverage areas, for a given class (or classes) of (e.g., CDMA or TDMA) mobile station(s) 140, location coverage should be based on an MS's ability to adequately detect the pilot channel, as opposed to adequate signal quality for purposes of carrying user-acceptable traffic in the voice channel. Note that more energy is necessary for traffic channel activity (typically on the order of at least −94 to −104 dBm received signal strength) to support voice, than energy needed to simply detect a pilot channel's presence for location purposes (typically a maximum weakest signal strength range of between −104 to −110 dBm), thus the "Location Coverage Area" will generally be a larger area than that of a typical "Voice Coverage Area", although industry studies have found some occurrences of "no-coverage" areas within a larger covered area The approximate maximum RF coverage area for a given sector of (more generally angular range about) a base station 122 may be represented as a set of points representing a polygonal area (potentially with, e.g., holes therein to account for dead zones and/or notches). Note that if such polygonal RF coverage area representations can be reliably determined and maintained over time (for one or more BS signal power level settings), then such representations can be used in providing a set theoretic or Venn diagram approach to estimating the location of a target MS 140. Coverage area first order models utilize such an approach.

One embodiment, a coverage area model utilizes both the detection and non-detection of base stations 122 by the target MS 140 (conversely, of the MS by one or more base stations 122) to define an area where the target MS 140 may likely be. A relatively straightforward application of this technique is to:

(a) find all areas of intersection for base station RF coverage area representations, wherein: (i) the corresponding base stations are on-line for communicating with MSs 140; (ii) the RF coverage area representations are deemed reliable for the power levels of the on-line base stations; (iii) the on-line base stations having reliable coverage area representations can be detected by the target MS; and (iv) each intersection must include a predetermined number of the reliable RF coverage area representations (e.g., 2 or 3); and (b) obtain new location estimates by subtracting from each of the areas of intersection any of the reliable RF coverage area representations for base stations 122 that can not be detected by the target MS.

Accordingly, the new areas may be used to generate location hypotheses.

Satellite Signal Triangulation First Order Models

As mentioned hereinabove, there are various satellite systems that may be used to provide location estimates of a target MS 140 (e.g., GPS, GLONASS, LEOs, and MEOs). In many cases, such location estimates can be very accurate, and accordingly such accuracy would be reflected in the wireless location capabilities disclosed herein by relatively high confidence values for the location hypotheses generated from such models in comparison to other FOMs. However, it may be difficult for the target MS 140 to detect and/or lock onto such satellite signals sufficiently well to provide a location estimate. For example, it may be very unlikely that such satellite signals can be detected by the MS 140 in the middle of high rise concrete buildings or parking structures having very reduced exposure to the sky.

Hybrid Satellite and TCSO FOMs

A first order model 1224, denoted the WATTERS FOM herein, is disclosed in U.S. Pat. No. 5,982,324 filed May 14, 1998 and issued Nov. 9, 1999 having Watters, Strawczynski, and Steer as inventors, this patent being fully incorporated herein by reference. The WATTERS FOM includes a location estimator for determining the location of a target MS 140 using satellite signals to the target MS 140 as well as delay in wireless signals communicated between the target MS and base stations 122. For example, aspects of global positioning system (GPS) technology and cellular technology are combined in order to locate a target MS 140. The WATTERS FOM may be used to determine target MS location in a wireless network, wherein the network is utilized to collect differential GPS error correction data, which is forwarded to the target MS 140 via the wireless network. The target MS 140 (which includes a receiver R for receiving non-terrestrial wireless signals from, e.g., GPS, or other satellites, or even airborne craft) receives this data, along with GPS pseudoranges using its receiver R, and calculates its position using this information. However, when the requisite number of satellites are not in view of the MS 140, then a pseudosatellite signal, broadcast from a BS 122 of the wireless network, is received by the target MS 140 and processed as a substitute for the missing satellite signal. Additionally, in at least some circumstances, when the requisite number of satellites (more generally, non-terrestrial wireless transmitters) are not detected by the receiver R, then the target MS's location is calculated using the wireless network infrastructure via TDOA/TOA with the BSs 122 of the network. When the requisite number of satellites (more generally, non-terrestrial wireless transmitters) are again detected by the receiver R, then the target MS is again calculated using wireless signals from the non-terrestrial wireless transmitters. Additionally, the WATTERS FOM may use wireless signals already being transmitted from base stations 122 to the target MS 140 in a wireless network to calculate a round trip time delay, from which a distance calculation between the base station and the target MS can be made. This distance calculation substitutes for a missing non-terrestrial transmission signal.

Location Base Station First Order Model

In the location base station (LBS) model (FOM 1224), a database is accessed which contains electrical, radio propagation and coverage area characteristics of each of the location base stations in the radio coverage area. The LBS model is an active model, in that it can probe or excite one or more particular LBSs 152 in an area for which the target MS 140 to be located is suspected to be placed. Accordingly, the LBS model may receive as input a most likely target MS 140 location estimate previously output by the location engine 139 of the wireless location capabilities disclosed herein, and use this location estimate to determine which (if any) LBSs 152 to activate and/or deactivate for enhancing a subsequent location estimate of the target MS. Moreover, the feedback from the activated LBSs 152 may be provided to other FOMs 1224, as appropriate, as well as to the LBS model. However, it is an important aspect of the LBS model that when it receives such feedback, it may output location hypotheses having relatively small target MS 140 location area estimates about the active LBSs 152 and each such location hypothesis also has a high confidence value indicative of the target MS 140 positively being in the corresponding location area estimate (e.g., a confidence value of 0.9 to +1), or having a high confidence value indicative of the target MS 140 not being in the corresponding location area estimate (i.e., a confidence value of −0.9 to −1). Note that in some embodiments of the LBS model, these embodiments may have functionality similar to that of the coverage area first order model described above. Further note that for LBSs within a neighborhood of the target MS wherein there is a reasonable chance that with movement of the target MS may be detected by these LBSs, such LBSs may be requested to periodically activate. (Note, that it is not assumed that such LBSs have an on-line external power source; e.g., some may be solar powered). Moreover, in the case where an LBS 152 includes sufficient electronics to carry voice communication with the target MS 140 and is the primary BS for the target MS (or alternatively, in the active or candidate set), then the LBS model will not deactivate this particular LBS during its procedure of activating and deactivating various LBSs 152.

Stochastic First Order Model

The stochastic first order models may use statistical prediction techniques such as principle decomposition, partial least squares, partial least squares, or other regression techniques for predicting, for example, expected minimum and maximum distances of the target MS from one or more base stations 122, e.g., Bollenger Bands. Additionally, some embodiments may use Markov processes and Random Walks (predicted incremental MS movement) for determining an expected area within which the target MS 140 is likely to be. That is, such a process measures the incremental time differences of each pilot as the MS moves for predicting a size of a location area estimate using past MS estimates such as the verified location signatures in the location signature data base 1320.

Pattern Recognition and Adaptive First Order Models

It is a particularly important aspect of the wireless location capabilities disclosed herein to provide:

(a) one or more FOMs 1224 that generate target MS 140 location estimates by using pattern recognition or associativity techniques, and/or (b) one or more FOMs 1224 that are adaptive or trainable so that such FOMs may generate increasingly more accurate target MS location estimates from additional training.

Statistically Based Pattern Recognition First Order Models

Regarding FOMs 1224 using pattern recognition or associativity techniques, there are many such techniques available. For example, there are statistically based systems such as "CART" (acronym for Classification and Regression Trees) by ANGOSS Software International Limited of Toronto, Canada that may be used for automatically for detecting or recognizing patterns in data that were not provided (and likely previously unknown). Accordingly, by imposing a relatively fine mesh or grid of cells of the radio coverage area, wherein each cell is entirely within a particular area type categorization, such as the transmission area types (discussed in the section, "Coverage Area: Area Types And Their Determination" above), the verified location signature clusters within the cells of each area type may be analyzed for signal characteristic patterns. Accordingly, if such a characteristic pattern is found, then it can be used to identify one or more of the cells in which a target MS is likely to be located. That is, one or more location hypotheses may be generated having target MS 140 location estimates that cover an area having the identified cells wherein the target MS 140 is likely to be located. Further note that such statistically based pattern recognition systems as "CART" include software code generators for generating expert system software embodiments for recognizing the patterns detected within a training set (e.g., the verified location signature clusters).

A related statistical pattern recognition FOM 1224 is also disclosed in U.S. Pat. No. 6,026,304, filed Jan. 8, 1997 and issued Feb. 15, 2000, having Hilsenrath and Wax as inventors, this patent (denoted the Hilsenrath patent herein) being incorporated herein fully by reference. An embodiment of a FOM 1224 based on the disclosure of the Hilsenrath patent is referred to herein as the Hilsenrath FOM. The Hilsenrath FOM includes a wireless location estimator that locates a target MS 140 using measurements of multipath signals in order to accurately determine the location of the target MS 140. More particularly, to locate the target MS 140, the Hilsenrath FOM uses wireless measurements of both a direct signal transmission path and multipath transmission signals from the MS 140 to a base station 122 receiver. The wireless signals from the target MS 140 arrive at and are detected by an antenna array of the receiver at the BS 122, wherein the antenna array includes a plurality of antennas. A signal signature (e.g., an embodiment of a location signature herein) for this FOM may be derived from any combination of amplitude, phase, delay, direction, and polarization information of the wireless signals transmitted from the target MS 140 to the base station 122 receiver. The Hilsenrath FOM 1224 determines a signal signature from a signal subspace of a covariance matrix. In particular, for p antennas included in the base station receiver, these antennas are used to receive complex signal envelopes $x_{.1}(t)$, $x_{.2}(t)$, . . . , $x_{.p}(t)$, respectively, which are conventionally grouped together to form a p-dimensional array vector $x(t)=[x_1(t), x_2(t), \ldots, x_{.p}(t)]^T$. The signal subspace may be determined from a collection of M such array vectors x(t) by several techniques. In one such technique, the outer products of the M vectors are added together to form a pxp signal covariance matrix, $R=1/M\,[x(t_1)\times(t_1)^H+\ldots+x(t_M)\times(t_M)^H]$. The eigenvalues of R whose magnitudes exceed a predetermined threshold determine a set of dominant eigenvectors. The signal subspace is the space spanned by these dominant eigenvectors. The signal signature is compared to a database of calibrated signal signatures and corresponding locations (e.g., an embodiment of the location signature data base 1320), wherein the signal signatures in the database include representations of the signal subspaces (such as the dominant eigenvectors of the covariance matrices. Accordingly, a location whose calibrated signature best matches the signal signature of the target MS 140 is selected as the most likely location of the target MS 140. Note that the database of calibrated signal signatures and corresponding verified locations is generated by a calibration procedure in which a calibrating MS 140 transmits location data derived from a co-located GPS receiver to the base stations 122. Thus, for each of a plurality of locations distributed through a service area, the location has associated therewith: the (GPS or verified) location information and the corresponding signal signature of the calibrating MS 140.

Accordingly, the location of a target MS 140 in the service area may be determined as follows. Signals originating from the target MS 140 at an unknown location are received at a base station 122. A signal processor, e.g., at the base station 122, then determines the signal signature as described above. The signal signature is then compared with the calibrated signal signatures stored in the above described embodiment of the location signature database 1320 during the calibration procedure. Using a measure of difference between subspaces (e.g., an angle between subspaces), a set of likely locations is selected from this location signature database embodiment. These selected likely locations are those locations whose associated calibrated signal signatures differ by less than a minimum threshold value from the target MS 140 signal signature. The difference measure is further used to provide a corresponding measure of the probability that each of the selected likely locations is the actual target MS location. Moreover, for one or more of the selected likely location, the corresponding measure may be output as the confidence value for a corresponding location hypothesis output by a Hilsenrath FOM 1224.

Thus, an embodiment of the wireless location capabilities disclosed herein using such a Hilsenrath FOM 1224 performs the following steps (a)-(d):

(a) receiving at an antenna array provided at one of the base stations 122, signals originating from the target MS 140, wherein the signals comprise p-dimensional array vectors sampled from p antennas of the array;

(b) determining from the received signals, a signal signature, wherein the signal signature comprises a measured subspace, wherein the array vectors x(t) are approximately confined to the measured subspace;

(c) comparing the signal signature to previously obtained (and similarly computed) signal signatures, wherein each of the previously obtained signal signatures, SS, has associated therewith corresponding location data verifying the location where SS was obtained, wherein this step of comparing comprises substep of calculating differences between: (i) the measured subspace, and (ii) a similarly determined subspace for each of a plurality of the previously obtained signal signatures; and (d) selecting from the previously obtained signal signatures a most likely signal signature and a corresponding most likely location of the target MS 140 by using the calculated differences;

Note that regardless of the reliability some FOMs as described here may not be exceedingly accurate, but may be very reliable. Thus, since an aspect of at least some embodiments of the wireless location capabilities disclosed herein is to use a plurality of MS location techniques (FOMs) for generating location estimates and to analyze the generated estimates (likely after being adjusted) to detect patterns of convergence or clustering among the estimates, even large MS location area estimates may be useful. For example, it can be the case that four different and relatively large MS location estimates, each having very high reliability, have an area of intersection that is acceptably precise and inherits the very high reliability from each of the large MS location estimates from which the intersection area was derived.

Note, that another statistically based FOM 1224 may be provided wherein the radio coverage area is decomposed substantially as above, but in addition to using the signal characteristics for detecting useful signal patterns, the specific identifications of the base station 122 providing the signal characteristics may also be used. Thus, assuming there is a sufficient density of verified location signature clusters in some of the mesh cells so that the statistical pattern recognizer can detect patterns in the signal characteristic measurements, an expert system may be generated that outputs a target MS 140 location estimate that may provide both a reliable and accurate location estimate of a target MS 140.

Adaptive/Trainable First Order Models

The term adaptive is used to describe a data processing component that can modify its data processing behavior in response to certain inputs that are used to change how subsequent inputs are processed by the component. Accordingly, a data processing component may be "explicitly adaptive" by modifying its behavior according to the input of explicit instructions or control data that is input for changing the component's subsequent behavior in ways that are predictable and expected. That is, the input encodes explicit instructions that are known by a user of the component. Alternatively, a data processing component may be "implicitly adaptive" in that its behavior is modified by other than instructions or control data whose meaning is known by a user of the component. For example, such implicitly adaptive data processors may learn by training on examples, by substantially unguided exploration of a solution space, or other data driven adaptive strategies such as statistically generated decision trees. Accordingly, it is an aspect of the wireless location capabilities disclosed herein to utilize not only explicitly adaptive MS location estimators within FOMs 1224, but also implicitly adaptive MS location estimators. In particular, artificial neural networks (also denoted neural nets and ANNs herein) are used in some embodiments as implicitly adaptive MS location estimators within FOMs. Thus, in the sections below, neural net architectures and their application to locating an MS is described.

Artificial Neural Networks for MS Location

Artificial neural networks may be particularly useful in developing one or more first order models 1224 for locating an MS 140, since, for example, ANNs can be trained for classifying and/or associatively pattern matching of various RF signal measurements such as the location signatures. That is, by training one or more artificial neural nets using RF signal measurements from verified locations so that RF signal transmissions characteristics indicative of particular locations are associated with their corresponding locations, such trained artificial neural nets can be used to provide additional target MS 140 location hypotheses. Moreover, it is an aspect of the wireless location capabilities disclosed herein that the training of such artificial neural net based FOMs (ANN FOMs) is provided without manual intervention as will be discussed hereinbelow. Additional description of this aspect of the wireless location capabilities disclosed herein can be found in the copending U.S. patent application titled "Location Of A Mobile Station" filed Nov. 24, 1999 having application Ser. No. 09/194,367 whose inventors are D. J. Dupray and C. L. Karr, which is incorporated herein by reference and wherein this copending patent application may have essential material for the wireless location capabilities disclosed herein. In particular, this copending patent application may have essential material relating to the use of ANNs as mobile station location estimators 1224.

Other First Order Models

Figure 2:
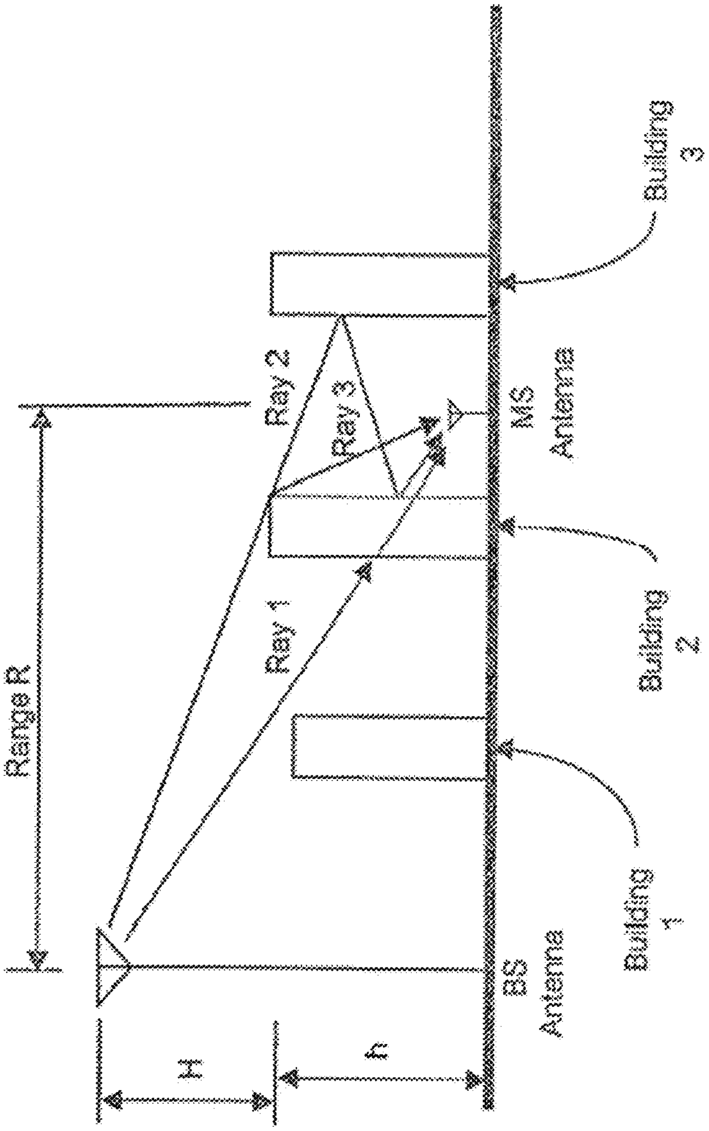
FIG. 2 shows aspects of the two-ray radio propagation model and the effects of urban clutter.
Figure 3:
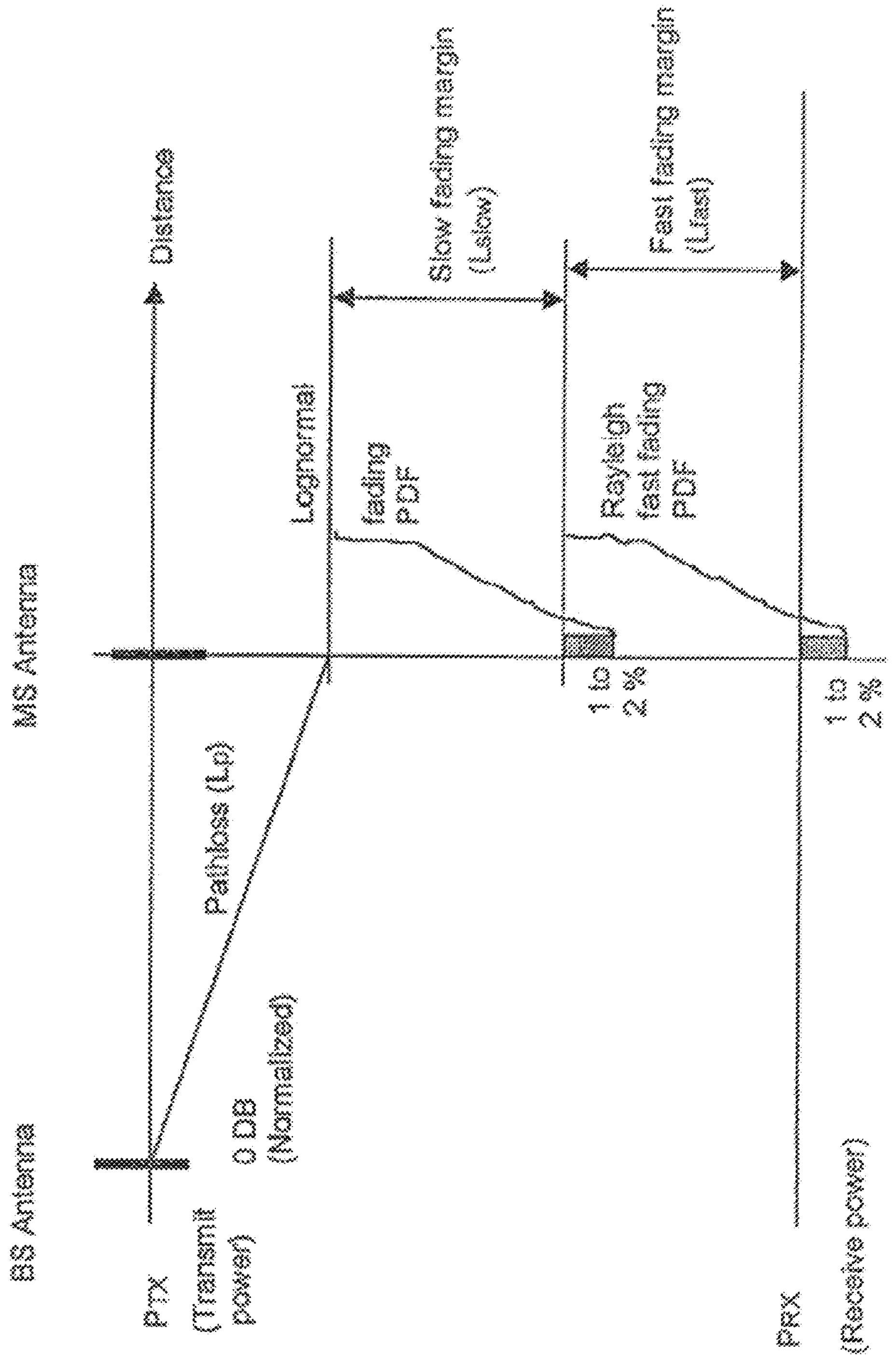
FIG. 3 provides a typical example of how the statistical power budget is calculated in design of a Commercial Mobile Radio Service Provider network.

U.S. Pat. No. 5,390,339 ('339 patent) filed Oct. 23, 1991 having an issue date of Feb. 14, 1995 with inventor being Bruckert et. al. provides number of embodiments of wireless location estimators for estimating the location of a "remote unit." In particular, various location estimator embodiments are described in relation to FIGS. 1B and 2B therein. The location estimators in the '339 patent are, in general, directed to determining weighted or adjusted distances of the "remote unit" (e.g., MS 140) from one or more "transceivers" (e.g., base stations 122). The distances are determined using signal strength measurements of wireless signals transmitted between the "remote unit" and the "transceivers." However, adjustments are in the signal strengths according to various signal transmission anomalies (e.g., co-channel interference), impairments and/or errors. Additionally, a signal RF propagation model may be utilized, and a likelihood of the "remote unit" being in the designated coverage areas (cells) of particular transceivers (e.g., base stations 122) is determined using probabilistic techniques such as posteriori probabilities. Accordingly, the Bruckert '339 patent is fully incorporated by reference herein and may contain essential material for the wireless location capabilities disclosed herein.

U.S. Pat. No. 5,570,412 ('412 patent) filed Sep. 28, 1994 having an issue date of Oct. 29, 1996 with inventors LeBlanc et. al. provides further embodiments of wireless location estimators that may be used as First Order Models 1224. The location estimating techniques of the LeBlanc '412 patent are described with reference to FIG. 8 and succeeding figures therein. At a high level, wireless location techniques of the '412 patent can be characterized by the following quote therefrom:

> "The location processing of the wireless location capabilities disclosed herein focuses on the ability to predict and model RF contours using actual RF measurements, then performing data reduction techniques such as curve fitting technique, Bollinger Bands, and Genetic Algorithms, in order to locate a mobile unit and disseminate its location."

Accordingly, the LeBlanc '412 patent is fully incorporated by reference herein and may contain essential material for the wireless location capabilities disclosed herein.

U.S. Pat. No. 5,293,645 ('645 patent) filed Oct. 4, 1991 having an issue date of Mar. 8, 1994 with inventor Sood. provide further embodiments of wireless location estimators that may be used as First Order Models 1224. In particular, the '645 patent describes wireless location estimating techniques using triangulations or other geographical intersection techniques. Further, one such technique is described in column 6, line 42 through column 7, line 7. Accordingly, the Sood '645 patent is fully incorporated by reference herein and may contain essential material for the wireless location capabilities disclosed herein.

U.S. Pat. No. 5,293,642 ('642 patent) filed Dec. 19, 1990 having an issue date of Mar. 8, 1994 with inventor Lo provide further embodiments of wireless location estimators that may be used as First Order Models 1224. In particular, the '642 patent determines a corresponding probability density function (pdf) about each of a plurality of base stations in communication with the target MS 140. That is, upon receiving wireless signal measurements from the transmissions between the target MS 140 and base stations 122, for each BS 122, a corresponding pdf is obtained from prior measurements of a particular wireless signal characteristic at locations around the base station. Subsequently, a most likely location estimation is determined from a joint probability density function of the individual base station probability density functions. Further description can be found in the Description Of The Preferred Embodiment section of the '642 patent. Accordingly, the Lo '642 patent is incorporated by reference herein and may contain essential material for the wireless location capabilities disclosed herein.

Hybrid First Order Models

Time Difference of Arrival and Timing Advance FOM

A first order model 1224 denoted the Yost model herein. The Yost model includes a location estimator that uses a combination of Time Difference of Arrival (TDOA) and Timing Advance (TA) location determining techniques for determining the location of a target MS 140, wherein there are minor modifications to a telecommunication network such as a CMRS. The hybrid wireless location technique utilized by this location estimator uses TDOA measurements and TA measurements to obtain substantially independent location estimates of the target MS 140, wherein the TDOA measurements determine hyperbolae MS loci, about base stations 122 communicating (uni or bi-directionally) with the target MS, and the TA measurements determine circles about the base stations 122. Accordingly, an enhanced location estimate of the MS 140 can be obtained by using a least squares (or other statistical technique), wherein the least-squares technique determines a location for the MS between the various curves (hyperbolae and circles) that best approximates a point of intersection. Note that TA is used in all Time Division Multiple Access (TDMA) systems as one skilled in the art will understand, and measurements of TA can provide a measurement of the distance of the MS from a TDMA communication station in communication with the target MS 140. The Yost model is disclosed in U.S. Pat. No. 5,987,329 ('329 Patent) filed Jul. 30, 1997 and issued Nov. 16, 1999 having Yost and Panchapakesan as inventors, this patent being fully incorporated herein fully by reference to thereby further describe the Yost model. The following quote from the '329 Patent describes an important aspect of the Yost model:

> "Furthermore, the combination of TA and TDOA allows resolution of common ambiguities suffered by either technique separately. For example, in FIG. 5 a situation involving three base stations 24 (A, B and C as described, the latter being visible in the figure) is represented along with the resultant two hyperbolas AB and AC (and redundant hyperbola BC) for a TDOA position determination of the mobile M. FIG. 5 is a magnified view of the mobile terminal M location showing the nearby base stations and the nearby portions at the curves. It should be understood that, in this case, using TDOA alone, there are two possible solutions, where the hyperbolae cross. The addition of the TA circles (dashed curves) will allow the ambiguous solutions, which lie at different TA from all three base stations, to be clearly resolved without the need for additional base station 24 measurements."

As an aside note that a timing advance (TA) first order model may be provided as a separate FOM independent from the TDOA portion of the Yost model. Thus, if an embodiment of the wireless location capabilities disclosed herein includes both a TA FOM and a TDOA FOM, then the multiple location estimator architecture of the wireless location capabilities disclosed herein may substantially include the Yost model whenever the TA FOM and TDOA FOM are both activated for a same location instance of a target MS 140. However, it is an aspect of the wireless location capabilities disclosed herein to also activate such a TA FOM and a TDOA FOM asynchronously from one another.

Satellite and Terrestrial Base Station Hybrid FOM

A first order model 1224, denoted the Sheynblat model (FOM) herein, is disclosed in U.S. Pat. No. 5,999,124 (denoted the '124 Patent herein) filed Apr. 22, 1998 and issued Dec. 7, 1999 having Sheynblat as the inventor, this patent being fully incorporated herein by reference The Sheynblat FOM provides a location estimator for processing target MS 140 location related information obtained from: (a) satellite signals of a satellite positioning system (denoted SPS in the '124 Patent) (e.g., GPS or GLONASS, LEO positioning satellites, and/or MEO positioning satellites), and (b) communication signals transmitted in the terrestrial wireless cellular network of BSs 122 for a radio coverage area, e.g., coverage area 120 (FIG. 4), wherein there is two-way wireless communication between the target MS 140 and the BSs. In one embodiment of the Sheynblat FOM, the location related information obtained from the satellite signals includes a representation of a time of travel of SPS satellite signals from a SPS satellite to a corresponding SPS receiver operatively coupled to (and co-located with) the target MS 140 (such "time of travel" is referred to as a pseudorange to the SPS satellite). Additionally for this embodiment, the location related information obtained from the communication signals in the wireless cellular network includes time of travel related information for a message in the communication signals between a BS 122 transceiver and the target MS 140 (this second "time of travel" related information is referred to as a cellular pseudorange). Accordingly, various combinations of pseudoranges to SPS satellites, and cellular pseudoranges can be used to determine a likely location of the target MS 140. As an example, if the target MS 140 (enhanced with a SPS receiver) can receive SPS satellite signals from one satellite, and additionally, the target MS is also in wireless communication (or can be in wireless communication) with two BSs 122, then three pseudoranges may be obtained and used to determine the position of the target MS by, e.g., triangulation. Of course, other combinations are possible for determining a location of the target MS 140, e.g., pseudoranges to two SPS satellites and one cellular pseudorange. Additionally, various techniques may be used to mitigate the effects of multipath on these pseudoranges. For example, since it is typical for the target MS 140 to detect (or be detected by) a plurality of BSs 122, a corresponding plurality of cellular pseudoranges may be obtained, wherein such cellular psuedoranges may be used in a cluster analysis technique to disambiguate MS locations identified by the satellite pseudoranges. Moreover, the determination of a location hypothesis is performed, in at least one embodiment, at a site remote from the target MS 140, such as the location center/gateway 142, or another site that communicates with the location center/gateway for supplying a resulting MS location to the gateway. Alternatively, the target MS 140 may perform the calculations to determine its own location. Note that this alternative technique may be particularly useful when the target MS 140 is a mobile base station 148.

MS Status Repository Embodiment

The MS status repository 1338 is a run-time storage manager for storing location hypotheses from previous activations of the location engine 139 (as well as the output target MS location estimate(s)) so that a target MS may be tracked using target MS location hypotheses from previous location engine 139 activations to determine, for example, a movement of the target MS between evaluations of the target MS location. Thus, by retaining a moving window of previous location hypotheses used in evaluating positions of a target MS, measurements of the target MS's velocity, acceleration, and likely next position may be determined by the location hypothesis analyzer 1332. Further, by providing accessibility to recent MS location hypotheses, these hypotheses may be used to resolve conflicts between hypotheses in a current activation for locating the target MS; e.g., MS paths may be stored here for use in extrapolating a new location Mobile Base Station Location Subsystem Description Mobile Base Station Subsystem Introduction Any collection of mobile electronics (denoted mobile location unit) that is able to both estimate a location of a target MS 140 and communicate with the base station network may be utilized by the wireless location capabilities disclosed herein to more accurately locate the target MS. Such mobile location units may provide greater target MS location accuracy by, for example, homing in on the target MS and by transmitting additional MS location information to the location center 142. There are a number of embodiments for such a mobile location unit contemplated by the wireless location capabilities disclosed herein. For example, in a minimal version, such the electronics of the mobile location unit may be little more than an onboard MS 140, a sectored/directional antenna and a controller for communicating between them. Thus, the onboard MS is used to communicate with the location center 142 and possibly the target MS 140, while the antenna monitors signals for homing in on the target MS 140. In an enhanced version of the mobile location unit, a GPS receiver may also be incorporated so that the location of the mobile location unit may be determined and consequently an estimate of the location of the target MS may also be determined. However, such a mobile location unit is unlikely to be able to determine substantially more than a direction of the target MS 140 via the sectored/directional antenna without further base station infrastructure cooperation in, for example, determining the transmission power level of the target MS or varying this power level. Thus, if the target MS or the mobile location unit leaves the coverage area 120 or resides in a poor communication area, it may be difficult to accurately determine where the target MS is located. None-the-less, such mobile location units may be sufficient for many situations, and in fact the wireless location capabilities disclosed herein contemplates their use. However, in cases where direct communication with the target MS is desired without constant contact with the base station infrastructure, the wireless location capabilities disclosed herein includes a mobile location unit that is also a scaled down version of a base station 122. Thus, given that such a mobile base station or MBS 148 includes at least an onboard MS 140, a sectored/directional antenna, a GPS receiver, a scaled down base station 122 and sufficient components (including a controller) for integrating the capabilities of these devices, an enhanced autonomous MS mobile location system can be provided that can be effectively used in, for example, emergency vehicles, air planes and boats. Accordingly, the description that follows below describes an embodiment of an MBS 148 having the above mentioned components and capabilities for use in a vehicle.

As a consequence of the MBS 148 being mobile, there are fundamental differences in the operation of an MBS in comparison to other types of BS's 122 (152). In particular, other types of base stations have fixed locations that are precisely determined and known by the location center, whereas a location of an MBS 148 may be known only approximately and thus may require repeated and frequent re-estimating. Secondly, other types of base stations have substantially fixed and stable communication with the location center (via possibly other BS's in the case of LBSs 152) and therefore although these BS's may be more reliable in their in their ability to communicate information related to the location of a target MS with the location center, accuracy can be problematic in poor reception areas. Thus, MBSs may be used in areas (such as wilderness areas) where there may be no other means for reliably and cost effectively locating a target MS 140 (i.e., there may be insufficient fixed location BS's coverage in an area).

Figure 11A:
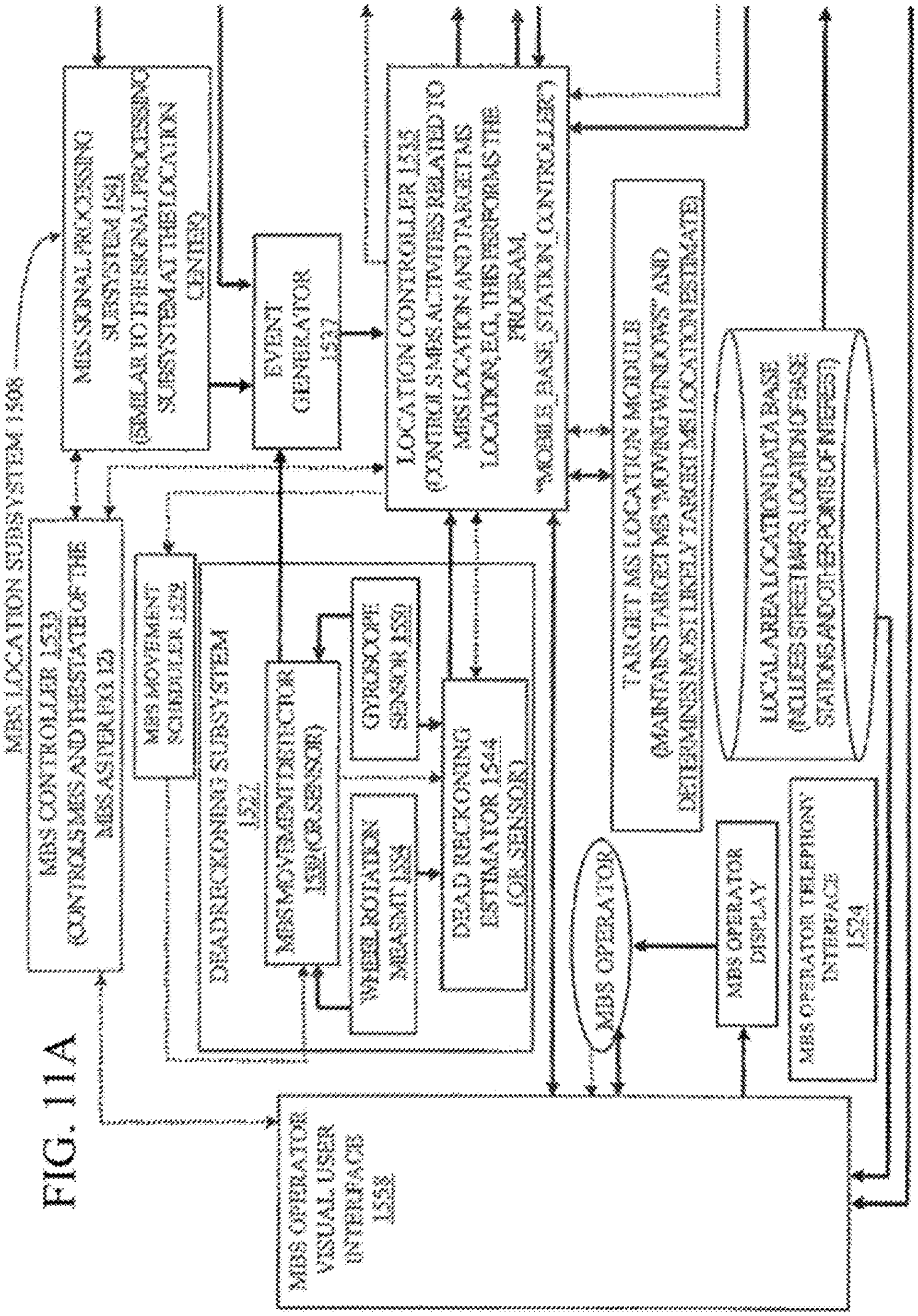
FIGS. 11A-11B is a high level block diagram of the mobile base station (MBS).
Figure 11B:
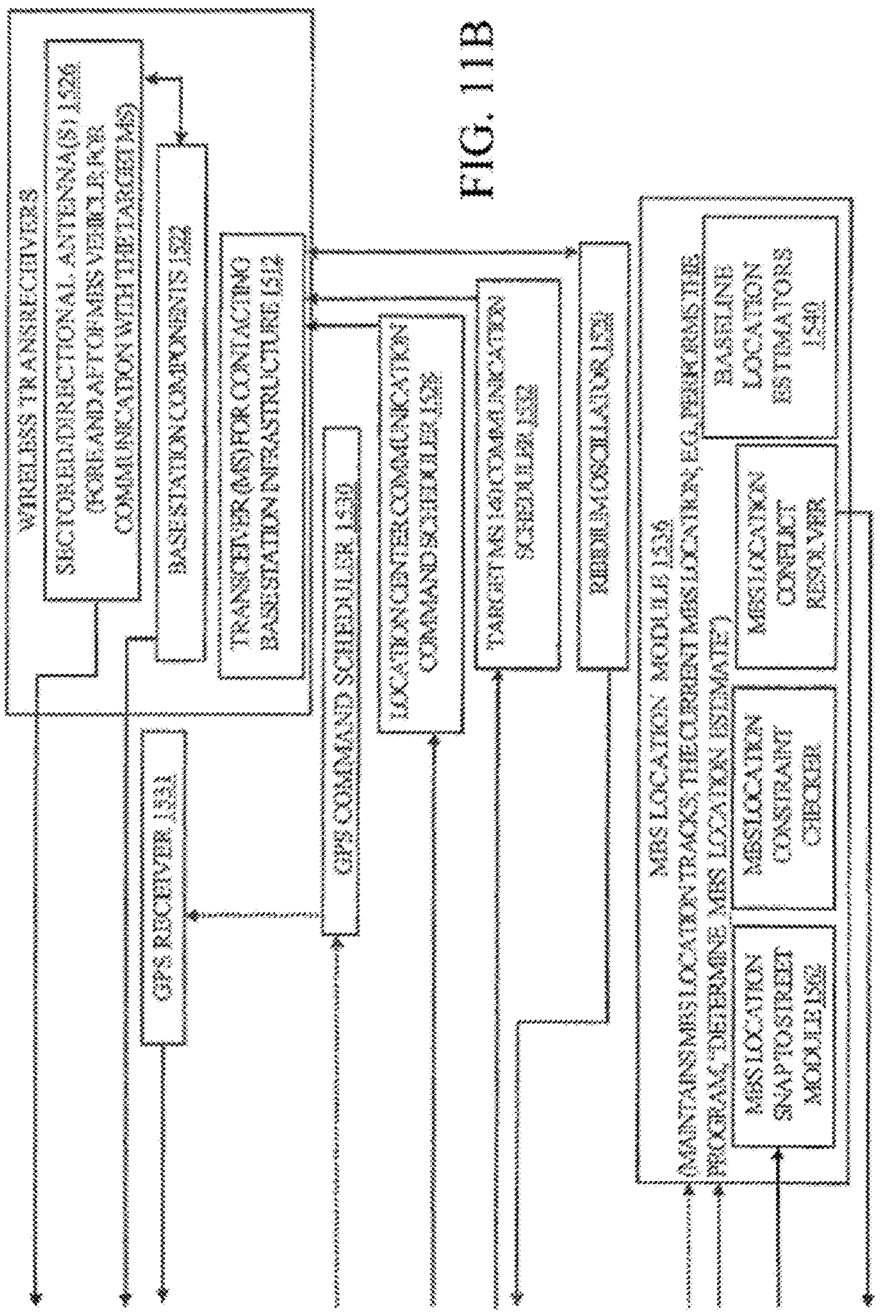
Figure 12:
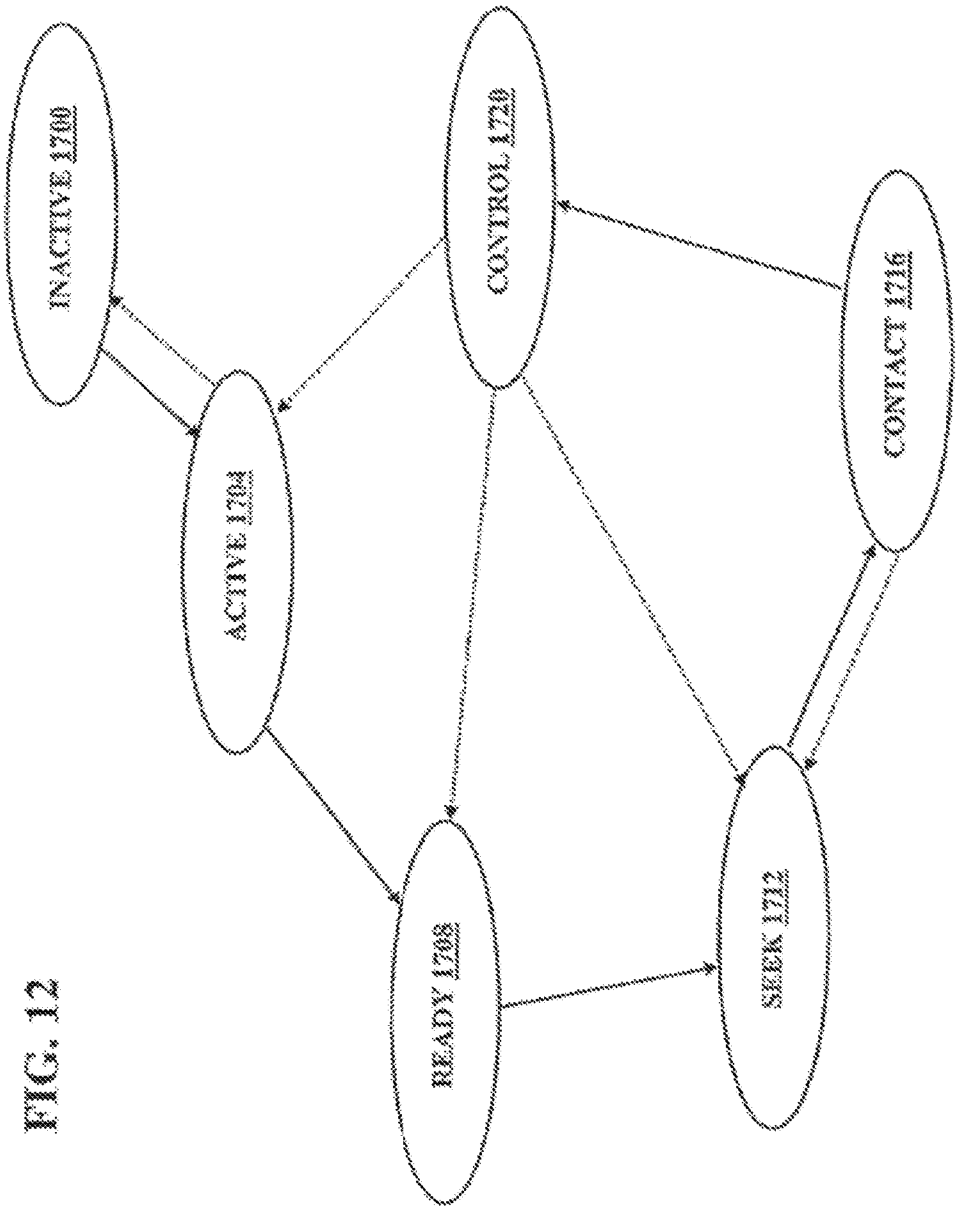
FIG. 12 is a high level state transition diagram describing computational states the Mobile Base station enters during operation.

FIG. 11 provides a high level block diagram architecture of one embodiment of the MBS location subsystem 1508. Accordingly, an MBS may include components for communicating with the fixed location BS network infrastructure and the location center 142 via an on-board transceiver 1512 that is effectively an MS 140 integrated into the location subsystem 1508. Thus, if the MBS 148 travels through an area having poor infrastructure signal coverage, then the MBS may not be able to communicate reliably with the location center 142 (e.g., in rural or mountainous areas having reduced wireless telephony coverage). So it is desirable that the MBS 148 must be capable of functioning substantially autonomously from the location center. In one embodiment, this implies that each MBS 148 must be capable of estimating both its own location as well as the location of a target MS 140.

Additionally, many commercial wireless telephony technologies require all BS's in a network to be very accurately time synchronized both for transmitting MS voice communication as well as for other services such as MS location. Accordingly, the MBS 148 will also require such time synchronization. However, since an MBS 148 may not be in constant communication with the fixed location BS network (and indeed may be off-line for substantial periods of time), on-board highly accurate timing device may be necessary. In one embodiment, such a device may be a commercially available ribidium oscillator 1520 as shown in FIG. 11.

Since the MBS 148, includes a scaled down version of a BS 122 (denoted 1522 in FIG. 11), it is capable of performing most typical BS 122 tasks, albeit on a reduced scale. In particular, the base station portion of the MBS 148 can:

(a) raise/lower its pilot channel signal strength,
(b) be in a state of soft hand-off with an MS 140, and/or
(c) be the primary BS 122 for an MS 140, and consequently be in voice communication with the target MS (via the MBS operator telephony interface 1524) if the MS supports voice communication.

Further, the MBS 148 can, if it becomes the primary base station communicating with the MS 140, request the MS to raise/lower its power or, more generally, control the communication with the MS (via the base station components 1522). However, since the MBS 148 will likely have substantially reduced telephony traffic capacity in comparison to a standard infrastructure base station 122, note that the pilot channel for the MBS is preferably a nonstandard pilot channel in that it should not be identified as a conventional telephony traffic bearing BS 122 by MS's seeking normal telephony communication. Thus, a target MS 140 requesting to be located may, depending on its capabilities, either automatically configure itself to scan for certain predetermined MBS pilot channels, or be instructed via the fixed location base station network (equivalently BS infrastructure) to scan for a certain predetermined MBS pilot channel.

Moreover, the MBS 148 has an additional advantage in that it can substantially increase the reliability of communication with a target MS 140 in comparison to the base station infrastructure by being able to move toward or track the target MS 140 even if this MS is in (or moves into) a reduced infrastructure base station network coverage area. Furthermore, an MBS 148 may preferably use a directional or smart antenna 1526 to more accurately locate a direction of signals from a target MS 140. Thus, the sweeping of such a smart antenna 1526 (physically or electronically) provides directional information regarding signals received from the target MS 140. That is, such directional information is determined by the signal propagation delay of signals from the target MS 140 to the angular sectors of one of more directional antennas 1526 on-board the MBS 148.

Before proceeding to further details of the MBS location subsystem 1508, an example of the operation of an MBS 148 in the context of responding to a 911 emergency call is given. In particular, this example describes the high level computational states through which the MBS 148 transitions, these states also being illustrated in the state transition diagram of FIG. 12. Note that this figure illustrates the primary state transitions between these MBS 148 states, wherein the solid state transitions are indicative of a typical "ideal" progression when locating or tracking a target MS 140, and the dashed state transitions are the primary state reversions due, for example, to difficulties in locating the target MS 140.

Accordingly, initially the MBS 148 may be in an inactive state 1700, wherein the MBS location subsystem 1508 is effectively available for voice or data communication with the fixed location base station network, but the MS 140 locating capabilities of the MBS are not active. From the inactive state 1700 the MBS (e.g., a police or rescue vehicle) may enter an active state 1704 once an MBS operator has logged onto the MBS location subsystem of the MBS, such logging being for authentication, verification and journaling of MBS 148 events. In the active state 1704, the MBS may be listed by a 911 emergency center and/or the location center 142 as eligible for service in responding to a 911 request. From this state, the MBS 148 may transition to a ready state 1708 signifying that the MBS is ready for use in locating and/or intercepting a target MS 140. That is, the MBS 148 may transition to the ready state 1708 by performing the following steps:

(1a) Synchronizing the timing of the location subsystem 1508 with that of the base station network infrastructure. In one embodiment, when requesting such time synchronization from the base station infrastructure, the MBS 148 will be at a predetermined or well known location so that the MBS time synchronization may adjust for a known amount of signal propagation delay in the synchronization signal.

(1b) Establishing the location of the MBS 148. In one embodiment, this may be accomplished by, for example, an MBS operator identifying the predetermined or well known location at which the MBS 148 is located.

(1c) Communicating with, for example, the 911 emergency center via the fixed location base station infrastructure to identify the MBS 148 as in the ready state.

Thus, while in the ready state 1708, as the MBS 148 moves, it has its location repeatedly (re)-estimated via, for example, GPS signals, location center 142S location estimates from the base stations 122 (and 152), and an on-board deadreckoning subsystem 1527 having an MBS location estimator according to the programs described hereinbelow. However, note that the accuracy of the base station time synchronization (via the ribidium oscillator 1520) and the accuracy of the MBS 148 location may need to both be periodically recalibrated according to (1a) and (1b) above.

Assuming a 911 signal is transmitted by a target MS 140, this signal is transmitted, via the fixed location base station infrastructure, to the 911 emergency center and the location center 142, and assuming the MBS 148 is in the ready state 1708, if a corresponding 911 emergency request is transmitted to the MBS (via the base station infrastructure) from the 911 emergency center or the location center, then the MBS may transition to a seek state 1712 by performing the following steps:

(2a) Communicating with, for example, the 911 emergency response center via the fixed location base station network to receive the PN code for the target MS to be located (wherein this communication is performed using the MS-like transceiver 1512 and/or the MBS operator telephony interface 1524).

(2b) Obtaining a most recent target MS location estimate from either the 911 emergency center or the location center 142.

(2c) Inputting by the MBS operator an acknowledgment of the target MS to be located, and transmitting this acknowledgment to the 911 emergency response center via the transceiver 1512.

Subsequently, when the MBS 148 is in the seek state 1712, the MBS may commence toward the target MS location estimate provided. Note that it is likely that the MBS is not initially in direct signal contact with the target MS. Accordingly, in the seek state 1712 the following steps may be, for example, performed:

(3a) The location center 142 or the 911 emergency response center may inform the target MS, via the fixed location base station network, to lower its threshold for soft hand-off and at least periodically boost its location signal strength. Additionally, the target MS may be informed to scan for the pilot channel of the MBS 148. (Note the actions here are not, actions performed by the MBS 148 in the "seek state"; however, these actions are given here for clarity and completeness.)

(3b) Repeatedly, as sufficient new MS location information is available, the location center 142 provides new MS location estimates to the MBS 148 via the fixed location base station network.

(3c) The MBS repeatedly provides the MBS operator with new target MS location estimates provided substantially by the location center via the fixed location base station network.

(3d) The MBS 148 repeatedly attempts to detect a signal from the target MS using the PN code for the target MS.

(3e) The MBS 148 repeatedly estimates its own location (as in other states as well), and receives MBS location estimates from the location center.

Assuming that the MBS 148 and target MS 140 detect one another (which typically occurs when the two units are within 0.25 to 3 miles of one another), the MBS enters a contact state 1716 when the target MS 140 enters a soft hand-off state with the MBS. Accordingly, in the contact state 1716, the following steps are, for example, performed:

(4a) The MBS 148 repeatedly estimates its own location.

(4b) Repeatedly, the location center 142 provides new target MS 140 and MBS location estimates to the MBS 148 via the fixed location base infrastructure network.

(4c) Since the MBS 148 is at least in soft hand-off with the target MS 140, the MBS can estimate the direction and distance of the target MS itself using, for example, detected target MS signal strength and TOA as well as using any recent location center target MS location estimates.

(4d) The MBS 148 repeatedly provides the MBS operator with new target MS location estimates provided using MS location estimates provided by the MBS itself and by the location center via the fixed location base station network.

When the target MS 140 detects that the MBS pilot channel is sufficiently strong, the target MS may switch to using the MBS 148 as its primary base station. When this occurs, the MBS enters a control state 1720, wherein the following steps are, for example, performed:

(5a) The MBS 148 repeatedly estimates its own location.

(5b) Repeatedly, the location center 142 provides new target MS and MBS location estimates to the MBS 148 via the network of base stations 122 (152).

(5c) The MBS 148 estimates the direction and distance of the target MS 140 itself using, for example, detected target MS signal strength and TOA as well as using any recent location center target MS location estimates.

(5d) The MBS 148 repeatedly provides the MBS operator with new target MS location estimates provided using MS location estimates provided by the MBS itself and by the location center 142 via the fixed location base station network.

(5e) The MBS 148 becomes the primary base station for the target MS 140 and therefore controls at least the signal strength output by the target MS.

Note, there can be more than one MBS 148 tracking or locating an MS 140. There can also be more than one target MS 140 to be tracked concurrently and each target MS being tracked may be stationary or moving.

MBS Subsystem Architecture

An MBS 148 uses MS signal characteristic data for locating the MS 140. The MBS 148 may use such signal characteristic data to facilitate determining whether a given signal from the MS is a "direct shot" or an multipath signal. That is, in one embodiment, the MBS 148 attempts to determine or detect whether an MS signal transmission is received directly, or whether the transmission has been reflected or deflected. For example, the MBS may determine whether the expected signal strength, and TOA agree in distance estimates for the MS signal transmissions. Note, other signal characteristics may also be used, if there are sufficient electronics and processing available to the MBS 148; i.e., determining signal phase and/or polarity as other indications of receiving a "direct shot" from an MS 140.

In one embodiment, the MBS 148 (FIG. 11) includes an MBS controller 1533 for controlling the location capabilities of the MBS 148. In particular, the MBS controller 1533 initiates and controls the MBS state changes as described in FIG. 12. Additionally, the MBS controller 1533 also communicates with the location controller 1535, wherein this latter controller controls MBS activities related to MBS location and target MS location. The location controller 1535 receives data input from an event generator 1537 for generating event records to be provided to the location controller 1535. For example, records may be generated from data input received from: (a) the vehicle movement detector 1539 indicating that the MBS 148 has moved at least a predetermined amount and/or has changed direction by at least a predetermined angle, or (b) the MBS signal processing subsystem 1541 indicating that the additional signal measurement data has been received from either the location center 142 or the target MS 140. Note that the MBS signal processing subsystem 1541, in one embodiment, is similar to the signal processing subsystem 1220 of the location center 142. may have multiple command schedulers. In particular, a scheduler 1528 for commands related to communicating with the location center 142, a scheduler 1530 for commands related to GPS communication (via GPS receiver 1531), a scheduler 1529 for commands related to the frequency and granularity of the reporting of MBS changes in direction and/or position via the MBS dead reckoning subsystem 1527 (note that this scheduler is potentially optional and that such commands may be provided directly to the deadreckoning estimator 1544), and a scheduler 1532 for communicating with the target MS(s) 140 being located. Further, it is assumed that there is sufficient hardware and/or software to appear to perform commands in different schedulers substantially concurrently.

In order to display an MBS computed location of a target MS 140, a location of the MBS must be known or determined. Accordingly, each MBS 148 has a plurality of MBS location estimators (or hereinafter also simply referred to as location estimators) for determining the location of the MBS.

Each such location estimator computes MBS location information such as MBS location estimates, changes to MBS location estimates, or, an MBS location estimator may be an interface for buffering and/or translating a previously computed MBS location estimate into an appropriate format. In particular, the MBS location module 1536, which determines the location of the MBS, may include the following MBS location estimators 1540 (also denoted baseline location estimators):

(a) a GPS location estimator 1540*a* (not individually shown) for computing an MBS location estimate using GPS signals, (b) a location center location estimator 1540*b* (not individually shown) for buffering and/or translating an MBS estimate received from the location center 142, (c) an MBS operator location estimator 1540*c* (not individually shown) for buffering and/or translating manual MBS location entries received from an MBS location operator, and (d) in some MBS embodiments, an LBS location estimator 1540*d* (not individually shown) for the activating and deactivating of LBS's 152. Note that, in high multipath areas and/or stationary base station marginal coverage areas, such low cost location base stations 152 (LBS) may be provided whose locations are fixed and accurately predetermined and whose signals are substantially only receivable within a relatively small range (e.g., 2000 feet), the range potentially being variable. Thus, by communicating with the LBS's 152 directly, the MBS 148 may be able to quickly use the location information relating to the location base stations for determining its location by using signal characteristics obtained from the LBSs 152.

Note that each of the MBS baseline location estimators 1540, such as those above, provide an actual MBS location rather than, for example, a change in an MBS location. Further note that it is an aspect of the wireless location capabilities disclosed herein that additional MBS baseline location estimators 1540 may be easily integrated into the MBS location subsystem 1508 as such baseline location estimators become available. For example, a baseline location estimator that receives MBS location estimates from reflective codes provided, for example, on streets or street signs can be straightforwardly incorporated into the MBS location subsystem 1508.

Additionally, note that a plurality of MBS location technologies and their corresponding MBS location estimators are utilized due to the fact that there is currently no single location technology available that is both sufficiently fast, accurate and accessible in substantially all terrains to meet the location needs of an MBS 148. For example, in many terrains GPS technologies may be sufficiently accurate; however, GPS technologies: (a) may require a relatively long time to provide an initial location estimate (e.g., greater than 2 minutes); (b) when GPS communication is disturbed, it may require an equally long time to provide a new location estimate; (c) clouds, buildings and/or mountains can prevent location estimates from being obtained; (d) in some cases signal reflections can substantially skew a location estimate. As another example, an MBS 148 may be able to use triangulation or trilateralization technologies to obtain a location estimate; however, this assumes that there is sufficient (fixed location) infrastructure BS coverage in the area the MBS is located. Further, it is well known that the multipath phenomenon can substantially distort such location estimates. Thus, for an MBS 148 to be highly effective in varied terrains, an MBS is provided with a plurality of location technologies, each supplying an MBS location estimate.

In fact, much of the architecture of the location engine 139 could be incorporated into an MBS 148. For example, in some embodiments of the MBS 148, the following FOMs 1224 may have similar location models incorporated into the MBS:

(a) a variation of the TCSO FOM 1224 wherein TOA signals from communicating fixed location BS's are received (via the MBS transceiver 1512) by the MBS and used for providing a location estimate;

(b) a variation of the artificial neural net based FOMs 1224 (or more generally a location learning or a classification model) may be used to provide MBS location estimates via, for example, learned associations between fixed location BS signal characteristics and geographic locations;

(c) an LBS location FOM 1224 for providing an MBS with the ability to activate and deactivate LBS's to provide (positive) MBS location estimates as well as negative MBS location regions (i.e., regions where the MBS is unlikely to be since one or more LBS's are not detected by the MBS transceiver);

(d) one or more MBS location reasoning agents and/or a location estimate heuristic agents for resolving MBS location estimate conflicts and providing greater MBS location estimate accuracy. For example, modules similar to the analytical reasoner module 1416 and the historical location reasoner module 1424.

However, for those MBS location models requiring communication with the base station infrastructure, an alternative embodiment is to rely on the location center 142 to perform the computations for at least some of these MBS FOM models. That is, since each of the MBS location models mentioned immediately above require communication with the network of fixed location BS's 122 (152), it may be advantageous to transmit MBS location estimating data to the location center 142 as if the MBS were another MS 140 for the location center to locate, and thereby rely on the location estimation capabilities at the location center rather than duplicate such models in the MBS 148. The advantages of this approach are that:

(a) an MBS is likely to be able to use less expensive processing power and software than that of the location center;

(b) an MBS is likely to require substantially less memory, particularly for data bases, than that of the location center.

As will be discussed further below, in one embodiment of the MBS 148, there are confidence values assigned to the locations output by the various location estimators 1540. Thus, the confidence for a manual entry of location data by an MBS operator may be rated the highest and followed by the confidence for (any) GPS location data, followed by the confidence for (any) location center location 142 estimates, followed by the confidence for (any) location estimates using signal characteristic data from LBSs. However, such prioritization may vary depending on, for instance, the radio coverage area 120. In an one embodiment of the wireless location capabilities disclosed herein, it is an aspect of the wireless location capabilities disclosed herein that for MBS location data received from the GPS and location center, their confidences may vary according to the area in which the MBS 148 resides. That is, if it is known that for a given area, there is a reasonable probability that a GPS signal may suffer multipath distortions and that the location center has in the past provided reliable location estimates, then the confidences for these two location sources may be reversed.

In one embodiment of the wireless location capabilities disclosed herein, MBS operators may be requested to occasionally manually enter the location of the MBS 148 when the MBS is stationary for determining and/or calibrating the accuracy of various MBS location estimators.

There is an additional important source of location information for the MBS 148 that is incorporated into an MBS vehicle (such as a police vehicle) that has no comparable functionality in the network of fixed location BS's. That is, the MBS 148 may use deadreckoning information provided by a deadreckoning MBS location estimator 1544 whereby the MBS may obtain MBS deadreckoning location change estimates. Accordingly, the deadreckoning MBS location estimator 1544 may use, for example, an on-board gyroscope 1550, a wheel rotation measurement device (e.g., odometer) 1554, and optionally an accelerometer (not shown). Thus, such a deadreckoning MBS location estimator 1544 periodically provides at least MBS distance and directional data related to MBS movements from a most recent MBS location estimate. More precisely, in the absence of any other new MBS location information, the deadreckoning MBS location estimator 1544 outputs a series of measurements, wherein each such measurement is an estimated change (or delta) in the position of the MBS 148 between a request input timestamp and a closest time prior to the timestamp, wherein a previous deadreckoning terminated. Thus, each deadreckoning location change estimate includes the following fields:

(a) an "earliest timestamp" field for designating the start time when the deadreckoning location change estimate commences measuring a change in the location of the MBS;

(b) a "latest timestamp" field for designating the end time when the deadreckoning location change estimate stops measuring a change in the location of the MBS; and (c) an MBS location change vector.

That is, the "latest timestamp" is the timestamp input with a request for deadreckoning location data, and the "earliest timestamp" is the timestamp of the closest time, T, prior to the latest timestamp, wherein a previous deadreckoning output has its a timestamp at a time equal to T.

Further, the frequency of such measurements provided by the deadreckoning subsystem 1527 may be adaptively provided depending on the velocity of the MBS 148 and/or the elapsed time since the most recent MBS location update. Accordingly, the architecture of at least some embodiments of the MBS location subsystem 1508 must be such that it can utilize such deadreckoning information for estimating the location of the MBS 148.

In one embodiment of the MBS location subsystem 1508 described in further detail hereinbelow, the outputs from the deadreckoning MBS location estimator 1544 are used to synchronize MBS location estimates from different MBS baseline location estimators. That is, since such a deadreckoning output may be requested for substantially any time from the deadreckoning MBS location estimator, such an output can be requested for substantially the same point in time as the occurrence of the signals from which a new MBS baseline location estimate is derived. Accordingly, such a deadreckoning output can be used to update other MBS location estimates not using the new MBS baseline location estimate.

It is assumed that the error with dead reckoning increases with deadreckoning distance. Accordingly, it is an aspect of the embodiment of the MBS location subsystem 1508 that when incrementally updating the location of the MBS 148 using deadreckoning and applying deadreckoning location change estimates to a "most likely area" in which the MBS 148 is believed to be, this area is incrementally enlarged as well as shifted. The enlargement of the area is used to account for the inaccuracy in the deadreckoning capability. Note, however, that the deadreckoning MBS location estimator is periodically reset so that the error accumulation in its outputs can be decreased. In particular, such resetting occurs when there is a high probability that the location of the MBS is known. For example, the deadreckoning MBS location estimator may be reset when an MBS operator manually enters an MBS location or verifies an MBS location, or a computed MBS location has sufficiently high confidence.

Thus, due to the MBS 148 having less accurate location information (both about itself and a target MS 140), and further that deadreckoning information must be utilized in maintaining MBS location estimates, a first embodiment of the MBS location subsystem architecture is somewhat different from the location engine 139 architecture. That is, the architecture of this first embodiment is simpler than that of the architecture of the location engine 139. However, it important to note that, at a high level, the architecture of the location engine 139 may also be applied for providing a second embodiment of the MBS location subsystem 1508, as one skilled in the art will appreciate after reflecting on the architectures and processing provided at an MBS 148. For example, an MBS location subsystem 1508 architecture may be provided that has one or more first order models 1224 whose output is supplied to, for example, a blackboard or expert system for resolving MBS location estimate conflicts, such an architecture being analogous to one embodiment of the location engine 139 architecture.

Furthermore, it is also an important aspect of the wireless location capabilities disclosed herein that, at a high level, the MBS location subsystem architecture may also be applied as an alternative architecture for the location engine 139. For example, in one embodiment of the location engine 139, each of the first order models 1224 may provide its MS location hypothesis outputs to a corresponding "location track," analogous to the MBS location tracks described hereinbelow, and subsequently, a most likely MS current location estimate may be developed in a "current location track" (also described hereinbelow) using the most recent location estimates in other location tracks. Thus, the location estimating models of the location center 139 and those of the MBS 148 are may be interchanged depending on the where it is deemed most appropriate for such each such model to reside. Additionally, note that in different embodiments of the wireless location capabilities disclosed herein, various combinations of the location center location architecture and the mobile station architecture may be utilized at either the location center or the MBS 148. Thus, by providing substantially all location estimating computational models at the location center 142, the models described here for locating the MBS 148 (and equivalently, its incorporated MS 140) can be used for locating other MSs 140 that are be capable of supporting transmission of wireless signal measurements that relate to models requiring the additional electronics available at the MBS 140 (e.g., GPS or other satellite signals used for location).

Further, note that the ideas and methods discussed here relating to MBS location estimators 1540 and MBS location tracks, and, the related programs hereinbelow are sufficiently general so that these ideas and methods may be applied in a number of contexts related to determining the location of a device capable of movement and wherein the location of the device must be maintained in real time. For example, the present ideas and methods may be used by a robot in a very cluttered environment (e.g., a warehouse), wherein the robot has access: (a) to a plurality of "robot location estimators" that may provide the robot with sporadic location information, and (b) to a deadreckoning location estimator.

Each MBS 148, additionally, has a location display (denoted the MBS operator visual user interface 1558 in FIG. 11) where area maps that may be displayed together with location data. In particular, MS location data may be displayed on this display as a nested collection of areas, each smaller nested area being the most likely area within (any) encompassing area for locating a target MS 140. Note that the MBS controller algorithm below may be adapted to receive location center 142 data for displaying the locations of other MBSs 148 as well as target MSs 140.

Further, the MBS 148 may constrain any location estimates to streets on a street map using the MBS location snap to street module 1562. For example, an estimated MBS location not on a street may be "snapped to" a nearest street location. Note that a nearest street location determiner may use "normal" orientations of vehicles on streets as a constraint on the nearest street location. Particularly, if an MBS 148 is moving at typical rates of speed and acceleration, and without abrupt changes direction. For example, if the deadreckoning MBS location estimator 1544 indicates that the MBS 148 is moving in a northerly direction, then the street snapped to should be a north-south running street. Moreover, the MBS location snap to street module 1562 may also be used to enhance target MS location estimates when, for example, it is known or suspected that the target MS 140 is in a vehicle and the vehicle is moving at typical rates of speed. Furthermore, the snap to street location module 1562 may also be used in enhancing the location of a target MS 140 by either the MBS 148 or by the location engine 139. In particular, the location estimator 1344 or an additional module between the location estimator 1344 and the output gateway 1356 may utilize an embodiment of the snap to street location module 1562 to enhance the accuracy of target MS 140 location estimates that are known to be in vehicles. Note that this may be especially useful in locating stolen vehicles that have embedded wireless location transceivers (MSs 140), wherein appropriate wireless signal measurements can be provided to the location center 142.

MBS Data Structure Remarks

Figure 13:
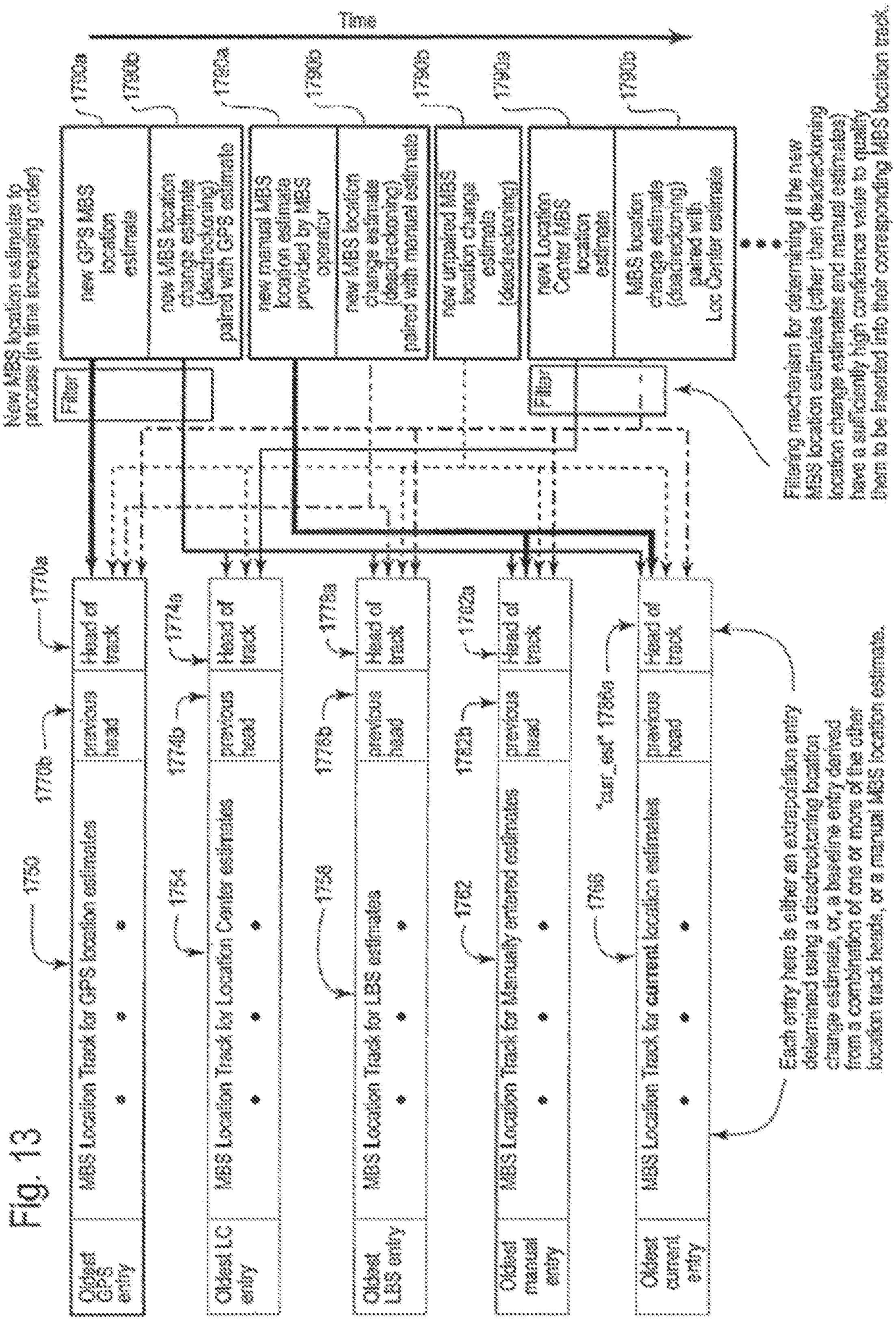
FIG. 13 is a high level diagram illustrating the data structural organization of the Mobile Base station capability for autonomously determining a most likely MBS location from a plurality of potentially conflicting MBS location estimating sources.
Figure 14:
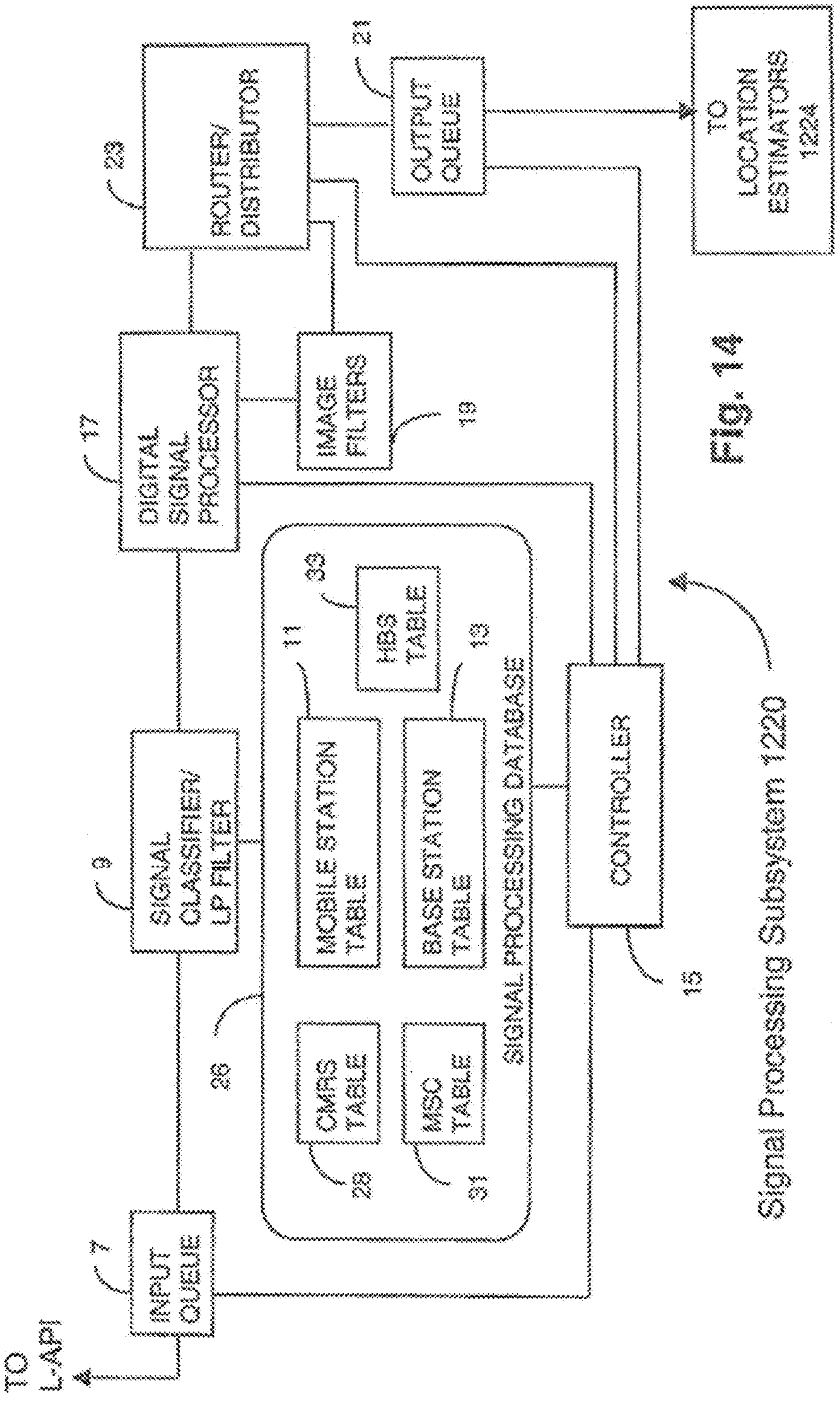
FIG. 14 illustrates the primary components of the signal processing subsystem.
Figure 15:
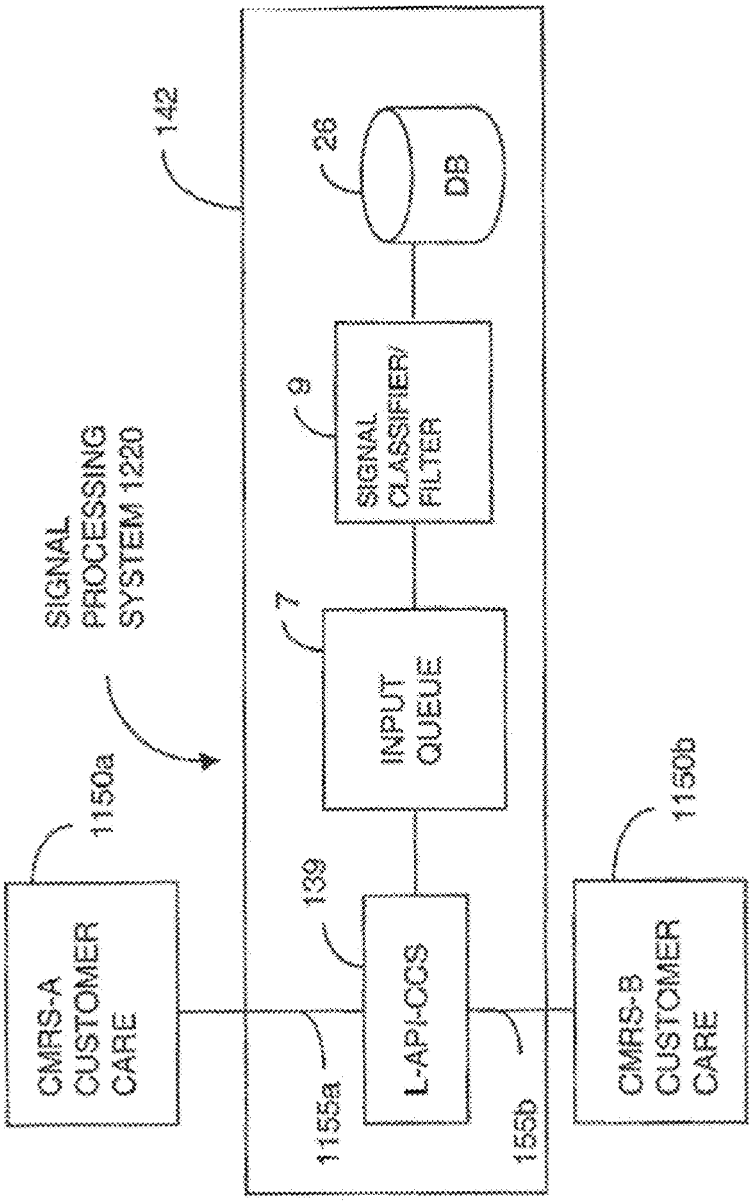
FIG. 15 illustrates how automatic provisioning of mobile station information from multiple commercial mobile radio service providers (CMRSs) occurs.

Assuming the existence of at least some of the location estimators 1540 that were mentioned above, the discussion here refers substantially to the data structures and their organization as illustrated in FIG. 13.

The location estimates (or hypotheses) for an MBS 148 determining its own location each have an error or range estimate associated with the MBS location estimate. That is, each such MBS location estimate includes a "most likely MBS point location" within a "most likely area". The "most likely MBS point location" is assumed herein to be the centroid of the "most likely area." In one embodiment of the MBS location subsystem 1508, a nested series of "most likely areas" may be provided about a most likely MBS point location. However, to simplify the discussion herein each MBS location estimate is assumed to have a single "most likely area". One skilled in the art will understand how to provide such nested "most likely areas" from the description herein.

Each MBS location estimate also has a confidence associated therewith providing a measurement of the perceived accuracy of the MBS being in the "most likely area" of the location estimate.

A (MBS) "location track" is an data structure (or object) having a queue of a predetermined length for maintaining a temporal (timestamp) ordering of "location track entries" such as the location track entries **1770*a*, 1770*b*, 1774*a*, 1774*b*, 1778*a*, 1778*b*, 1782*a*, 1782*b*, and 1786*a* (FIG. 13**), wherein each such MBS location track entry is an estimate of the location of the MBS at a particular corresponding time.

There is an MBS location track for storing MBS location entries obtained from MBS location estimation information from each of the MBS baseline location estimators described above (i.e., a GPS location track 1750 for storing MBS location estimations obtained from the GPS location estimator 1540, a location center location track 1754 for storing MBS location estimations obtained from the location estimator 1540 deriving its MBS location estimates from the location center 142, an LBS location track 1758 for storing MBS location estimations obtained from the location estimator 1540 deriving its MBS location estimates from base stations 122 and/or 152, and a manual location track 1762 for MBS operator entered MBS locations). Additionally, there is one further location track, denoted the "current location track" 1766 whose location track entries may be derived from the entries in the other location tracks (described further hereinbelow). Further, for each location track, there is a location track head that is the head of the queue for the location track. The location track head is the most recent (and presumably the most accurate) MBS location estimate residing in the location track. Thus, for the GPS location track 1750 has location track head 1770; the location center location track 1754 has location track head 1774; the LBS location track 1758 has location track head 1778; the manual location track 1762 has location track head 1782; and the current location track 1766 has location track head 1786. Additionally, for notational convenience, for each location track, the time series of previous MBS location estimations (i.e., location track entries) in the location track will herein be denoted the "path for the location track." Such paths are typically the length of the location track queue containing the path. Note that the length of each such queue may be determined using at least the following considerations:

(i) In certain circumstances (described hereinbelow), the location track entries are removed from the head of the location track queues so that location adjustments may be made. In such a case, it may be advantageous for the length of such queues to be greater than the number of entries that are expected to be removed;

(ii) In determining an MBS location estimate, it may be desirable in some embodiments to provide new location estimates based on paths associated with previous MBS location estimates provided in the corresponding location track queue.

Also note that it is within the scope of the wireless location capabilities disclosed herein that the location track queue lengths may be a length of one.

Regarding location track entries, each location track entry includes:

(a) a "derived location estimate" for the MBS that is derived using at least one of:
   (i) at least a most recent previous output from an MBS baseline location estimator 1540 (i.e., the output being an MBS location estimate);
   (ii) deadreckoning output information from the deadreckoning subsystem 1527. Further note that each output from an MBS location estimator has a "type" field that is used for identifying the MBS location estimator of the output.

(b) an "earliest timestamp" providing the time/date when the earliest MBS location information upon which the derived location estimate for the MBS depends. Note this will typically be the timestamp of the earliest MBS location estimate (from an MBS baseline location estimator) that supplied MBS location information used in deriving the derived location estimate for the MBS 148.

(c) a "latest timestamp" providing the time/date when the latest MBS location information upon which the derived location estimate for the MBS depends. Note that earliest timestamp=latest timestamp only for so called "baseline entries" as defined hereinbelow. Further note that this attribute is the one used for maintaining the "temporal (timestamp) ordering" of location track entries.

(d) A "deadreckoning distance" indicating the total distance (e.g., wheel turns or odometer difference) since the most recently previous baseline entry for the corresponding MBS location estimator for the location track to which the location track entry is assigned.

For each MBS location track, there are two categories of MBS location track entries that may be inserted into a MBS location track:

(a) "baseline" entries, wherein each such baseline entry includes (depending on the location track) a location estimate for the MBS 148 derived from: (i) a most recent previous output either from a corresponding MBS baseline location estimator, or (ii) from the baseline entries of other location tracks (this latter case being the for the "current" location track);

(b) "extrapolation" entries, wherein each such entry includes an MBS location estimate that has been extrapolated from the (most recent) location track head for the location track (i.e., based on the track head whose "latest timestamp" immediately precedes the latest timestamp of the extrapolation entry). Each such extrapolation entry is computed by using data from a related deadreckoning location change estimate output from the deadreckoning MBS location estimator 1544. Each such deadreckoning location change estimate includes measurements related to changes or deltas in the location of the MBS 148. More precisely, for each location track, each extrapolation entry is determined using: (i) a baseline entry, and (ii) a set of one or more (i.e., all later occurring) deadreckoning location change estimates in increasing "latest timestamp" order. Note that for notational convenience this set of one or more deadreckoning location change estimates will be denoted the "deadreckoning location change estimate set" associated with the extrapolation entry resulting from this set.

(c) Note that for each location track head, it is either a baseline entry or an extrapolation entry. Further, for each extrapolation entry, there is a most recent baseline entry, B, that is earlier than the extrapolation entry and it is this B from which the extrapolation entry was extrapolated. This earlier baseline entry, B, is hereinafter denoted the "baseline entry associated with the extrapolation entry." More generally, for each location track entry, T, there is a most recent previous baseline entry, B, associated with T, wherein if T is an extrapolation entry, then B is as defined above, else if T is a baseline entry itself, then T=B. Accordingly, note that for each extrapolation entry that is the head of a location track, there is a most recent baseline entry associated with the extrapolation entry.

Further, there are two categories of location tracks:

(a) "baseline location tracks," each having baseline entries exclusively from a single predetermined MBS baseline location estimator; and (b) a "current" MBS location track having entries that are computed or determined as "most likely" MBS location estimates from entries in the other MBS location tracks.

MBS Location Estimating Strategy

In order to be able to properly compare the track heads to determine the most likely MBS location estimate it is an aspect of the wireless location capabilities disclosed herein that the track heads of all location tracks include MBS location estimates that are for substantially the same (latest) timestamp. However, the MBS location information from each MBS baseline location estimator is inherently substantially unpredictable and unsynchronized. In fact, the only MBS location information that may be considered predicable and controllable is the deadreckoning location change estimates from the deadreckoning MBS location estimator 1544 in that these estimates may reliably be obtained whenever there is a query from the location controller 1535 for the most recent estimate in the change of the location for the MBS 148. Consequently (referring to FIG. 13), synchronization records 1790 (having at least a 1790*b* portion, and in some cases also having a 1790*a* portion) may be provided for updating each location track with a new MBS location estimate as a new track head. In particular, each synchronization record includes a deadreckoning location change estimate to be used in updating all but at most one of the location track heads with a new MBS location estimate by using a deadreckoning location change estimate in conjunction with each MBS location estimate from an MBS baseline location estimator, the location track heads may be synchronized according to timestamp. More precisely, for each MBS location estimate, E, from an MBS baseline location estimator, the wireless location capabilities disclosed herein also substantially simultaneously queries the deadreckoning MBS location estimator for a corresponding most recent change in the location of the MBS 148. Accordingly, E and the retrieved MBS deadreckoning location change estimate, C, have substantially the same "latest timestamp". Thus, the location estimate E may be used to create a new baseline track head for the location track having the corresponding type for E, and C may be used to create a corresponding extrapolation entry as the head of each of the other location tracks. Accordingly, since for each MBS location estimate, E, there is a MBS deadreckoning location change estimate, C, having substantially the same "latest timestamp", E and C will be hereinafter referred as "paired."

High Level Description of a Wireless Platform

Figure 20:
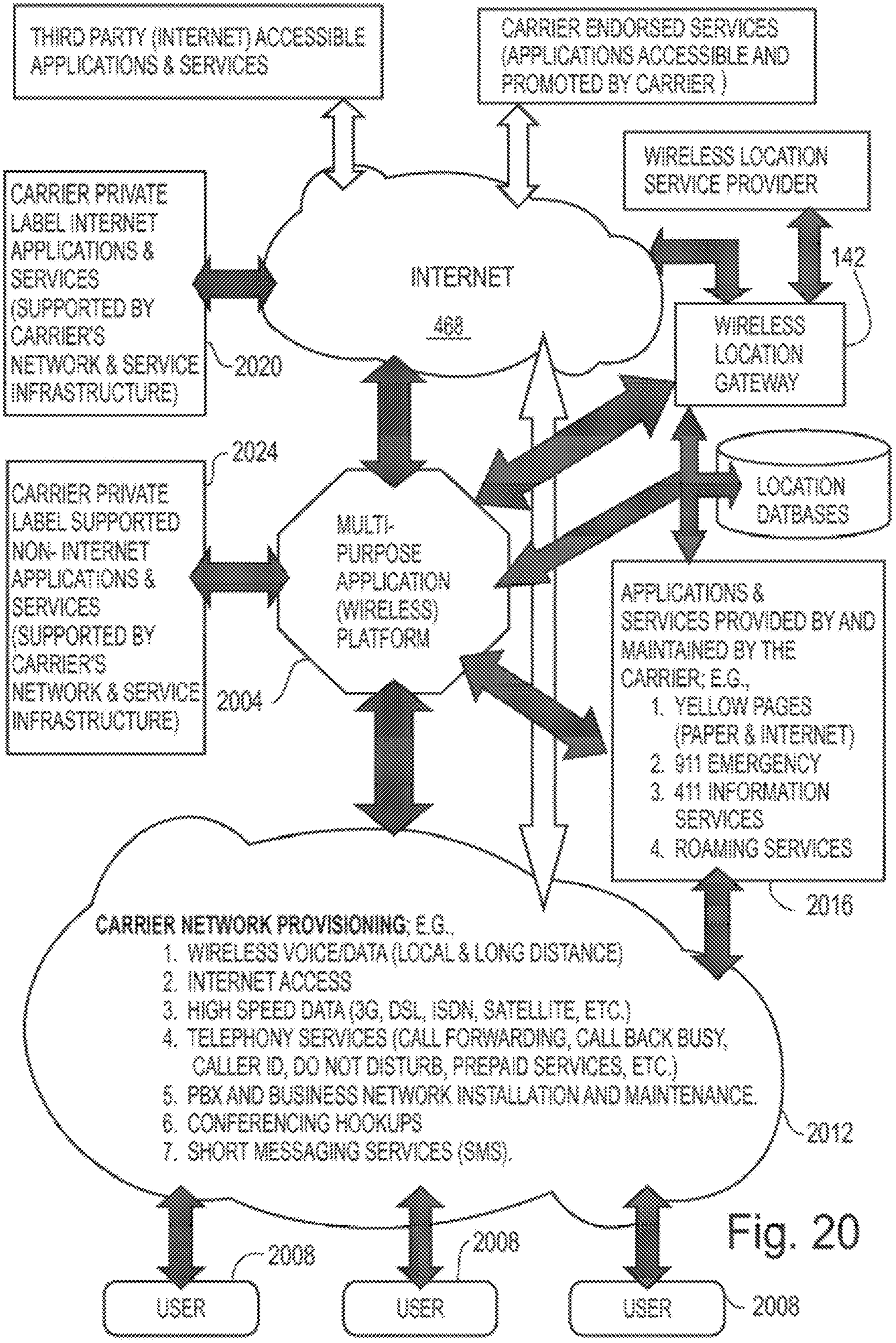
FIG. 20 is a high level block diagram illustrating the wireless application platform of the present disclosure.

FIG. 20 is a high level block diagram illustrating the wireless application platform 2004 of the present disclosure in combination with various services and network components with which the platform communicates. In particular, the embodiment of FIG. 20 is illustrative of how the platform 2004 communicates with, e.g., the subscribers (e.g., users 2008), applications (e.g., applications 2016, 2020, 2024, 2028, and 2032 which may or may not receive wireless location related information from the wireless location gateway 142), and network accessible components (e.g., wireless equipment) for a single commercial wireless carrier. The platform 2004 communicates with subscribers or users 2008 of the wireless carrier via, e.g., a mobile station 140 in communication with various provisioning equipment and communication services of the wireless carrier, collectively this equipment and communication services are identified as carrier network provisioning 2012, and may include e.g.:

1. wireless voice and/or wireless data (local and/or long distance) services;
2. Internet access;
3. high speed data and/or Internet services such as (3G, cable, DSL, ISDN, satellite communications, etc.);

4. telephony specific services (e.g., call forwarding, call back busy, Caller ID, Do Not Disturb, prepaid calling card services, etc.);
5. PBX and/or business network installation and maintenance services;
6. teleconferencing provisioning and services; and/or
7. short messaging services (SMS).

More particularly, users 2008 can communicate various requests to the platform 2004 for various wireless location related services such as:

PR 1. Requests for routing the user from his/her location to a desired location;

PR 2. Requests for information about products, services, places and/or persons that are geographically related to a location of the user 2008;

PR 3. Requests for displaying and/or modifying, e.g., user profile information to thereby change access permissions, and/or profile visibility;

PR 4. Requests for activating or deactivating services, e.g., wireless services such as hotel concierge wireless location and routing services offered by hotel, such services capable of, e.g., being attached and detached from a user's profile as a unit;

PR 5. Requests for procuring products and/or services (location related or otherwise); and/or PR 6. Standard telephony, Internet and data services.

It is worth noting that embodiments of related wireless platforms have been described in the art. In particular, International Patent Application PCT/US01/02526, filed Jan. 26, 2001 by McDowell et. al. titled: "Method and Apparatus For Sharing Mobile User Event Information Between Wireless Between Wireless and Fixed IP Networks" incorporated herein fully by reference, and, International Patent Application PCT/US02/04533, filed Feb. 15, 2002 by McDowell et. al. titled: "Use Of Presence And Location Information Concerning Wireless Subscribers For Instant Messaging And Mobile Commerce" also incorporated herein fully by reference. However, these platforms appear directed to short messaging service applications and ecommerce (i.e., merchant advertising), and do not appear to address issues related to the easy incorporation of entirely new complex network services, and in particular, for network services wherein there is a uniform architecture for communications between the platform and new network service applications. Instead, the PCT/US02/04533 application is directed to: "the integration of presence determination, location determination, Instant Messaging, and mobile commerce into a functionally seamless system" wherein such presence determination "determines whether a mobile device is ON or OFF in real-time." So that this system (i.e., McDowell's) "may then share the revenue generated through the sale of subscriber information with the participating wireless carriers that host the subscribers.", and "determines both Internet presence and wireless network presence, and makes this information available to entities on both networks." However, the above-identified McDowell et. al. PCT patent applications do provide appropriate supportive and enabling information for the present disclosure, and in particular, the platform 2004.

Figure 21:
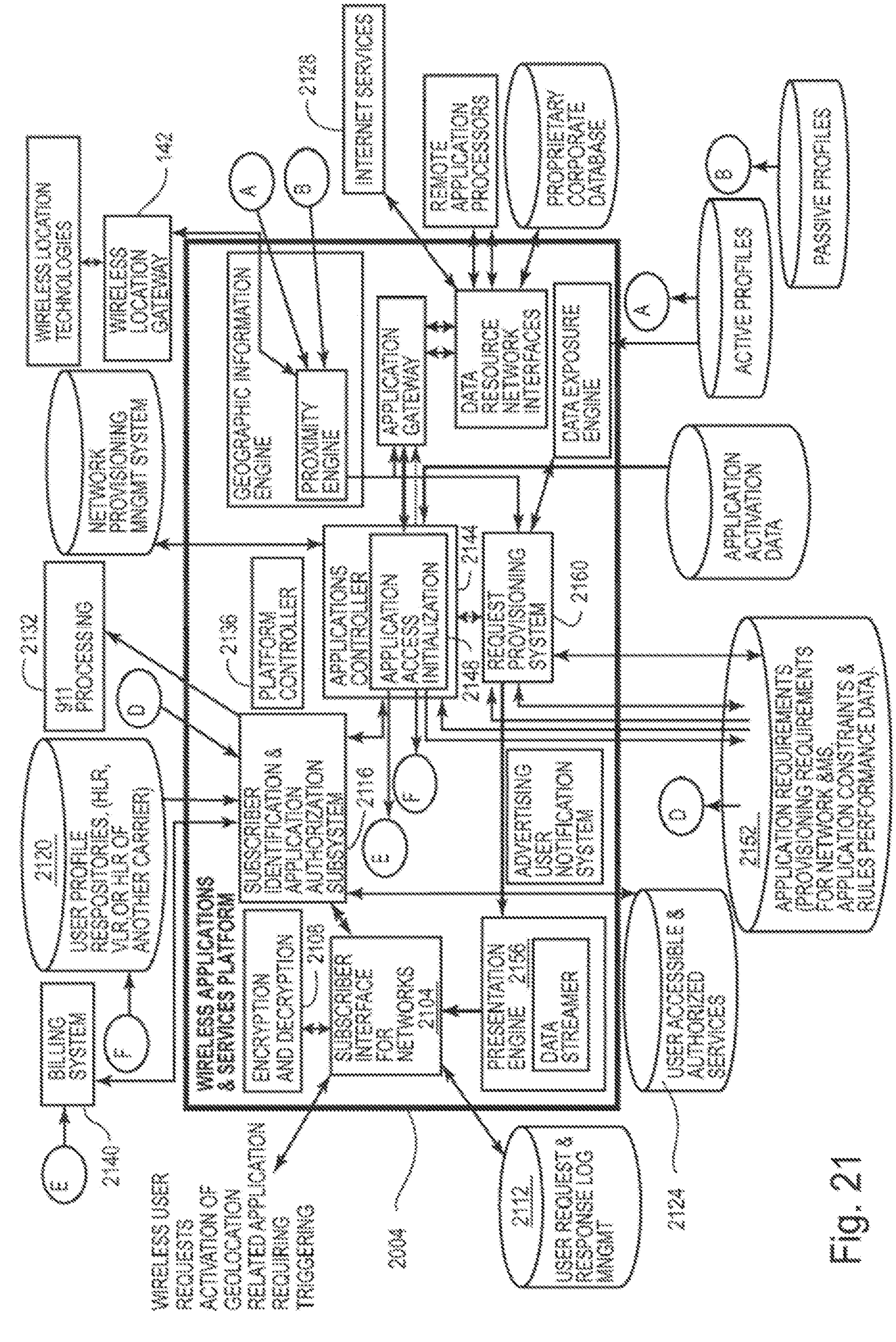
FIG. 21 is a more detailed block diagram illustrating the wireless application platform of the present disclosure.
Figure 22:
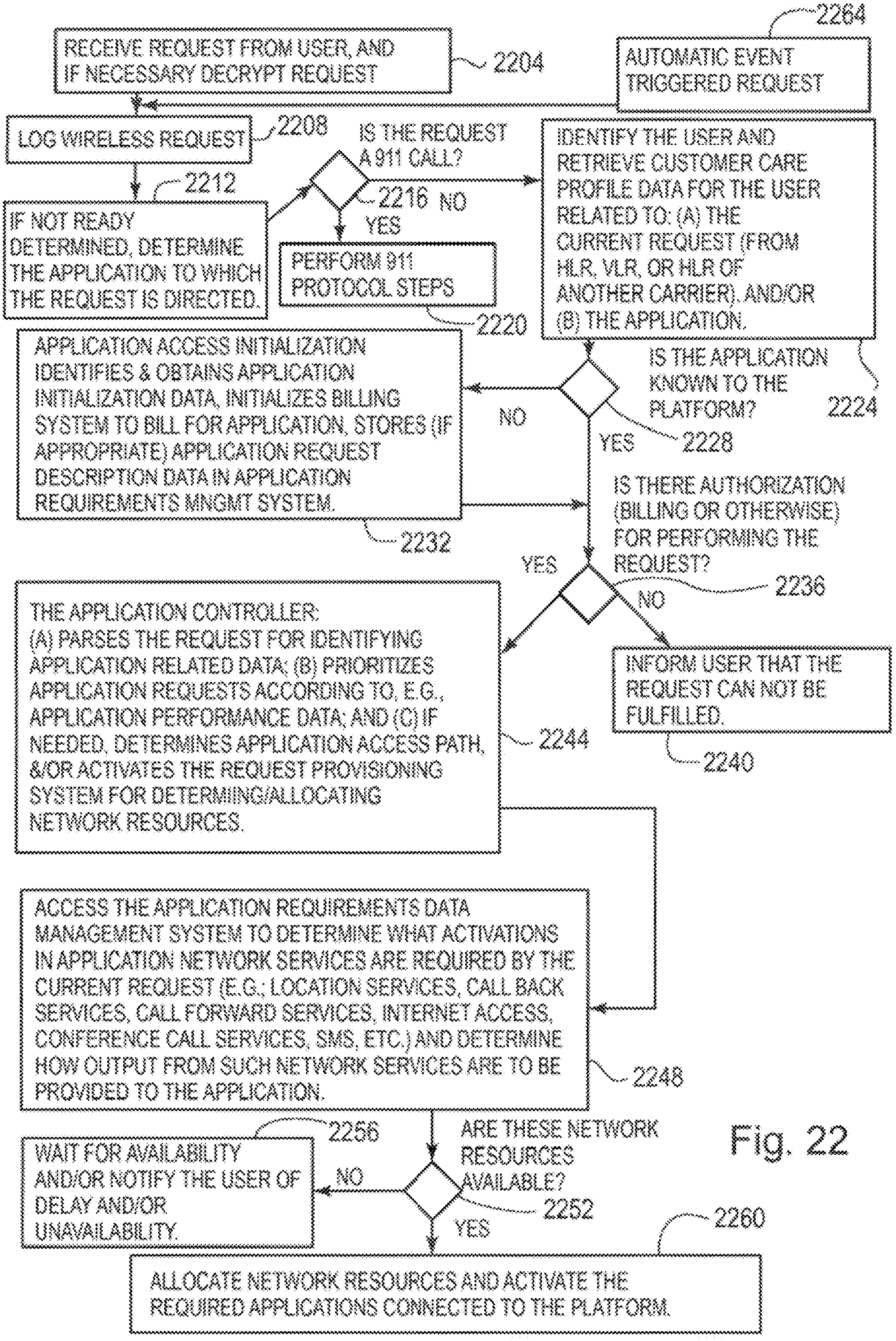
FIG. 22 is a high level flowchart of the operation of the wireless application platform of the present disclosure.

FIG. 22 shows an embodiment of the high level steps performed that can be performed by the platform 2004. Descriptions of these steps follows:

Step 2204: The subscriber interfaces 2104 (FIG. 21) receives a service request from a user 2008, via the carrier network provisioning 2012 (FIG. 20). Note that such service requests may be from users 2008 where such users include not only persons, but also entities such as businesses, employers, other telecommunication carriers, government agencies (e.g., command, control, and communications centers), law enforcement, etc. In at least some circumstances, the actual payload of the data describing the service request and/or related data in the request may be encrypted. Thus, the present step determines whether one or more portions of the service request is encrypted, and if so, activates the encryption and decryption component 2108 (FIG. 21) for decrypting the service request. Encryption/decryption cyphers are well known in the art, and accordingly will not be discussed at length here. However, the encryption and decryption component 2108 may support a substantial number encryption/decryption cyphers (e.g., RC4 and RSA, by Security Inc, Belford, Massachusetts, USA) as well as such general encryption techniques as public/private key cryptographic technique such as Diffie-Hellman.

Note that the present step may identify, e.g., at least some of the following data items:

(i) the identity of the requestor;

(ii) the identity of an entity (or entities) to whom an action of the request is directed, e.g., (a) the identity of the person or MS 140 whose wireless location is requested (this may be the mobile identification number (MIN) as one skilled in the art will understand), or (b) the identity of a package whose whereabouts is being tracked, (c) the location of an MS 140 which to be identified (e.g., in a battlefield context to determine if the location of the MS corresponds to friend or foe);

(iii) any additional data that may be needed by an application activated to fulfill the request, e.g., for an MS 140 location request, this may include the last known location of the MS;

(iv) any timing constraints that the service requesting application should aware of;

(v) any authorization code needed for granting access to any generated information about the entity (e.g., for determining a subscriber's location, a code indicating that permission has been obtained to locate the subscriber, or a code indicating that location of the subscriber is at the request of the government agency responsible for national security or crime prevention);

(vi) any encryption parameters needed for a resulting response to the request;

(vii) the identity of any specific application to be activated to fulfill the request;

(viii) any billing code required in order to bill for fulfilling the service request;

(ix) a priority for fulfilling the service request (note, emergency 911 and other time critical life threatening or emergency services will have highest priority and may pre-empt other service requests being processed by the platform 2004);

(x) identity of all destinations, entities and/or persons to which the results from the fulfillment (and/or activation) of the service request is to be transmitted;

(xi) any authorization code or protocol to be used in identifying the appropriate person or entity prior to presenting information related to the results of the service request.

Further note, however, that it is not intended that the user 2008 be required to enter all of the items identified in this step. In particular, many of these items may be automatically filled in with default values residing on the user's service requesting device.

Step 2208: With any decryption completed, the service request is now readable and accordingly may be logged in the user request & response log management database 2112 (FIG. 21) so that, e.g., (i) audits can be performed for verifying what service requests have been received, (ii) analyzing platform 2004 performance, diagnosing errors in service request processing, and/or statistical analysis of service request volume may be performed, and (iii) tracking or identifying criminal behavior and/or misuse of a service offered by the platform 2004.

Regarding the request & response log management database 2112, this database may capture and store at least most of the following information related to a service request received by the platform 2004:

(a) The identity of the party initiating the service request, e.g., a user ID or log in name;

(b) The time of receipt of the service request;

(c) The identity of the service requested;

(d) The priority of the service request (if any provided);

(e) Any time constraints that the service request is imposing (e.g., a response within 30 seconds);

(f) Information related to the source of the request, e.g., the MIN (or other identification) of an MS 140 requesting service, or an Internet address of a service requestor;

(g) Any authorization code for permitting the service request to be performed; and (h) Any billing code identifying who is to be charged.

Step 2212: Subsequently, a readable version of the service request is provided to the subscriber identification & application authorization subsystem 2116 (FIG. 21), wherein the identification of both the requestor and the application to be activated to fulfill the service request is determined. The subsystem 2116 may access various user identification repositories, such as user profile repositories collectively labeled 2120 (FIG. 21), including customer care data management systems that are maintained by, e.g., a wireless carrier responsible for the operation of the platform 2004, such repositories being, e.g., home location registers (HLRs) and Visitor Location Registers (VLRs). Additionally, some of the repositories 2120 may be accessed only via another network carrier not affiliated or responsible for the operation of the platform 2004. Such repositories may be accessed for obtaining, e.g., (i) additional user information that may not have been provided with the service request, and/or (ii) an identification of the carrier network (if any) to which the user is a subscriber. In particular, such additional information may relate to an authorization to activate, e.g., a wireless location based application, and receive a response therefrom. Note that such authorization may include two processes: a determination of whether the user is eligible to make the request (e.g., such eligibility may be substantially determined according to, e.g., the service package to which the user 2008 has subscribed and whether the user's subscription remains active), and a determination as to whether the current service request can be honored given privacy, security, and/or legal constraints that must satisfied for fulfilling the service request, e.g., location based network services where a person different from the user 2008 is to be located.

In one embodiment, if the user 2004 is a roamer (civilian or military), the network carrier operably responsible for the platform 2004 may initiate, via the subsystem 2116, a request for user profile information to be transmitted from the user's subscriber network or other central profile repository. Various embodiments of such profiles and/or data within them are provided throughout this description. Thus, a user profile may include substantially any user information that is required to allow or prohibit access, activation, or fulfillment of a network service by the user, or, by another user where the requested service, by the other user, requires accessing information about the user that is identified as being confidential or private. However, in one preferred embodiment such user profiles may be automatically requested when the roamer activates his/her MS 140 for out of network service. Moreover, it may be the case that when fulfillment of the service request requires the location or other personal information (e.g., financial information) of another user or entity, at least a portion of the profile for this other user or entity must be queried or accessed for determining whether such a location activity is permissible and/or legal, and such information may be substantially only accessible from the carrier network to which the user is a subscriber.

In order to identify the service being requested, the subsystem 2116 can access the user assessable & authorized services database 2124 (FIG. 21) for determining the services that are currently accessible from via the platform 2004, e.g., as called services or platform aware connection services as described in the Summary section hereinabove. Additionally, the database 2124 may be accessed by the subsystem 2116 for retrieving information related to who is authorized to access certain services. For example, certain network services may be available for only a particular time period(s). For example, a particular network based game may extend for a predetermined time period such as three weeks, or may be only played on non-holiday weekends when there is less network traffic. In such a case, it may more expedient to associate game activation authorization data with information identifying the game in the database 2124 than iteratively modifying, e.g., user 2008 profiles of game players for indicating when the game can be accessed as a network service. Additionally, note that a network service that is malfunctioning may be easily prevented from being accessed if such authorizations are associated with network service identifications. Furthermore, it may be the case, that an alternative service provider may be utilized for fulfilling the service. Thus, the preferred (now malfunctioning) service provider may be effectively disconnected from being accessed by users 2008, and a second less preferred backup network service activated for the providing substantially the same service in a manner that is transparent to the users 2008. Examples where such backup service providers may be desirable are: (i) when wireless location requests must be fulfilled (e.g., E911 requests) and the primary wireless location service provider is experiencing operational difficulties, then a second less desirable backup wireless location service provider may be easily activated (assuming all communication and data flow paths with the second location service provider have been previously established) by merely changing the value of the activation information for each of the primary and secondary wireless location service providers in the database 2124, (ii) when a service provider for an Internet service 2128 (FIG. 21) such as a service provider for an Internet connection, or some other Internet accessible service such as a search engine or a battlefield command and control Internet site becomes inoperative, then users 2004 may be transparently (or substantially so) switched to a corresponding backup service provider for the Internet service. Thus, the database 2124 may allow for providing a simple and effective technique for providing the platform 2004 with a measure of fail safeness to network services that are accessible via the platform 2004.

Note that the services & applications 2016 (FIG. 20) are representative examples of some of the services that may be requested as called services. However, these services may also be connection services, e.g., a 911 call may be a voice over IP connection which also provides the FCC mandated information to the 911 center. The services identified in 2016 will how be briefly described:

i. Yellow page services related to the purchase of products and/or services, and in particular electronic networked yellow page services as described more fully under the section Wireless Location Applications hereinbelow;

ii. Emergency services such as E 911 in the USA (note that emergency services are typically routed through substantially dedicated channels; however, it is believed that with increasing network bandwidth and robustness, such dedicated channels can be substantially dispensed with and, instead, such emergency services can be appropriately and timely performed by using the platform 2004 of the present disclosure. Moreover, by utilizing the platform 2004, emergency services may be significantly enhanced by, e.g., accessing the emergency caller's profile and thereby alerting friends, relatives, neighbors, and/or appropriate passersby. Additionally, caller medical information may be provided in the caller's profile such as type of medical insurance, caller medical conditions, and/or medical personal to be alerted;

iii. 411 information services, and in particular, location based information services, and more particularly "intelligent" location based information services such as the location based routing services described hereinbelow in the section titled Routing Applications, and the section titled Point of Interest Applications hereinbelow;

iv. Roaming services such as wireless concierge services that may offered to travelers by, e.g., hotels as described more fully in the section titled Roaming Services hereinbelow.

Note, however, that for different application domains very different network services may be available. For example, in a military or battlefield context there may be analogous services to some of the items (i) through (iv) immediately above; however, certainly additional network services are likely such as network services for real time control over robotic or surveillance battlefield devices.

Step 2216: Subsequently, a determination is made by the subscriber identification & application authorization subsystem 2116 as to whether the network service request is an emergency such as an E911 request.

Step 2220: If the results from Step 2216 is positive, then the subsystem 2116 activates an emergency protocol for communicating with one or more emergency response service providers 2132 (represented in FIG. 21 by the 911 processing block 2132), whereby, e.g., a predetermined series of emergency tasks or steps are performed for: (i) locating the emergency, (ii) identifying the type of emergency, and (iii) directing assistance to the emergency or directing persons out of the emergency. When the platform 2004 is used for accessing network services within a U.S. commercial mobile radio provider network (CMRS), the U.S. Federal Communications Commission (FCC) provides guidelines and mandates regarding how and what emergency tasks are performed. Such emergency protocols are well known in the art and are not elaborated on here. However, note that such emergency protocols may be different when the platform 2004 is utilized in a military or battlefield context, or in the context of a major disaster such as damage from a hurricane or a biological terrorist attack in that there may be many requests for emergency services within a relatively short timeframe (e.g., 1 minute to 12 hours or longer). However, whether the platform 2004 is utilized in a civilian or military context, a high rate of emergency service requests can be problematic for the communications network to appropriately handle. In one embodiment, of the platform 2004, the subsystem 2116 detects high rates of emergency requests, and alerts a platform controller 2136 (FIG. 21) which, e.g., allocates computational resources within the platform 2004, and handles error or exceptional event processing. The controller 2136 may in one embodiment, modify the database 2124 so that when the subsystem 2116 subsequently accesses this database for determining an emergency response service provider to service emergency requests, the database 2124 commences to distribute the output identifications of emergency response service over a plurality of such service providers. Thus, two successive requests for an emergency response service provider by the subsystem 2116 may result in different in identifications of two different service providers, whereas without the controller 2136 database modification, the same emergency response service provider would have been provided to the subsystem 2116. Note that the database 2124 may use a static or fixed allocation scheme for allocating emergency service requests among a plurality of emergency response service providers 2132 operatively connected to the platform 2004. Alternatively, a dynamic scheme may be used wherein there is feedback to the platform 2004 (and more particularly, the controller 2136) from each (or at least some) of the emergency response service providers 2132 providing data indicative of the emergency processing loads they are experiencing. For example, such feedback from an emergency response service provider may include one or more of: (i) a measurement related to the number of emergency requests that are queued and not currently being processed (e.g., the current number or the average over some time period); (ii) a measurement related to the rate at which emergency requests are being processed (e.g., an average number of emergency requests fully processed in a particular time period); (iii) one or more measurements related to the time to process a specified number of emergency requests (e.g., an average time for fully processing a moving window of 10 emergency requests, a percentage of the number of emergency requests being currently processed that are identified as likely to require very lengthy or an indeterminate amount of time to process; (iv) a measurement related to the overall emergency response processing load (e.g., this measurement identified as high whenever a measurement for (i) above exceeds a predetermined threshold, or a measurement for (iii) above exceeds a predetermine threshold).

Thus, upon receiving such feedback, the controller 2136 may be able to adjust the distribution of emergency requests among the emergency response service providers to thereby balance the loads on these service providers, or provide a higher emergency response completion rate, or provide a lower average time for providing an initial response to emergency requests. Additionally, the controller 2136 may provide instructions to, e.g., subscriber identification & application authorization subsystem 2116 so that during such load balancing, geographic location information of the user initiating emergency or 911 requests is used in the routing of such requests to particular emergency service providers (e.g., public safety answering points, or PSAPs). For example, a large hurricane may impact an area having a radius of 100 miles or more. Accordingly, numerous emergency service providers local to such an area may be overwhelmed with emergency calls. Accordingly, one or more emergency command centers may be setup to coordinate emergency response services, wherein such emergency command centers communicate with the emergency service providers (e.g., PSAPs) in the emergency effected area. Accordingly, when load balancing is initiated to direct some (or all) calls to alternative emergency service providers (e.g., PSAPs) instead of such local emergency service providers, at least emergency command center communication information is also provided to the alternative emergency service providers so that they can communicate with the one or more emergency command centers for the geographic areas from which such alternative emergency service providers are receiving emergency requests. Thus, in one embodiment, when load balancing between emergency service providers (e.g., PSAPs), the geographic location of each emergency request may be determined and used for determining the alternative emergency service provider to route the request. In particular, the alternative emergency service provider should have communications established with the corresponding emergency command center responsible for the area from which the emergency request is received. Accordingly, such load balancing may additionally cause all calls which are to be re-routed from an overloaded (or non-functioning) emergency service provider to re-routed one or more predetermined or pre-selected alternative emergency service providers. Thus, the following substeps may be performed during load balancing for each emergency request within an emergency or disaster area;

i.e., if at least one load balancing metric indicates load balancing between an emergency service provider P and some alternative emergency service provider $Q_i$ is needed, then:

Determine a percentage (or other measurement) of the emergency requests to be off-loaded from P to some $Q_i$. In one embodiment, such a percentage may be:

The maximum, less than or equal to 100 (100 otherwise), of:

[100*((terminated requests not processed by P within time period T)/(emergency requests received by P within T))+predetermined additional percentage (e.g., 5)], and

[100*(1+((emergency requests fulfilled by P within T)/(emergency requests received by P within T))], wherein the time period T may be, e.g., from one minute to 5 minutes, and wherein T may vary inversely with the number (or change in number) of emergency call requests in the immediately preceding one or more time periods (denoted here the "call volume"). Thus, assuming a substantially inversely linear relationship between T and the emergency call volume, if the call volume rises from an average of 50 calls for the time period sT of a preceding collection of one or more time periods (e.g., having an average length of 3 minutes) to 100 calls in the current time period Tc (e.g., of say 3.5 minutes), then the next time period $T_N$ may be between 1.75 and 1.5 minutes depending the number of preceding time periods used.

For each emergency request to be re-routed to an alternative emergency service provider $Q_i$, select $Q_i$ according to whether $Q_i$ is configured to communicate with the command center C for the area containing the geographic location of the source of the request, and wherein $Q_i$ is the first such configured alternative emergency service provider on a list of alternative emergency service providers for P that is not also requiring load balancing.

If no $Q_i$, was selected in (b) above, notify emergency command center C.

Additionally, such re-routing of emergency requests may also be dependent upon a geographical location of the emergency caller. In particular, emergency requests from predetermined geographical subareas of a overloaded emergency service provider may be routed to the same alternative emergency service provider. Note, that such re-routing based on emergency caller location can be performed by identifying (for wireless emergency requests) the primary base station with which the caller is in contact. Accordingly, it is believed that in most emergency or disaster designated areas, emergency calls from subareas thereof will be processed by at most one or two emergency service providers (e.g., PSAPs) while at the same time balancing call loads between emergency service providers.

Moreover, the present step also includes providing what is known as "reverse 911" protocols, wherein persons in a given area are alerted to an eminent or likely emergency situation or event which may be dangerous to them, e.g., an impending flood, an enemy aircraft that is nearby, a change in the direction of a forest fire or hurricane, etc. Thus, for such reverse 911 service requests, the requestor is likely to be a governmental agency or designated agent (e.g., a field observer), and location information, e.g., indicating the area to likely be affected by the imminent threat is provided with the service request. Accordingly, subscribers (and others that can be contacted) whose locations are identified as being in a designated area are notified of the danger. Thus, it is an aspect of the platform 2004 to push certain types of information to users' MSs 140 such as reverse 911 information.

Step 2224: If the result from step 2216 indicates that the service request is not for an emergency, then in step 2224 the subsystem 2116 may access a home location register for the user, a visitor location register providing user information, wherein such an access is for obtaining profile data for the user related to the current request. That is, the present step accesses the database (s) 2120 for retrieving profile information for the user 2008 requesting the service, and/or the user profile information related to the service or application being requested.

Step 2228: In the present step a determination is made by the subsystem 2116 as to whether the application being requested (or a comparable application) is known to the platform 2004; e.g., registered with the platform so that platform can enable the service and/or perform accounting for the service. Note that for roaming MS 140 users, they may request one or more services that are not available in a network in which they are roaming. However, substantially or somewhat comparable services may be available, and the platform 2004 may inform such a (roaming) user of the comparable service for thereby obtaining user input regarding whether to allocate resources for the comparable service, or alternatively automatically activate the comparable service for the user. For example, for a user whose medical condition is monitored continuously or periodically via automatic transmissions from the user's MS 140 to a medical monitoring service, the user may roam to a geographical area where the user's medical monitoring service is not provided. For instance, a user may have his/her heart rhythms monitored by a medical monitoring service. However, upon roaming to an area not covered by the medical monitoring service (or not covered efficiently due to time delays and/or cost), the user may be: (i) informed of such lack of coverage, and (ii) allow the user to request activation of an alternative service, (if available) and/or the user may automatically be provided with the alternative service such as a service that merely monitors blood pressure. Other examples may be also instructive. A user may have contracted with a particular rental car agency to supply the user with a particular type of car substantially wherever the user travels, and the user has requested such a car for his/her arrival in Santa Fe, New Mexico. However, upon arriving in Santa Fe, New Mexico, the user may be notified via the platform 2004: (i) that the particular type of car is unavailable, and (ii) of what alternative car selections the rental agency has, and/or that other car rental agencies have the particular car that the user can rent. In another example, a user may be provided with periodic information regarding another user's or object's status, e.g., user/object's geographic location, the temperature of the user/object, a movement of the user/object, a configuration of user/object (e.g., computer network configuration), etc. However, if the user/object moves to an area that cannot support (or cost effectively) can support the transmission of such information, a comparable service (if available) may be offered to the user.

Step 2232: If the result from step 2228 is negative, then in one embodiment of the present step, an applications controller 2144 (FIG. 21) and more particularly, application access initialization 2148 attempts to obtain data for initializing access to the requested (or comparable) service, and/or to provide the billing system 2140 with sufficient information for billing for the service request. For example, the platform 2004 may request activation schema or script data from the requested service for activating the service for the user. Such schema or script data may include identifications of network bandwidth required/desired, when to activate the service, the length of time network resources will be needed, network quality of transmission characteristics required/desired, and/or payment information for billing the user via the user's network provider. If the application access initialization 2148 is successful in obtaining sufficient information, then the retrieved application request description data may be in the application requirements database management system 2152. However, in another alternative embodiment of the present step, the application access initialization 2148 outputs a failure code for the request, and this code is provided to the subscriber interfaces component 2104, wherein an appropriate representation of this failure is presented to the user 2008 by accessing the presentation engine 2156 for generating a presentation that is presentable at the user's network device such as an MS 140. Subsequently, in this alternative embodiment, the process of FIG. 22 terminates relative to the service request being processed.

Step 2236: If the result from step 2228 is positive or the requested application can be otherwise initiated via step 2232, then in one embodiment the subsystem 2116 determines whether there is authorization for activating an application for fulfilling the service request. In one embodiment, the billing system 2140 (FIG. 21) may be accessed for determining whether the request by a user 2008 should be honored. Note such access to the billing system 2140 may be desirable since an important aspect of the platform 2004 is the ability to provide common network services (and in particular complex network services, and more particularly, wireless location based network services) to a large and potentially varying number of network services. For example, it may be the case that a user 2008 is denied further access to a particular network service by the platform 2004 due to a delinquent payment or disputed charges, but the user is given access to other network services (e.g., network services paid by another, such as an employer, a parent, a financial institution, etc.).

Step 2240: If the result of step 2236 is negative, then in a similar manner to the alternative embodiment of step 2232 a failure indication is output to the user.

Step 2244: If the result of step 2236 is positive, then the applications controller 2144 performs the following steps: (a) it parses the service request for identifying service request specific data; (b) it prioritizes the service request according to, e.g., desired performance requirements (e.g., network bandwidth requirements, security requirements, encryption requirements, response requirements, etc.) for fulfilling the service request and priority; and (c) if needed, determines network access paths for accessing the application that can fulfill the service request, and/or activates the request provisioning system 2160 for determining/allocating network resources such as equipment and bandwidth (e.g., virtual private communication channels or allocating bandwidth for a user requested movie to be streamed to his/her MS 140).

Step 2248: In the present step, the applications controller 2144 in combination with the request provisioning system 2160: (a) accesses the applications requirements data management system 2152 to determine what activations of other network services are required by the current service request being processed by the applications controller 2144, and (b) determines how such additional network service output(s) is to be provided to the current service request being processed; e.g., output format, output timing restrictions, accuracy restrictions, etc. Note that the applications requirements data management system 2152 may include scripts or other interpretative or executable code that identifies a series of intermediate service requests that must be performed to the fulfill the user's input service request. Moreover, in some embodiments, the user's input service request may substantially identify such intermediate steps and thereby over ride any default intermediate service requests in the data management system 2152. In particular, the user service request input may be declarative in nature, wherein the user input identifies what is to be performed in as much detail as desired, and the system 2152 determines the mapping between a desired output and the one or more service requests that need to be fulfilled in order to fulfill the user's request. Thus, for each service request for which the platform 2004 is responsible for processing, the system 2152 includes, e.g., a script, schema or other data structure indicating the services to be activated, and any sequencing of those services. Note that by providing such data structures (e.g., service request scripts) so that they are accessible by the platform 2004, the following advantages are obtained: (1) any backup or alternative services that can be used may be performed as necessary without the users 2004 having to specify such alternatives; (2) network and/or service request enhancements may be more easily utilized in fulfilling certain service requests; e.g., certain location based service requests may require a particular location accuracy and such accuracy may require activating more than one location service provider. Typically, the wireless location gateway or location center 142 would provide such functionality. However, certain networks may assume such functionality, and not utilize such a gateway, and the platform 2004 may assume such responsibility. Accordingly, such scripts for location based services that require a predetermined accuracy may be modified without the need to change user service request inputs to the platform 2004. Thus, a location based dating service may require location based information of mobile stations 140 that are within 20 meters of one another, and it may be determined (e.g., through user complaints) that the accuracy currently being provided is insufficient. Thus, the corresponding script for fulfilling an activation of the dating service request may be changed to use additional location service providers and/or a location gateway 142 entirely transparent to the users 2008. In another example, if the platform 2004 offers a service to obtain estimates for obtaining discounted hotel rooms for users 2008 seeking immediate occupancy in a relatively local geographical area (e.g., a city or within 5 miles of the user), the script for such a service may change frequently according to season, occupancy rates, hotels opting in or out of such a service.

Step 2252: A determination is made by the applications controller 2144 as to whether there are currently sufficient network resources available to appropriately fulfill the service request currently being processed (more precisely, attempting to be processed).

Step 2256: If the result from step 2252 is negative, then in one embodiment of the present step, the applications controller 2144 re-queues the current service for examining at a later time and commences processing another service request as the current request. Additionally, the applications controller 2144 may issue an allocation request to the request provisioning system 2160 to reserve certain network resources (e.g., reserve a high bandwidth data channel) if such is needed by the previous "current" service that has been re-queued. If the re-queued service request is not processed within a request specific amount of time, then as in the alternative embodiment of step 2232, the user 2008 is informed of the failure of the service request. However, in one alternative embodiment, instead of notifying the user 2008 of failure, the user may be notified that there is a delay in fulfilling the service request, and the user may be provided with the option of canceling the service request or waiting for its fulfillment.

Step 2260: The applications controller 2144 activates one or more applications for fulfilling the service request currently being processed since all the network resources it requires are available as well as the application(s) for fulfillment of the request. For example, the applications illustrated in FIG. 20 may be activated by applications controller 2144, and such an activation(s) may be via the application gateway (FIG. 21) for activating specific applications as one of ordinary skill in the art will understand. Note that the service request data processed by the applications controller 2144 may be in the form of a script that the controller 2144 interprets.

Step 2264: In some circumstances, service requests are automatically activated as, e.g., intermediate steps in fulfilling another service request. Accordingly, the present step illustrates the performance of such automatically activated service requests.

The above high level description of the processing performed by the platform 2004 is also applicable to disaster or large scale emergency management and communication such as occurs during hurricanes, floods, earthquakes, combat situations, and the like where communications and applications may need to be modified rapidly. In particular, by providing a standard script or schema for requesting network services and/or provisioning, network applications may be easily incorporated into embodiments of the present disclosure. For example, during a hurricane or earthquake, high call volume capacity mobile base stations may be required to compensate for damaged or malfunctioning geographically fixed base stations of a wireless carrier's infrastructure, and/or to handle an increase in call volume. However, network services not related to disaster assistance may need to be severely restricted, and such restrictions may be easily provided via the platform 2004 since the applications requirements database management system 2152 (FIG. 21) to temporarily disable or restrict non-essential network services (e.g., high bandwidth network games, etc.). Moreover, by establishing appropriate profiles for emergency responder personnel in the user profile repositories 2120, such personnel may be able to activate network services/applications that may be restricted from general use. So, e.g., while non-emergency requests for multi-point conference calls may be restricted or unavailable to the public in general, such network services may be available to various emergency responder personnel. Thus, it is aspect of the present disclosure that authorization for accessing network services/applications can be selectively provided to one or more groups of users, wherein individuals are identified as to whether they are such groups by accessing each individual's profile in the profile repositories 2120. Accordingly, large numbers network users (where most of the users are unrelated to one another at least in the sense that the network services for which each has contracted is unrelated to the contracted network services of most others) may be restricted from accessing certain network services, and/or allowed to access certain network services dependent upon, e.g., which group of a hierarchy of network user groups with which each user is identified via his/her profile. Moreover, it important to note that network service requests may be grouped into one or more groups, wherein access and/or denial of network services may depend on the user's geographic location (and/or the location network infrastructure by which the user accesses the network). For example, an MS 140 user within an area hit by a disaster may not be provided with wireless Internet service, whereas if this same user were in an area remote from the disaster wireless Internet service may be provided. Thus, in one embodiment, the following hierarchy of network service requests may be utilized (from highest priority for network services to lowest priority for network services) when a disaster is declared, e.g., by a governmental entity:

(a) Emergency requests by personnel directors and supervisors directing emergency assistance efforts related to the disaster (such individuals having profiles for identifying themselves as emergency personnel directors and supervisors). Note that such directors and supervisors may be individuals in charge of governmental and/or military operations related to the disaster;

(b) Emergency command center communications for directing emergency assistance efforts related to the disaster (e.g., with emergency responder personnel and/or emergency response centers, e.g., PSAPs);

(c) Network emergency request calls by users dialing an emergency number, e.g., 911; note that in one embodiment, the locations of such users may be aggregated on a display device for emergency response personnel (e.g., PSAP 911 operators) so that emergency assistance personnel assisting one user can also be directed to assist other nearby users also seeking emergency assistance while such personnel reside in the area.

(d) Network service requests by users requesting non-emergency network services within the disaster area (e.g., as defined by a governmental entity). Accordingly, for each user within a disaster area, each requested network access by the user may be accompanied by information indicating the user is in the disaster area (e.g., the identification of the primary base station with which the user is communicating) so that the request can be identified as having relatively low priority. Additionally, a user outside of the disaster area that is requesting access to network resources in the disaster area may be prevented or delayed from doing so. For example, if the last known wireless coverage area of a user being called is in the disaster area (as, e.g., identified in the called user's home location register or visitor location register), then the call may be given a relatively low priority.

Thus, it is an aspect of the present disclosure that within a disaster area, network allocation may be driven at least partially by geographical location of network resources being requested.

Additional processing capabilities that various embodiments of the platform 2004 will now be described:

(a) billing system 2140: Note that in one embodiment of the platform 2004, the billing system 2140 (or an enhancement thereto) is the billing system of the wireless carrier with whom the user 2008 subscribes for wireless services. It is contemplated that for various wireless applications, and particularly location based applications, such applications can be more quickly made available to subscribers 2008 if the already existing network infrastructure and support services (such as billing) are used. Thus, assuming an appropriate and preferably uniform interface between service request fulfillment application management processes (not shown) and the billing system 2140 is provided, business rules, charges for existing, new and removed application services maybe communicated to the billing system 2140. Furthermore, such a central billing system 2140 makes it easier for network services, and in particular, complex network services such as location based services to be bundled or packaged together and potentially provided under the trademarks or service marks of the wireless carrier even though such "private label" applications (identified in FIG. 20 by the components labeled 2020 and 2024) are owned and operated by third parties. Moreover, such a central billing system 2140 also has the advantage of providing fewer individual bills to the subscribers 2008 in that charges for such services may be incorporated into the bill provided by the subscriber's wireless carrier;

(b) data exposure engine (FIG. 21): This component provides the functionality described in the Wireless Application Platform Services and Architecture section of the Summary entitled "data exposure processing".

Wireless Location Applications

Such wireless location applications as were briefly described above in reference to the gateway 142 will now be described in further detail. Note that the following location related services are considered within the scope of the wireless location capabilities disclosed herein, and such services can, in general, be provided without use of a gateway 142, albeit, e.g., in a likely more restricted context wherein not all available wireless location estimating techniques are utilized, and/or by multiplying the number of interfaces to geolocation service providers (e.g., distinct wireless location interfaces are provided directly to each wireless location service provider utilized).

Routing Applications

Routing For Personal Services

In one noteworthy routing application, hotels and other personal service providers, such as auto rental agencies, resorts and cruise ships may provide inexpensive or free wireless concierge services to their customers, wherein an inexpensive MS 140 can offered to customers that can be used substantially only for contacting: (i) the personal service, (ii) emergency services, (iii) receiving directions to return to the personal service, and/or (iv) routing or directing customers predetermined locations such as historic sites, shopping areas, and/or entertainment. In a similar fashion, instead of providing such a dedicated MS 140, the personal service could in an alternative embodiment, allow customers access such information from their own personal mobile stations 140. In one embodiment, this may be accomplished by allowing a user to attach such information to their user profiles and thereby obtain at least temporary access to a wireless concierge providing one or more of the location based services (i)-(iv) immediately above. Accordingly, the MS 140 may be wirelessly located during operations (ii) and (iii) via wireless communications between the MS 140 and a local commercial wireless service provider wherein a request to locate the MS 140 is provided to, e.g., the gateway 142, and the resulting MS location estimate is: (1) provided to a public safety emergency center (e.g., E911) for dispatching emergency services, or (2) provided to a mapping and routing system such as provided by MapInfo or Google Maps and disclosed in U.S. Pat. No. 6,236,365 (which is fully incorporated herein by reference) so that the MS 140 user may be routed safely and expeditiously to a predetermined location of the personal service. Note that data representing the location of the personal service can be associated with an identification of the MS 140 so that MS activation for (iii) above results in one or more audio and/or visual presentations of directions for directing the user to return to the personal service.

Additionally, directions to such personal services may be made available to the personal MS 140 of a user, wherein upon calling a number (or accessing a website via the MS), the directions to a desired destination may be transmitted to the MS and presented to the user. Moreover, such directions may be dependent upon how the MS user is traveling. For example, if it is known (or presumed) that the user is in a vehicle such as an auto, the user may be directed first to a parking garage rather than to the front door of a government agency building. Alternatively, if it is known (or presumed) that the user is on foot, then the MS user may indeed be directed to the front door of the government agency building. Similarly, if the MS 140 is determined to be on a train, bicycle, watercraft, etc. such modes of conveyance may be used in determining an appropriate route to present to the MS user. In one embodiment of the present disclosure, traffic congestion may also be used to determine an appropriate route to present to the MS user.

Moreover, it is an aspect of the present disclosure that the MS 140 user may be tracked by, e.g., periodic MS location determinations, until the MS user is substantially at the personal service. Note that if the MS 140 user does not correctly follow the directions received, then for a predetermined deviation (e.g., dependent upon whether it is perceived that the user is on foot or in a vehicle, which may be determined according to the user's velocity and/or acceleration) the MS user may be alerted to the deviation and a new route determined dependent upon, e.g., the user's new location, the direction that the user is traveling, and/or the mode of transportation. For example, if the MS 140 user got on an subway train, then after one or more locations of the MS user have been performed, if such locations are sufficiently accurate, it can be determined whether the user is proceeding along a route consistent with directions provided, and that the user is on the subway. In the case where the MS user got onto the wrong subway train, the user can be alerted of this fact and given the opportunity to have a new route determined which takes into account not only the user's location, but where the user can exit the subway train, and likely, the subway train schedules for expeditiously getting the MS user to his/her destination.

Register Locations for Later Routing Thereto

In another routing related application of the present disclosure, an MS 140 and the MS location providing wireless network may provide the MS user with functionality to register certain locations so that data representing such locations can be easily accessed for use at a later time. For example, the MS 140 user may be staying at a hotel in an unfamiliar area. Accordingly, using the present capability of the disclosure, the user can request, via his/her MS 140, that his/her location at the hotel be determined and registered so that it is available at a later time for routing the user back to the hotel. In fact, the user may have personal location registrations of a plurality of locations in various cities and countries so that when traveling the user has wireless access to directions to preferred locations such as his/her hotel, preferred restaurants, shopping areas, scenic areas, rendezvous points, theatres, athletic events, churches, entertainment establishments, locations of acquaintances, etc. Note, that such personal location registration information may reside primarily on the user's subscriber network, but upon the MS user's request, his/her personal location registrations may be transmitted to another network from which the user is receiving wireless services as a roamer. Moreover, any new location registrations (or deletions) may be duplicated in the user's personal registration of the user's subscriber network. However, in some instances an MS user may wish to retain such registered locations only temporarily while the user is in a particular area; e.g., a predetermined network coverage area. Accordingly, the MS user may indicate (or such may be the default) that a new personal location registration be retained for a particular length of time, and/or until a location of the user is outside the area to which such new location registrations appear to be applicable. However, prior to deleting any such registrations, the MS user may be queried to confirm such deletions. For example, if the MS user has new location registrations for the Dallas, Texas area, and the MS user subsequently travels to London, then upon the first wireless location performed by the MS user for location registration services, the MS user may be queried as to whether to save the new Dallas, Texas location registrations permanently, for an particular length of time (e.g. 30 days), or delete all or selected portions thereof.

Other routing related applications of the present disclosure are for security (e.g., tracking how do I get back to my hotel safely), and, e.g., sightseeing guided tour where the is interactive depending on feedback from users Tracking at Predetermined Times/Schedules A tracking application for the MS 140 and the MS location providing wireless network (e.g., a wireless carrier (e.g., a CMRS, FIG. 15), a PSTN 124 or the Internet 468) may also provide the MS user with the ability to explicitly request to be substantially continuously tracked, wherein the MS tracked locations are stored for access by those having permission (e.g., the user, parents and/or associates of the user). Additionally, the velocity and/or expected time of arrival at a predetermined destination may be derived from such tracking and may be provided to the user or his/her associates (e.g., employer, friends, and/or family). Further, note that this tracking and notification of information obtained therefrom may be provided via a commercial telephony or Internet enabled mobile station, or a mobile station in operable communication with a short messaging service. For example, the MS registered owner may provide the tracking application permissions for those able to access such MS tracking information so that such information can be automatically provided to certain associates and/or provided on request to certain associates. Additionally, note that the tracking application may also allow the MS user to deactivate such MS tracking functionality. In one embodiment, an MS user may activate such tracking for his/her MS 140 during working hours and deactivate such tracking during non-working hours. Accordingly, an employer can then track employee's whereabouts during work hours, while the employee is able to retain his/her location privacy when not working although the employer may be still able to contact the employee in case of an emergency during the employee's non-working time. Note, that this location capability and method of obtaining location information about an MS user while assuring privacy at other times may be useful for appropriately monitoring personnel in the military, hospitals, transportation services (e.g., for couriers, bus and taxis drivers), telecommunications personnel, emergency rescue and correctional institution personnel. Further, note that this selective MS location capability may be performed in a number of ways. For example, the MS 140 and/or the tracking application may activate and deactivate such tracking by dialing a predetermined number (e.g., by manually or speed dialing the number) for switching between activation of a process that periodically requests a wireless location of the MS 140 from, e.g., the location gateway 142. Note that the resulting MS location information from the tracking application may be made available to other users at a predetermined phone number, Internet address and/or having sufficient validation information (e.g., a password). Alternatively/additionally, the tracking application may automatically activate such MS tracking for predetermined times of the day, for predetermined days of the week and/or when an MS is within a predetermined area (or outside of a predetermined area). Note that this latter embodiment (of automatically activating and/or deactivating) may be particularly useful for both tracking employees, e.g., at large construction sites, and, e.g., determining when each employee is at his/her work site. Thus, in this embodiment, the tracking application may provide database storage of times and days of the week for activation and deactivation of this selective MS tracking capability that is accessible via, e.g., a network service control point 104 (or other network control points or servers as one skilled in the art will understand), wherein triggers may be provided within the database for generating a network message (to, e.g., a wireless location gateway) requesting the commencement of tracking the MS 140 or the deactivation of such tracking. Accordingly, the resulting MS location information may be provided to an employer's tracking and/or payroll system so that the employer is able to determine the actual time an employee arrives at and leaves a work location site.

Concierge Related Services

There may also be concierge related services provided by a mobile station accessible application wherein a user's personal geographic related data and/or data related thereto may be presented to the user depending on the geographical location of the user and depending upon past user experience (personally by the user and/or aggregately by others users). For example, a hotel chain may offer regional and/or global wireless concierge services wherein local location based information, such as information on sites, activities, events, routes and types of transportation that are local to users may be made available to the users, and such local location based information may be combined with user preferences and evaluations for determining what to present to the user (via his/her mobile station). Such local location based information may identify preferred restaurants, shopping areas, points of interest, entertainment, exercise areas, travel routes, bus (train or boat) schedules, parking areas (e.g., that may be subsidized by the hotel chain), sports equipment rentals, emergency services (police, fire, etc.), wherein such preferred items are in a geographical area (such as a metropolitan area, a resort area, a theme park or other relatively local area) where a user is located. In one embodiment, such geographically related user profile activations may be performed automatically such that local location based information indicative of such local items receives priority when the user enters a request that can be satisfied by entities identified in such local location based information. Note that a potentially simple embodiment of this aspect of the present disclosure may be, e.g., for a hotel chain, to have an Internet website having for each of their hotels, corresponding web pages dedicated to local location based information in identifying geographic areas such local items (e.g., local restaurants, shopping sites, points of interest, bus routes, etc.), e.g., within the same city as the hotel or surrounding within the hotel, e.g. a mile of the hotel. Such web pages may provide searching and routing capabilities related to the local location based information. In one embodiment, a user's personal local geographical preferences (or specific portions thereof) may be stored and maintained, e.g., (i) by a network service, such as a wireless carrier, (ii) by the user himself (i.e., on the user's MS 140, assuming the user's MS 140 has sufficient storage capacity), (iii) by an electronic yellow pages entity, (iv) by an Internet search engine, or (iv) by a hotel or other entity providing local geographical user assistance. In one embodiment, such assistance may be made available (at least temporarily) via a hotel's Internet wireless concierge capabilities so that user service requests can be easily customized to the user's preferences. Moreover, such Internet access may provide access (at least while the user is staying at the hotel) to discounts, coupons, and/or free access to various preferred local facilities or establishments.

Additionally and/or alternatively, a user 2008 (FIG. 20) may be able to store and associate a location with a user input description (and possibly a picture if the user's MS 140 supports such) and store such information (e.g., in a user profile related to the user's mobile station) so that it is available at a later time, e.g., when the user is once again in the same geographical area.

Advertising Applications

Advertising may be directed to an MS 140 according to its location. In at least some studies it is believed that MS 140 users do not respond well to unsolicited wireless advertisement whether location based or otherwise. However, in response to certain user queries for locally available merchandise, certain advertisements may be viewed as more friendly. Thus, by allowing an MS user to contact, e.g., a wireless advertising portal by voice or via wireless Internet, and describe certain products or services desired (e.g., via interacting with an automated speech interaction unit), the user may be able to describe and receive (at his/her MS 140) audio and/or visual presentations of such products or services that may satisfy such a user's request. For example, a user may enter a request: "I need a Hawaiian shirt, who has such shirts near here?"

Figure 23A:
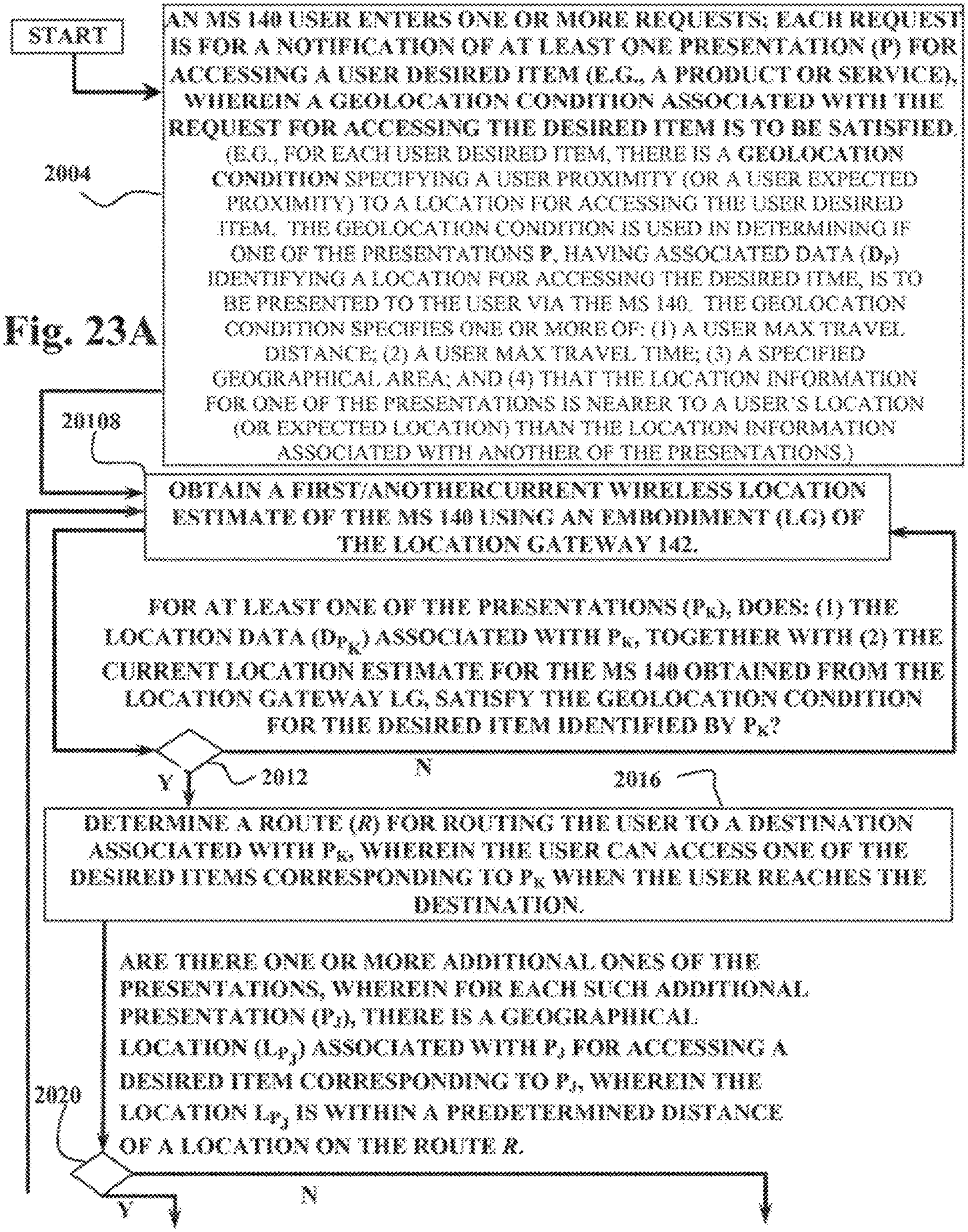
FIGS. 23A and 23B show a flowchart of the steps performed for routing a user along a route that includes a plurality of locations where the user can access a desired item (product or service) at each of the plurality of locations.
Figure 23B:
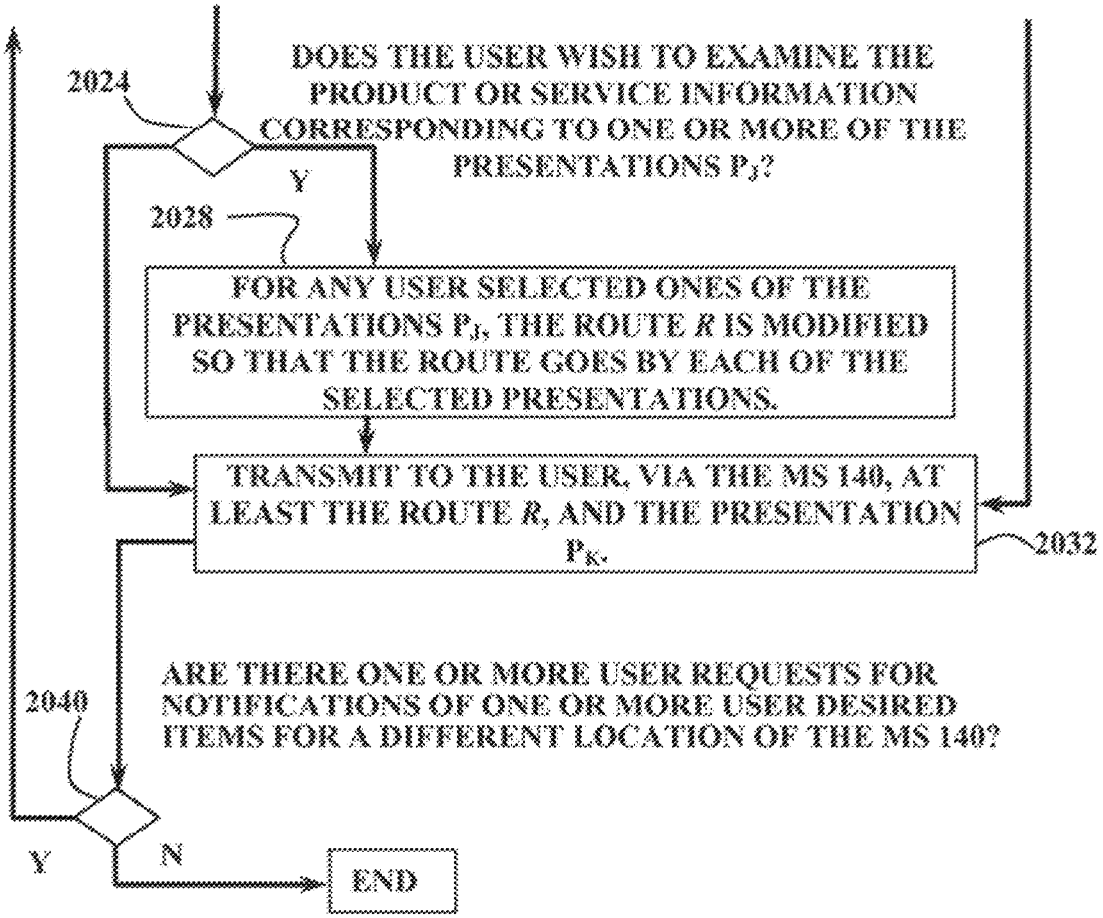

In the area of advertising, the present disclosure has advantages both for the MS user (as well as the wireline user), and for product and service providers that are nearby to the MS user. For instance, an MS user may be provided with (or request) a default set of advertisements for an area when the MS user enters the area, registers with a hotel in the area, or makes a purchase in the area, and/or requests information about a particular product or service in the area. Moreover, there may be different collections of advertisements for MS users that are believed to have different demographic profiles and/or purposes for being in the area. Accordingly, an MS whose location is being determined periodically may be monitored by an advertisement wizard such that this wizard may maintain a collection of the MS user's preferences, and needs so that when the MS user comes near a business that can satisfy such a preference or need, then an advertisement relating to the fulfillment of the preference or need may be presented to the MS user. However, it is an aspect of the disclosure that such potential advertising presentations be intelligently selected using as much information about the user as is available. In particular, in one embodiment of the disclosure MS user preferences and needs may be ordered according to importance. Moreover, such user preferences and needs may be categorized by temporal importance (i.e., must be satisfied within a particular time frame, e.g., immediately, today, or next month) and by situational importance wherein user preferences and needs in this category are less time critical (e.g., do not have to be satisfied immediately, and/or within a specified time period), but if certain criteria are met the user will consider satisfying such a preference or need. Thus, finding a Chinese restaurant for dinner may be in the temporal importance category while purchasing a bicycle and a new pair of athletic shoes may be ordered as listed here in the situational category. Accordingly, advertisements for Chinese restaurants may be provided to the user at least partially dependent upon the user's location. Thus, once such a restaurant is selected and routing directions are determined, then the advertising wizard may examine advertisements (or other available product inventories and/or services that are within a predetermined distance of the route to the restaurant for determining whether there is product or service along the route that could potentially satisfy one of the user's preferences or needs from the situational importance category. If so, then the MS user may be provided with the option of examining such product or service information and registering the locations of user selected businesses providing such products or services. Accordingly, the route to the restaurant may be modified to incorporate detours to one or more of these selected businesses. The flowchart of FIGS. 23A and 23B provides steps that illustrate the modification (if necessary) of such a route so that the MS user can visit one or more locations along the route for accessing one or more additional products or services.

Of course, an MS user's situationally categorized preferences and needs may allow the MS user to receive unrequested advertising during other situations as well. Thus, whenever an MS user is moving such an advertisement wizard (e.g., if activated by the user) may attempt to satisfy the MS user's preferences and needs by presenting to the user advertisements of nearby merchants that appear to be directed to such user preferences and needs.

Accordingly, for MS user preferences and needs, the wizard will attempt to present information (e.g., advertisements, coupons, discounts, product price and quality comparisons) related to products and/or services that may satisfy the user's corresponding preference or need: (a) within the time frame designated by the MS user when identified as having a temporal constraint, and/or (b) consistent with situational criteria provided by the MS user (e.g., item on sale, item is less than a specified amount, within a predetermined traveling distance and/or traveling time) when identified as having a situational constraint. Moreover, such information may be dependent on the geolocation of both the user and a merchant(s) having such products and/or services. Additionally, such information may be dependent on a proposed or expected user route (e.g., a route to work, a trip route). Thus, items in the temporal category may be ordered according to how urgent must a preference or need must be satisfied, while items in the situational category may be substantially unordered and/or ordered according to desirableness (e.g., an MS user might want a motorcycle of a particular make and maximum price, but want a new car more). However, since items in the situational category may be fulfilled by substantially serendipitous circumstances detected by the wizard, various orderings or no ordering may be used. Thus, e.g., if the MS user travels from one commercial area to another, the wizard may compare a new collection of merchant products and/or services against the items on an MS user's temporal and situational lists, and at least alerting the MS user that there may be new information available about a user desired service or product which is within a predetermined traveling time from where the user is. Note that such alerts may be visual (e.g., textual, or iconic) displays, or audio presentations using, e.g., synthesized speech (such as "Discounted motorcycles ahead three blocks at Cydes Cycles").

Electronic Yellow Pages

Figure 19:
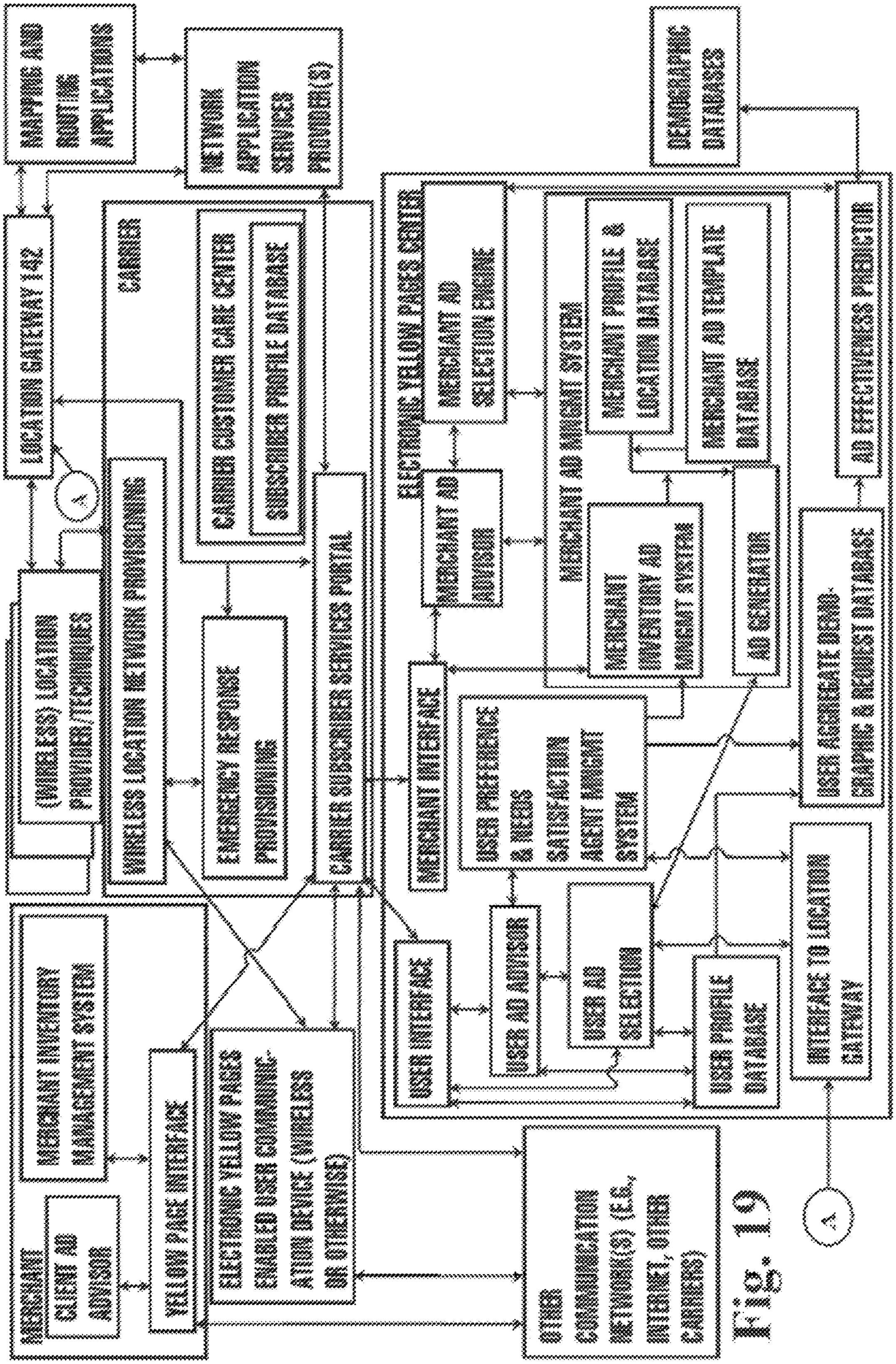
FIG. 19 is a block diagram of an electronic networked yellow pages for providing intelligent advertising services, wherein wireless location services may be utilized.

Note that the advertising aspects of the present disclosure may be utilized by an intelligent electronic yellow pages which can utilize the MS user's location (and/or anticipated locations; e.g., due to roadways being traversed) together with user preferences and needs (as well as other constraints) to both intelligently respond to user requests as well as intelligently anticipate user preferences and needs. A block diagram showing the high level components of an electronic yellow pages according to this aspect of the present disclosure is shown in FIG. 19. Accordingly, in one aspect of the present disclosure advertising is user driven in that the MS user is able to select advertising based on attributes such as: merchant proximity, traffic/parking conditions, the product/service desired, quality ratings, price, user merchant preferences, product/service availability, coupons and/or discounts. That is, the MS user may be able to determine an ordering of advertisements presented based on, e.g., his/her selection inputs for categorizing such attributes. For example, the MS user may request advertisements of athletic shoes be ordered according to the following values: (a) within 20 minutes travel time of the MS user's current location, (b) midrange in price, (c) currently in stock, and (d) no preferred merchants. Note that in providing advertisements according to the MS user's criteria, the electronic yellow pages may have to make certain assumptions such if the MS user does not specify a time for being at the merchant, the electronic yellow pages may default the time to a range of times somewhat longer than the travel time thereby going on the assumption that MS user will likely be traveling to an advertised merchant relatively soon. Accordingly, the electronic yellow pages may also check stored data on the merchant (e.g., in the merchant profile & location database of FIG. 19) to assure that the MS user can access the merchant once the MS user arrives at the merchant's location (e.g., that the merchant is open for business). Accordingly, the MS user may dynamically, and in real time, vary such advertising selection parameters for thereby substantially immediately changing the advertising being provided to the user's MS. For example, the MS display may provide an area for entering an identification of a product/service name wherein the network determines a list of related or complementary products/services. Accordingly, if an MS user desires to purchase a wedding gift, and knows that the couple to be wed are planning a trip to Australia, then upon the MS user providing input in response to activating a "related products/services" feature, and then inputting, e.g., "trip to Australia" (as well as any other voluntary information indicating that the purchase is for: a gift, for a wedding, and/or a price of less than $100.00), then the intelligent yellow pages may be able to respond with advertisements for related products/services such as portable electric power converter for personal appliances that is available from a merchant local (and/or non-local) to the MS user. Moreover, such related products/services (and/or "suggestion") functionality may be interactive with the MS user. For example, there may be a network response to the MS user's above gift inquiry such as "type of gift: conventional or unconventional?". Moreover, the network may inquire as to the maximum travel time (or distance) the MS user is willing to devote to finding a desired product/service, and/or the maximum travel time (or distance) the MS user is willing to devote to visiting any one merchant. Note that in one embodiment of the electronic yellow pages, priorities may be provided by the MS user as to a presentation ordering of advertisements, wherein such ordering may be by: price, quality, convenience to purchase, language spoken at the merchant, user safety concerns in traveling to or being at the merchant's location, etc.

Note that various aspects of such an electronic yellow pages described herein are not constrained to using the MS user's location. In general, the MS user's location is but one attribute that can be intelligently used for providing users with targeted advertising, and importantly, advertising that is perceived as informative and/or addresses current user preferences and needs. Accordingly, such electronic yellow page aspects of the present disclosure are not related to a change in the MS user's location over time also apply to stationary communication stations such home computers wherein, e.g., such electronic yellow pages are accessed via the Internet. Additionally, the MS user may be able to adjust, e.g., via iconic selection switches (e.g., buttons or toggles) and icon range specifiers (e.g., slider bars) the relevancy and a corresponding range for various purchasing criteria. In particular, once a parameter is indicated as relevant (e.g., via activating a toggle switch), a slider bar may be used for indicating a relative or absolute value for the parameter. Thus, parameter values may be for: product/service quality ratings (e.g., display given to highest quality), price (low comparable price to high comparable price), travel time (maximum estimated time to get to merchant), parking conditions.

Accordingly, such electronic yellow pages may include the following functionality:

(a) dynamically change as the user travels from one commercial area to another when the MS user's location is periodically determined such that local merchants are given preference;

(b) routing instructions are provided to the MS user when a merchant is selected;

(c) provide dynamically generated advertising that is related to an MS user's preferences or needs. For example, if an MS user wishes to purchase a new dining room set, then such an electronic yellow pages may dynamically generate advertisements (e.g., via the ad generation component of the merchant ad management system of FIG. 19) with dining room sets therein for merchants that sell them. Note that this aspect of the present disclosure is can be accomplished by having, e.g., a predetermined collection of advertising templates (e.g., in the merchant ad template database, FIG. 19) that are assigned to particular areas of an MS user's display wherein the advertising information is selected according to the item(s) that the MS user has expressed a preference or desire to purchase, and additionally, according to the user's location, the user's preferred merchants, and/or the item's price, quality, as well as coupons, and/or discounts that may be provided. Thus, such displays may have a plurality of small advertisements that may be selected for hyperlinking to more detailed advertising information related to a product or service the MS user desires. Note that this aspect of the present disclosure may, in one embodiment, provide displays (and/or corresponding audio information) that is similar to Internet page displays. However, such advertising may dynamically change with the MS user's location such that MS user preferences and needs for an item(s) (including services) having higher priority are given advertisement preference on the MS display when the MS user comes within a determined proximity of the merchant offering the item. Moreover, the MS user may be able dynamically reprioritize the advertising displayed and/or change a proximity constraint so that different advertisements are displayed. Furthermore, the MS user may be able to request advertising information on a specified number of nearest merchants that provide a particular category of products or services. For example, an MS user may be able to request advertising on the three nearest Chinese restaurants that have a particular quality rating. Note, that such dynamically generated advertising (d) information about MS users' preferences and needs may be supplied to yellow page merchants regarding MS users who reside and/or travel nearby yellow subscriber merchant locations as described hereinabove FIG. 19 (Block Diagram of Electronic Yellow Pages)

The following is a high level description of some of the components shown in FIG. 19 of an illustrative embodiment of the electronic yellow pages of the present disclosure.

a. Electronic yellow pages center: Assists both the users and the merchants in providing more useful advertising for enhancing business transactions. The electronic yellow pages center may be a regional center within the carrier, or (as shown) an enterprise separate from the carrier. The center receives input from users regarding preferences and needs which are first received by the user interface.

b. User interface: Receives input from a user that validates the user via password, voice identification, or other biometric capability for identifying the user. Note that the identification of the user's communication device (e.g., phone number) is also provided. For a user contact, the user interface does one of: (a) validates the user thereby allowing user access to further electronic yellow page services, (b) requests additional validation information from the user, or (c) invalidates the user and rejects access to electronic yellow pages. Note that the user interface retrieves user identification information from the user profile database (described hereinbelow), and allows a validated user to add, delete, and/or modify such user identification information.

c. User ad advisor: Provides user interface and interactions with the user. Receives an identification/description of the user's communication device for determining an appropriate user communication technique. Note that the user ad advisor may also query (any) user profile available (using the user's identity) for determining a preferred user communication technique supported by the user's communication device. For example, if the user's communication device supports visual presentations, then the user ad advisor defaults to visual presentations unless there are additional constraints that preclude providing such visual presentations. In particular, the user may request only audio ad presentations, or merely graphical pages without video. Additionally, if the user's communication device supports speech recognition, then the user ad advisor may interact with the user solely via verbal interactions. Note that such purely verbal interactions may be preferable in some circumstances such as when the user can not safely view a visual presentation; e.g., when driving. Further note that the user's communication device may sense when it is electronically connected to a vehicle and provide such sensor information to the user ad advisor so that this module will then default to only a verbal presentation unless the user requests otherwise. Accordingly, the user ad advisor includes a speech recognition unit (not shown) as well as a presentation manager (not shown) for outputting ads in a form compatible both with the functional capabilities of the user's communication device and with the user's interaction preference.

Note that the user ad advisor communicates: (a) with the user ad selection engine for selecting advertisements to be presented to the user, (b) with the user profile database for inputting thereto substantially persistent user personal information that can be used by the user ad selection engine, and for retrieving user preferences such as media preference(s) for presentations of advertisements, and (c) with the user preference and needs satisfaction agents for instantiating intelligent agents (e.g., database triggers, initiating merchant requests for a product/service to satisfy a user preference or need).

Also note that in some embodiments of the present disclosure, the user ad advisor may also interact with a user for obtaining feedback regarding: (a) whether the advertisements presented, the merchants represented, and/or the products/services offered are deemed appropriate by the user, and (b) the satisfaction with a merchant with which the user has interactions. In particular, such feedback may be initiated and/or controlled substantially by the user preference and needs satisfaction agent management system (described hereinbelow).

d. User profile database: A database management system for accessing and retaining user identification information, user personal information, and identification of the user's communication device (e.g., make, model, and/or software version(s) being used). Note that the user profile database may contain information about the user that is substantially persistent; e.g., preferences for: language (e.g., English, Spanish, etc.), ad presentation media (e.g., spoken, textual, graphical, and/or video), maximum traveling time/distance for user preferences and needs of temporal importance (e.g., what is considered "near" to the user), user demographic information (e.g., purchasing history, income, residential address, age, sex, ethnicity, marital status, family statistics such as number of children and their ages), and merchant preferences/preclusions (e.g., user prefers one restaurant chain over another, or the user wants no advertisements from a particular merchant).

e. User ad selection engine (also referred to as "user ad selection" in FIG. 19): This module selects advertisements that are deemed appropriate to the user's preferences and needs. In particular, this module determines the categories and presentation order of advertisements to be presented to the user. To perform this task, the user ad selection engine uses a user's profile information (from the user profile database), a current user request (via the user ad advisor), and/or the user's current geolocation (via the interface to the location gateway 142). Thus, for a user requesting the location of an Italian restaurant within 12 mile of the user's current location, in a medium price range, and accepting out of town checks, the user ad selection engine identifies the ad criteria within the user's request, and determines the advertising categories (and/or values thereof) from which advertisements are desired. In one embodiment, Note that the user ad selection engine can suggest advertisement categories and/or values thereof to the user if requested to do so.

Traveling & Ad Wizards

When an MS 140 appears to be traveling an extended distance through a plurality of areas (as determined, e.g., by recent MS locations along an interstate that traverse a plurality of areas), then upon entering each new area having a new collection of location registrations (and possibly a new location registration wizard) may be provided. For example, a new default set of local location registrations may become available to the user. Accordingly, the user may be notified that new temporary location registrations are available for the MS user to access if desired. For example, such notification may be a color change on a video display indicating that new temporary registrations are available. Moreover, if the MS user has a personal profile that also is accessible by a location registration wizard, then the wizard may provide advertising for local businesses and services that are expected to better meet the MS user's tastes and needs. Thus, if such wizard knows that the MS user prefers fine Italian food but does not want to travel more than 20 minutes by auto from his/her hotel to reach a restaurant, then advertisements for restaurants satisfying such criteria will become available to the user However, MS users may also remain anonymous to such wizards.

Note, that by retaining MS user preferences and needs, if permission is provided, e.g., for anonymously capturing such user information, this information could be provided to merchants. Thus, merchants can get an understanding of what nearby MS users would like to purchase (and under what conditions, e.g., an electric fan for less than $10). Note such users may be traveling through the area, or users may live nearby. Accordingly, it is a feature of the present disclosure to provide merchants with MS user preferences and needs according to whether the MS user is a passerby or lives nearby so that the merchant can better target his/her advertising.

In one embodiment, a single wizard may be used over the coverage area of a CMRS and the database of local businesses and services changes as the MS user travels from one location registration area to another. Moreover, such a wizard may determine the frequency and when requests for MS locations are provided to the gateway 142. For example, such databases of local businesses and services may be coincident with LATA boundaries. Additionally, the wizard may take into account the direction and roadway the MS 140 is traveling so that, e.g., only businesses within a predetermined area and preferably in the direction of travel of the MS 140 are candidates to have advertising displayed to the MS user.

Figure 24A:
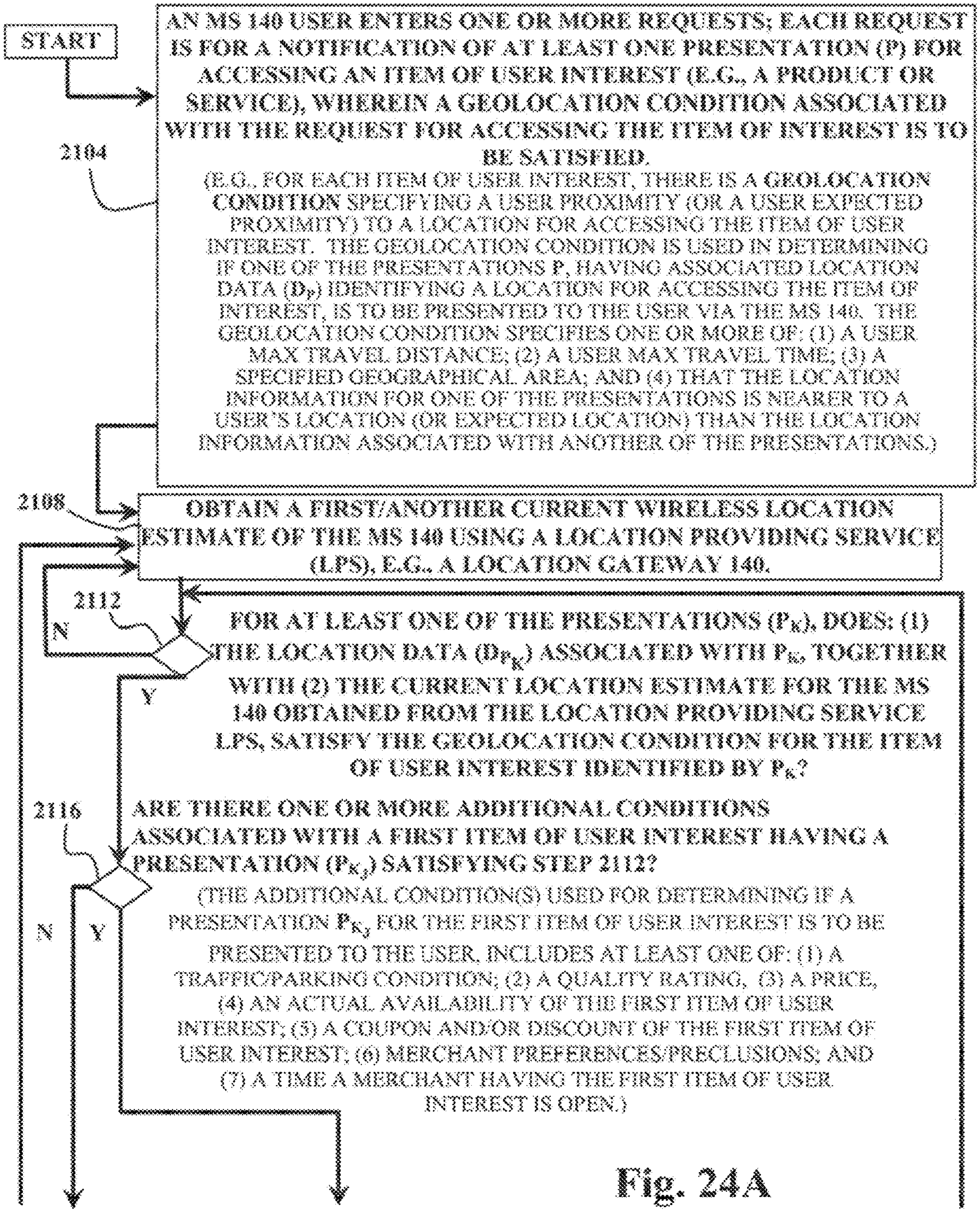
FIGS. 24A and 24B show a flowchart that is illustrative of the steps performed when, e.g., MS user input of preferences and needs is iteratively examined at various user locations for determining the location(s) that sufficiently satisfy user specified constraints (e.g., temporal or situational constraints) so that the user is alerted or notified of products and/or services that satisfy the user's input. The steps 2004 through 2040 are fully disclosed and explained in the sections hereinabove.
Figure 24B:
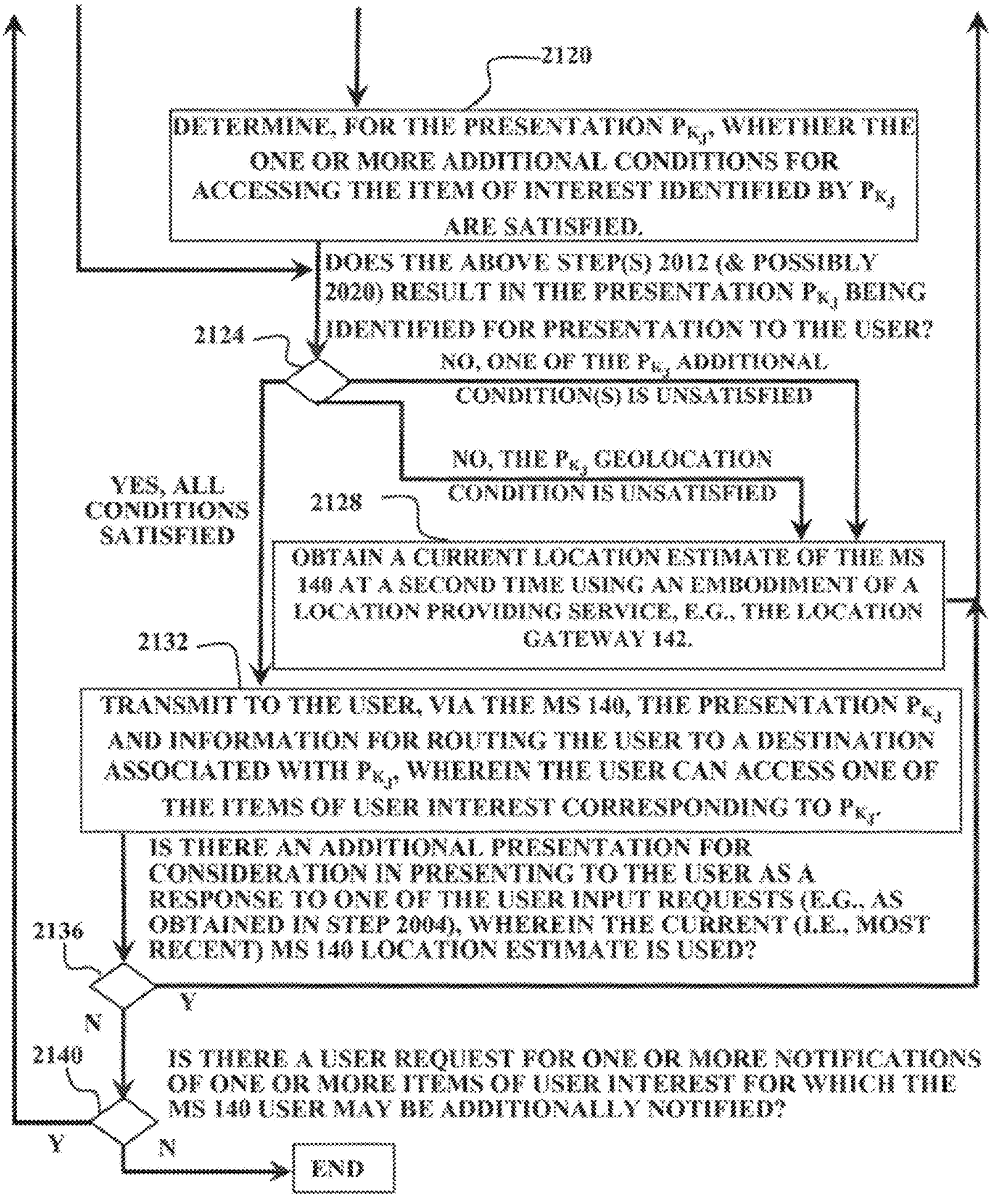

The flowchart of FIGS. 24A and 24B is illustrative of the steps performed when, e.g., MS user input of preferences and needs is iteratively examined at various user locations for determining the location(s) that sufficiently satisfy user specified constraints (e.g., temporal or situational constraints) so that the user is alerted or notified of products and/or services that satisfy the user's input. The steps 2004 through 2040 are fully disclosed and explained in the sections hereinabove.

Targeted Incentive Applications Using Wireless Location

An incentive providing application is now disclosed, wherein electronic coupons, discounts, promotions, etc. (collectively, referred to as "incentives" herein) may be provided to the user of the mobile communications device, e.g., at the request of the user, and generally, for a particular product/service or product/service type. Moreover, such an application may provide these incentives according to, the user's location and time sensitive information in that the incentives may be dependent upon the user's geographic location, and may also have built-in time constraints (e.g., an expiration time/date) which may, e.g., vary with a context indicative of such criteria as: the user's location, previous locations of the user, user purchasing behavior, and one or more (social) networks of contacts/friends of the user. In particular, the present application is directed to providing, e.g., targeted advertising to users (e.g., also referred to as "consumers" in the present context) by combining various technologies to provide a system and service that:

(a) allows the consumer to become aware of a product/service in terms of both time and location, in which the consumer shows an interest;

(b) allows the system to know the at least information about the consumer that provides some measure of predictability in terms of what the consumer will purchase and/or has an interest therein. Note that anonymity of the consumer may still be maintained.

(c) activates techniques for obtaining information from/about the consumer for benefiting the consumer, wherein such information is obtained by both explicit consumer input as well as analysis of the consumer's behavior related to contacts with others (e.g., dissemination of incentives, as well as locations visited by the consumer);

(d) provides and transmits to a consumer (e.g., via an MS therefor) various alternatives prior to, or within a reasonable time, of the consumer making a selection of an item to purchase so that the consumer may benefit from such alternatives to which the consumer is provided within a relatively short time span.

In particular, the present advertising application benefits users/consumers by providing incentives that are more "intelligent" or "smart" than heretofore has been provided to users, wherein such incentives can function to both assist the consumer in buying, as well as assisting an advertiser in selling products in a timely and cost effective manner.

Additionally, the present incentive providing application may also be used in the identification of alternative materials, products and/or services available to consumers and parties interested in locating alternatives to whatever product/service in which they have demonstrated an interest or in which a provider may recognize as an opportunity to make a presentation. For instance, a consumer who has an interest in purchasing a particular material or design for a bathroom may, through the presently disclosed incentive providing application learn of alternative materials and/or designs such as a different type of tile or fixture. Additionally, a scientist may be provided with alternatives that he might not have otherwise recognized for a particular experimental use. Also, a product/service provider may be provided with alternatives methods of delivering a product/service.

In one aspect of the present disclosure, a mobile communication device (also referred to herein as a "MCD" instead of an "MS" in this section) with a computational capability to execute and/or activate what is generally referred to as "applications" or "apps" is utilized, wherein the MCD includes, e.g.:

(i) an ability to be located (e.g., via built-in GPS detection electronics, or other location capabilities whether requiring MCD location specific electronics or not), (ii) a built-in camera, e.g., of sufficient quality to photograph bar codes, product packaging, clothing details (e.g., texture, composition, etc.), product model numbers, product identification numbers, manufacturer/producer names, source of origin, etc., and (iii) in at least one embodiment, a light sensor for detecting coherent (or otherwise) light from, e.g., a bar code scanner.

Given such an MCD having the features (i)-(iii) above, a communications network application can be provided on the MCD, wherein the communications network application coordinates and enables various features of the MCD for obtaining information about a user desired product or service, and subsequently providing assistance with purchasing such a product or service, e.g., via an incentive related to a store, or shopping center nearby the user's location or in which the user is currently residing. In one embodiment, a user of such an MCD, upon seeing a product of interest, activates the communications network application which responds with at least an option for the user to enter information about the product or service of interest (generically referred to as an "item" herein). Upon activating this option, the user may, e.g., use the MCD to take series of one or more photos of the item, its merchandising tag, a tag identifying its manufacturer, model number, and/or its composition. Subsequent to completion of the series of photos, the user may add additional description (either textually, verbally, or form-based) providing comments and/or constraints about the item such as: (i) indicating that even though the photos show the product in red, a preferred color would be white, (ii) that the dress size should be size 8 rather than 6, (iii) the shirt material should be rayon rather than cotton, (iv) a distance the user is willing to travel to view or access the desired product, (v) characteristics (if any) of a similar but unacceptable product, (vi) one or more preferred manufacturers or distributors or suppliers, (vii) pricing/financing constraints (e.g., the product must be priced less than a certain amount, capable of being financed over at least 6 months, etc.), (viii) warranty or return policy constraints, and/or (ix) the item's type (e.g., resort destination, clothing, automobile, recreational equipment, etc.). In one embodiment, the user may assign such textual or verbal description to locations of the photos to assist in the description of the item of interest. Additionally/optionally, the user may also link the photos together whereby, e.g., a first photo shows an overall view of the item with links to other photos being located on this first photo for showing additional details at their respective link locations on the first photo. Moreover, in one embodiment, the user may record a video of the item of interest and provide such additional description (either textually, verbally or form-based, e.g., via a graphical MCD user interface) to facilitate identifying the item of interest. Note that hereinbelow, both photos and videos will be identified (to the extent possible) by the term "photo" or "photos".

Additionally/optionally, if the photo(s) includes one or more extraneous articles, e.g., various displays of clothing, the user may be able to outline or highlight (e.g., on the MCD's touch screen) the particular item of interest to facilitate identification thereof. Alternatively/optionally, extraneous portions of the photo(s) may be deleted (e.g., crossed out, scribbled over or erased) from the photo(s) to thereby further identify the item of interest to the user. For example, a user may activate the communications network application to take a photo of a person walking in New York city whose clothing is of interest to the user, then delete other people in the photo to thereby better identify the clothing of interest.

Following any such user input of item photo(s), descriptions and/or constraints, the user may then submit this item information to a remote network host site (e.g., an Internet website) for identifying the user desired product, and determining any of the following:

(a) An incentive for purchasing the item or a similar item.

(b) A location (or website address) of a user acceptable provider of the item.

(c) A photo of the item (or similar item) currently available for purchase by the user.

(d) One or more reviews or assessments of the item (or similar item).

Providing the above information from (a) through (d) can be computationally challenging since substantial intelligence about items for purchase and/or the user may be needed to properly address all or most inquiries. However, such computational capabilities exist currently. For example, IBM super computers such as "Deep Blue" and variants thereof provide sufficient computational processing power to intelligently assist very large numbers of consumers with accessing and purchasing products/services. Moreover, such super computers are now proficient in understanding natural language to such an extent that appropriate inferences about what is intended (even if somewhat ambiguous) can be very rapidly determined for large numbers of consumers. Such rapid linguistic proficiency has been demonstrated by an IBM super computer winning at the television game "Jeopardy" over the best human "Jeopardy" players. Moreover, making such computational capabilities (both hardware and software) available on a communications network, such as the Internet, via one or more network nodes, intelligent "cloud" computing can be performed for consumers wherein the consumers use their MCD's to access (explicitly, implicitly and/or automatically) such intelligent network nodes wherein such assistance is for:

(i) Suggesting products/services that are likely to meet a consumers needs/desires, e.g., given past behavior of the consumer, the consumer likes and dislikes (e.g., for brand names, stores, etc.), the consumer's time constraints, the consumer's financial constraints, the consumer's ability to access various geographical locations, the consumer's preferences in, e.g., acquiring items similar to another person (e.g., clothing worn by a popular singer, actor, etc.).

(ii) Providing such suggestions that are consistent with the consumer's perceived/actual constraints and/or values. For example, a consumer may wish to purchase a new pair of shoes. Accordingly, the consumer may enter the following information into his MCD regarding a desire to purchase such a new pair of shoes: "size 11 men's shoe, black with rounded toe, slip on, accessible within 5 miles of my location within the next 3 weeks, preferably to access the shoes within the time period of 6 pm to 7 pm weekdays or 12 pm to 4 pm weekends, preferably on sale with price less than $100, preferably by Clarke, Rockport, Florshiem, but not by Adidas." However, to intelligently assist this consumer, additional information may also be necessary/appropriate. For example, the network (Internet) node providing such consumer assistance may additionally use further consumer related information indicative of other constraints, preferences, values that are particular to the consumer, such as, a. preferably, alert the consumer about 1 hour before he proceeds on an expected route (e.g., to work or to home from work) that will take him within the 5 miles of a store having the desired shoes;
b. do not provide the alert for a shoe store previously visited unless new information is available such as: new shoe inventory, new sale, etc.;
c. check the consumer's preferences to determine whether he has raised or lowered his preference for one or more shoe stores, or entirely filtered out one or more shoe stores. Also, raise the preference for Nordstrom's since I have a credit at Nordstrom's. Also, remind me Note the application may search the Internet, e.g., web crawlers, much as Internet search engines (e.g., Google, Yahoo, Bing do) for capturing, identifying and/or classifying information related to products, services, who is buying/selling what items, who is wearing or acquiring what items, what items are on sale, The application may be configured to receive information about purchases made by the consumer to better assist the consumer in the future. For example, referring to the shoes example above, the application may detect that the consumer has visited a particular shoe store (possibly repeatedly) and has not purchased any shoes, then a likelihood of buying shoes at the store may be reduced. Accordingly, in addition to a consumer preference for certain brands, stores, or items, the application disclosed herein may also use a likelihood of success factor to assist the consumer in accessing and/or purchasing desired items. In one embodiment, both a likelihood of success factor (LSF) and a consumer preference factor (CPF) may used for prioritizing and/or suggesting where/how to access/buy particular items. Moreover, additional factors may also be used for assisting the consumer, including: (a) a value factor that is indicative of a best value for the selling price of an item, (b) a seller/buyer reliability factor (RF) that provides a quantitative indication of, e.g., seller/buyer willingness to exchange/refund and/or a promptness at delivery of items. Additionally, a risk factor may be provided that is a quantitative indication of the consumer's tolerance for risk in buying/selling a particular item. For instance, Such factors as described herein are for modeling the consumer so that the application can be effective at predicting what assistance the consumer will perceive as most valuable to him/her (e.g., related to a particular item and/or the purchase or selling thereof), and optionally, what assistance is of little value to the consumer regarding, e.g., the purchasing or selling of a particular item.

In one embodiment, consumers may explicitly adjust the values of the above identified factors However, the following features may be provided by the method and system disclosed herein:

(a) An item in a photo may be substantially automatically (or interactive with the user).
(b) For a user that is identified as being in a particular store, the photo(s) may be matched with items for sale in the store, and an electronic incentive may be provided or other information may be returned to the user. For example, in large stores with relatively few customer service personnel, a user desired item may be unavailable in a size, color or quantity that the user desires. In such a case, instead of hunting down a store employee that may or may not be knowledgeable about the availability of the desired item, the user may activate the communications network application for taking a photo of, e.g., the store tag for the item and submit this photo to the host website which, in turn, may transfer the photo (and any related information, e.g., the user's location) to a website for the store (or for the chain of such stores). Thus, website for the store identifies the item by the photo of the in-store tag identifying the item (or a related item, e.g., the in-store tag for the desired item of a different color). Subsequently (and possibly depending on user input), the store website may transmit a presentation to the user showing the presumed desired item together with one or more of the following:
(i) A location of another store having the desired item.
(ii) An electronic form for ordering the desired item from the store website, wherein the user may pay for the desired item via an in-store checkout or via the store website. Note that in one embodiment, the communications network application may automatically fill in any user specific information needed for delivery of the desired item to the user's home address. Moreover, an incentive may be provided to the user since the desired item was not available for purchase at the store. Further note that such electronic displays provided to the user's MCD related to the purchase of the desired item may be scanned at one of the store's checkout stations for purchasing the desired item. In particular, information from the store's website regarding the desired item, e.g., a bar code, displayed on the MCD's display may be scanned for confirming purchase of the desired item from the website wherein the desired item is to be provided to the user at a later date. Accordingly, this aspect of the present disclosure may assist in reducing in-store customer support personnel while at the same time providing more effective responses to customers.
(iii) In the case that the user transmits only textual information to a store website, such as "where's the tea isle in this store?", the response to the user may be in-store directions and/or an in-store map showing the user where the tea (e.g., the desired item) is, e.g., from the user's location. Accordingly, as in (ii) above, the user may be provided with a timely response without having to hunt down store personnel.
(iv) The user may receive one or more electronic incentives to purchase additional items at the store or from the store's website. In particular, such incentives can be customized to what the user is likely to need or desire given, e.g., what the user has currently and/or previously provided to the store's website. Moreover, such incentives may also provide one or more of the following features:

(1) such an incentive may be dependent upon a return to the store within a certain number of days and/or the purchase of an additional item from the store or its website;

(2) such an incentive may be forwarded by the user to others; thus, the store's website is able to identify additional potential customers by forwarding such incentives;

(3) such incentives may be provided in conjunction with, e.g., a game wherein the user plays the game for determining the incentive. For example, the user may be presented with a slot machine wherein the user can activate the slot machine at most five times with the incentive resulting from the last activation being the incentive electronically provided to the user;

(4) such an incentive may be dependent on a location of the user; for example, an incentive may be required to be used prior to leaving the store or upon a return to the store;

(5) such an incentive may be dependent upon on the user listening to a presentation (e.g., in-store or on the store's website) related to an item sold by the store;

(6) such an incentive may be specific to the owner/subscriber of the MCD, wherein upon presentation of the electronic incentive on the MCD, the user must also present identification identifying him/herself;

(7) such an incentive may only become active when a purchase from or a visit to an affiliated merchant is made by the user; note that such visit may be readily verified by the user activating the communications network application on the user's MCD for locating the user to thereby verify that at least the user's MCD is located at the affiliated merchant;

(8) such an incentive may change its discount or compensation to the user depending upon what the user is about to purchase or information the user has discovered; for example, if the incentive is for 20% off a particular television and the user transmits a photo to the communications network application showing a lower price on the same television at a competing merchant, then the incentive may be changed so that the incentive when applied makes the purchase of the television lower than that of the competing merchant. Accordingly, while the user is in the competing merchant's store, the user may receive a modified incentive that provides incentive for the user to return to the merchant providing the incentive and purchase the television. Alternatively/optionally, the incentive may be changed so that upon purchase of the television that the user may be provided with additional services such as an extended warranty;

(9) such an incentive may change depending upon purchases by other users to whom the incentive may be forwarded; in particular, since each such incentive may include information about a user that forwards the incentive, when such an incentive is submitted at a store for redemption, one or more forwarding users may also receive additional compensation. Accordingly, the forwarding or distribution of incentives to other communications network application users who will accept such forwarding can be beneficial to the forwarding user. Note that in the present context, a particular incentive could rapidly travel through a network of communications network application registered users. Moreover, in a related aspect, a user may wish to forward an incentive and also forward his/her benefit (or a portion thereof) for forwarding the incentive. Thus, such forwarding provides extra benefits for the receiver. Further note that certain restrictions may be placed on such forwards such that additional benefits for forwarding are not provided if the receiving user's MCD is: (i) registered to the same wireless carrier subscriber as the forwarding MCD; and/or (ii) is in a chain of MCDs receiving the forwarded incentive, and the MCD (or another MCD registered to the same wireless carrier subscriber as the MCD) previously forwarded the incentive;

(10) Such an incentive may be used to benefit a single charity or organization. For example, for each time a particular incentive is used in purchasing an item, a benefit accrues to the charity or organization.

In another aspect, since a user may have a potentially large number of incentives available for various merchants, the user's location at various times may be used identify the functionality of the incentive(s).

Points of Interest Applications

Sightseeing or tour applications may be provided for MS users, wherein repeated locations of the user's MS is determined for assisting in routing the user to desired, e.g., points of interest. In particular, self guided tours may be provided by such applications, wherein the application is interactive with the user depending on user feedback, e.g., as to one or more points of interest the user desires to see or access, the time the user has available to access the points of interest, the estimated time needed to access the points of interest, the cost of certain points of interest. Such interactivity with the user may be verbal and/or visual, and include directions to points of interest according to, e.g., (i) a route that efficiently uses the user's time (e.g., least travel time plus user time expected waiting to access points of interest upon arriving), (ii) a route that is expected to reduce the cost of accessing the points of interest (e.g., a less expensive Monday matinee presentation/play as opposed to a Friday showing of the same), (iii) a route that must rendezvous with others and/or at be at a predetermined location at a particular time, (iv) a route that is to avoid a particular area, or location (e.g., due to crime, bad weather, poor services/accommodations, etc., and optionally avoidance during a particular, time of day), (v) a route may be dynamically modified as circumstances change (e.g., lengthy delay at one point of interest precludes visitation of a second point of interest and possibly replaced by a different point of interest, or causes the second point of interest visitation to be postponed), and/or (vi) a route with alternative points of interest wherein the user is routed to a subset of such points of interest depending on other criteria, e.g., the criteria according to (i)-(v) above.

Picture/Video Applications

An application may provided for MSs that have photo/video capabilities integrated therein, wherein location information indicative of where a picture/video is taken using the MS (optionally also with a time/date of obtaining the picture/video data) is associated with the picture/video. Note that such location information may be determined from a wireless location of a user's MS. In particular, MS latitude-longitude coordinates may be transformed into a city address (or city area) together with a direction(s) from the location (s) where the picture/video was taken.

Visualization Applications Using Wireless Location

An application of the wireless location system disclosed herein may be used to enable geographic visualization applications, wherein one or more geographic areas of interest are presented as visual geographic images or maps with annotations thereon indicative of, e.g., a relative interest a mobile station user may have in such geographic areas. In particular, such geographic areas may be color coded on a map according to an expected interest the user may have in different ones of the areas. Moreover, such a visualization application may also include audio feedback as well, and in fact, in some contexts (e.g., a mountain bike rider on a trail requiring full visual attention by the rider to the trail terrain) such "visualization applications" may include an audio-only feature for providing a mobile station 140 user with only audio feedback such as directions or navigation instructions. In fact, in one embodiment, such a "visualization application" may be audio-only, wherein the audio provided is enhanced in sound quality and/or with more detailed information than would be, by default, provided if it is expected that the user could reliably and safely (at least periodically) view a graphical display on his/her mobile station 140. Accordingly, visualization applications as described herein can, in some embodiments, be audio-only applications.

In one embodiment, upon attending an event (e.g., electronics convention, a gun show, a western stock show, a trade show, a concert, a volleyball tournament, a theme park, etc.) a user may be unable to visit all portions of interest of the event due to, e.g., time and/or physical constraints on the user. Accordingly, an application may be downloaded and installed on the user's mobile station 140 (e.g., an Iphone® of Apple Corp. or other smart phone, perhaps in conjunction with other mobile devices, e.g., Google glasses where displays are imaged to the user on the eye pieces thereof while the user wears such glasses) which provides the user with one or more of the following:

(a) Identifications of geolocation sites within the event (or surroundings thereof) that may be of interest to the user. Such identifications may be presented to the user (at his/her mobile station, MS 140) in various ways, including a graphical (and/or audio) presentation for: (i) identifying such sites on a map of the event premises, (ii) identifying such sites in a list, (iii) identifying such sites that are most closely related according to, e.g., one or more conditions or criteria, e.g., of likely interest to the user (e.g., due to a user's personal interests, site geographical proximity to the user, site availability/accessibility by the user, and/or expected financial by the user at the site), and/or (iv) identifying event sites that have been (or are being) identified on a social network site (e.g., Facebook™ via the Internet) as of most interest to event attendees or others.

Regarding such identifications on a map of the event premises, the identifications may be provided on a plurality of layers of the map. For example, food providing sites and bathrooms may be provided on one layer that is overlaid on a map of the event premises while exhibits of likely interest to the user are overlaid on another layer onto the map of the event premises. Thus, the information content and clutter on an event premises map can be reduced for ease of understanding and navigating by the user.

Regarding listings output to the user, such outputs displayed (on the user's mobile station 140) as in (ii) above may be, e.g.: (1) information on theme park rides with rider restrictions, e.g., where the rider must taller (or weigh more or be older) than a particular value, (2) information on site access (e.g., hours the site is open, wait time, e.g., restaurant wait time), (3) resources available at the site (e.g., food items available, lodging rooms available, etc.).

Regarding graphical output to the user as in (iii) above, such graphs may show the relatedness of particular event presentations/sites. For example, for such a graph of event presentations and sites related to a particular classification (classified according topic, time of accessibility/availability, expense, others who may attend, etc.), each node of the graph may identify a distinct or unique class of the classification. Accordingly, such a graph may have one or more hub nodes identifying such presentations/sites wherein such a hub nodes has, e.g., at least a threshold number of graph edges ending at the hub node, and wherein the opposite ends of these edges connect to additional graph nodes having identifications of such presentations/sites (in the classification) that are related to class of the hub node. For instance, each edge of the graph may be indicative of data (e.g., user profile data stored in an electronic database) identifying the user's perception of how closely the edge end point nodes are perceived to be related. In one embodiment, such data may indicate ratings according to other event attendees' behavior or input if the user finds such a graph of ratings of interest, e.g., such ratings could be for ratings of presentations on the topic of global warming. Thus, for some one or more presentations or sites, they may be represented in the graph as by a single node which is directly connected to a hub node by a single edge while other event presentations/sites that are less related (e.g., according to the user's profile data) may be represented by a graph node that is connected to such a hub only via a corresponding plurality of nodes thereby indicating a lesser relatedness/interest by the user.

(b) Information related to the user's likely interest in the event. Such information can be presented to the user and include data indicative of the starting, ending and/or duration time of particular event presentations of likely interest to the user. Additionally, the opening and/or closing of event sites of likely interest to the user may be provided. In one embodiment, a user may input to his/her mobile station 140 selections of one or more such particular presentations to attend and/or sites to visit, and the application may can then present to the user only event presentations and event sites that the user can visit/attend in the time not already allocated by the selected particular presentations and/or sites to visit. In one embodiment, the application may output (on the user's mobile station 140) information on presentations in a list according to start time.

Note that such events and/or presentations may be more generally considered as resources that such visualization applications allow a mobile station user: (i) to attend, (ii) view or interact with (perhaps remotely on the use's mobile station 140), or generally "consume" in the sense that such at least a part of such a resource is allocated for utilization by the user. Further note that this framework of resources being consumed by mobile station users can be apply in other contexts as well. For example, such a framework can also apply to providing a mobile station 140 user reservations at a user desired type of restaurant. Additionally, such a framework can also be used to assign or allocate a mobile station 140 user such resources as hotel rooms, parking spaces, etc. In particular, regarding such dynamic applications as the allocation of parking spaces, the use of wireless location information obtained from, e.g., a location system 142 (in communication with a wireless network that mobile station 140 is wirelessly communicating thereon) to timely route (and potentially re-route) a mobile station 140 user and his/her vehicle can be a particularly challenging visualization application. The section hereinbelow provides a novel wireless location based solution to dynamically and in substantially real-time identifying parking spaces to which mobile station 140 users can be routed and/or re-routed as necessary.

In one embodiment such a wireless location based visualization application may be for routing vehicles (and their mobile station users) to parking spaces, a mobile station user may be desirous of finding a parking space in a large parking facility such as at an airport parking facility, municipal parking (on, e.g., downtown streets or parking garages), or a shopping mall. If the parking facility has electronic monitoring for monitoring parking spaces therein, then parking spaces (e.g., for automobiles or other modes of transportation) can be readily identified as being occupied or available via such electronic monitoring so that a mobile station user can view (via an appropriate wireless location based visualization application) on his/her mobile station, a map of the parking facility with a designated color (e.g., bright green) identifying one or more nearby available parking spaces, and optionally providing a route to one of the parking spaces (such visualization of a map may, as discussed above, be replaced or enhanced by varying amounts of audio quality and/or audio navigation detail). Of course, there may be no guarantee that the user will arrive at one of the parking spaces prior to it being taken by someone else. However, if another takes the parking space, then the user can be notified of the parking space's unavailability potentially substantially before the user navigated to the un available parking space. Note that notifications of available parking spaces in real time (or nearly so) can be provided by, e.g., marking a center of each parking space with a distinctive insignia or design that can be readily identified via video input from one or more electronic monitoring devices that view the parking spaces. In particular, when a parking space is available, the insignia or design on the parking space is visible to one of the video monitors, and when an automobile (or other vehicle) is parked in the parking space, the insignia or design on the parking space is at least partially occluded (more preferably, substantially occluded). Accordingly, such video input can be provided to computational equipment (a computer system) for automatically recognizing the predetermined insignia(s) or design(s) painted, taped or otherwise attached to the parking spaces, e.g., without manual intervention. Such symbol recognition computational devices may be modified versions of bar code readers, or, e.g., techniques as disclosed in U.S. Pat. No. 7,274,823 by Lane, which is fully incorporated herein by reference, wherein symbols embedded in digital video signals are recognized. Of course, in providing parking space information to the user, both the location of an empty parking space and the user's location preferably should be known or determined so that the user may be navigated to an empty parking space. In addition to a service for locating such empty parking spaces for users in, e.g., parking garages, shopping malls, street parking in downtown areas, etc., other services may also be provided which rely on wirelessly locating mobile station users and/or resources for such users. In particular, such users may request notifications for assisting in locating other resources such as a nearby restaurant having a reduced (or no) wait time for service, a hotel or motel having a vacancy, a campsite at a campground, a theme park (or other) attraction having a reduced (or no) wait time. However, routing to parking spaces and other services where the resource utilized (or consumed) by the mobile station user cannot be (or is not) reserved exclusively for the user is particularly challenging to address. In one embodiment such a wireless location based visualization application may be for routing mobile station 140 users to appropriate transportation capabilities. For example, in large transportation facilities such as a bus station or subway station, people enter vehicles typically on a first-come-first-serve basis. Thus, such a visualization application embodiment could be used in conjunction with a computer system for estimating the number of people wishing to enter a transportation vehicle, and then provide such information along with the capacity of the vehicle to the visualization application embodiment for notifying a mobile station user of which vehicle the user has a better chance of obtaining transportation to his/her desired destination, and route the user to the vehicle loading area.

The high level pseudo-code shown in FIGS. 25A-25D is a simplified illustration of the processing performed regarding user notification of: (1) available resources that cannot be typically reserved prior to actual use, such as available parking spaces, available campsites, available gaming locations (at a gaming machine or gaming table) in a casino, and/or (2) resources (e.g., restaurants, theme park attractions, convention presentations) that are determined to require less user time to access than other similar resources.

The following provides a description of the psuedo-code of FIGS. 25A-25D which discloses one embodiment of the method for interacting with mobile station 140 users and providing such users with notifications related to obtaining and/or utilizing resources, e.g., by such users physically travelling to such a resource such as a parking space as one such resource. The line numbers to the left of the psuedo-code of FIGS. 25A-25D are referred to hereinbelow for identifying the portions of the psuedo-code being referenced.

In FIG. 25A, lines 1-3 provide a step of the mobile station (140) user activating an application (denoted an "APP" herein) on his/her mobile station (e.g., an Apple® Iphone™, an Android™ based smart phone, or a Blackberry® smart phone), wherein the APP provides notifications related to an availability of one or more resources of interest to the user, e.g., at one or more geographical locations of interest to the user, and wherein such notifications may include information for accessing one or more of the resources, e.g., by providing directions for routing or navigating the user to an available one of the resources via communications with the user via his/her mobile station 140.

Lines 4-5 (FIG. 25A) disclose a step of determining whether the APP can obtain user location information from wirelessly locating the user's mobile station 140 (merely "MS" hereinbelow). In some embodiments, such a determination is dependent upon the user authorizing the APP to request such location information, and upon the ability of the wireless network (and/or components attached thereto) to determine both (i) an appropriately reliable and accurate wireless location of the MS for obtaining the user location information, and (ii) communicate such user location information to the APP. Note that such authorization may be not just for the APP, but instead, may be for a group of mobile station applications that are contractually obligated to maintain certain confidentiality provisions regarding user location information. If the user cannot or will not authorize the use of his/her wireless location information (related to the position of his/her mobile station 140), then the process described in the pseudo-code terminates.

Lines 6-7 (FIG. 25A) disclose a further step of putting or entering user and/or MS identification data on a queue (or other dynamic computing machine data repository) accessible by the APP. This queue retains the data for identifying each MS whose user requested activation of the APP and wherein the APP has been authorized to obtain and use user location information as described above. The queue may also retain additional information such an identification of the user, how the user is currently travelling (e.g., via car, bicycle, or walking), the type of presentations the user requires/requests the APP to provide on the user's mobile station 140 (e.g., visual only, audio only, haptic feedback (e.g., provided in the event that the user takes an incorrect direction and thereby deviates from a route, e.g., provided by the APP, to one of the resources, or provided when an APP notification is available to the user, or a hybrid of two of more of visual, audio and haptic). Additionally, financial user information may be also retained in certain embodiments, e.g., when the APP assists in identifying gaming machines for users, the APP may be incorporated into a computer system that also manages the users' winnings and loses at various games. Additionally, the queue may assist in prioritizing how MS each user is to be allocated processing time for identifying an available resource to which the user is to be notified. For example, this queue may be a "queue" in the technical sense of, e.g., a "first in first out" data repository (possibly a "round robin first in first out" data repository) with associated procedures/methods as one of skill will understand. However, the queue may also allocate APP computational time and/or machinery according to various priorities of the users requesting notification of resources (e.g., parking spaces). For example, such priorities may be determined according to a time or distance each user is from likely available resources, wherein the further away users are, their priorities are reduced.

Line 8 and higher numbered lines disclose an embodiment of the processing performed for each user (and/or his/her MS) when it is allocated APP computer processing time for providing the user with notifications related to available resources (e.g., parking spaces). In particular, once a user's data in the queue is selected for notification processing, such data would be then re-prioritized to a lower priority so that any next activation of the APP on the user's data would be of a lower priority than such data for other users in the queue. Thus, in lines 8-9, the APP requests periodic or repeated wireless locations of the MS. In some embodiments, the resulting MS location information may be iteratively determined according to fixed time period. However, a preferred technique for iteratively obtaining a user's location information (e.g., for tracking the user's MS in a manner effective for the APP to provide reliable available resource notification(s)) is to request such user location information instances at a frequency dependent upon, e.g., an expected or appropriate speed of the MS (e.g., the greater the speed the greater the frequency), MS distance and/or direction of travel relative to the resources (e.g., an MS travelling away from the resources, and not following an assigned route to the resources, may be wirelessly tracked at a lower frequency), and/or a change in direction of the MS (e.g., repeated short time period changes in user direction may be indicative of user frustration or dissatisfaction, and accordingly, wireless tracking frequency may be increased), and an expected change in the availability of one or more of the resources (e.g., if it is determined that an available resource is near the user, then the wireless tracking frequency may be increased for routing the user to the resource). Note such wireless tracking frequency of a user's MS may not be lowered just because the user's data is only in the queue and not being currently processed. In particular, it may be assumed that each user having user data in the queue is actively requesting an available one of the resources and there is a reasonable likelihood of the user being notified of an available such resource by the APP.

In lines 10-93, a "while loop" is provided that "allocates" one of the resources (e.g., parking space) to the user, wherein such allocation is an initial determination that one of the resources has been identified as appropriate to notify the user thereof. In lines 10-16, conditions are disclosed for entering this "while loop" (and continuing to loop therethrough), wherein these conditions are evaluated by computer machinery. In particular, these conditions state that whenever:

(a) the wireless locations for the user's MS are timely provided so that each such wireless location is approximately indicative of the MS's current location (e.g., within 50 feet even though the MS may be moving at, e.g., 50 miles per hour), (b) the MS is in a proximity or geographic area (or expected to be currently or shortly) for seeking an available one of the resources (e.g., the MS is within an eight of a mile of a predetermined vehicle parking area (such as a parking garage) for which the APP notifies the MS user of a parking space(s) therein, or the MS is within the confines of a particular facility or event for which the APP notifies the MS user of the availability of a user desired transport to board, a presentation or entertainment to attend, a ride or attraction to experience, wherein the user may walk to an available one of the resources.

(c) there is no resource currently allocated to the MS (i.e., there is no wireless transmission to the MS of a notification from the APP of an available resource for the MS user, wherein this resource is still both available and designated as allocated to the MS or its user; note that when the "while loop" entered during an initial activation for allocating a resource to the user, there is no resource allocated to the user.

Regarding (b) immediately above, in one embodiment, a distance between the MS user's most recent wireless location and a location for at least one of the resources may be determined, and if this distance is less than a particular threshold, then the MS would be deemed to be in a proximity or geographic area of the resources. Of course, other techniques for determining whether the MS is within a proximity or geographic area of the resources may also be used, such as:

- An MS distance from a particular location such as an entry to access the resources.
- An expected time of travel a particular location such as an entry to access the resources.
- An expected time of travel to (at least one) of the resources.

In lines 17-22, conditions are identified for exiting the "while loop" under circumstances wherein the MS user cannot be allocated one of the (predetermined) resources. In particular, there may circumstances that occur where all of the resources become unavailable substantially independently of what resources have been acquired by various MS users. For example, for the resources being parking spaces in a parking facility (e.g., at a large airport), if the entire parking facility had to be closed down (e.g., due to a potential dangerous situation), then APP processing for finding MS users parking spaces would cease.

In lines 23-92, a "For" loop is provided, wherein this loop allocates an unavailable resource (if possible) to the MS user, and transmits one or more notifications to the MS, as appropriate, regarding navigating the MS user to an available one of the resources for acquiring the same (note, the term "acquiring", as used in the context of an MS user "acquiring" a resource, can have various interpretations depending on the service the APP provides; for example, if the service is to provide the MS user with a parking space, then indeed the MS may acquire a parking space; however, if the service is to assist the MS user in boarding an appropriate bus or subway then "acquiring" may be interpreted as "acquiring a seat or standing room" on the bus or subway; thus, in such embodiments, "acquiring" may be interpreted as providing an actual spatial or physical extent to the user. for his/her own use).

As will be described further hereinbelow, this "For" loop attempts to determine an available one of the resources that is closest or at least near to the MS. Accordingly, wireless location(s) of the MS are used to determine such a proximity of the (any) available resources to the MS. In lines 24-27, the locations of the currently available and not allocated resources are obtained. Note that the terms "available" and "availability", when referring to a resource in the present context, may be interpreted as: (1) indicative of an output providing a binary (e.g., yes/no or true/false) result as to whether the resource can be currently acquired by an MS user, and in some embodiments, may also have an interpretation including (2) the use of a threshold number of users that can be effectively supported by the resource (e.g., up to a predetermined threshold number of users can be appropriately supported by the resource simultaneously or during a time interval, but the resource degrades, fails, and/or is not appropriately effective when the number of users for the resource exceeds the predetermined threshold number (e.g., the resource is a bus having a maximum occupancy as the predetermined threshold).

Regarding the locations of the resources, data for such location may be maintained in a persistent electronic data repository (e.g., a database management system by anyone of various vendors such as Oracle® or Microsoft®). Such a data repository may be substantially static where the resources have fixed locations such as parking spaces. However, in other embodiments of the APP, the resources may not be stationary. For example, an embodiment of the APP may be provided where each resource is a taxi, and the MS users are each seeking to acquire one of the taxis. In this later embodiment, the current location of each of the taxis is preferably maintained in the data repository, and such locations may be determined by wirelessly locating each taxi so that each taxi's location is maintained (in the data repository) to within, e.g., 50 feet of its actual location.

In lines 29-44, a determination is made as to whether there is any resource available, and in the event that there is none, then a notification may be wirelessly transmitted to the MS for informing the MS user that there are currently no available resources. Further, if the MS responds and indicates that he/she wishes to wait until an appropriate resource becomes available, then a next notification is sent to the MS user when:

(1) there is at least one becomes available and is also unallocated resource. In one embodiment, an "availability threshold" of the number (greater than one) of the resources must be available and unallocated must be attained before such a next notification would be output to the MS user for providing the MS user with the identity and/or directions for navigating to one of these resources. Note that when such a resource(s) become available and unallocated, APP processing of the MS user's request for one of the resources may commence at line 67 of the psuedo-code in FIGS. 25A-25D; or (2) a predetermined elapsed has expired (e.g., three minutes), wherein such a next notification ("status notification" herein) is to inform the MS user that no resources (or an insufficient number thereof) is available which have been not already allocated to others. Accordingly, the APP may activate a timer associated with the MS user (or the MS) for determining when such an elapsed time has expired. Note that such status notifications may be repeatedly output to the MS user, e.g., when the MS associated timer expires, this timer may be reset for a further elapsed time to provide another status notification in the event that the MS user is still waiting for one of the resources when this further elapsed time period expires.

Note that if the MS user responds indicating that he/she does not wish to wait to be notified of an available resource, then the APP terminates the MS user's execution of an instance of the psuedo-code (line 44).

In one embodiment, when a threshold number (greater than one) of available and allocateable resources is required before a notification according to (1) immediately above is output to the MS user, such a threshold may be determined according to a likelihood or expectation of the available and unallocated resources being unavailable to the MS user by the time the MS user travels to a location for acquiring any one of these resources. For instance, each such available and unallocated resource may have an MS user travel time thereto that is too long for the MS user to travel to such the resource and acquire it since, e.g., there may be high expectation/probability that another person (whether an APP user or otherwise) may acquire the resource before the MS user arrives at the resource, and such acquisition would be to the exclusion of the MS user acquiring the resource. As an illustrative example, for the resources being parking spaces, the available and unallocated parking spaces may take too lengthy of an expected time for the MS user to travel any one of them for there to be a reasonable expectation that the resource would be acquireable by the MS user on arrival thereat. In one embodiment, an expected "acquireability time" may be computed for each available and unallocated resource for determining if information on any of the available and unallocated resources should be communicated to the MS user for the purpose of the MS user acquiring the resource. Such an acquireability time may be determined accordingly to historical data, e.g., having measurements of the lengths of time that (each or an aggregation of) the resources remains continuously available. Such an acquireability time may be dependent upon various characteristics ("availability characteristics" herein) affecting resource availability such characteristics being, e.g., a given day of the week and/or a time of day, a number indicative of entities seeking to acquire the resources, the locations or the acquireability time of such other entities relative to the available resources, the weather about the available resources, etc. Various statistical analyses may be used to compute such acquireability times (for each resource or for an aggregate of resources). Such acquireability times may be determined by a statistical technique such as principle decomposition, partial least squares, or another regression technique a regression as one of skill will understand, wherein such times may depend upon one or more availability characteristics.

Applying the immediately above discussion to an APP for MS users seeking parking spaces, the availability characteristics may any or all of the above identified characteristics for which there is statistically significant historical data for computing the acquireability times. In particular, for parking spaces, such an acquireability time for a parking space may be the a time that the parking space is expected to be continuously vacant for a given set of availability characteristics.

For an embodiment of the APP provided for services other than the resources being parking spaces, different ones of the above identified availability characteristics may become more important than others. For example, for a substantially indoor event at a large facility, crowd congregation and average travel time between event buildings may be the most important characteristics for determining an acquireability time for a particular event attraction or presentation, e.g., having limited seating capacity.

When an embodiment of the APP is provided to assist MS users in acquiring taxis (as the resources), such availability characteristics may also depend on obtaining near real-time or current locations of the taxis as well.

Assuming there are resources available (e.g., as determined at line 28, FIG. 25A), in lines 45-66 (FIG. 25B), a determination is made as to whether all (or substantially all) of the resources are allocated but at least one resource remains available. In such a case, the APP processing may be substantially the same as in lines 29-44 discussed above.

Assuming the determination in line 45 is negative, and thus, there is at least one resource that is both available and unallocated (more generally, the availability threshold is met), a determination is made in lines 68-71 as to whether:

(a) the location of the MS user (as wirelessly determined) is sufficiently near one of the available and unallocated resources, R, for potential allocation to the MS user; and (b) there is no other MS user of the APP wherein this other MS user is known to the APP to have been (and still is) seeking one of the resources, wherein this other MS user is at least as near (or approximately so) to the resource R, and who is known to the APP as seeking one of the resources a longer amount of time.

When this determination yields as positive result, then the MS user is allocated the resource R, and if necessary (or desired by the MS user), navigation directions are transmitted to the user's MS for directing the user to the resource R. Note that providing the MS user with navigation to the resource R may require interactive communications with the user's MS and possibly the MS user as well. For example, in the case that the MS user does not fully follow the navigation directions, an alternative route to the resource R may need to be determined and provided to the MS user. Additionally, the MS user may need to confirm that a proposed route to the resource R having stairs is acceptable (e.g., the MS user may be wheelchair bound). Further, the MS user may desire an alternative route to the resource R that, e.g., goes by (or does not go by) a particular location. Accordingly, the processing performed for providing the MS user with navigation instructions to the resource R may occur over an extended period of time. However, remaining APP processing of lines 68-81 does not, in general, wait on the navigation process to complete. Instead, such remaining APP process of lines 68-81 may be performed concurrently therewith (and indeed, substantially all further APP processing may be performed currently with navigating the MS user to the resource R. However, as will be described below, at some of the steps of the pseudo-code of FIGS. 24A-25D (e.g., lines 95-96, and more generally in the loop of lines 84-123) monitor whether the MS user appears to be attempting to travel to the resource R. Note that processes for generating and providing such navigation instructions to the MS user are known in the art, and may be provided (at least for some APP services by Google Maps™ by Google Corporation).

In one embodiment, in order to effectively evaluate condition (b) above for line 45, for each MS user actively (and generally continuously) seeking a resource with the assistance of the APP, the APP maintains data indicative of the total length of time the MS user has been seeking (or has an active request input to the APP for acquiring) one of the resources (such data identified herein as "seek time", and electronically stored and associated with the MS user in a persistent data storage). Accordingly, the condition (b) above may be evaluated by comparing the seek time of the MS user in condition (b) with such seek times of the other MS users also seeking resource (via the APP), wherein such comparisons are used to determine one or more of the MS users who have been actively and continuously seeking one of the resources for the longest time(s). Thus, if another MS user has a seek time data indicative of seeking the resources longer than the MS user (in condition (b) above), then this another MS user may be allocated the resource R instead of the MS user. In one embodiment, when the MS user can travel to the resource R in an expected shorter time than another MS user, but the another MS user has seek time data indicative of a longer time seeking or requesting a resource, then a preference between the MS user and the another MS user is determined. In one embodiment, such a preference may be determined by:

(i) determining the difference ("travel_diff" herein) between (1) an expected time of travel to the resource R of the MS user, and (2) an expect time of travel to the resource R of the another MS user;

(ii) determining the difference ("seek_diff" herein) between (1) the length of time the MS user has been seeking one of the resources, and (2) the length of time the another MS user has been seeking one of the resources;

(iii) compute a resulting MS user preference value that is dependent upon the difference of (i) and the difference of (ii); note various functions of travel_diff and seek_diff may be used to obtain the preference value, e.g., if (only the absolute value of one of the travel_diffs is above a predetermined "travel time" threshold) then prefer the one of the MS user and the another MS user that has the greatest travel_diff;

elseif (only the absolute value of one of the seek_diffs is above a predetermined "seek time" threshold) then prefer the one of the MS user and the another MS user that has the greatest seek_diff;

elseif (the absolute value of both of the travel_diffs are above the predetermined threshold) then in one embodiment, compute the following:

travel_norm←normalize (to the range 0 to 1) the travel_diff to the travel time threshold (e.g., travel_diff/(travel time threshold);

seek_norm←normalize (to the range 0 to 1) the seek_diff to the seek time threshold (e.g., seek_diff/(seek time threshold);

if (travel_norm>seek_norm) then
prefer the one of the MS user and the another MS user that has the greatest travel_diff;
elseif (seek_norm>travel_norm) then
prefer the one of the MS user and the another MS user that has the greatest seek_diff;
else prefer the MS user.

Note, however, that in at least one embodiment, the order of the last two programmatic comparisons may be switched.

Subsequently, if the MS user is allocated the resource R, then in lines 77-80, the APP removes (de-queues) the MS user from the queue and deletes any active timer for the MS user. Subsequently, the "For" loop (commenced in line 23) reevaluates its loop conditions to determine whether this loop's internal steps should be performed again, and assuming the "For" loop is not performed again, the "While" loop (commenced in line 10) and reevaluates its loop conditions to determine whether this loop's internal steps should be performed again.

Assuming the resource R has been allocated to the MS user and the MS user is receiving navigation instructions to R, in lines 84-123, a further programmatic loop, identified as "LOOP", is performed continuously until it is explicitly exited by a step performed in the body of this loop. This loop firstly, in lines 85-87, makes a determination as to whether the resource R: (i) becomes unavailable; (ii) the MS user did not acquire the resource R (and so could not have been the cause of the resource R becoming unavailable), and (iii) the MS user has not acquired another of the resources (e.g., the MS user did not come upon another of the resources (e.g., another unoccupied parking space) and decide to acquire it instead of the allocated resource R. If all the conditions (i)-(iii) immediately above are true, then the resource R was acquired by another, e.g., during the MS user's traveling to the resource R. Accordingly, lines 88-93 are performed, wherein all associations the APP may have for associating the MS user with the resource R are deleted, and the MS user is re-queued in the queue. However, in performing the re-queuing of the MS user, in at least some embodiments, the APP does not reset the MS user's stored seek time data. Thus, such seek time continues to accrue until the MS user: (1) is identified as no longer interested in acquiring one of the resources (e.g., the MS user is wirelessly located outside of a predetermined area for the resources, or the MS user is persistently headed away from the resources, or the MS user has responded to the APP with an indication of disinterest/termination in his/her request for APP assistance in acquiring one of the resources, or (2) the MS user acquires one of the resources.

Assuming at least one of the conditions of lines 85-87 are not satisfied, then in line 94, a determination is made as to whether the MS user's allocated resource R remains available (note, in this case, the MS user has been allocated the resource R, but has not acquired it), then a further determination is made (lines 95-96) as to whether the MS user is travelling generally along a route for acquiring the resource R. In one embodiment, such a determination may be made by determining whether the MS user (i) follows a route to the resource R provided, (ii) is proceeding along some alternative route to the resource R that has an expected time of arrival at the resource R that is "reasonable" (e.g., along some route that wherein the MS user would have an expected travel time to the resource R of not more than, e.g., 1.5 times of the expected travel time via the route provided to the MS user via the APP.

Accordingly, if the determination in lines 95-96 indicates that the MS user appears to be proceeding to the resource R, then if appropriate (for continuing to navigate the MS user to the resource R), continue to transmit further navigation information to the MS user. However, if the result of lines 95-96 indicates that the resource R has been acquired by the MS user, then (lines 100-103) mark the data for the resource R (residing in a persistent electronic data storage along with similar status data for all the other resources) as being unavailable for allocation (line 100), de-queue the MS user from the queue, delete any MS user associated active APP timer (as well as other associated MS user data specially to be used only for allowing the MS user to acquire the resource R), and then end the APP processing of FIGS. 25A-25D.

However, if it is determined (lines 105-106) that the MS user has acquired one of the resources different from R (e.g., along the way in travelling to R), then (lines 107-110) mark the data for this different resource (residing in a persistent electronic data storage along with similar status data for all the other resources) as being unavailable for allocation (line 107), de-queue the MS user from the queue, delete any MS user associated active APP timer (as well as other associated MS user data specially to be used only for allowing the MS user to acquire the resource R), and then end the APP processing of FIGS. 25A-25D.

Referring to lines 112-113, the APP waits for some new information to be stored in a persistent electronic database accessed by the APP, wherein such information is related to the MS user acquiring the resource R. For example, such new information can be, e.g.: (1) data indicative of the MS user's disinterest in acquiring the resource R, (2) the MS user has acquired the resource R or another resource, and/or (3) the resource R has been acquired by another. Accordingly, whenever such new information is detected, the loop commencing at line 84 is again entered.

Of course, a location system for performing the above wireless location applications is also an aspect of the present disclosure. In particular, regarding the geographic visualization applications the following computational machinery (e.g., hardware/software components) is contemplated by the present disclosure:

(i) A database for persistently storing each MS users' status, identity data and wireless contact information for the acquiring of one of the resources.
(ii) A database for persistently storing a status of each of the resources, including each resources location (or current location if the resource moves), whether it is available, whether it has been allocated, etc.
(iii) A subsystem for providing notifications to the MS users regarding the acquiring of one of the resources.
(iv) A system for providing MS users with navigation instructions for proceeding to an allocated resource.
(v) An interface for receiving wireless location information providing locations of the MS users and, if the resources move, the locations of such moving resources.
(vi) An electronic mapping system for providing the MS users with graphical displays of maps with, e.g., at least one route to a corresponding allocated one of the resources.
(vii) A hardware/software configuration for enabling the APP to execute on such a configuration together with various communication network(s) interfaces for receiving and transmitting information related to the MS users acquiring resources. Note the APP may communicate with the MS users via wireless Internet communications as one of skill will understand. However, in some embodiments, the APP may communicate with the MS users via a wireless LAN (which may or may not be accessible via the Internet).

(viii) In some embodiments, a subsystem for selecting and presenting appropriate information to the MS users via graphical display presentations, audio presentations, or a combination thereof, wherein such presentations may also therewith haptic MS user output to assist the MS users in, e.g., detecting resource notification from the APP.

Note that machine instructions for embodying variations of the above pseudo-code may be used for routing users to available gaming machines in a casino, routing user's to available attractions in an amusement or theme park, and/or routing user's to the most sparely populated ski lifts at a ski resort.

Dynamically Enabled/Disabled Location Based Services

In another aspect of the present disclosure certain telecommunication services or applications for a mobile station may be automatically enabled and/or disabled according to the to a location estimate of the mobile station or the resolution of such location estimates that may be available to others may vary according to a location area. For example, when a mobile station for medical doctor is at or within a predetermined vicinity of a medical facility where he/she works, the doctor (i.e., his/her mobile station) may be able to wirelessly located by other authorized persons (e.g., medical staff at the medical facility), where the resulting location estimate provides as great a resolution as available. However, if the doctor is beyond such a predetermined vicinity, then such high location accuracy may be precluded from being provided to, e.g., other medical facility personnel attempting to locate the doctor. Moreover, in some circumstances, no location of the doctor may be provided. Thus, in medical emergencies, instead of broadcasting requests for one or more doctors to travel to a particular area of the medical facility regardless of their location, and instead of contacting doctors without knowing their (at least general) whereabouts, at least one doctor may be contacted according to his/her proximity to the medical facility and/or the particular location therein.

Similar location based services may be applied to locating construction site workers. For example, when each such worker is within, e.g., a predetermined area of a construction site and it is within working hours for the worker, authorized personnel may be able to wireless locate the worker with a high degree of accuracy (e.g., within 5 feet).

To perform this aspect of the present disclosure, a profile for a mobile station user may be stored that provides one or more conditions for communicating the user's location one or more others that have been authorized to receive such location information. Accordingly, such user profile information may include conditions identifying who is authorized to receive the user's location information, the time when the user's location may be communicated (e.g., time of day, days of the week, date range, etc.), the proximity of the user to, e.g., a predetermined geographic area (a hospital, a work site, a location of a preferred store at which the user prefers to shop, a hotel or convalescence facility where the user resides).

In one embodiment, a user profile for disclosing the user's location (via, e.g., wirelessly locating the user's mobile station) may be integrated with telecommunication services (e.g., mobile phone downloadable applications) for also transmitting photos and/or video feeds as well as user health data (e.g., heart rate or rhythm, blood oxygenation, glucose levels, one or more measurements indicative of user movement) to another mobile station or a network (e.g., Internet) server. For example, a mobile station user may be hiking when an irregular heart rhythm commences. Accordingly, such detection could be used to inform the user that he/she could stop hiking (if possible), and that his/her wireless location has been both determined and communicated to a health care professional and/or a network (LAN, WAN, Internet) server for providing the hiker with assistance.

In one embodiment, one or more Bluetooth devices may be attached to a mobile station user (e.g., the hiker immediately above) for monitoring and/or capturing data related to the user and/or his/her surroundings. Such Bluetooth devices may include components that provide the functionality of a camera, video recorder, as well as health related components for monitoring, e.g., heart rate or rhythm, blood oxygenation, glucose levels, one or more measurements indicative of user movement (e.g., an accelerometer for detecting falls as well as extended periods no or reduced user motion). Moreover, additional Bluetooth components may provided to automatically adjust sound levels provided by such Bluetooth devices according to a user's audio hearing profile as disclosed in U.S. Patent Application Publications 2008/0240477 filed Mar. 30, 2007, and 2010/0119093 filed Nov. 13, 2008 both fully incorporated herein by reference.

In one embodiment, a mobile station may be in wireless communication with transceivers distributed throughout an area (e.g., a shopping center, hospital, penal institution, school, military installation, etc.) for communicating with users (via audio and/or video) for locating and/or providing directions, alerts, notifications, etc. For example, the network of transceivers may provide WIFI communications with the mobile stations. In particular, such mobile stations may be configured to be exclusively used within such an area or configured depending on the area. Thus, a user may receive (or have automatically activated) such a mobile station upon entering the area and such a device may be relinquished (or deactivated) upon leaving the area. In particular, such mobile stations may be used in combination with, e.g., an indoor wireless communication system which performs wireless location (e.g., via matching signal strengths from the mobile stations when detected by one or more of the transceivers or access points distributed throughout the area for both communicating with and locating mobile stations in proximity of the access points. Note, that relatively inexpensive (potentially reusable or recyclable) mobile stations may be provided for use exclusively within such a predetermined area. Thus, under certain conditions, such a mobile station may be automatically activated upon detecting the distributed transceivers. In one embodiment, such mobile stations may be dispensed to users from a charging platform (e.g., an induction charging platform), wherein once the mobile station detects that it is no longer being charged, it automatically connects to the predetermined distributed network of transceivers within the area. In this manner, unused mobile stations do not burden the wireless communication system (having the distributed transceivers) with unnecessary wireless signal communications. Moreover, since (in the case of induction for charging) the mobile station mobile stations can be charged with little or no manual manipulation of the devices, labor costs for providing such mobile stations to users within the predetermined area may be reduced.

In one embodiment, mobile stations may have the network services to which they can access determined according to a geographical location estimate of such mobile stations. For example, mobile station determined to be located in a public access area of a military installation may be provided with unrestricted wireless communication, whereas the same mobile station in another non-public area of the military installation may be prevented from accessing, e.g., the Internet and/or taking photos or videos. Note, that such restrictions according to geographic location may be provided by a mobile station "services controller application" that is downloaded and installed on a mobile station wherein the application monitors the mobile station's location for activating and deactivating mobile station services according to its geographical location. In one embodiment, such mobile station geographical locations and corresponding activation/deactivation of mobile station services may be provided without incurring network communication overhead on a local (WIFI) or wide area (commercial mobile phone) wireless network. In particular, if the mobile station's location is determined according to localized wireless signals (e.g., Bluetooth) being detected, then the services controller application may be able to activate/deactivate mobile station services. Thus, upon entry to a restricted area, it may be required for all mobile stations (e.g., mobile phones, computer laptops, etc.) to be presented in proximity to a first Bluetooth device whose wireless Bluetooth signals are detected by the mobile stations, and accordingly when the services controller application installed on such mobile stations is alerted to such Bluetooth signals, the application restricts certain mobile station services, and upon exiting the restricted area, such mobile stations may be provided in proximity of an second Bluetooth device such that when Bluetooth signals therefrom are detected, the installed services controller application re-enables one or more of the restricted mobile station services. In particular, such mobile stations need not even pair with such Bluetooth devices since only the detection of the Bluetooth signals sufficiently for identifying each of the Bluetooth devices by which the mobile stations come in signal proximity is sufficient. Note that Bluetooth is recited as the signal protocol for use in the present mobile station services activation/deactivation context, another widely available signal protocol having only very local coverage that transmits device identifying information, and that is preferably inexpensive may also be used.

The present disclosure has been presented for purposes of illustration and description. Further, the description herein is not intended to limit the present disclosure to the form disclosed herein. Consequently, variation and modification commiserate with the above teachings, within the skill and knowledge of the relevant art, are within the scope of the present disclosure. The present disclosure is further intended to explain the best mode presently known of practicing the invention as recited in the claims, and to enable others skilled in the art to utilize the present disclosure, or other embodiments derived therefrom, e.g., with the various modifications required by their particular application or uses of the present disclosure. In particular, regarding the various communication network applications recited hereinabove, such communications network applications may be combined into a single network service, or provided individually.

What is claimed is:

1. A method for providing location-based information to a user via the user's wireless communication mobile unit, wherein each of a plurality fixed location communication stations includes one or more of a transmitter and a receiver for wirelessly communicating with said wireless communication mobile unit, comprising performing the following by computational equipment:

acquiring one or more wireless location estimates of the user's wireless communication mobile unit using wireless signal measurements obtained from transmissions between said wireless communication mobile unit and the plurality of fixed location communication stations for determining the wireless location estimates;

determining, for the user, (1) a satisfaction of one or more preferences indicative of data in a persistent electronic data storage separate from the wireless communication mobile unit, for allocating to the user a resource of a plurality of available resources and providing the location-based information for accessing the resource dependent upon the satisfaction of the preferences, and at least one of (2-1) an indication of a historical performance of the user accessing previously allocated resources, and (2-2) an indication of an elapsed time the user has been available for accessing one or more of the resources;

wherein the preferences are indicative of (i) at least one geographic related condition and (ii) at least one non-geographical condition;

wherein a satisfaction of the at least one geographic related condition is dependent upon data indicative of geographic travel information for traveling between a location for the resource and a location estimate of the mobile unit determined by the computational equipment using at least one of the wireless location estimates of the mobile unit;

wherein a satisfaction of the at least one non-geographical condition is dependent upon non-geographical preference data, obtained in accordance with user preference input from the user, for determining whether to allocate the resource to the user for accessing;

wherein the at least one geographic related condition, dependent on a location for the geographic travel information, is evaluated using (a) information for a time of travel between the location for the resource, and the location for the geographic travel information, or (b) information for a distance of travel between the location for the at least one resource, and the location for geographic travel information;

wherein at least one of the indication of the historical performance of the user, and the indication of the elapsed time is used in determining whether the user is preferred for being allocated the resource instead of another user also having requested allocation of one of the available resources;

determining the location-based information based on at least one of the wireless location estimates of the mobile unit, and on the location for the resource, the location-based information including identification information for identifying the resource, and location data for the location for the resource; and transmitting, on a wireless network, the location-based information to the mobile unit for presentation on the mobile unit to the user;

wherein after the transmitting of the location-based information, data indicative of the identification information and the location for the resource is presented via the mobile unit.

2. The method of claim 1, further including performing the following by the computational equipment:

identifying a plurality of routes based on at least one of the location estimates and a final destination for the routes for bringing the user and the resource together;

wherein the final destination is a rendezvous location for the user and the resource.

3. The method of claim 1, wherein the at least one geographic related condition is dependent upon a maximum travel distance between the location for the geographic travel information and the location for the resource.

4. The method of claim 1, wherein the at least one geographic related condition is dependent upon a maximum travel time between the location for the geographic travel information and the location for the resource.

5. The method of claim 1, wherein the data indicative of the identification information and the location for the resource is available to the user while the mobile unit is within a predetermined proximity of the location for the resource.

6. The method of claim 1, wherein the resource includes a transport in which the user travels to a predetermined destination.

7. The method of claim 1, wherein an evaluation of the at least one non-geographical condition determines, using data related to user access for one or more other resources, whether the user is preferred for accessing the resource.

8. The method of claim 1, further for providing, for each mobile unit ($M_2$) of a plurality of wireless telecommunication mobile units, a corresponding message to a second user's the mobile unit $M_2$, the corresponding message being a result of allocating, to the second a second user of the mobile unit $M_2$, an instance of a product, service or physical asset (collectively, product/service) according to a request by the second user, wherein there is a network having a plurality of geographically spaced apart stationary network access units for receiving wireless transmissions from the mobile units, wherein the method further comprises performing, for the second user's mobile unit $M_2$, (a) through (d) following by computational equipment:

(a) receiving, via a network transmission to a networked site for allocating one or more instances of the product/service, one or more communications resulting from one or more wireless transmissions, wherein each of the communications includes (a.1) for a corresponding location of the second user's mobile unit $M_2$, location information for the corresponding location, the location information dependent upon location dependent measurements of wireless signals received from, or transmitted to, the second user's mobile unit $M_2$, and (a.2) for the communications having a request (R) to the networked site directed to allocating to the second user one or more of the instances of the product/service;

(b) for the request R of at least one of the communications, (b.1) obtaining, for fulfilling the request R, an ordering of a plurality of predetermined services to be performed, the services in communication with the networked site for activation, the services including a service for estimating locations of the mobile units, and (b.2) using the ordering to activate the services for fulfilling the request R;

(c) for at least one service identified by the ordering, determining, for the second user, whether there is a satisfaction of one or more proximity conditions for determining whether (c.1) and (c.2) following are near to one another:

(c.1) for the second user's mobile unit $M_2$, a location estimate thereof, wherein the location estimate is determined using the location information for the corresponding location (CL) for one of the communications, and (c.2) at least one geographical location for the instance, wherein the determining of being near is dependent upon one of: (i) a determination that the corresponding location CL and the at least one geographical location are within a predetermined geographical extent indicative of being in proximity of one another, and (ii) an estimate of a time of travel of the second user for bringing the second user and a location for the instance together;

(d) dependent upon results from activation of the at least one service, including satisfaction of the proximity conditions for the instance, electronically providing the corresponding message to the second user, the corresponding message for providing data indicative of a route for bringing geographically together the second user and the location for the instance.

9. The method of claim 1, further including determining a preference for the user over the another user by: (i) calculating a first value corresponding to a travel difference between an expected travel time of the user to the resource and an expected travel time of the another user to the resource; (ii) calculating a second value corresponding to a time difference between an accrued elapsed time the user has been available and an accrued elapsed time the another user has been available; and (iii) allocating the resource dependent upon the first value and the second value.

10. The method of claim 1, wherein when, after allocation of the resource to the user and prior to the user accessing the resource, the resource becomes unavailable for access by the user, increasing a preference of the user, relative to another user, for another available resource.

11. The method of claim 1, wherein the determining whether to allocate includes computing an expected time for traveling to the resource using a statistical technique using historical travel information, and using environmental characteristics affecting travel to the resource.

12. The method of claim 1, further including, by the computational equipment, acquiring additional location estimates of the user's mobile unit, wherein the computational equipment varies a frequency of acquiring the additional location estimates varies for obtaining the additional location estimates.

13. The method of claim 1, wherein the computational equipment is configured to request additional wireless locations of the user's mobile unit for tracking it at a tracking frequency (a) dependent upon an expected change in the availability of the resource; or (b) in response to one or more deviations from a navigation route to the resource transmitted to the user's mobile after allocation of the resource.

14. The method of claim 1, wherein, after the user accepts the allocation of resource, an electronic processing state associated with the user is updated from a requesting state to an en-route state for accessing the resource, and arrival of the user at a location for accessing the resource is detected.

15. A system for providing location-based information to a user via the user's wireless communication mobile unit, wherein each of a plurality fixed location communication stations includes one or more of a transmitter and a receiver for wirelessly communicating with said wireless communication mobile unit, comprising:

a locater for acquiring one or more wireless location estimates of the user's wireless communication mobile unit using wireless signal measurements obtained from transmissions between said wireless communication mobile unit and the plurality of fixed location communication stations for determining the wireless location estimates;

electronic computational equipment for determining, for the user, (1) a satisfaction of one or more preferences indicative of data in a persistent electronic data storage separate from the wireless communication mobile unit for allocating to the user a resource of a plurality of available resources and providing the location-based information for accessing the resource dependent upon the satisfaction of the preferences, and at least one of (2-1) an indication of a historical performance of the user accessing previously allocated resources, and (2-2) an indication of an elapsed time the user has been available for accessing one or more of the resources;

wherein the preferences are indicative of (i) at least one geographic related condition and (ii) at least one non-geographical condition;

wherein a satisfaction of the at least one geographic related condition is dependent upon data indicative of geographic travel information for traveling between a location for the resource and a location estimate of the mobile unit determined by the computational equipment using at least one of the wireless location estimates of the mobile unit;

wherein a satisfaction of the at least one non-geographical condition is dependent upon non-geographical preference data, obtained in accordance with user preference input from the user, for determining whether to allocate the resource to the user for accessing; and wherein the at least one geographic related condition, dependent on a location for the geographic travel information, is evaluated using (a) information for a time of travel between the location for the resource, and the location for the geographic travel information, or (b) information for a distance of travel between the location for the at least one resource, and the location for geographic travel information;

wherein at least one of the indication of the historical performance of the user, and the indication of the elapsed time is used in determining whether the user is preferred for being allocated the resource instead of another user also having requested allocation of one of the available resources;

computational equipment for determining the location-based information based on at least one of the location estimates of the mobile unit, and on the location for the resource, the location-based information including identification information for identifying the resource, and location data for the location for the resource; and a transmitter for transmitting, on a wireless network, the location-based information to the mobile unit for presentation on the mobile unit to the user;

wherein after the transmitting of the location-based information, data indicative of the identification information and the location for the resource is presented via the mobile unit.

16. The system of claim 15, wherein the data indicative of the identification information and the location for the resource are available to the user for one or more predetermined durations of time.

17. The system of claim 15, wherein the data indicative of the identification information and the location for the resource is available to the user while the mobile unit is within a predetermined proximity of the location for the resource.

18. The system of claim 15, further including computational equipment for determining a preference for the user over the another user by: (i) calculating a first value corresponding to a travel difference between an expected travel time of the user to the resource and an expected travel time of the another user to the resource; (ii) calculating a second value corresponding to a time difference between an accrued elapsed time the user has been available and an accrued elapsed time the another user has been available; and (iii) allocating the resource dependent upon the first value and the second value.

19. The system of claim 15, wherein when, after allocation of the resource to the user and prior to the user accessing the resource, the resource becomes unavailable for access by the user, increasing a preference of the user, relative to another user, for another available resource.

20. The system of claim 15, wherein the determining whether to allocate includes computing an expected time for traveling to the resource using a statistical technique using historical travel information, and using environmental characteristics affecting travel to the resource.

21. The system of claim 15, further including a locator for acquiring additional location estimates of the user's mobile unit, wherein the locator varies a frequency of acquiring for obtaining the additional location estimates.

22. The system of claim 21, wherein the locator is configured to request wireless locations of the user's mobile unit for tracking it at a tracking frequency (a) dependent upon an expected change in the availability of the resource; or (b) in response to one or more deviations from a navigation route to the resource transmitted to the user's mobile after allocation of the resource.

23. The system of claim 15, wherein, after the user accepts the allocation of the resource, an electronic processing state associated with the user is updated from a requesting state to an en-route state for accessing the resource, and arrival of the user at a location for accessing the resource is detected.

24. A non-transitory computer-readable medium for providing location-based information to a user via the user's wireless communication mobile unit, wherein each of a plurality fixed location communication stations includes one or more of a transmitter and a receiver for wirelessly communicating with said wireless communication mobile unit, comprising computer-executable code for performing the following:

acquiring a location estimate of the user's wireless communication mobile unit using wireless signal measurements obtained from transmissions between said wireless communication mobile unit and the plurality of fixed location communication stations for determining the location estimate;

determining, for the user, (1) a satisfaction of one or more preferences indicative of data in a persistent electronic data storage separate from the wireless communication mobile unit, for allocating to the user a resource of a plurality of available resources and providing the location-based information for accessing the resource dependent upon the satisfaction of the preferences, and at least one of (2-1) an indication of a historical performance of the user accessing previously allocated resources, and (2-2) an indication of an elapsed time the user has been available for accessing one or more of the resources;

wherein the preferences are indicative of (i) at least one geographic related condition and (ii) at least one non-geographical condition;

wherein a satisfaction of the at least one geographic related condition is dependent upon data indicative of geographic travel information for traveling between a location for the resource and a wireless location estimate of the mobile unit determined by computational equipment using at least one wireless location estimate of the mobile unit;

wherein a satisfaction of the at least one non-geographical condition is dependent upon non-geographical preference data, obtained in accordance with user preference input from the user, for determining whether to allocate the resource to the user for accessing;

wherein the at least one geographic related condition, dependent on a location for the geographic travel information, is evaluated using (a) information for a time of travel between the location for the resource, and the location for the geographic travel information, or (b) information for a distance of travel between the location for the at least one resource, and the location for geographic travel information;

wherein at least one of the indication of the historical performance of the user, and the indication of the elapsed time is used in determining whether the user is preferred for being allocated the resource instead of another user also having requested allocation of one of the available resources;

determining the location-based information based on the location estimate of the mobile unit, and on the location for the resource, the location-based information including identification information for identifying the resource, and location data for the location for the resource; and transmitting, on a wireless network, the location-based information to the mobile unit for presentation on the mobile unit to the user;

wherein after the transmitting of the location-based information, data indicative of the identification information and the location for the resource is presented via the mobile unit.

25. The non-transitory computer-readable medium of claim 24, further including computer-executable code for determining a preference for the user over the another user by: (i) calculating a first value corresponding to a travel difference between an expected travel time of the user to the resource and an expected travel time of the another user to the resource; (ii) calculating a second value corresponding to a time difference between an accrued elapsed time the user has been available and an accrued elapsed time the another user has been available; and (iii) allocating the resource dependent upon the first value and the second value.

26. The non-transitory computer-readable medium of claim 24, wherein when, after allocation of the resource to the user and prior to the user accessing the resource, the resource becomes unavailable for access by the user, increasing a preference of the user, relative to another user, for another available resource.

27. The non-transitory computer-readable medium of claim 24, wherein the determining whether to allocate includes computing an expected time for traveling to the resource using a statistical technique using historical travel information, and using environmental characteristics affecting travel to the resource.

28. The non-transitory computer-readable medium of claim 24, further including computer executable code for acquiring additional location estimates of the user's mobile unit, wherein the computational equipment varies a frequency of acquiring the additional location estimates.

29. The non-transitory computer-readable medium of claim 24, wherein the computational equipment is configured to request wireless locations of the user's mobile unit for tracking it at a tracking frequency (a) dependent upon an expected change in the availability of the resource; or (b) in response to one or more deviations from a navigation route to the resource transmitted to the user's mobile after allocation of the resource.

30. The non-transitory computer-readable medium of claim 24, wherein, after the user accepts the allocation of the resource, an electronic processing state associated with the user is updated from a requesting state to an en-route state for accessing the resource, and arrival of the user at a location for accessing the resource is detected.

31. A method for providing location-based information to a user via the user's wireless communication mobile unit, wherein each of a plurality fixed location communication stations includes one or more of a transmitter and a receiver for wirelessly communicating with said wireless communication mobile unit, comprising performing the following by computational equipment:

acquiring one or more wireless location estimates of the user's wireless communication mobile unit using wireless signal measurements obtained from transmissions between said wireless communication mobile unit and the plurality of fixed location communication stations for determining the wireless location estimates;

determining, for the user, (1) a satisfaction of one or more preferences indicative of data in a persistent electronic data storage separate from the wireless communication mobile unit, for allocating to the user a resource of a plurality of available resources and providing the location-based information for accessing the resource dependent upon the satisfaction of the preferences, and at least one of 2-1) an indication of a historical performance of the user accessing previously allocated resources, and (2-2) an indication of an elapsed time the user has been available for accessing one or more of the resources;

wherein the preferences are indicative of (i) at least one geographic related condition and (ii) at least one non-geographical condition;

wherein a satisfaction of the at least one geographic related condition is dependent upon data indicative of geographic travel information for traveling between a location for the resource and a location estimate of the mobile unit determined by the computational equipment using at least one of the wireless location estimates of the mobile unit;

wherein a satisfaction of the at least one non-geographical condition is dependent upon non-geographical preference data, obtained in accordance with user preference input from the user, for determining whether to allocate the resource to the user for accessing;

wherein the at least one geographic related condition, dependent on a location for the geographic travel information, is evaluated using (a) information for a time of travel between the location for the resource, and the location for the geographic travel information, or (b) information for a distance of travel between the location for the at least one resource, and the location for geographic travel information;

wherein at least one of the indication of the historical performance of the user, and the indication of the elapsed time is used in determining whether the user is preferred for being allocated the resource instead of another user also having requested allocation of one of the available resources;

determining the location-based information based on at least one of the wireless location estimates of the mobile unit, and on the location for the resource, the location-based information including identification information for identifying the resource, and location data for the location for the resource;

transmitting, on a wireless network, the location-based information to the mobile unit for presentation on the mobile unit to the user;

wherein after the transmitting of the location-based information, data indicative of the identification information and the location for the resource is presented via the mobile unit;

determining a preference for the user over the another user by: (i) calculating a first value corresponding to a travel difference between an expected travel time of the user to the resource and an expected travel time of the another user to the resource; (ii) calculating a second value corresponding to a time difference between an accrued elapsed time the user has been available and an accrued elapsed time the another user has been available; and (iii) allocating the resource dependent upon the first value and the second value; and acquiring additional location estimates of the user's mobile unit, wherein a frequency is varied for obtaining the additional location estimates.

32. The system of claim 15, further including computational equipment for identifying a plurality of routes based on at least one of the location estimates and a final destination for the routes for bringing the user and the resource together; wherein the final destination is a rendezvous location for the user and the resource.

33. The non-transitory computer-readable medium of claim 24, further including computer-executable code for performing the following:

identifying a plurality of routes based on at least one of the location estimates and a final destination for the routes for bringing the user and the resource together;

wherein the final destination is a rendezvous location for the user and the resource.

34. The system of claim 15, wherein the at least one geographic related condition is dependent upon a maximum distance between the location for the mobile unit and the location for the resource.

35. The non-transitory computer-readable medium of claim 24, wherein the at least one geographic related condition is dependent upon a maximum travel distance between the location for the mobile unit and the location for the resource.

36. The system of claim 15, wherein the at least one geographic related condition is dependent upon a maximum travel time between the location for the geographic travel information and the location for the resource.

37. The non-transitory computer-readable medium of claim 24, wherein the at least one geographic related condition is dependent upon a maximum travel time between the location for the geographic travel information and the location for the resource.

38. The non-transitory computer-readable medium of claim 24, wherein the data indicative of the identification information and the location for the resource is available to the user while the mobile unit is within a predetermined proximity of the location for the resource.

39. The non-transitory computer-readable medium of claim 24, wherein the data indicative of the identification information and the location for the resource are available to the user for one or more predetermined durations of time.

40. The method of claim 1, wherein the data indicative of the identification information and the location for the resource are available to the user for one or more predetermined durations of time.

41. The system of claim 15, wherein the resource includes a transport in which the user travels to a predetermined destination.

42. The non-transitory computer-readable medium of claim 24, wherein the resource includes a transport in which the user travels to a predetermined destination.

43. The non-transitory computer-readable medium of claim 24, further for providing, for each mobile unit ($M_2$) of a plurality of wireless telecommunication mobile units, a corresponding message to the mobile unit $M_2$, the corresponding message being a result of allocating, to a second user of the mobile unit $M_2$, an instance of a product, service or physical asset (collectively, product/service) according to a request by the second user, wherein there is a network having a plurality of geographically spaced apart stationary network access units for receiving wireless transmissions from the mobile units, wherein the non-transitory computer-readable medium further comprises computer-executable code for performing, for the second user's mobile unit $M_2$, (a)-(d) following:

(a) receiving, via a network transmission to a networked site for allocating one or more instances of the product/service, one or more communications resulting from one or more wireless transmissions, wherein each of the communications includes (a.1) for a corresponding location of the second user's mobile unit $M_2$, location information for the corresponding location, the location information dependent upon location dependent measurements of wireless signals received from, or transmitted to, the second user's mobile unit $M_2$, and (a.2) for the communications having a request (R) to the networked site directed to allocating to the second user one or more of the instances of the product/service;

(b) for the request R of at least one of the communications, (b.1) obtaining, for fulfilling the request R, an ordering of a plurality of predetermined services to be performed, the services in communication with the networked site for activation, the services including a service for estimating locations of the mobile units, and (b.2) using the ordering to activate the services for fulfilling the request R;

(c) for at least one service identified by the ordering, determining, for the second user, whether there is a satisfaction of one or more proximity conditions for determining whether (c.1) and (c.2) following are near to one another:

(c.1) for the second user's mobile unit $M_2$, a location estimate thereof, wherein the location estimate is determined using the location information for the corresponding location (CL) for one of the communications, and (c.2) at least one geographical location for the instance, wherein the determining of being near is dependent upon one of: (i) a determination that the corresponding location CL and the at least one geographical location are within a predetermined geographical extent indicative of being in proximity of one another, and (ii) an estimate of a time of travel of the second user for bringing the second user and a location for the instance together;

(d) dependent upon results from activation of the at least one service, including satisfaction of the proximity conditions for the instance, electronically providing the corresponding message to the second user, the corresponding message for providing data indicative of a route for bringing geographically together the second user and the location for the instance.

44. The system of claim 15, further for providing, for each mobile unit ($M_2$) of a plurality of wireless telecommunication mobile units, a corresponding message to the mobile unit $M_2$, the corresponding message being a result of allocating, to a second user of the mobile unit $M_2$, an instance of a product, service or physical asset (collectively, product/service) according to a request by the second user, wherein there is a network having a plurality of geographically spaced apart stationary network access units for receiving wireless transmissions from the mobile units, wherein the system further comprises computational equipment for performing, for the second user's mobile unit $M_2$, (a)-(d) following:

(a) receiving, via a network transmission to a networked site for allocating one or more instances of the product/service, one or more communications resulting from one or more wireless transmissions, wherein each of the communications includes (a.1) for a corresponding location of the second user's mobile unit $M_2$, location information for the corresponding location, the location information dependent upon location dependent measurements of wireless signals received from, or transmitted to, the second user's mobile unit $M_2$, and (a.2) for the communications having a request (R) to the networked site directed to allocating to the second user one or more of the instances of the product/service;

(b) for the request R of at least one of the communications, (b.1) obtaining, for fulfilling the request R, an ordering of a plurality of predetermined services to be performed, the services in communication with the networked site for activation, the services including a service for estimating locations of the mobile units, and (b.2) using the ordering to activate the services for fulfilling the request R;

(c) for at least one service identified by the ordering, determining, for the second user, whether there is a satisfaction of one or more proximity conditions for determining whether (c.1) and (c.2) following are near to one another:

(c.1) for the second user's mobile unit $M_2$, a location estimate thereof, wherein the location estimate is determined using the location information for the corresponding location (CL) for one of the communications, and (c.2) at least one geographical location for the instance, wherein the determining of being near is dependent upon one of: (i) a determination that the corresponding location CL and the at least one geographical location are within a predetermined geographical extent indicative of being in proximity of one another, and (ii) an estimate of a time of travel of the second user for bringing the second user and a location for the instance together;

(d) dependent upon results from activation of the at least one service, including satisfaction of the proximity conditions for the instance, electronically providing the corresponding message to the second user, the corresponding message for providing data indicative of a route for bringing geographically together the second user and the location for the instance.

45. The method of claim 1, wherein the preferences are dependent upon data indicative of, for one or more previous allocations to the user, and each such previous allocation's corresponding instance of one of the resources, wherein the previous allocations did not result in bringing geographically together the user and a location for their corresponding instance.

46. The method of claim 1, further comprising allocating the resource and when the resource becomes unavailable after the allocating the resource, electronically transmitting to the user information indicating the unavailability and performing the determining the satisfaction of the one or more preferences again with another resource substituted for the resource.

47. The method of claim 1, wherein the location for the resource includes a location of a restaurant.

48. The method of claim 1, further comprising allocating the resource dependent upon satisfaction of a financial user transaction preference determined using input by the user indicative of the transaction preference.

49. The system of claim 15, wherein the preferences are dependent upon data indicative of, for one or more previous allocations to the user, and each such previous allocation's corresponding instance of one of the resources, wherein the previous allocations did not result in bringing geographically together the user and a location for their corresponding instance.

50. The system of claim 15, further comprising computational equipment for allocating the resource and when the resource becomes unavailable after the allocating the resource, electronically transmitting to the user information indicating the unavailability and performing the determining the satisfaction of the one or more preferences again with another resource substituted for the resource.

51. The system of claim 15, wherein the location for the resource includes a location of a restaurant.

52. The system of claim 15, further comprising computational equipment for allocating the resource dependent upon satisfaction of a financial user transaction preference determined using input by the user indicative of the transaction preference.

53. The non-transitory computer-readable medium of claim 24, wherein the preferences are dependent upon data indicative of, for one or more previous allocations to the user, and each such previous allocation's corresponding instance of one of the resources, wherein the previous allocations did not result in bringing geographically together the user and a location for their corresponding instance.

54. The non-transitory computer-readable medium of claim 24, further comprising computer-executable code for allocating the resource and when the resource becomes unavailable after the allocating the resource, electronically transmitting to the user information indicating the unavailability and performing the determining the satisfaction of the one or more preferences again with another resource substituted for the resource.

55. The non-transitory computer-readable medium of claim 24, wherein the location for the resource includes a location of a restaurant.

56. The non-transitory computer-readable medium of claim 24, further comprising computer-executable code for allocating the resource dependent upon satisfaction of a financial user transaction preference determined using input by the user indicative of the transaction preference.

* * * * *